US009264252B2

(12) United States Patent
Ebrom et al.

(10) Patent No.: US 9,264,252 B2
(45) Date of Patent: *Feb. 16, 2016

(54) CLIENT FOR AN APPLIANCE NETWORK

(75) Inventors: Matthew P. Ebrom, Holland, MI (US); Robert J. Feldbruegge, Stevensville, MI (US); Mark E. Glotzbach, Granger, IN (US); Richard A. McCoy, Stevensville, MI (US); Christopher S. Moes, Sodus, MI (US); Andrew D. Whipple, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1107 days.

This patent is subject to a terminal disclaimer.

(21) Appl. No.: 12/340,995

(22) Filed: Dec. 22, 2008

(65) Prior Publication Data

US 2009/0132070 A1 May 21, 2009

Related U.S. Application Data

(63) Continuation of application No. 11/953,595, filed on Dec. 10, 2007, which is a continuation-in-part of application No. PCT/US2006/022503, filed on Jun. 9, 2006, and a continuation-in-part of application No. PCT/US2006/022420, filed on Jun. 8, 2006.

(60) Provisional application No. 60/595,148, filed on Jun. 9, 2005.

(51) Int. Cl.
G06F 15/16 (2006.01)
H04L 12/28 (2006.01)
(Continued)

(52) U.S. Cl.
CPC ............ *H04L 12/2825* (2013.01); *D06F 33/02* (2013.01); *D06F 39/005* (2013.01);
(Continued)

(58) Field of Classification Search
CPC .............. H04L 12/2816; H04L 12/283; H04L 12/2827; H04L 12/2832; H04L 67/12; H04L 2012/285; H04L 63/105; H04L 12/282; H04L 12/285; H04L 12/2803; H04L 12/2807; H04L 12/2814; H04L 12/2818; H04L 12/2823; H04L 12/2825; Y02B 40/143; Y02B 60/165; A47L 15/0063; D06F 33/02; D06F 39/005; G06F 11/3495; G06F 9/54
USPC .................................................. 709/217, 201
See application file for complete search history.

(56) References Cited

U.S. PATENT DOCUMENTS 4,303,990 A 12/1981 Seipp
4,480,307 A 10/1984 Budde et al.
(Continued)

FOREIGN PATENT DOCUMENTS

CN 481119 A 3/2004
EP 0802465 10/1997
(Continued)

OTHER PUBLICATIONS

Al-Ali, A.R. et al. Java-Based Home Automation System. IEEE Transaction on Consumer Electronics, vol. 50, No. 2. [online]. May 2004 [retrieved on Dec. 14, 2010]. Retriteved from the Internet<URL>: http://ieeexplore.ieee.org/stamp/stamp.jsp?tp=&arnumber=1309414&userType=inst.*
(Continued)

Primary Examiner — Daniel C Murray
Assistant Examiner — Adam Cooney

(57) ABSTRACT

A client having at least one memory location is provided for use with an appliance network. The client includes an arbitrary software component for performing a useful function, a software architecture or a software architecture driver configured to generate or enable transmission of messages, and means to communicate by message over a network. Thus, the client can have full capability to act as an accessory to an appliance to communicate with and to enhance or alter the operation of the appliance.

28 Claims, 67 Drawing Sheets

(51) Int. Cl.
| | |
|---|---|
| *D06F 33/02* | (2006.01) |
| *D06F 39/00* | (2006.01) |
| *G04G 7/00* | (2006.01) |
| *G06F 9/54* | (2006.01) |
| *G06F 11/34* | (2006.01) |
| *H04L 29/06* | (2006.01) |
| *H05B 6/68* | (2006.01) |
| *G06Q 10/06* | (2012.01) |
| *A47L 15/00* | (2006.01) |
| *H04L 29/08* | (2006.01) |

(52) U.S. Cl.
CPC . *G04G 7/02* (2013.01); *G06F 9/54* (2013.01); *G06F 11/3495* (2013.01); *G06Q 10/06* (2013.01); *H04L 12/282* (2013.01); *H04L 12/2803* (2013.01); *H04L 12/2814* (2013.01); *H04L 12/2818* (2013.01); *H04L 12/2823* (2013.01); *H04L 12/2827* (2013.01); *H04L 12/2832* (2013.01); *H04L 63/105* (2013.01); *H05B 6/688* (2013.01); *A47L 15/0063* (2013.01); *H04L 12/2807* (2013.01); *H04L 67/12* (2013.01); *H04L 69/26* (2013.01); *H04L 2012/285* (2013.01); *Y02B 40/143* (2013.01); *Y02B 60/165* (2013.01)

(56) References Cited

U.S. PATENT DOCUMENTS

| | | | |
|---|---|---|---|
| 4,503,535 | A | 3/1985 | Budde et al. |
| 5,113,398 | A | 5/1992 | Howes |
| 5,321,229 | A | 6/1994 | Holling et al. |
| 5,754,548 | A | 5/1998 | Hoekstra et al. |
| 6,105,122 | A | 8/2000 | Muller et al. |
| 6,121,593 | A | 9/2000 | Mansbery et al. |
| 6,148,349 | A | 11/2000 | Chow et al. |
| 6,160,796 | A | 12/2000 | Zou |
| 6,295,272 | B1 | 9/2001 | Feldman et al. |
| 6,426,947 | B1 | 7/2002 | Banker et al. |
| 6,681,248 | B1 | 1/2004 | Sears et al. |
| 6,711,632 | B1 | 3/2004 | Chow et al. |
| 6,847,614 | B2 | 1/2005 | Banker et al. |
| 6,883,065 | B1 | 4/2005 | Pittelkow et al. |
| 6,996,115 | B1 | 2/2006 | Budde et al. |
| 6,996,741 | B1 | 2/2006 | Pittelkow et al. |
| 7,003,688 | B1 | 2/2006 | Pittelkow et al. |
| 7,043,663 | B1 | 5/2006 | Pittelkow et al. |
| 7,069,468 | B1 | 6/2006 | Olson et al. |
| 7,081,830 | B2 * | 7/2006 | Shimba et al. ............. 340/12.31 |
| 7,117,051 | B2 * | 10/2006 | Landry et al. ................... 700/83 |
| 7,127,633 | B1 | 10/2006 | Olson et al. |
| 7,134,011 | B2 | 11/2006 | Fung |
| 7,136,927 | B2 | 11/2006 | Traversat et al. |
| 7,165,107 | B2 | 1/2007 | Pouyoul et al. |
| 7,171,475 | B2 | 1/2007 | Weisman et al. |
| 7,263,560 | B2 | 8/2007 | Abdelaziz et al. |
| 7,526,539 | B1 * | 4/2009 | Hsu ............................... 709/223 |
| 2001/0025349 | A1 | 9/2001 | Sharood et al. |
| 2002/0069399 | A1 * | 6/2002 | Miloushey et al. ........... 717/108 |
| 2002/0161552 | A1 | 10/2002 | Ryu |
| 2002/0165950 | A1 | 11/2002 | Lee et al. |
| 2003/0018733 | A1 | 1/2003 | Yoon et al. |
| 2003/0177268 | A1 | 9/2003 | Youn et al. |
| 2005/0011886 | A1 | 1/2005 | Kim |
| 2005/0013310 | A1 | 1/2005 | Banker et al. |
| 2005/0018612 | A1 | 1/2005 | Fitzgerald |
| 2005/0044225 | A1 | 2/2005 | Ota et al. |
| 2005/0103466 | A1 | 5/2005 | Landry et al. |
| 2005/0143129 | A1 | 6/2005 | Funk et al. |
| 2005/0212663 | A1 | 9/2005 | Matsumoto et al. |
| 2005/0251604 | A1 | 11/2005 | Gerig |
| 2006/0009861 | A1 | 1/2006 | Bonasia et al. |
| 2006/0092861 | A1 | 5/2006 | Corday et al. |
| 2006/0120302 | A1 | 6/2006 | Poncini et al. |
| 2006/0123124 | A1 | 6/2006 | Weisman et al. |
| 2006/0123125 | A1 | 6/2006 | Weisman et al. |
| 2006/0123807 | A1 | 6/2006 | Sullivan et al. |
| 2006/0168159 | A1 | 7/2006 | Weisman et al. |
| 2006/0168269 | A1 | 7/2006 | Sather et al. |
| 2006/0184661 | A1 | 8/2006 | Weisman et al. |
| 2006/0190266 | A1 | 8/2006 | Tanigawa et al. |
| 2007/0061266 | A1 | 3/2007 | Moore et al. |
| 2007/0129812 | A1 | 6/2007 | Ferchau |
| 2007/0129813 | A1 | 6/2007 | Ferchau |
| 2007/0160022 | A1 | 7/2007 | McCoy et al. |
| 2007/0162158 | A1 | 7/2007 | McCoy et al. |
| 2007/0217341 | A1 | 9/2007 | Kawabata et al. |
| 2007/0240173 | A1 | 10/2007 | McCoy et al. |

FOREIGN PATENT DOCUMENTS

| | | |
|---|---|---|
| EP | 1016831 A1 | 7/2000 |
| EP | 1028604 A2 | 8/2000 |
| EP | 1351447 A1 | 10/2003 |
| KR | 1020020052064 A | 7/2002 |
| WO | 03031876 A1 | 4/2003 |
| WO | 2005/109135 A1 | 11/2005 |
| WO | 2006/014504 A2 | 2/2006 |
| WO | 2006096854 A2 | 9/2006 |
| WO | 2006/135726 A2 | 12/2006 |
| WO | 2006/135758 A1 | 12/2006 |

OTHER PUBLICATIONS

H. Kim, et al., "USB-based home control system using OSGi", International Conference on Consumer Electronics, Jan. 7-11, 2006.

H. Kim, et al., "Wireless USB-Based Home Security System on the OSGi Service Platform", International Conference on Consumer Electronics, Jan. 10-14, 2007.

Jeffrey Nichols, Brad A. Myers, Michael Higgins, Joseph Hughes, Thomas K. Harris, Roni Rosenfeld, Mathilde Pignol; Generating Remote Control Interfaces for Complex Appliances; pp. 1-10; Human Computer Interaction Institute, School of Computer Science, Carnegie Mellon University, Pittsburgh, PA 15213, USA.

Brad A. Myers, Jeffrey Nichols, Robert C. Miller; Taking Handheld Devices to the Next Level; pp. 36-42; Downloaded on Jan. 22, 2009 at 13:32 from IEEE Xplore; published by IEEE Computer Society.

European Search Report for Application No. EP08843374.3, dated May 27, 2014.

European Search Report for Application No. EP08845484.8, dated May 26, 2014.

European Search Report for Application No. EP08844798.2, dated May 26, 2014.

European Search Report for Application No. EP08845255.2, dated Jun. 6, 2014.

* cited by examiner

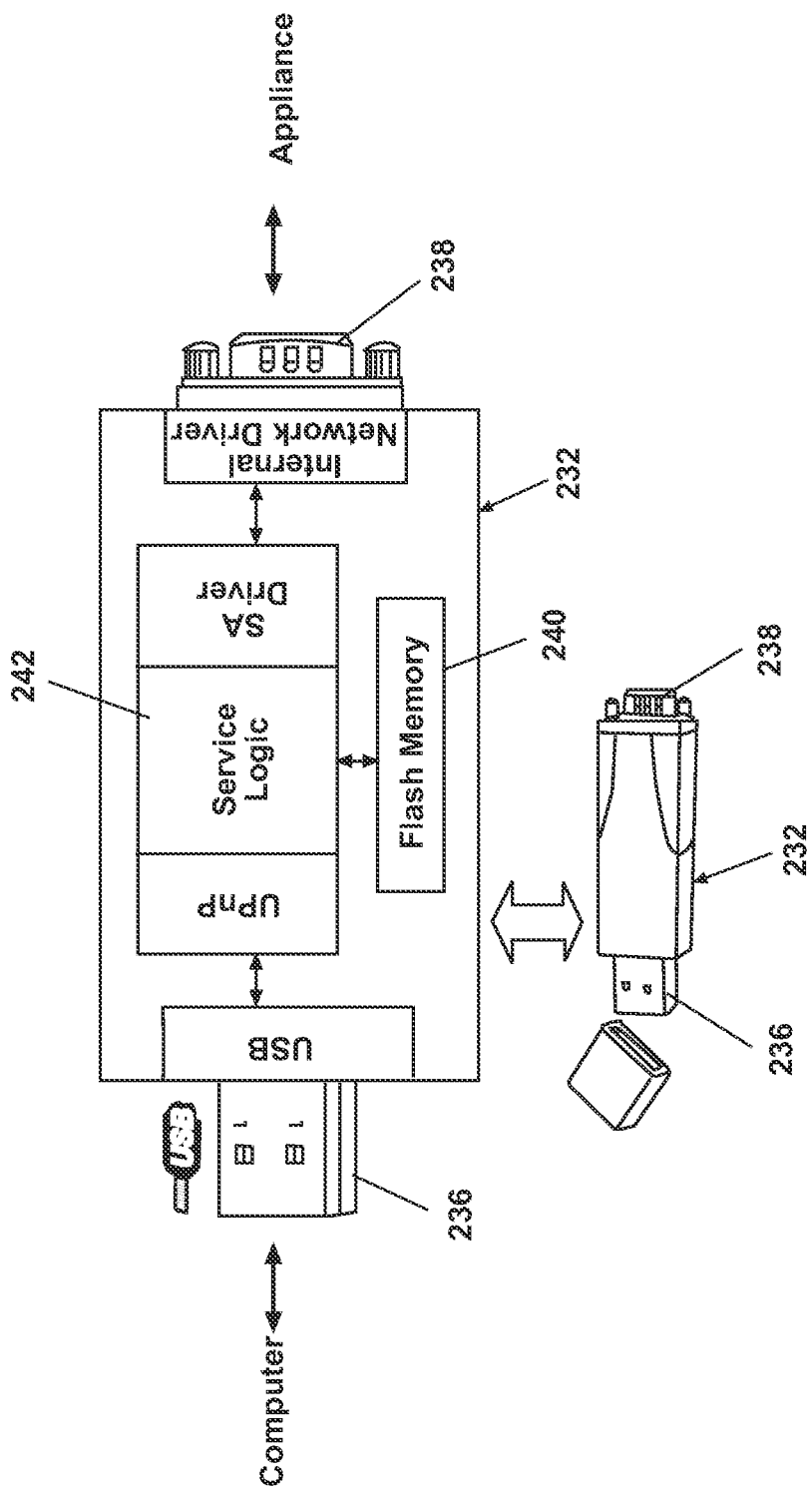

| Frag | MFP | MID | FID | |
|---|---|---|---|---|
| | Cmd/Fb | OpCode | | - Fragmented Message Bit Definition |
| | | | | - Standard Message Bit Definition |
| 1 | Cmd | OpCode | | - First fragment contains OpCode and Cmd/Fb bit |
| 1 | 1 | 0 | 0 | - Second fragment begins MID and FID counters |
| 1 | 1 | 0 | 1 | - Only the FID counter increments inside the message |
| 1 | 1 | 0 | 2 | - FID increments again to ensure no fragments are lost |
| 1 | 0 | 0 | 3 | - MFP = 0 indicates fragmentation is complete |
| 1 | Fb | OpCode | | - Next fragmented message begins with OpCode |
| 1 | 1 | 1 | 0 | - Now the MID increments for this new message group |
| 1 | 1 | 1 | 1 | - FID counter incremented |
| 1 | 0 | 1 | 2 | - Fragmented message complete |
| 0 | Fb | OpCode | | - A standard feedback message is sent here so Frag = 0 |
| 1 | Cmd | OpCode | | - Next fragmented message begins with Frag = 1 |
| 1 | 0 | 2 | 0 | - The FID always starts at 0 and counts up to 7 |
| 1 | Cmd | OpCode | | - Next fragmented message begins |
| 1 | 1 | 3 | 0 | - The maximum value for the MID is 3 |
| 1 | 0 | 3 | 1 | - Message complete |
| 0 | Cmd | OpCode | | - A standard message is sent. This is a command message |
| 1 | Fb | OpCode | | - Next fragmented message begins |
| 1 | 1 | 0 | 0 | - The MID rolls over from 3 to 0 for this message group |
| 1 | 0 | 0 | 1 | - MFP = 0 - message complete |

| oid | mid | argi | argn |
|-----|-----|------|------|
| 1   | 1   | 0    | 0    |

Fig. 65

CLIENT FOR AN APPLIANCE NETWORK

CROSS-REFERENCE TO RELATED APPLICATIONS

This application is a continuation of U.S. patent application Ser. No. 11/953,595, filed Dec. 10, 2007, which is a continuation-in-part of International Application No. PCT/US2006/022420, filed Jun. 8, 2006 and International Application No. PCT/US2006/022503, filed Jun. 9, 2006, both of which claim the benefit of U.S. Provisional Patent Application No. 60/595,148, filed Jun. 9, 2005, all of which are incorporated in their entireties by reference.

BACKGROUND OF THE INVENTION

1. Field of the Invention

The invention relates to network systems of appliances and the software architecture of the network.

2. Description of the Related Art

Household appliances are typically comprised of one or more components which cause the electromechanical, electrothermal, and electrochemical operations of the appliance. For example, an oven may include an appliance management component, having a printed circuit board (PCB) with memory thereon, as well as a user interface component, such as a control panel or keypad for a user to issue commands to the oven appliance. The basic appliance models typically are difficult to design, develop, test, diagnose, control, and debug due to the diversity of componentry and the associated diversity of implementation choices. This diversity is an impediment to creating interoperable, reusable, value added componentry.

It has become known in recent years to interlink the components of an appliance by an internal communications network capable of sending and receiving control messages for controlling the interaction between the internal components of an appliance, as opposed to the use of a plurality of discrete circuits, with each discrete circuit responsible for an individual communication between related components and implemented by hard-wiring ribbon cables or other connectors or harnesses between the components. This internal network affords some degree of universality in connecting the components internal to the appliance, however, each component typically needs to be enabled with software within its microprocessor and the adjacent hardware circuitry to achieve network participation. One example of this internal network used within a household appliance is the WIDE network protocol, created by Whirlpool, Inc., the assignee of this document.

SUMMARY OF THE INVENTION

According to the invention, a client having at least one memory location is provided for use with an appliance network. The client includes an arbitrary software component for performing a useful function, a software architecture or a software architecture driver configured to generate or enable transmission of messages, and means to communicate by message over a network. Thus, the client can have full capability to act as an accessory to an appliance to communicate with and to enhance or alter the operation of the appliance. The client can be a physical device.

In one aspect, the client can include one or more identifiers residing in one or more memory locations. Preferably, the identifier will be one of a class identifier, a sub-class identifier, at least one instance ID, a model number and a serial number of the appliance or components of the appliance, a functional identifier, identifier of a method, identifiers of objects, identifiers of class attributes, network identifiers, a unique numeric addressing identifier, a unique numeric functional identifier, and an API ID that can serve as a portion of a unique numeric addressing identifier.

In another aspect, the identifier includes one or more class identifiers and one or more instance identifiers where the instance identifiers are cached and indexed to a class identifier. In another aspect, the identifier is an identifier of function or an identifier of another client node on a network. Preferably, an arbitrary software component, the software architecture, or the software architecture driver develops references to the identifier of a different node on a network so that the client can communicate with the different node by message using the references.

The client can include a display for communication with a user. The client can also include a control command for communication by message that can affect a cycle of operation of a networked appliance. In one aspect, the control command is configured to create objects or instances of classes in a networked appliance. In another aspect, the control command is configured to change values in a first objects field to a third object from a second object in an appliance control system of a networked appliance. In another aspect, the control command is configured to place a networked appliance into one of two or more operating modes.

The client can be configured to query a network for information such as the identity of another node on a network, an appliance, a client, an arbitrary software component, a device comprising a node, a coupler, one or more of a plurality of identifiable software elements on any node, or the functional identifiers thereof. In one aspect, the query can be a propagated message. In another aspect, at least one identifier can be received in response to a query.

The arbitrary software component of the client can be one of a clock and time synchronization accessory, a stirring and ingredient addition accessory, a cooking sensor accessory, an operation cycles accessory, a consumable messaging and reader accessory, a recipe book, a recipe wand, a laundry credit accessory, a smart dimmer and adapter, a network binder accessory, a remote user interface, a smart coupler, a resource communication accessory, a cellular telephone accessory, a configuration mechanism, an audio communication accessory, and a remote audio communication accessory.

The software architecture or software architecture driver can be configured to communicate a password. The client can also include identification information in order for the client to establish useful communications with other communicating nodes without the arbitrary software component having knowledge of routing information otherwise required to enable the useful communication.

The software architecture or software architecture driver can be configured to collect data associated with a node synchronously for a complete snapshot of updates to the state of the node for one scan of a processor, so that meaningful dynamic and virtual data aggregation can occur regardless of changing states of the node. As well, the software architecture or software architecture driver can be configured to send a plurality of commands to a second node by a message protocol enabled by the one of a software architecture and a software architecture driver wherein multiple messages are used to convey elements of a command, bounded together synchronously whereby the receiving node will know when to begin executing the command.

In one aspect, the arbitrary software component is configured to send configuration messages over a network to create an event structure in a memory heap. In another aspect, the arbitrary software component is further configured to classify the event structure as acknowledged or unacknowledged. In another aspect, the arbitrary software component is configured to invoke a function of a second arbitrary software component utilizing encapsulated routing information where the invocation does not contain routing information. The arbitrary software component can be configured to listen to a heartbeat of a networked appliance.

The client can include a source of information about a resource used by an appliance of the type configured to perform an operation on a physical article where the appliance consumes at least some of a resource in performing the operation. The source will typically include a request to change the operation of an appliance in response to a resource parameter or a request for the status of a resource used by the appliance.

The client can include an embedded virtual router, in which case the arbitrary software component is configured to collaborate with another software component by a method of access or exposure to each other. Here, the embedded virtual router encapsulates the method, so that the collaboration can be uniform and identical whether the collaboration is over a network or sharing a runtime environment.

BRIEF DESCRIPTION OF THE DRAWINGS

FIG. 21A is a schematic illustration of architecture for the service module of FIG. 21.

FIG. 25 illustrates a sequence of packets representing a series of fragmented messages transmitted in the form shown in FIG. 2, which are by the receiving SA and reformed into the original cohesive data sets created by the sender of the packets.

FIG. 65 is a schematic view illustrating an exemplary packet structure for an object-oriented message in an appliance.

DESCRIPTION OF EMBODIMENTS OF THE INVENTION

A brief overview of the invention should be helpful before examining the multiple aspects of the invention. The invention relates to a software architecture ("SA") that is implemented on and communicates over an internal communications network on an appliance, which connects the various physical components of the appliance.

Some of the physical components have a corresponding controller (main controller, motor controller, user interface, etc.), which may be a simple microprocessor mounted on a printed circuit board. Other components have no controller. Typically the components that have controllers (and if there are more than one are typically also network enabled) cooperate through network messaging or other forms of data transmission to directly or indirectly, through other components, control the operation of all of the components and their contained or attached devices to implement an operation or cycle for the appliance.

The SA can, but does not have to, reside on each of the components with a controller. Those components with the SA or a variant of the SA compliant with the SA (compliance determined by the ability to send, receive, and process packets) form a node on the network that can communicate with the other nodes.

The SA performs multiple functions: identifying each of the components corresponding to a node to the network; identifying the capabilities or functions of the identified components to the network; identifying the status of the components to the network; providing well defined command interfaces for each component; providing communication between internal and external software components that are not part of the SA; and providing communication between components non-SA software components on different physical components. In this way, the SA functions to inform all of the nodes on the network of the presence, capabilities, and status of the other nodes.

The SA comprises multiple modules, each of which has different functionality. Various combinations of the modules or all of the modules can reside on each of the components. One module having the basic or core functionality for the invention resides on all of the components. In one anticipated configuration, all of the modules reside at least on the main controller, which establishes the main controller to function as a primary or controller SA, with the other nodes functioning in a client relationship to the controller SA. In such a configuration, all of the nodes would communicate through the controller SA.

The SA is sufficiently robust that it can permit configurations without a controller SA or with multiple controller SAs. Regardless of the configuration, any component with a residing SA can function as a client with respect to the other components.

The internal communications can be connected to one or more external components directly or through an external network. The external components would also have one, some, or all of the SA modules in resident.

Figure 1:
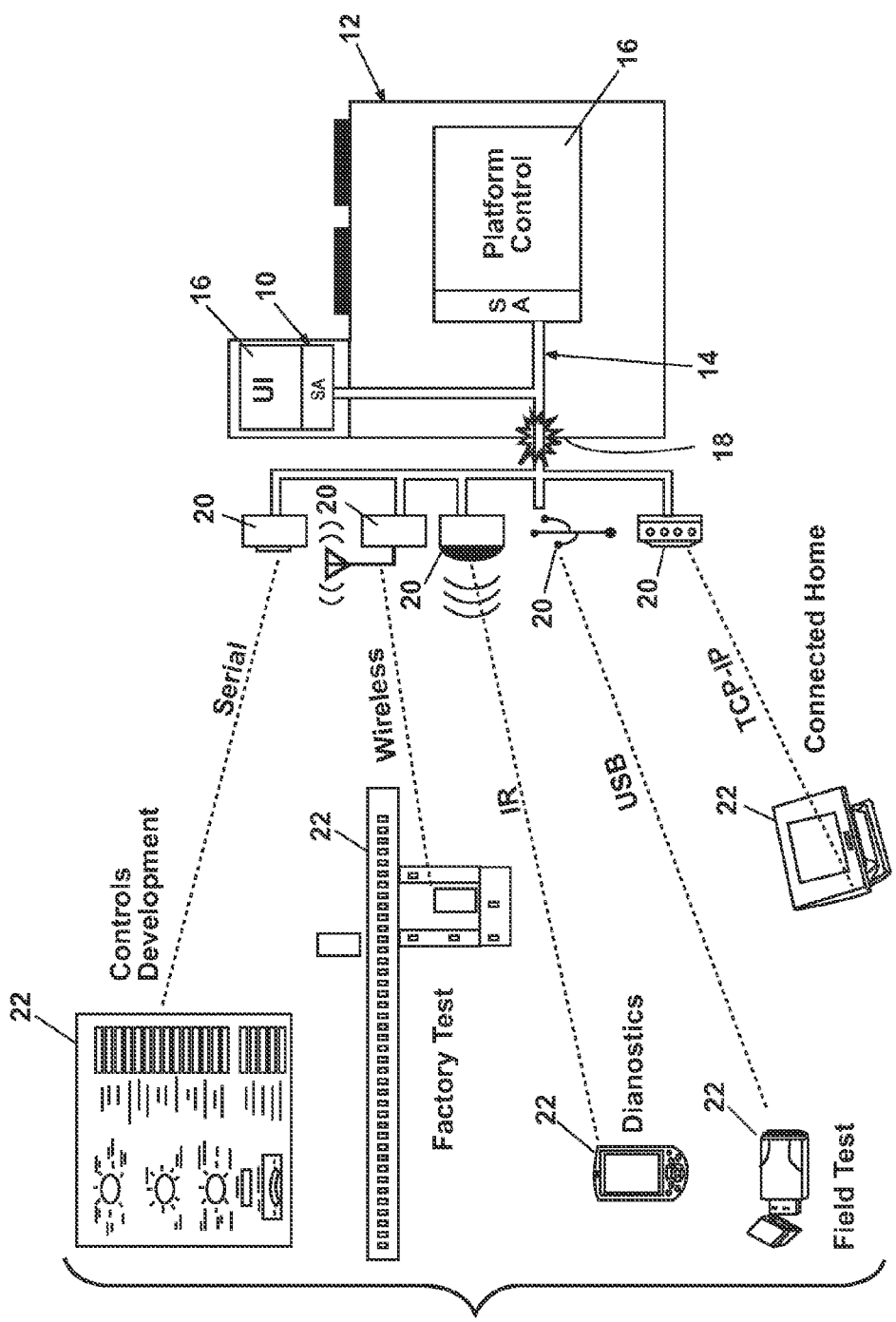
FIG. 1 is a schematic illustration showing a household appliance having an internal communication network interconnecting a plurality of components, wherein each component has a software architecture embedded therein according to the invention, the household appliance also having an external communications connection showing various network interface cards (NICs) establishing communication with various embodiments of external clients.

Beginning with FIG. 1, the specifics of the invention will now be described. FIG. 1 is a schematic illustrating one environment of a software architecture 10, (embodying the systems and methods described herein and those which would be apparent to one skilled in the art) in the form of a household appliance 12 having an internal communication network 14 interconnecting a plurality of components 16, which can be internal clients when they include at least a portion of the SA or can otherwise exchange messages across the network 14, wherein the software architecture 10 resides on at least one component 16 to enable the component 16, and preferably each additional component 16 has the software architecture 10 in resident, or an alternate able to be interoperable with. The household appliance 12 also has an internal/external communications connection 18 shown interconnected to various network interface devices 20 for communication with various embodiments of an external client 22.

The external clients will typically comprise computing hardware and software and networking hardware and software able to interact with the software architecture 10. This may be achieved by including all or a portion of the software architecture 10 within the embodiment of the external client or an alternative to the software architecture 10 which is able to communicate and fully or partially interact with the software architecture 10. A number of alternate components (C dll, Visual Basic Driver, Java Driver, and Active X driver) able to fully interact with the software architecture 10 have been implemented.

In connection with the text of this patent application and in review of the drawings accompanying the text of this application, it will be understood that the abbreviation "SA" refers to "software architecture" as described by reference numeral 10 in this application.

Further, the term "client" is used to refer a component on which all or a portion of the SA resides and which fully or partially enables the functionality of the component. The component can be either an internal or external component. While client will primarily be used to describe a component enabled by the SA, client is also used to describe a component that is enabled by an alternate software that is able to successfully exchange messages on internal communication network 14 and communicate with the SA. Generally, the term client is used when referring to the software aspects and not the hardware aspects of the node.

The components 16 can comprise one or more devices. Thus, the term "device" as used in the application can refer to a component or to a device. The devices can be any electronic, electro-thermal, and electromechanical elements which collectively form the component or which are attached to a component with a controller via electrical circuitry (e.g., wiring harness), a physical part which can execute logic, and a physical part which has memory.

As described herein, the appliance 12 can be any of the well-known variety of appliances which would be well known to one skilled in the art. For example, the appliance 12 can be a washer, a dryer, a microwave, a dishwasher, a refrigerator, a refrigerator/freezer combination, a stand-alone freezer, a warming drawer, a refrigerated drawer, an oven, a combination cooktop and oven, a cooktop, and the like. While the described environment of the invention is that of an appliance, the invention has applicability to any type of machine having networked components.

As described herein, the internal communication network 14 can be any well-known interconnecting conduit, wiring and/or harness, or wireless system suitable for interconnecting the various internal components 16 of a household appliance 12. As described in the background section of this application, the WIDE network is a suitable internal communication network 14 to provide the internal communications necessary to support the software architecture 10 according to the invention. It will be apparent to one skilled in the art that the software architecture 10 can run on any suitable internal network, and that the illustrative example provided herein (i.e. the WIDE network) is simply one example of a suitable internal communication network 14.

As previously stated, component 16 is any processor-based component or sub-component of a household appliance 12. Examples of components 16 suitable for receiving and installation of the software architecture 10 according to the invention include, but are not limited to, motor control microprocessors, microprocessor enabled key pad controllers, LCD user interface controllers, and other device controls typically included within a household appliance 12.

The internal/external interface connector or slot 18 is suitable for connecting a plurality of types of devices 20, which are able to communicate on the internal communication network 14 and at least one other network such as RS-232 serial, various forms of wireless (Zigbee, Wi-Fi, etc), USB, or wired Ethernet, etc. The functionality of the device 20 may be strictly limited to protocol and physical layer conversion, or may be expanded to support value added services in addition to its base protocol bridging function.

Examples of external clients 22 to which the software architecture 10 permits a household appliance 12 to be connected include, but are not limited to, a personal computer-based control development, a factory testing application, a diagnostic application, a field test application, and an interface to a connected home environment. This connection to the external environment, whether adjacent to or remote from the appliance 12, enables value-added applications to communicate with the appliance 12. Some examples are:

Automated factory test
Energy Management applications
Engineering development tools
Appliance Service and Diagnostic Tool
Electronic Controls Manufacturing Functional Verification Testing
Consumer Applications . . . etc.

The system level architecture (mechanical, electrical, and software elements participating to achieve a useful purpose of the household appliance) includes the software architecture 10 and software elements apart from the software architecture 10. The collection of software elements, including but not limited to the software architecture 10, within the microprocessor of a component of the system architecture is herein referred to as a software operating environment 16A. The software architecture 10 is comprised of three components: a core implementation, an application protocol definition, one or more application program interfaces (referred to herein as "API" or "APIs" in the plural).

Core Implementation

Figure 3:
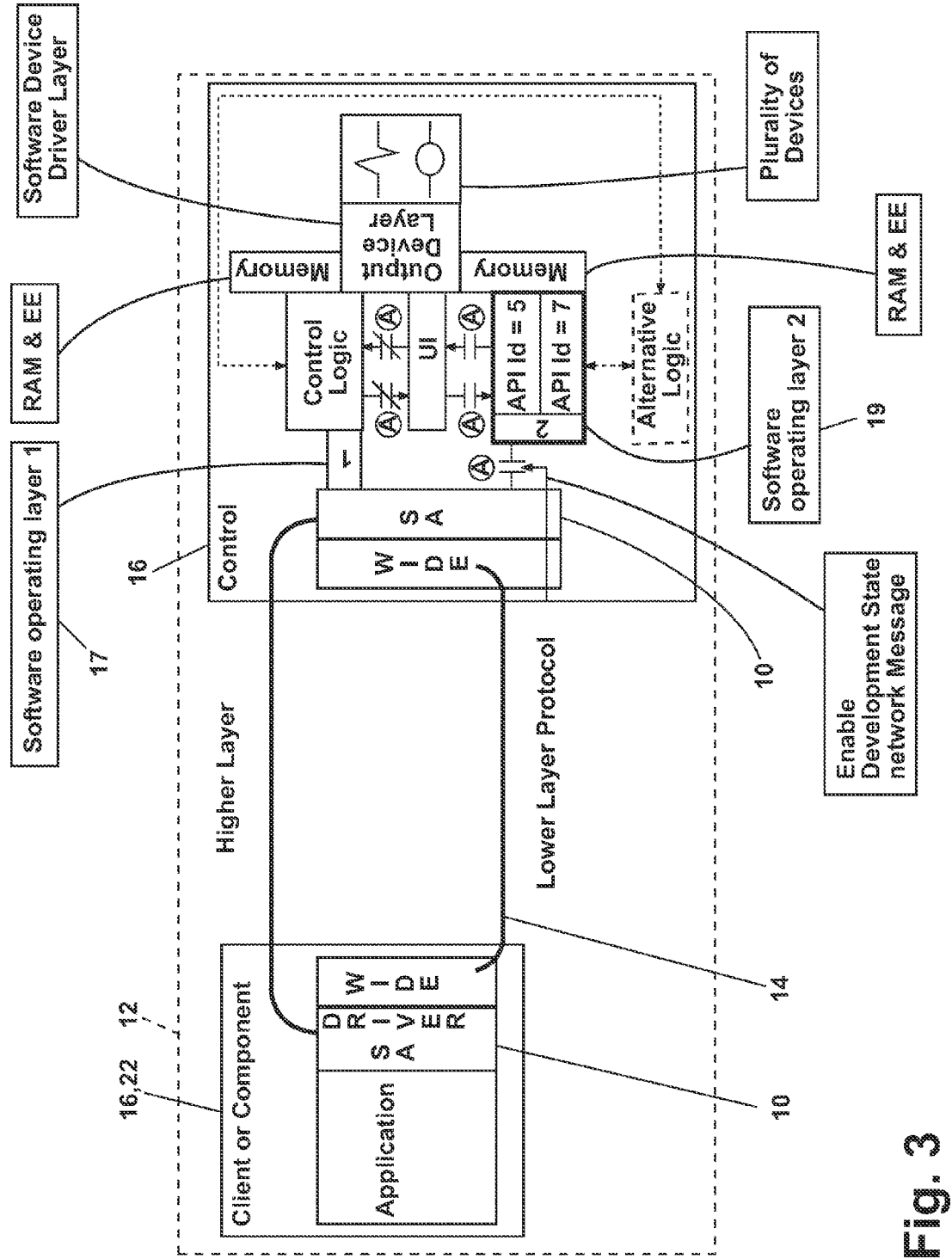
FIG. 3 is a schematic illustration of the internal communications network of FIG. 1 showing the internal communications network functioning as a physical support for the SA residing on two components (a Lower Layer, which represents the network physical layer and is not directly associated with the SA, and a Higher Layer, which represents support for packet structure and is directly an element of the SA). with the SA used by the components to communicate through information exchange and to interact with other software operating layers residing on the components to achieve the results in accordance with the information exchanged between components according to the invention.
Figure 11:
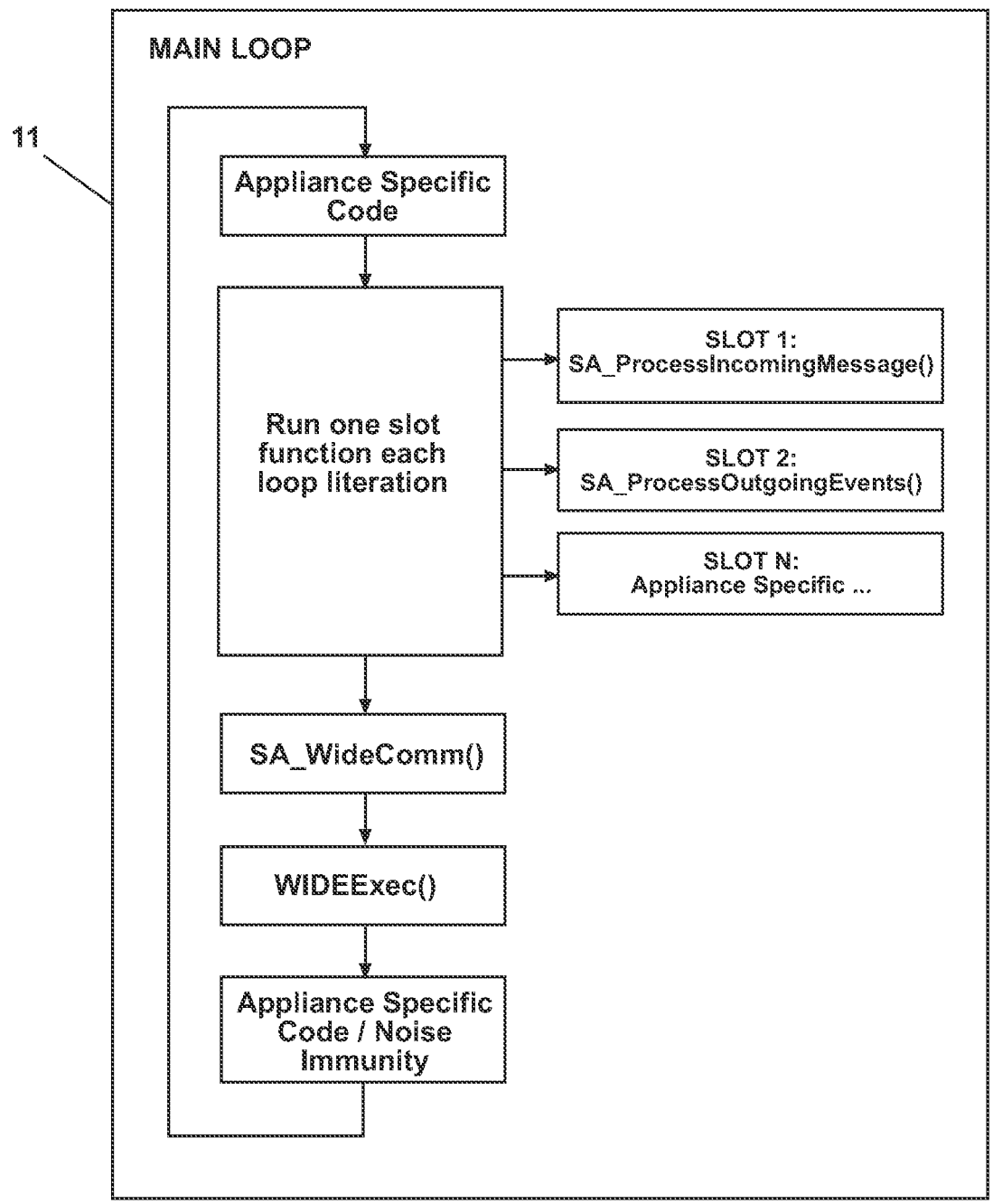
FIG. 11 is a schematic illustration showing the invocation of the controller SA by the supervisory scheduler (MAIN) residing on the main controller, which also invokes a subroutine call to expose functions of client SA's on the network.
Figure 12:
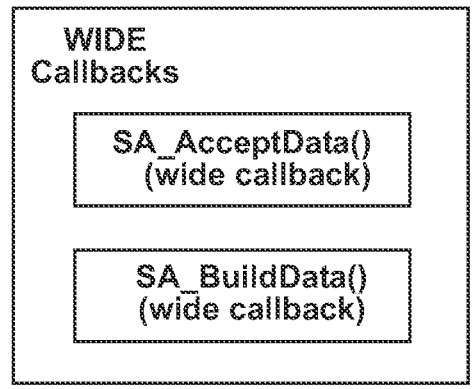
FIG. 12 is a schematic illustration showing the interface between the internal appliance application logic and the software architecture shown in FIG. 11 including a callback section.

The core implementation of the software architecture 10 is a collection of software modules (examples found in FIG. 3 are SACore, SADiscovery, SADAQ, SAPortMemory, SAPollVariable) executing in an appliance control microprocessor. As shown in FIG. 11, the core implementation is preferably executed in the MAIN loop of the appliance control microprocessor which will be apparent to one skilled in the art. The core provides a common application messaging layer over the internal communication network 14 and is based on a flexible design enabling the development of cross-platform connectivity applications. As part of the core implementation, a core API will exist which will be uniformly implemented on each appliance. Moreover, where uniform implementation is not practical, a discovery mechanism may be used, allowing adaptation by the client to the non-uniformity.

Application Protocol Definition

A protocol is a standard procedure for regulating data transmission between nodes in a network. Messages are sent across the internal communication network in one or more packets of data, which are then assembled to form a communicated message. There are two applicable areas of definition relative to the software architecture 10.

Figure 4:
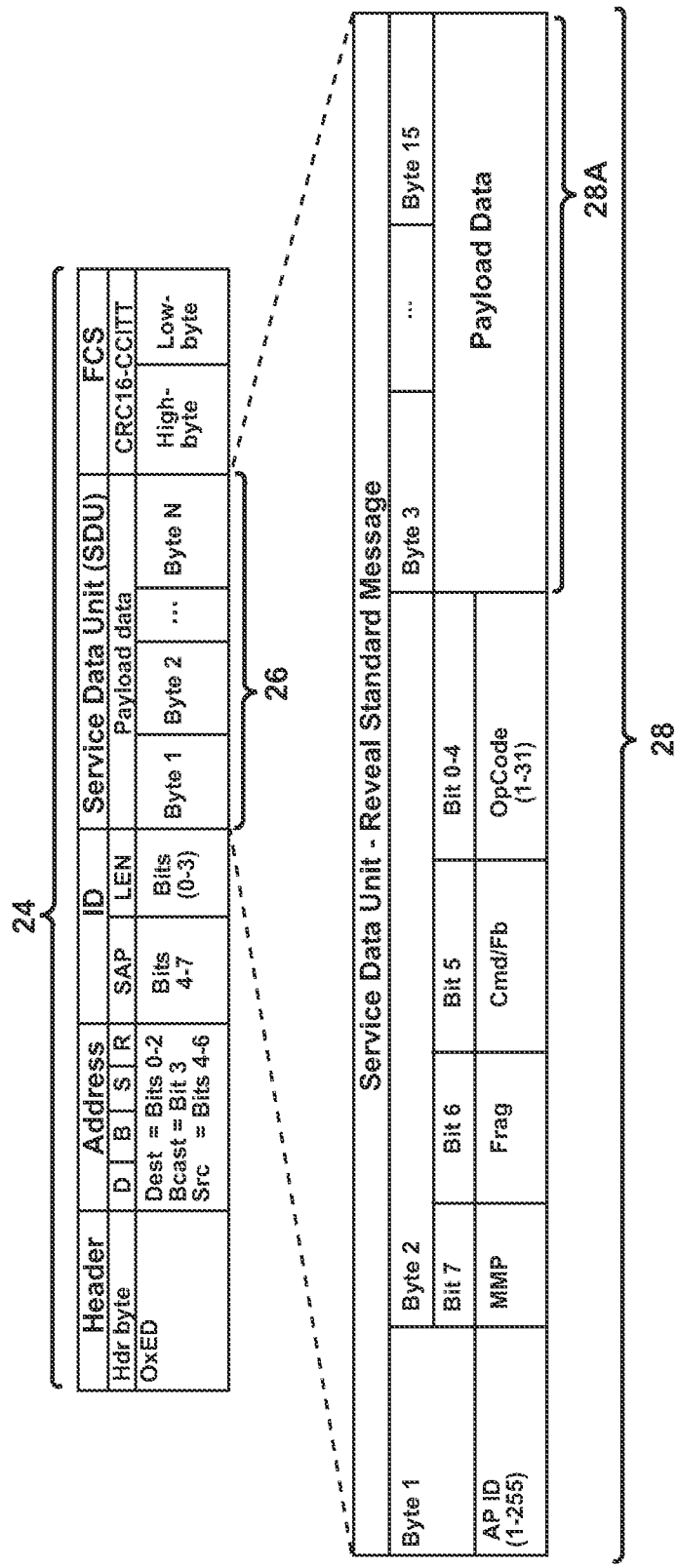
FIG. 4 is a schematic illustration of a packet structure for the internal communications network of the household appliance shown in FIG. 1 having a payload portion comprising an application packet structure for the software architecture according to the invention.
Figure 24:
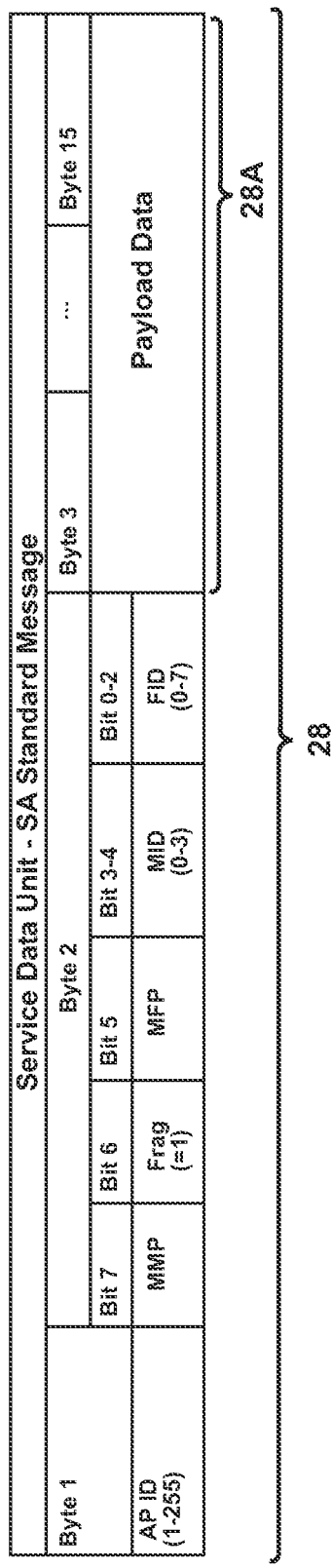
FIG. 24 is a schematic illustration of a fragmentation packet structure for the internal communications network of the household appliance shown in FIG. 1 having protocol for handling fragmented packet integrity, which replaces the protocol illustrated in FIG. 4 when a message must be broken into multiple messages.

1. Packet Definition: is the pre-defined meaning for each byte within a collection of bytes which make the packet, or bits or bit ranges within one of those bytes therein. FIG. 4 and FIG. 24 and their accompanied description represent the Packet Definition of the software architecture 10.
2. Message Order and Messaging Rules: The definition of a Protocol is generally expanded beyond the packet definition (1) above to include rules governing the expected ordered collections of messages necessary to accomplish certain useful transactions. Examples of Ordered Messages with Message Rules (transactions) are shown in FIGS. 6, 9, 27, 29, and 31.

Application Programming Interfaces

An API is a communication and messaging contract, which specifies how one network node communicates with another. This is accomplished by defining the available function calls, the arguments to each function call, the data type of each argument, and in some cases, the valid values of each argument.

In many cases, APIs are specific to an application or appliance 12, and therefore are not considered as part of the software architecture 10 collection of Core (standard set of) APIs; rather, the software architecture 10 core enables and exposes multiple API's to the client 16, 22, and possibly the device 20.

System-Level Architecture

The software architecture 10 was designed to achieve several objectives over time.

1. Business productivity within the constraints of existing control architecture.
2. Business productivity though enablement and realization of new control architecture.
3. Support and better enable core business functions of Innovation, Manufacturability, Quality, and Serviceability.
4. Enable new growth opportunities by enabling production appliances with the software architecture 10 which with the addition of the connector 18 creates the 'connectable' appliance. This approach minimizes the risk and cost of connectivity by externalizing the cost of networking electronics.

To realize the full potential of this architecture, a simple connector can be available on the appliance 12 so that a network card can be plugged into the appliance. See FIGS. 1 and 18-22 for examples of suitable external devices 20 connected to the appliance 12. As the appliance 12 already has an internal, low cost network 14 for its internal purpose, additional wiring to connect the internal communication network 14 with the external device 20 via the internal/external interface 18 is minimal and can be accomplished in a known manner, such as by a three-wire serial cable, an external connector, and a mounting fixture.

The software architecture 10 can preferably reside on all components 16 of the household appliance control system. However, where cost or other constraints are prohibitive, the software architecture 10 can reside on a sub-set of the components 16 within the control system of the household appliance 12.

Example benefits of this "connectable" architecture include, but are not limited to: external device 20 can be added after market, reducing base cost of the appliance 12. Devices 20 can be developed supporting multiple network technologies, applications and devices 20 can be cross-platform and generic due to the standard interface presented by the software architecture 10, an internal low-cost network (such as the WIDE network example) 14 is used as a standard, API framework and discovery allows many value added commands, the software architecture 10 uses bounded events to preserve state and make efficient use of bandwidth, and the software architecture 10 is designed to be configured at runtime allowing program developers a more flexible architecture that can reduce time to market.

Figure 2:
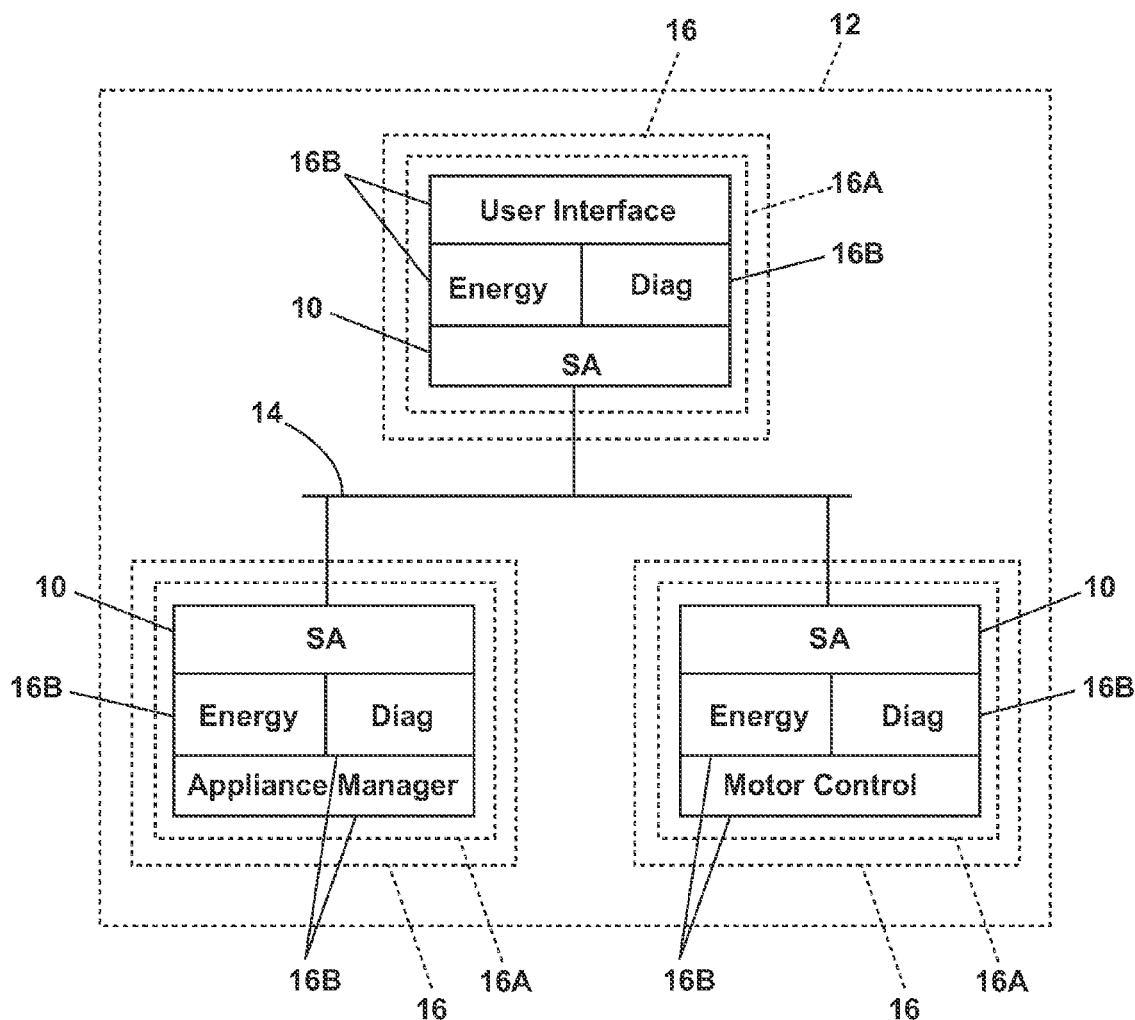
FIG. 2 is a schematic illustration of the internal communications network of FIG. 1 showing the software architecture (SA) according to the invention interposed between the internal communications network and various software components of physical components internal to the household appliance.

FIG. 2 is a schematic illustration of the internal communications network 14 of FIG. 1 showing the software architecture 10 according to the invention interposed between the internal communications network 14 and various software components 16B within the software operating environment 16A internal to the components 16 making up the control system for the household appliance 12. The components 16 in FIG. 2 represent typical components found in appliances 12, such as an appliance manager (main board or motherboard) and another component such as motor control and a control panel or keypad interface, generally referred to as a user interface. The "Energy" and "Diag" indicia in FIG. 2 are examples of typical non-core functions performed by the software architecture, such as energy and power management ("Energy") and troubleshooting or diagnosis ("Diag"). Not explicitly shown in FIG. 2, are core functions (API 1-7 and 10) performed by the software architecture and represented by the indicia 10.

In addition, the software architecture 10 can be extended to many other types of system architectures where data exchange over peer-to-peer communication is desired. These include multi-node systems where multiple printed circuit boards, such as a motor control board, appliance control board, and smart sensor boards communicate within the appliance 12 using the software architecture 10. The software architecture 10 discovery protocol illustrated in FIG. 6 (and described later herein) can be used to enable a component 16 whose presence causes other components 16 to adapt their control functions to create new behavior or performance or expose new capability to the consumer. The component architecture of FIG. 2 (structural model) along with the discovery behavior of FIG. 6, along with the component identification scheme of API ID, Type, Version (see API ID=3) are a basis for the invention embodied in 10 to enable the appliance with a new dynamic and intelligent system architecture.

FIG. 3 is a schematic illustration of the internal communications network 14 of FIG. 1 showing typical components 16 for appliance control exchanging messages via the internal communications network 14 of the household appliance 12 comprised of a lower layer protocol, such as WIDE, which accounts for OSI layers of PHY, LINK, and partial network layer functionality, as well as a higher layer protocol supported by the software architecture 10 (which accounts for OSI layers of application, transport, and partial network layer functionality) according to the invention. The lower layer protocol functions as both a physical and link layer between the higher layer associated with the software architecture 10 and the components 16 in the appliance 12. In this way, the software architecture 10 uses the lower layer protocol to communicate with a first software operating layer 17 that implements the control logic of the component 16 for appliance control relative to client 16, 22, as well as using a second software layer 19 to bypass the control logic and directly control the devices associated with the component 16 for appliance control. The devices in FIG. 3 are the physical elements that represent the functionality of the component 16 for appliance control. FIG. 3 illustrates the software architecture 10 from a software/protocol stack perspective.

In addition, FIG. 3 provides a schematic illustration of two modes of operation enabled by the software architecture 10 which control access to and the level of intervention between the network messages exposed by the software architecture 10 and the internal RAM, EE, and other forms of non-volatile memory of the software operating environment 16A, as well as an output device layer, which comprises the low level software operating layer 19 representing the software components 16B residing within the software operating environment 16A and providing direct control of the devices for the component 16. The software components 16B having direct control of the devices do so by having direct access to the microprocessor port address memory, which, in turn, maps to the physical pins of the microprocessor which, in turn, are connected through various electronic apparatus to the electro-mechanical devices.

Software operating layer 17 of FIG. 3 represents appliance specific software components 16B which interface the network messages received by software architecture 10 to the application control logic resulting in the application control logic to take some action. When the appliance is in a development state, an additional software operating layer 19 (comprised of API 5 or low level API and API 7, which is the memory/port API) enables the network messages of API 5 and API 7 to change the state of the physical memory of the software operating environment 16A and the devices. In this way, the devices can be controlled independently of the application software, which typically controls the devices in accordance with an operational cycle. The direct control permits the each function of the devices to be independently controlled, which is very beneficial in development or diagnostic conditions.

Figure 7:
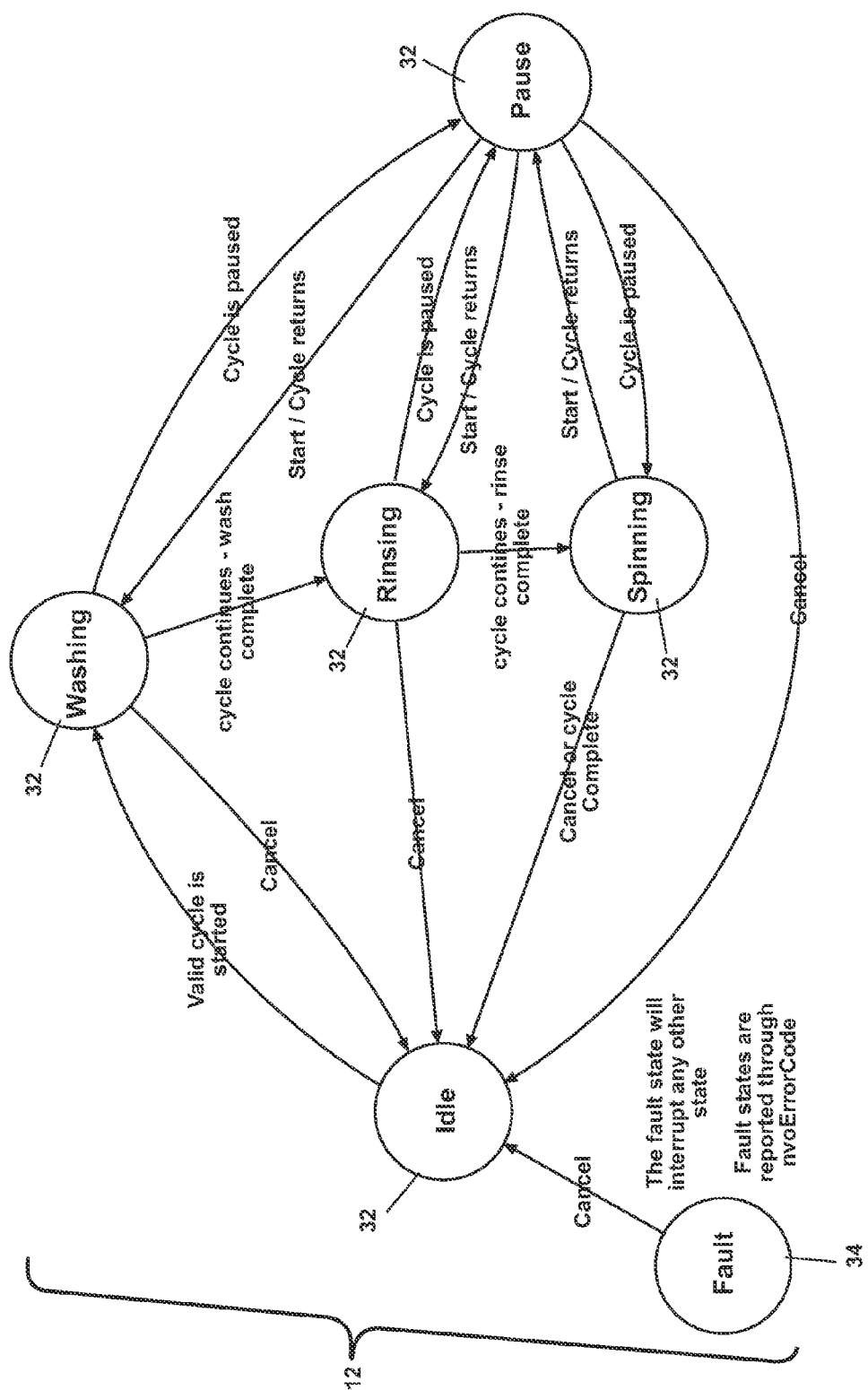
FIG. 7 is a schematic illustration of various exemplary states of a software operating environment typically operating within the Control Logic element as shown in FIG. 3 within a component of a household appliance, which is illustrated as a washer.

Software operating layer 19 is enabled to effect state change by a special network message exposed by software architecture 10 as well as by additional logic customized for the various states of the appliance, an example of which is shown in FIG. 7. During the development state, it is preferred that when the user interacts with the appliance 12 via the user interface of FIG. 3, software operating layer 17 will not receive the associated user interface inputs. Instead, software operating layer 19 will receive the inputs from the user interface. Subsequently, software operating layer 2 19 may interact with the alternate logic of FIG. 3. The alternate logic may in turn make function calls onto the control logic of software operating layer 17, change values in memory, or change the state of the attached plurality devices. However, during the development state, software operating layer 17 is not able to effect the state of the user interface (e.g. LEDs, lamps, buzzers, text and graphic displays). The development state renders the control logic of software operating layer 17 ineffective unless invoked from software operating layer 19. During the development state, the implementation logic of APIs 5 and 7 and the alternate logic are in complete control of the appliance 12 and its associated components 16.

The development state reverts back to the idle state (FIG. 7) when a special network message is received. In addition, it is contemplated that at least one predetermined key press or a predetermined sequence of key presses may also result in a transition from the development state to the idle state.

Software operating layer 17 operates independently of the enablement of software operating layer 19. The purpose of the development state is to allow and enable operational cycles that have not been previously contemplated. The advantage to this approach is that implementations and configurations of the appliance 12, some of which are illustrated in FIG. 1, do not require new software modifications to any component 16 of the appliance 12 because the appliance 12 has the capability through the software architecture 10 to support any implementation or configuration contemplated.

There are many uses for this capability. They include but are not limited to:

1. ability to add new functional componentry to an appliance enabled with software architecture 10 achieving new behavioral characteristics and cycles of operation without modification to the pre-existing functional componentry. Examples of this are:
   a. adding steam control to a washer, dryer, oven, and microwave
   b. adding energy and other resource management componentry to an appliance
   c. adding networking componentry enabling connections to external networks in addition to the internal network 14.
   d. adding a card reader to a commercial appliance in order to create a pay for use usage model.
   e. adding a memory device which comprises additional cycles of operation available for selection and invocation by a client node or application or a user interacting with a user interface.
2. performing diagnostic tests, which can be accomplished by actuating each output sequentially to verify the expected results (examples: heater on—observed temperature increase, fill valve on—observe water level rise, ice crush motor—observe rotation of crushing apparatus)
3. performing automated factory tests
4. performing automated performance testing and DOE executions
5. performing automated lifecycle testing
6. performing component 16 unit testing and automated regression testing
7. performing automated ECM testing
8. performing other forms of ad hoc debugging and testing
9. enabling an alternate client device (example: PC) to control the Appliance 12 allowing the universe of selectable cycles of operation to be developed and tested using alternate software operating environments 16A to that which is typically required on the final production embedded computing componentry 16 which offer more productive programming environments resulting in a reduced time to market for new appliance models.

FIG. 4 is a schematic illustration of a packet or packet structure 24 for the internal communications network 14 of the household appliance 12 shown in FIG. 1 having a payload portion 26 comprising an application packet structure 28 for the software architecture 10 according to the invention. Packet structure 28 represents a well-formed message that the software architecture 10 can create and send to other components or clients 16 and 22 comprising an occurrence of the software architecture 10 or a variant thereof designed to be operable with packet structure 28 for the purpose of a meaningful exchange of data. Packet structure 28 occupies the position of payload portion 26 within packet structure 24, but packet structure 28 could occupy an alternate position in a variant of packet structure 24. 28A represents a packet structure within 28 which is defined according to the values of API Id and Op Code of packet structure 28.

In a network protocol, a packet (sometimes called a message) is a collection of bytes which are transmitted sequentially, representing all or part of a complete message. Generally, a packet is composed of a header, which includes routing information; a body (also referred to as the payload portion) of data; and a footer that sometimes contains a checksum (e.g., a CRC sum) or a terminator, such as an "end" flag. The payload is a collection of bytes contained in a packet. The payload is the data being transmitted between the application layers of two nodes, which are components 16 comprising the SA or an SA driver. The function of the network and the protocol is to get the payloads from one node to the other. Sometimes one protocol is sent as the payload of another, and in this way, protocols can be nested or stacked. Variables are named memory locations that have associated values. One or more variables can comprise the payload. A transaction is a series of messages or packets that represent a complete data exchange between a plurality of nodes.

The relationship between a packet and a payload can have an impact on the efficient use of available bandwidth. The tradeoff to be considered is the amount of overhead needed to get the payloads from one node to another in the context of application layer requirements.

The protocol packet structure 24 has a first header byte that is identified, for example, as 0xED, followed by an address byte having four portions. The first portion of the address byte comprises a destination portion (D) of bits 0, 1, 2. The second portion of the address byte comprises a broadcast portion (B) of bit 3. The third portion of the address byte comprises a source portion (S) of bits 4, 5, 6. The fourth portion of the address byte comprises a reserved portion (R) of bit seven. The address byte is followed by an identification byte comprised of a service data unit length (SDU-L) comprised of bits 0-3 and a SAP identifier comprised of bits 4-7. A SAP identifier defines the structure of the enclosed payload 26. A SAP of 4 indicates that the enclosed payload 26, also called a service data unit (SDU), is defined by the packet structure 28 associated with the software architecture 10. The identification byte is followed by the payload 26. The payload 26 is followed by a standard validation byte, such as a high-byte, low-byte combination or generally referred to by those skilled in the art as CRC16-CCITT.

The application packet structure 28 is formed from the payload portion 26 of the protocol packet structure 24. It is within this application packet structure 28 that the communications protocol and data exchange permitted by the software architecture 10 is carried out. The first byte of the application packet structure 28 contains an identifier (API ID), an integer from 1-255, of the particular API carried by the particular instance of the application packet structure 28. The second byte up the application packet structure 28 contains in operation code (abbreviated herein as "op code") as an integer from 1-31 in bit 0-4, followed by a command or feedback (Cmd/Fb) flag of bit 5, a fragmentation (frag) flag of bit 6, and a more messages pending (MMP) flag in bit 7. Bytes 3-15 of the application packet structure 28 comprise the payload (i.e., message data) of the particular instance of the application packet structure 28.

Essentially, the software architecture 10 uses two bytes of the payload 26 of the network packet structure 24 of the internal communication network 14 for additional protocol. The API ID is a unique identifier for a collection of Op Codes which are organized into functional units. 0xFF (255) and 0x01(1) are preferably reserved. An Op Code is a unique ID within an API which defines and identifies a single command or feedback message. Each API has an associated Type (2 bytes) and Version (2 bytes) allowing for a large library of identifiable, functionally related groups of messages (op codes) to be created over time.

Preferably, x1F (31) is a reserved value for Op Code. The Cmd/Fb flag indicates whether the message is a classified as a command or a feedback. A command is some message that requests an action to be taken, where a feedback is some message that simply contains information (e.g. acknowledgement, event data). Preferably, the Cmd/Fb flag is 0 for commands and 1 for feedbacks.

The frag flag specifies whether the received message is being broken into multiple messages (fragments) by the sender because of the size limitations of the lower layer protocol's payload 26. The first fragment of the message will take on the structure of FIG. 4. All subsequent fragments of the message will take on the structure of FIG. 24. The frag flag is preferably set until the fragmented message is completed.

Figure 9:
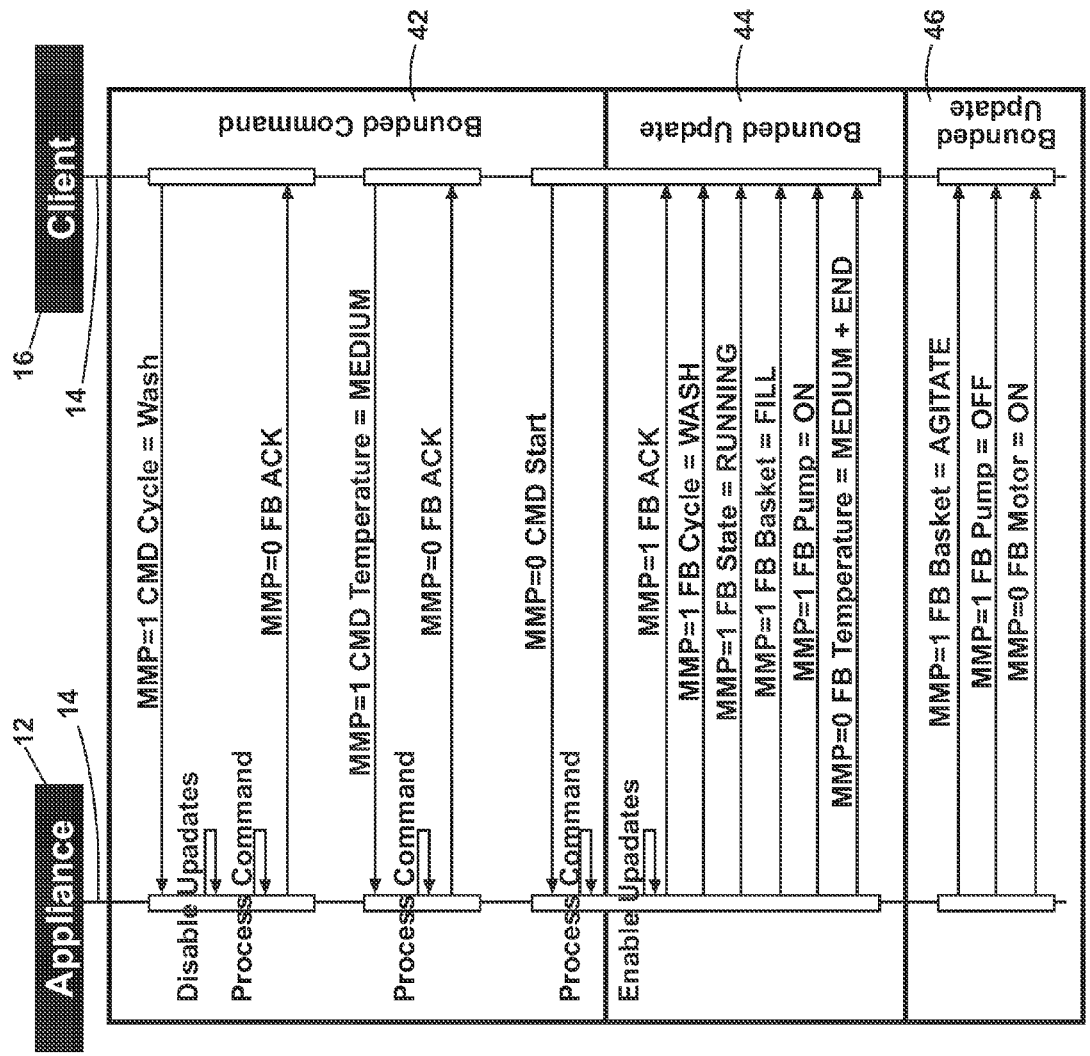
FIG. 9 is a schematic illustrating the usage of binding to link multiple data exchanges to form a single command and/or update between a client SA and the controller SA.

The MMP flag indicates that events are sent as individual messages but are bounded together by protocol so that the client can group events together as a complete snapshot for one scan of the micro-controller. The MMP flag is preferably set until the last message for a snapshot is sent out. FIG. 9 and the accompanying discussion provides more detail on bounded messages.

The MMP flag provides the software architecture 10 the capability to express the state of an appliance 12 as a function of independently meaningful feedback variables bounded together in snapshots.

When the internal state of an appliance 12 changes, multiple events may be sent that, in total, describe the new state of the appliance 12. The number of events required to describe a state change is appliance 12 state specific. Therefore, special protocol delimiters are used to allow an implementation specific number of feedback variables to be associated with a particular appliance state change. Because these events are independently meaningful, this approach is preferable in that all permutations of event (data) aggregations can be created through the use of MMP. This results in efficient use of the identification namespace (API Id and Op Code) because no new identifiers are required when the client requires a new combination of data to be sent. In summary, MMP and the associated rules thereof, allow dynamic and virtual data aggregation eliminating the need for special application case specific solutions. In FIG. 9, the net effect of the MMP flag is shown.

The MMP flag also provides the capability for the embedded implementation to suppress the invalid transient condition. As the appliance state transitions, it is possible for a set of related variables to change several times very rapidly. When appliance state is expressed in terms of independent feedback variables sent as separate events (feedback messages) without a binding mechanism, ambiguous or invalid transient states are likely to occur. Moreover, if the client is executing business logic during the invalid transient state, logic errors may result in incorrect control or user display actions. Refer to the section hence, labeled State Integrity, for an example of how asynchronous data collection is an inferior approach to data collected synchronously within each scan of the microprocessor and transmitted within the snapshot enabled by MMP. In addition, message binding can be used to group independent command invocations so that they may be processed in batch.

The packet structure 28 also governs incoming messages. In general, networks allow asynchronous processes to communicate, creating the potential for one network node to exceed the processing capacity of the other by sending too many requests within a short time window. To prevent message overruns, a protocol is used, according to the invention, which allows the sender to wait for an acknowledgement before sending a second message.

This feature permits the software architecture 10 to use an enumeration for this acknowledgement based on the execution state 8 of the software architecture 10. In this way, necessary information describing message success or failure is communicated with fewer messages. The command sender will receive an enumerated acknowledgement for each command sent. The most common is a positive ACK, which means that the node is ready to receive its next command. All other enumerations are a form of failure. Failure is characterized by the remaining 254 possible values of the acknowledgment byte. Of this range of 254 values, some are standardized and some are reserved for application specific failure codes.

Frag flags and MMP flags allow the user of the software architecture 10 flexibility in designing the application messaging strategy. If a developer chooses to use very large messages, the frag flag can be used so that messages larger than the packet structure 28A (i.e., 13 bytes within the exemplary application packet structure 28 shown herein) can be sent by sending the original large data set as multiple smaller data sets within multiple packets of packet structure 28.

By the same token, if a developer chose to use smaller messages (which are often the case) but wanted to group those messages together, MMP flags can be used. For example, if 10 messages of 3 bytes each needed to be sent as a group so that the client application could know that the messages were related to the same scan of the microcontroller, then the first 9 messages would have the MMP flag set and the last message of the group would have the MMP flag=0.

The following presents a summary of defined APIs for the software architecture 10 and then each one of these commands and feedback messages is described in detail. The advantage of this approach is that it allows the developer to choose the modules within the software architecture 10 that are appropriate for the current stage of development (e.g., unit test, engineering testing, production). Furthermore, compiling out certain modules allows developers to use portions of the software architecture 10 in those cases were RAM/ROM resources would otherwise be prohibitive. The APIs are described with their currently-selected application program interface identifier (API ID), however, any identifier can be employed without departing from the scope of this invention. The associated functions made capable by the particular API are enumerated beneath each API. Bulleted functions ("•") are feedback messages which are sent from the software architecture 10 to the client (such as an internal client 16 or an external client 22) and non-bulleted functions are commands which are sent from client (16, 22) to the software architecture 10.

One note on a convention used in this application. The word "extends" refers to the ability of one API to build on the functionality of a baser-level API. The extends keyword means: When API x 'EXTENDS' API y, then API x=API x+API y. This notation simplifies the task of record keeping and API documentation. In other words, API x also includes those functions specified in API y. If API x and API y each specify a function with the same Op Code, the implementation of API x implementation can take precedence.

The following table describes the Core API (API ID=1):

|   |
| --- |
| • Message Acknowledgment |
| • Publish Heartbeat |
| Set Heartbeat Period |
| • New Heartbeat Period |
| Read Memory |
| • Publish Memory Data |
| Read EE |
| • Publish EE Data |
| Send Event(s) |
| • Publish Event |

The following table describes the basic data acquisition API (Basic DAQ, API ID=2, Type=1):

|   |
| --- |
| Create Numeric Event |
| Create Byte Event |
| Clear Event(s) |
| • Publish Events Cleared |
| Reset SA |
| • Publish SA Reset |
| Set External On |
| • Publish External On |
| Set External Off |
| • Publish External Off |

The following table describes the extended data acquisition API (Extended DAQ, API ID=2, Type=2): The extended DAQ is inclusive of the Basic DAQ at runtime.

|   |
| --- |
| Get Event Data |
| • Publish Numeric Event Data |
| • Publish Byte Event Data |
| Create Remote |
| Numeric Event |
| Create Remote Byte |
| Event |
| Get Remote |
| Variable Data |
| • Publish Remote |
| Variable Data |

The following table describes the Discovery API (API ID=3):

|   |
| --- |
| Find Nodes |
| • Publish Node |
| Get APIs |
| • Publish APIs |
| Get API Info |
| • Publish API Info |
| Get Instance Info |
| • Publish Instance Info |

The following table describes the Core Debug API (API ID=4):

|   |   |
| --- | --- |
| • | Publish Saturation |
|   | Register for Saturation Message |

The following table describes the Low Level API (API ID=5):

|   |   |
| --- | --- |
|   | Set Development State |
| • | Publish State |
|   | TBD (Appliance Specific) |

The following table describes the Core Key Press API (API ID=6):

|   |   |
| --- | --- |
|   | Press Key (key index) |
| • | Publish Key Press (key index) |

The following table describes the Core Memory/Port API (API ID=7):

|   |
| --- |
| Write Memory |
| Write EE |

The Energy Management API is API ID=8. As does the other APIs, the Energy API is made of a collection of Op Codes, each representing a useful function relating to energy management, and having an associated collection of bytes which are the appropriate parameters to achieve the function.

The following table describes the Poll Variable API (API ID=10):

|   |   |
| --- | --- |
|   | Read Poll Variable |
| • | Publish Poll Variable |

The Core API (API ID=1 herein) is the smallest subset of the software architecture 10 functionality that can be deployed. However, it is contemplated that other embodiments compliant with packet structure 28 may be developed. It makes provisions to design the two hard coded data acquisition schemes referenced in FIG. 5.

Figure 5:
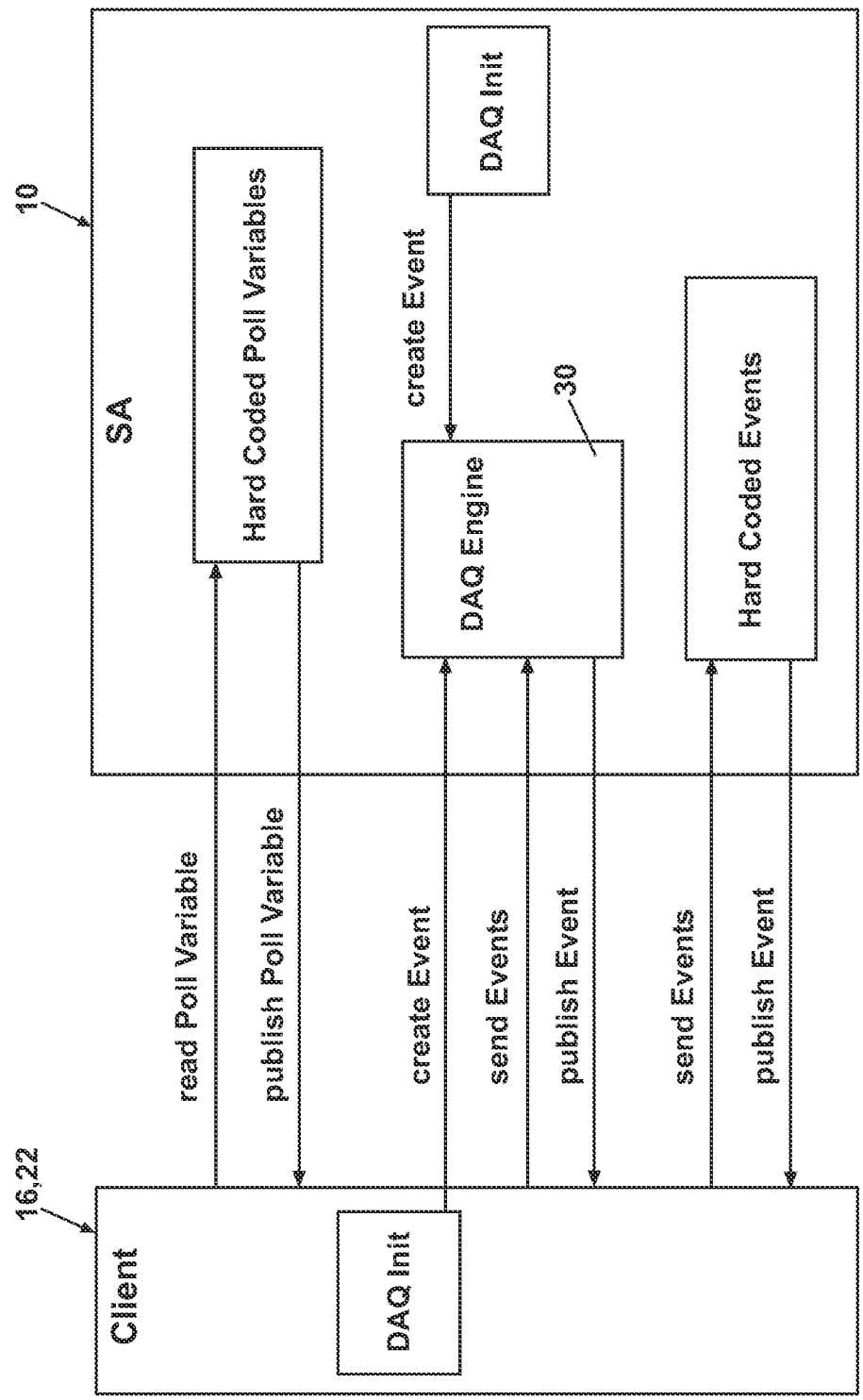
FIG. 5 is a schematic illustration of communication between a SA residing on a controller, controller SA, of the appliance and an SA residing on a component to create a client relationship, client SA, relative to the SA on the controller where various variables and events are transmitted between the controller SA and the client SA.

In the Core API, a protocol mechanism, send Events of FIG. 5, allows the client (16, 22) to request the event source to send all or send a specified set of events. In this way, a type of polling is possible within the framework of the eventing architecture without separate message definitions or implementation structures and logic. Moreover, this mechanism enables robust system startup conditions. For example: if all network nodes send all events simultaneously at system power up, misoperation within the software of a client 16 or 22 where the software components therein would not be able to accurately process the plurality of messages generated as a result of a power-up condition are more likely.

The DAQ API (API ID=2) presents a dynamic mechanism query for a component 16 enabled by the software architecture 10. This feature allows the client 16/22 to configure an embedded software engine (an array of structures whose elements are instanced and stored in a dynamic memory heap [see DynamicMemoryHeap of FIG. 33 containing a collection of NVOEvent structures]) which associates a section of microprocessor memory with an event operator (described in a table below) and arguments. Pointers into memory, values of the memory, event operators and operator arguments are stored in the memory heap's array of structures [FIG. 33 Heap[ ] containing NVOEvent structures]. As shown in FIG. 5, the DAQ engine can be configured in 2 ways:

1. Application software apart from the software architecture 10 which resides in the same microprocessor can configure the DAQ 30 as is shown by the arrow in FIG. 5 from the DAQ Init( ) software component.

2. Secondly, external clients may use the DAQ API (described herein) to configure the DAQ from the network 14.

The rational for each method of DAQ configuration is discussed 3 paragraphs hence.

Figure 36:
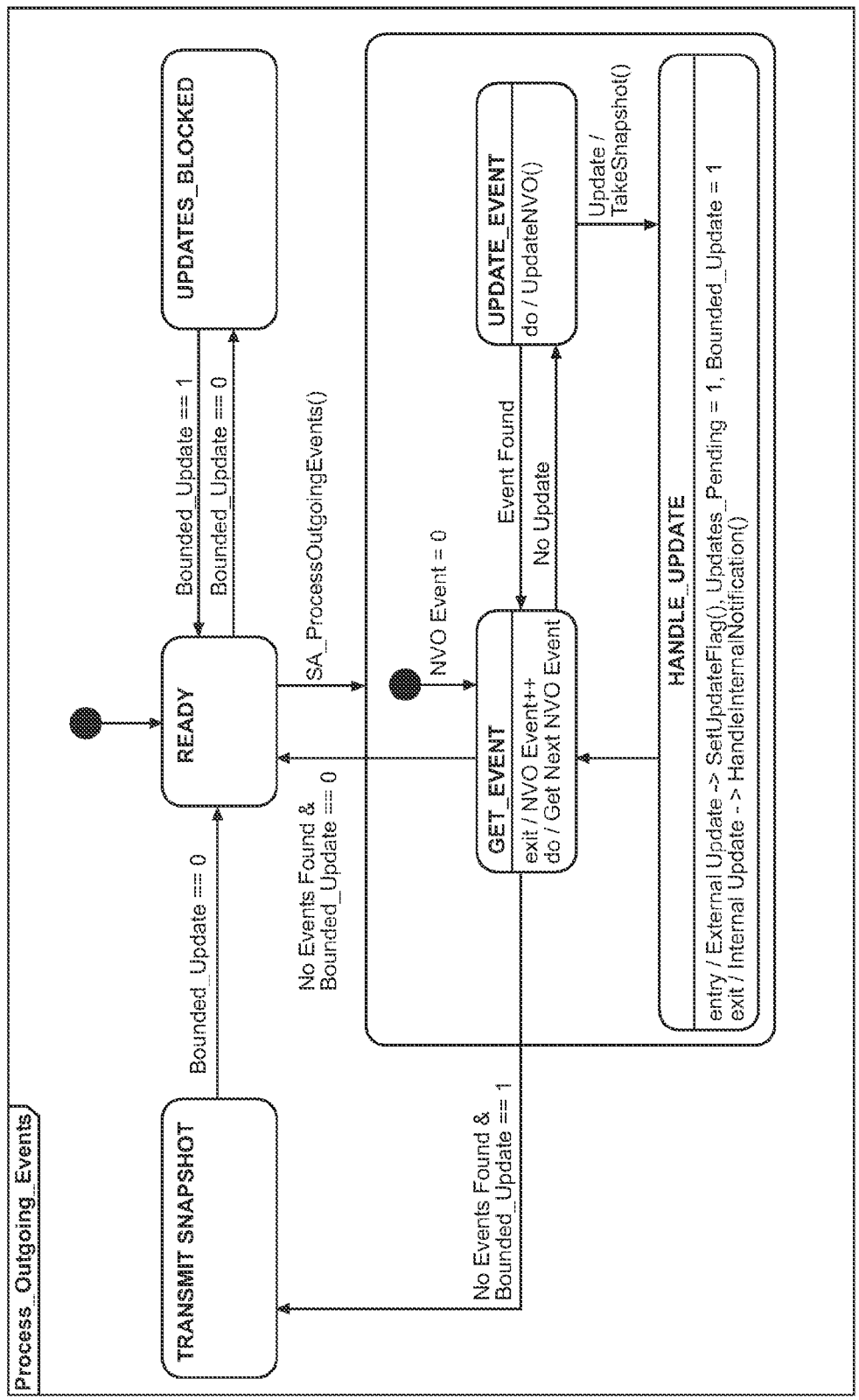
FIG. 36 shows a collection of inter-related UML state diagrams illustrating 4 primary states (READY, TRANSMIT SNAPSHOT, UPDATES_BLOCKED, and PROCESS_DAQ_EVENTS).

As shown in the Process DAQ Events State Diagram of FIG. 36, when the DAQ engine is executed, it iterates over each event structure, checking the associated memory locations against the event operator and arguments. When the event conditions evaluate to a TRUE, message buffers are constructed within the internal memory reflecting the data associated with the event condition. When the iteration is complete, notification messages are generated and preferably broadcast to the network. Alternatively, notification messages can be directed to a specific component 16 if additional memory is allocated to store the network identifier of the component which initially requested or configured the event.

A developer can use several event operators. Examples include: on change, greater than, less than, equal to, deadband, and bitmask. Several Op Codes of the DAQ API are provided to control the memory heap at runtime such as: clear Events, add Events, External notification on/off, get Events, get Event Data, etc.

In total, the software architecture 10 supports four schemes for data collection (all of which are shown in FIG. 5). Two of the four schemes, describe briefly above, are reliant on the DAQ. The other two schemes, also briefly described above, are hardcoded. Each scheme can co-exist within the software architecture 10. Each scheme provides certain optimizations at the expense of other resources.

In a client-configured data acquisition scheme, dynamic events are created. This method can be used if the microprocessor has enough RAM/ROM capacity and is most commonly used when the client is a PC application. Using the DAQ API, a developer can re-use code, require less engineering time, leverages a proven re-useable eventing module, is flexible (e.g., can be configured at runtime), and there can be an optimization of network bandwidth. However, this method can require more RAM/ROM than hard coded methods and an embedded client might not have access to needed data files at runtime.

In the client-configured data acquisition scheme, the DAQ engine 30 must be provided a memory location in order to watch for an event. With a variable map, this is practical when the client is a PC application as in FIG. 26A. However, when the client is, for example, another control board that implements the software architecture 10, access to a variable map is impractical. Thus, this invention provides functionality for an embedded variable map located in the memory of a node implementing the software architecture 10. This variable map links an API and Op Code to a variable address as in FIG. 26B. Thus, in order to register for an event on said node, the client needs only know the API and Op Code for that variable, not the specific memory address.

Using the embedded variable map in the client-configured data acquisition scheme, the situation may arise where a particular client is restricted from creation of an event because the associated API and Op Code pair has already been registered by another node. In such a situation, this invention provides that node the ability to request information about the embedded variable map. Included in this information is the variable's memory address. With this information, the client node can the register for an event of the same variable using the variable's address and a different API and Op Code pair than previously attempted (see FIG. 27).

An alternative to the client-configured DAQ, is a self-configured DAQ. In this case, the internal logic uses the DAQ engine 30 to create NVOEvent structures in the DynamicMemoryHeap of FIG. 33. This can be a useful scheme when the events to be realized are fixed and are known at the time of design and there are enough RAM and ROM resources to reuse the difference engine (the logic contained within the DAQ 30) of the DAQ 30. Therefore this method has similar benefits as the client-configured dynamic event scheme, and moreover, will require more RAM/ROM than hard coded methods (described below).

In a hard-coded eventing module, a developer can optimize network bandwidth, optimize use of RAM/ROM and can conform to the DAQ API. However, this scheme requires a custom-coded solution to generate the events and does not rely on the software and logic of the DAQ 30 as shown in FIG. 36).

Using the hard-coded polling method provided by the Core API, a developer can optimize use of RAM/ROM by creating custom-coded solution. Polling will generally waste network bandwidth, but is sometimes used due to its simplicity.

FIG. 5 illustrates one example of each type of potential data acquisition method. An installation of the software architecture 10 can support one, some, or all of the 4 methods. Each of the installation 10 and the client 16 may have a DAQ API initialized thereon. The software architecture 10 may have one or more hard-coded polling variables, one or more hard-coded events, and/or a DAQ engine 30 as described. Various variables and events are transmitted between the main software architecture installation and the client. For example, various hard-coded polling variables are exchanged between the software architecture 10 and the client 16 by the read Poll Variable and publish Poll Variable methods. Various hard-coded events are exchanged between the software architecture 10 and the client 16 by the send Event and publish Event methods. A create Event method is called by the DAQ Init engine which is sent to the DAQ Engine 30 which, in turn exchanges a generated event with the client 16 by the send Event and publish Event methods. The DAQ engine 30 in the software architecture 10 can also create an event received via a create Event method received from the client 16.

Figure 5A:
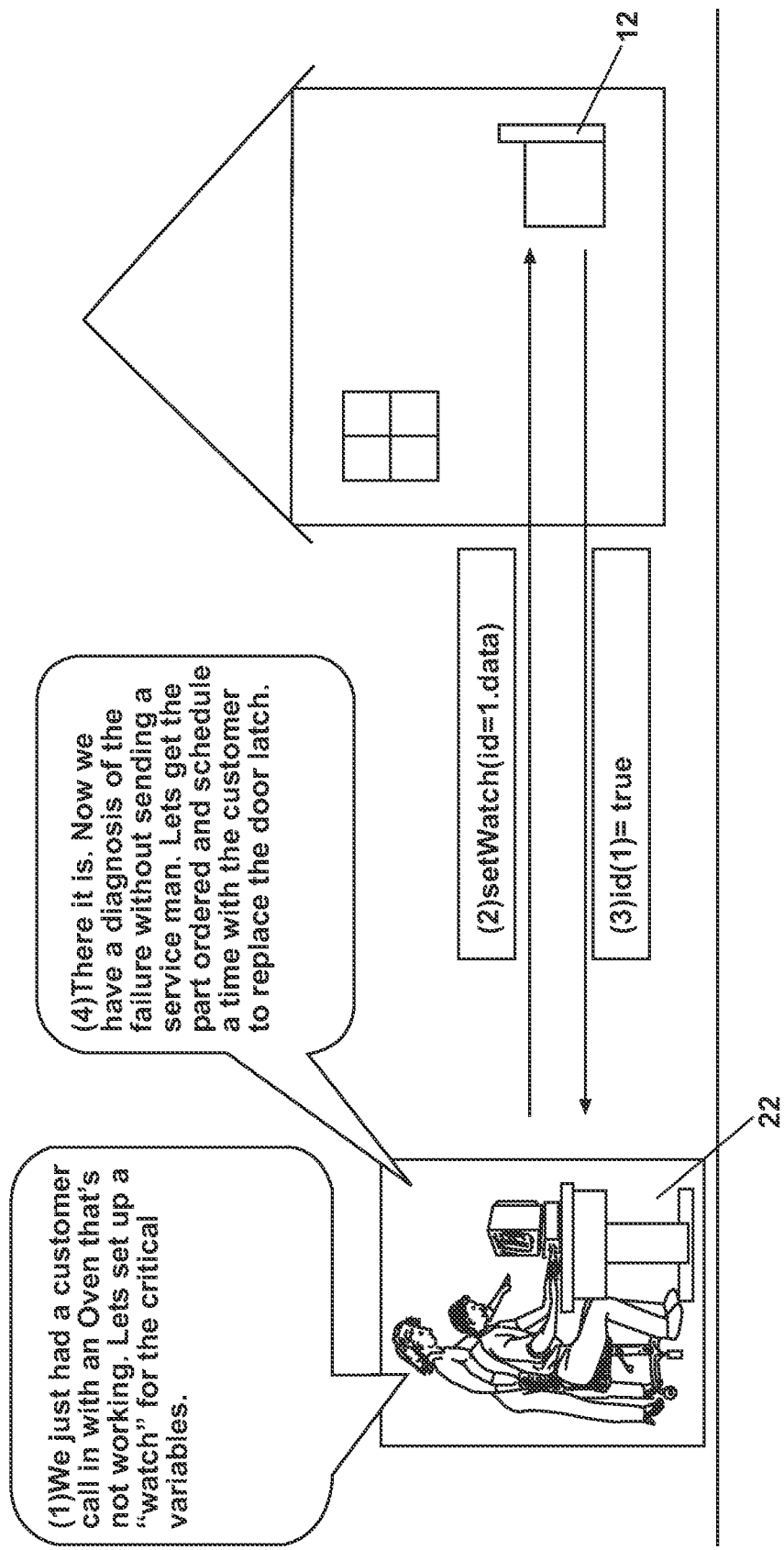
FIG. 5A is a schematic illustration similar to FIG. 5 and illustrating the client as an external client at a remote location in the form of a customer call support center to illustrate an exchange of data used to perform remote diagnosis of the appliance.

FIG. 5A is a schematic illustration showing communication between a household appliance 12 having the software architecture 10 installed therein according to the invention and shown in FIG. 1 and a client 22 at a remote location, such as a customer call support center as shown in FIG. 5A. The appliance 12 has an interface 18 to its internal network 14 and a network interface 20 which allows it to communicate with the external client 22. The schematic of FIG. 5A shows the customer service center setting up a variable watch using the DAQ Engine 5 create Event function and diagnosing a trouble with the household appliance 12 without needing to send out a service truck to the residence.

The software architecture 10 can be customized to allow for the needs of different implementation platforms. RAM and ROM space and time complexity can be managed, as well as access to memory locations, and timeouts. All of these are located in a predetermined parameters file. It will be understood that the parameters can be renamed, changed, retyped, added or deleted without departing from the scope of this invention.

A Discovery API (API ID=3) enables the concept of "Plug 'n Play" architecture. The Discovery API implies that a physical network node or client 16 can contain n functions, each encapsulated by a known API with a unique ID, Type, and Version. These APIs are portable (meaning they represent functionality and are independent of the microprocessor, software language, and network topology) and re-useable on other components where the functionality therein is applicable. The Discovery protocol (described in API 3 of FIG. 6) allows the client to learn the associations between the components 16 and the groups of functionality (APIs) which they contain.

Figure 6:
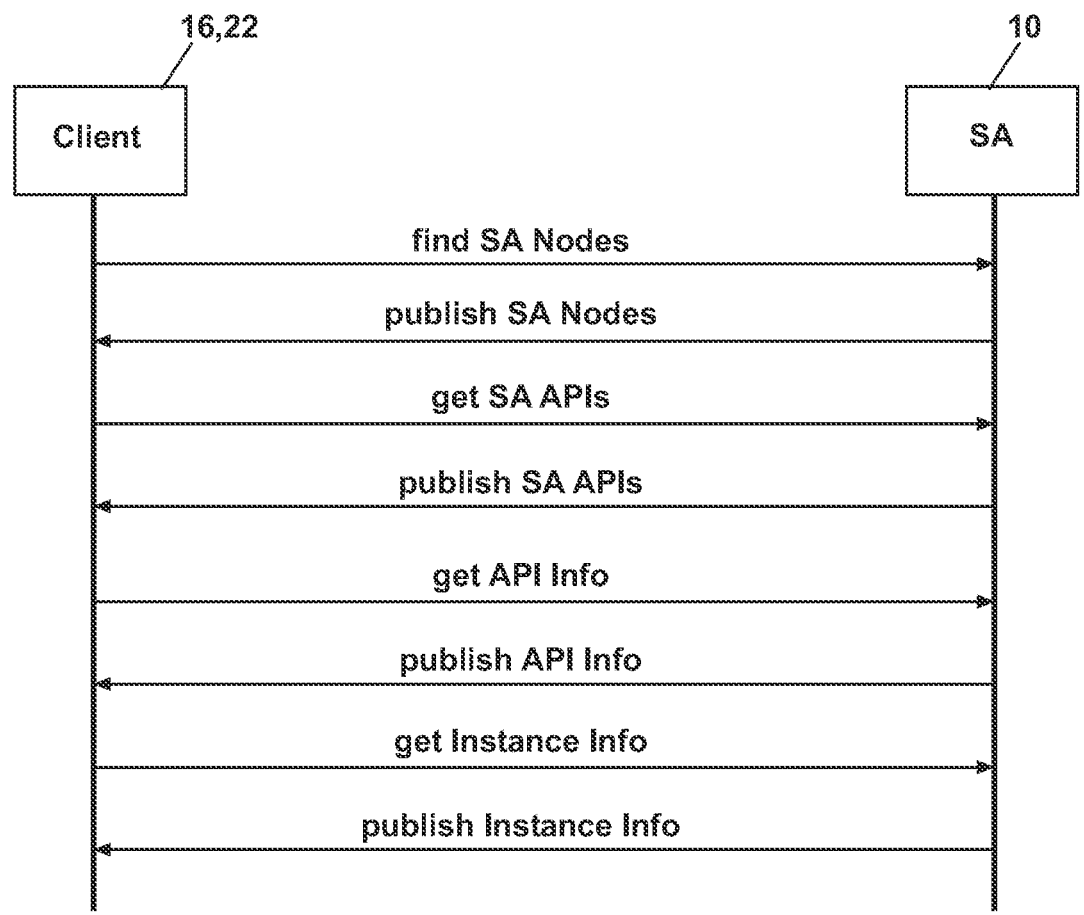
FIG. 6 is a schematic illustration similar to that shown in FIG. 5 illustrating a discovery technique contained in the software architecture of FIG. 1 according to the invention.

FIG. 6 illustrates a typical Discovery API sequence. Having no structures in memory representing the other software architecture 10 enabled components a client 16 transmits a command to locate clients/nodes 16 within the appliance 12, which are components 16 enabled with the software architecture. The command can be a "find Nodes" command. Enabled components or nodes 16 respond that they are, indeed, enabled, such as by issuing a broadcasted "publish Nodes" command. Then, the client 16 transmits a command to identify which APIs are located on each enabled node, such as by issuing a "find APIs" command. Each enabled node responds with a bounded message containing its API IDs, such as by replying with a "publish APIs" message. Then, the client 16 issues a command to identify information about each of the APIs found on each enabled node. Such as by issuing a "get API Info" command. Each enabled node responds with a bounded message (whose purpose and structure are described in FIG. 9) containing information about the API contained therein, such as by replying with a "publish API Info" message. This message can include type, version, and the number of occurrences or instances of a particular API Id. In cases where the number of instances of a particular API within a single component 16 exceeds one, meaning that there are multiple of the same APIs installed on a component 16 such as in the case of a multiple-cavity oven which might use multiple oven control APIs, the client 16 issues a command to get information on each instance of an API. This can be accomplished by issuing a "get Instance Info" command. The software architecture 10 responds with the requested information, such as by the "publish Instance Info" message. Multiples of the same instance are auto-numbered with a pseudo-API ID by the software architecture.

In addition when a component 16 enabled by the software architecture 10 and having resident the sub-component of the software architecture 10 discovery, which is API Id=3, initializes it will automatically send out a message announcing itself (API Id=3, Op Code=2 publishSANode( )).

Also, if the user of the software architecture 10 so chooses, the discovery sequence of FIG. 6 may be altered by omitting messages 1 and 2 (op codes 1 & 2, respectively). The approach is valid in that the client may initiate discovery by issuing an Op code=3 message, getSAAPI (collection) that will result in responses from all components enabled by the software architecture 10 thus obviating the need for messages 1 and 2 in most cases.

It is also contemplated that an abbreviated messaging sequence could achieve the same results as the aforementioned discovery sequence. In an abbreviated discovery sequence, each node issues a message after power-up containing within one message the totality of information which was described in the aforementioned discovery sequence. Each node receiving this message would reply back with the same information about itself giving the node which just powered up the discoverable information from all the nodes that were already powered up.

This Discovery API protocol mechanism allows a client 16 to locate a logical entity at runtime without prior compile time programming. Moreover, this mechanism allows the client 16 to determine if expected components are resident or missing. From this knowledge, the client can configure itself and/or present the user with the appropriate inferred functionality.

The Low Level API (API ID=5) exposes via the network 14, capabilities allowing the client to control or actuate the output devices which are electrically connected to the containing component 16 and to provide read and/or write access to the numeric value which represents the current state and potentially the state history of the electrically connected input device. Typical examples of outputs are valves, relays, triacs, solenoids, LEDs, lamps, buzzers, and on the like. Typical examples of inputs are push buttons, switches, sensors (e.g., pressure, temperature, and over-temperature), and on the like. In the preferred embodiment, the Low Level API as well as the Memory Port API are available only in the development state of FIG. 3 of the software architecture 10 of the appliance 12. The development state can only be entered from the appliance 12 idle state of the exemplary appliance state diagram of FIG. 7. Also in the preferred embodiment, if any user interface actions are initiated via a keypad, LCD, or other user interface device of the appliance 12 during the development state, the appliance 12 can revert back to the idle state of FIG. 7 and set each output back to its un-actuated state. The messages for initiating the development state can be found in the message definition specification for the low level API (see API 5, Op Code 2). This network message is defined to allow the appliance 12 to enter the development state. In the development state, a special API is enabled and exposed to the network 14 which allows the client 16 to control the electronic outputs of the appliance 12 directly. In development state, production oriented business rules such as validation are by-passed, giving the client 16 complete control of the electronic sub-system.

The low level API can be used to implement non-standard operation of the appliance 12 in that the appliance can be operated in a manner other than in accordance with one of the predetermined operating cycles implemented by the appliance software operations layer, which typically resides on the component 16 for appliance control. In this way, the low level API can be thought of as enabling additional cycles of operation. Some examples of additional cycles of operation include: a demonstration cycle; a development cycle; an error detection cycle; a diagnostic cycle; a cycle that reduces the time of at least one timed step of one of the predetermined cycles of operation; a cycle that bypasses at least one operational step of one of the predetermined cycles of operation; a cycle that substitutes a timed step for a step that responds to an event of one of the predetermined cycles of operation; and a cycle that exposes the low level API to the network The Key Press API (API 6) allows the client 16 to press virtual keys. This provides an equal method by which to exercise and test the software without mechanical or human actuation of the physical key pad.

One note on a convention used in this application. The word "extends" refers to the ability of one API to build on the functionality of a baser-level API. The extends keyword means: When API x 'EXTENDS' API y, then API x=API x+API y. This notation simplifies the task of record keeping and API documentation. In other words, API x also includes those functions specified in API y. If API x and API y each specify a function with the same Op Code, the implementation of API x implementation can take precedence.

Exemplary application packets for the payload portion of the packet structure for the internal communications network of the household appliance follow. The application packets are grouped according to API.

within byte 4 and 5 of the payload. This provides the receiver of the acknowledgment (the component 16 which sent the original command) certainty as to which previously transmitted command is being acknowledged. (The previously transmitted command having the unique identifier of API Id and Op Code.) It should be noted that in the drawings and descriptions, the ACK is generally assumed and is not continuously repeated or documented. Enumeration values for the reason code of the above application packet are shown in the table below.

| Enumeration Value for Reason Code | Reason Code Name | Programming Notes |
|---|---|---|
| 0 | READY* | The command was successfully executed and the SA is ready to accept another command. |
| 1 | BUSY* | The SA module is currently busy executing a command. Usually just an internal state. |
| 2 | REJECTED* | The command sent to the SA was rejected, because there was another command still in process. |
| 3 | ACK_EVENT | The command was not executed because the SA is currently waiting for an acknowledgement. |
| 4 | UNSUPPORTED | The command was unsupported for some reason and did not execute. (Ready for next command) |
| 5 | UNSUP_OP_CODE | The command was unsupported and did not execute due to an invalid op code. (Ready for next command) |
| 6 | UNSUP_UNAVAILABLE | The command was unsupported and did not execute because it is currently unavailable in this state. (Ready) |
| 7 | UNSUP_INVALID_PARAM | The command was unsupported and did not execute due to an invalid or out of bounds parameter. (Ready) |
| 8 | UNSUP_OUT_OF_MEMORY | The command was unsupported and did not execute because the dynamic heap is out of memory. (Ready) |
| 9 | UNSUP_DOOR_OPEN | The command was unsupported and did not execute because the appliance door was open. (Ready) |
| 10 | UNSUP_BOUND_CMD_INCOMPLETE | The bounded command was not fully received before a specified timeout, so it was not fully executed. (Ready) |
| 11 | UNSUP_CANNOT_PAUSE_NOW | Unable to pause due to state of appliance process. |
| 200-255 | Application Specific | Application Developers may use these return values in their applications. It is up to the Developer to document the Application Specific reason codes. |

*0-3 are reserved for use by the software architecture 10

Core API: API ID=1 (Type 3, Version 1). The following application packet represents a directed message from the software architecture 10 to a client for publishing acknowledgement (Publish Acknowledgement). This message is sent by the software architecture 10 to the sender of a previous message. It contains an enumerated value representing the results of the previous command processed by the software architecture 10. Generally, the receipt of the acknowledgment indicates that the sender can initiate the next message.

| API ID | Op Code | Byte 3 | Byte 4 | Byte 5 |
|---|---|---|---|---|
| 1 | 1: publish Acknowledgement | Reason code | API | OpCode |

Note that the API and op code of the previously received command (the one that is being acknowledged) is contained The following application packet represents a broadcast message from the software architecture 10 to a client (16 or 22) for publishing heartbeat (Publish Heartbeat). This message is periodically sent by the software architecture 10. This allows nodes, which have registered for events, to maintain confidence in the event sources. In other words, heartbeat insures connection integrity. Alternatively, the client (16 or 22) may determine that each or some event(s) sent by the software architecture 10 should receive an acknowledgement sent by the client back to the software architecture 10 before the software architecture 10 deems the transaction associated with the generation and transmission of the event to be complete. If a particular event has been created with the 'acknowledgment' classifier according to the message specification of API 2, Op Code=1, 2, 12, or 13, the software architecture 10 will define the end of the transaction associated with the generation and transmission of the event to be complete when an acknowledgment message is received according to the message specified by API Id 1 and Op Code 1.

Publish Heartbeat will not be sent until after the software architecture 10 receives a command. This can be used to prevent a misoperation or "Traffic Storm" condition during power-up. Traffic Storm refers to a misoperation within the software of a client 16 or 22 where the software components 16B therein would not be able to accurately process the plurality of messages generated as a result of a power-up condition. Publish Heartbeat will be suspended after a Reset SA message, which is described below with respect to the Core DAQ API and Op Code 8, is received, but will resume after the next subsequent command. This is a feedback message.

| API ID | Op Code | Byte 3-Byte F |
|---|---|---|
| 1 | 2: heartbeat | |

The following application packet represents a directed message from a client to the software architecture 10 for setting heartbeat period (Set Heartbeat Period), which is setting a frequency at which the heartbeat message is sent by the software architecture 10. Exemplary frequencies range from 0 seconds (off) to 3600 seconds (1 hr).

| API ID | Op Code | Byte 3 | Byte 4 | Byte 5-Byte F |
|---|---|---|---|---|
| 1 | 3: setHeartbeatPeriod | Sec MSB | Sec LSB | |

The following application packet represents a broadcast message from the software architecture 10 to a client for publishing the heartbeat period (Publish Heartbeat Period). This message is a response to Set Heartbeat Period. It is necessary so that if a second client changes the heartbeat period, the first client will be notified. Clients who require non-changing heartbeat periods should use the DAQ API to set up an event with a constant broadcast operator, See DAQ API Id=2, Op Code 1, Byte 9=4, 5, or 6 (see change operator table).

| API ID | Op Code | Byte 3 | Byte 4 | Byte 5-Byte F |
|---|---|---|---|---|
| 1 | 16: newHeartbeatPeriod | Sec MSB | Sec LSB | |

The following application packet represents a directed message from a client to the software architecture 10 for reading memory, particularly the RAM (Read Memory). It is sent to the software architecture 10 and results in a "Publish Memory Data" response, which is shown below (Op Code 4) and contains values specified in Bytes 3-7 of the packet below.

| API ID | Op Code | Byte 3 | Byte 4 | Byte 5 | Byte 6 | Byte 7 | Byte 8-Byte F |
|---|---|---|---|---|---|---|---|
| 1 | 5: readMemory | Address Hi-byte | Address Mid-Byte | Address Low-Byte | Size MSB | Size LSB | |

| API ID | Op Code | Byte 3 | Byte 4 | Byte 5 | Byte 6 | Byte 7 | Byte 8-Byte F |
|---|---|---|---|---|---|---|---|
| 1 | 6: readEE | Address Hi-byte | Address Mid-Byte | Address Low-Byte | Size MSB | Size LSB | |

| API ID | Op Code | Byte 3 | Byte 4 | Byte 5 | Byte 6 | Byte n | Byte 8-Byte F |
|---|---|---|---|---|---|---|---|
| 1 | 4: publishMemoryData | data MSB | data | data | . . . | data LSB | |

The following application packet represents a directed message from a client to the software architecture 10 for reading EE memory (Read EE). It is sent to the software architecture 10 and results in a "Publish EE Data" response (Op Code=8), which is shown below and contains the values specified in the Read EE packet, Bytes 3-7 below.

The following application packet represents a directed message from the software architecture 10 to a client for publishing memory data (Publish Memory Data) and is a response to Read Memory.

The following application packet represents a directed message from the software architecture 10 to a client for publishing EE memory data (Publish EE Data) and is a response to Read EE.

| API ID | Op Code | Byte 3 | Byte 4 | Byte 5 | Byte 6 | Byte n | Byte 8-Byte F |
|---|---|---|---|---|---|---|---|
| 1 | 8: publishEEData | data MSB | data | data | ... | data LSB | |

The following application packet represents a directed message from a client to the software architecture 10 for sending events (Send Events). The message instructs the software architecture 10 to send specified events regardless of event trigger criteria.

Note: Event Id is used synonymously with Op Code. Event Id is a more descriptive term for Op Code when describing an Event which is part of an API.

Note: the notation used below is repeated through out the document and is described here only. If Byte 3 contains the reserved value 0xFF, then the software architecture 10 interprets Byte 3 to mean all API Ids. Otherwise, Byte 3 specifies a particular API Id. Likewise, If Byte 4 contains 0xFF, the software architecture 10 interprets Byte 4 to mean all Events for the API or APIs specified in Byte 3. Otherwise, Byte 4 contains a single Event Id. Bytes 5 through Byte n contain a single Event Id.

| API ID | Op Code | Byte 3 | Byte 4 | Byte 5 | Byte 6 | Byte 7 | Byte 8-Byte F |
|---|---|---|---|---|---|---|---|
| 1 | 7: send Event(s) | API id (0xFF = all) | EventId# (0xFF = all) | EventId# | EventId# | EventId# | |

The following application packet represents a broadcast message from the software architecture 10 to a client for publishing events (Publish Event) and is a response to the above Send Events message. Alternatively, if the DAQ Engine is being used, this message is sent when the event trigger criteria is satisfied. Below, API Id and Op Code are notated as 'client defined'. This refers to the assignment made of API ID and Op Code by the createEvent commands (sent by the Client) of DAQ API (API Id=2) specifically in Bytes 7 and 8 of Op Code 1 & 2 and Bytes 3 and 4 of Op Code 12 & 13

| API ID | Op Code | Byte 3 | Byte 4 | Byte 5 | Byte 6 | Byte 7 | Byte 8-Byte F |
|---|---|---|---|---|---|---|---|
| client defined | client defined | data MSB | data | data | ... | data LSB | |

Core DAQ API: API ID=2 (Type 3, Version 1). The following application packet represents a directed message from a client to the software architecture 10 for creating a numeric event (Create Numeric Event). The message, identified by API Id of 2 and Op Code of 1 or 2 allows the client to create and configure feedback variables [NVOEvent structures of FIG. 33]. Byte 7 and 8 are used to assign the identifier (API Id and Op Code) which will be used to populate fields in the publish event message (API Id 1) when the event conditions are such that an event message is generated. Generated event messages are of the form found in the preceding description of the Core API where the message packet is labeled as 'Publish Event'. The identifiers API Id and Op Code located in bytes 1 and 2 respectively of the Publish Event message. The values found in these bytes can be assigned through the messages defined for the DAQ API, Op Codes 1 and 2 below. Bytes 3-5 contain the address in the memory of the software operating environment which will be evaluated for the event condition represented by Byte 9 which is an enumeration of evaluation rules and Bytes A and B which are arguments to the evaluation rules. Byte 6 specifies the number of contiguous bytes which should be evaluated as a single numeric value with respect to Bytes 9, A, and B

| API ID | Op Code | Byte 3 | Byte 4 | Byte 5 | Byte 6 | Byte 7 | Byte 8 | Byte 9 | Byte A | Byte B | Byte C |
|---|---|---|---|---|---|---|---|---|---|---|---|
| 2 | 1: createNumericEvent | address Hi-Byte | address Mid-Byte | address Low-Byte | size 1, 2, 4 | API Id | Event Id | Change Operator | Change Val MSB | Change Val LSB | ACK'd Event 1 = ACK'd 0 = unACK'd |

Event operators associated with Byte 9 of the above application packet are discussed in further detail following this section of exemplary application packets and are shown in the table that denotes event operators available when creating a numeric-based event. Additionally, byte C corresponds further classification resulting in either acknowledged or unacknowledged events (discussed later). See FIG. 29 for an example of the operation of an acknowledged event.

The following application packet represents a directed message from a client to the software architecture 10 for creating a byte event (Create Byte Event). The messages definitions, identified by API Id=2 and Op Code=1 or 2 allows the client to create and configure feedback variables (events).

The message specification for Op Code 2 is similar in intent, but has different implementation details that provide usefulness for certain application use cases. API Id 2 with Op Code 2 differs in functionality from API 1 Op Code 1 in that depending on the value of Byte A, either only 1 byte within the range specified by Bytes 3-5 and Byte 6 or all the bytes will be evaluated based on Byte 9's change operator and Byte B's change value. Whereas in the case of Op Code 1, the specified bytes were evaluated as a single numeric. In the case of Op Code 2, each byte or a single byte, according to the value specified in Byte A, will be evaluated independently according to the change operator specified in Byte 9 and the change value specified in Byte B.

| API ID | Op Code | Byte 3 | Byte 4 | Byte 5 | Byte 6 | Byte 7 | Byte 8 | Byte 9 | Byte A | Byte B | Byte C |
|---|---|---|---|---|---|---|---|---|---|---|---|
| 2 | 2: createByteEvent | address Hi-Byte | address Mid-Byte | address Low-Byte | size | API Id | Event Id | Change Operator | byte index 0-255 0xFF = all | Change Val | ACK'd Event 1 = ACK'd 0 = unACK'd |

Event operators associated with Byte 8 of the above application packet are discussed in further detail following this section of exemplary application packets and are shown in the table that denotes event operators available when creating a byte-based event. Additionally, byte C corresponds to further classification resulting in either acknowledged or unacknowledged events (discussed later). See FIG. 29 for an example of the operation of an acknowledged event.

The following application packet represents a directed message from a client to the software architecture 10 for clearing event(s) (Clear Event(s)). The Clearing Events message allows the client to clear the event definitions previously created with either of the create event Op Codes (1 or 2, as shown above). The client can send multiple Clear Event commands to the software architecture 10 using the MMP flag if synchronization is needed across multiple commands.

| API ID | Op Code | Byte 3 | Byte 4 | Byte 5 | Byte 6 | Byte n | Byte 8-Byte F |
|---|---|---|---|---|---|---|---|
| 2 | 3: clearEvent | API Id (0xFF = all) | EventId# (0xFF = all) | EventId # | EventId # | EventId # | |

The following application packet represents a broadcast message from the software architecture 10 to a client for publishing events cleared (Publish Events Cleared) and is a response to Clear Events. The message notifies the clients of the software architecture 10 when Op Codes or APIs are removed from the existing the software architecture node interface.

| API ID | Op Code | Byte 3 | Byte 4 | Byte 5 | Byte 6 | Byte n | Byte 8-Byte F |
|---|---|---|---|---|---|---|---|
| 2 | 4: publishEventsCleared | API Id (0xFF = all) | EventId# (0xFF = all) | EventId# | EventId# | EventId# | |

The following application packet represents a directed message from a client to the software architecture 10 for resetting the software architecture 10 (Reset SA). The Reset SA command instructs the software architecture 10 to re-initialize as if it had just powered up.

| API ID | Op Code    |
|--------|------------|
| 2      | 8: resetSA |

The following application packet represents a broadcast message from the software architecture 10 to notify that the software architecture 10 has been reset (Publish SA Reset) and is a response to Reset SA.

| API ID | Op Code           |
|--------|-------------------|
| 2      | 9: publishSAReset |

The following application packet represents a directed message from a client to the software architecture 10 for turning on external notification for a specified event (Set External On). The command instructs the software architecture to externally notify clients of the event. See FIG. 28 for an example of the usage of this command.

| API ID | Op Code              | Byte 3 | Byte 4 | Byte 5 | Byte 6 | Byte n |
|--------|----------------------|--------|--------|--------|--------|--------|
| 2      | 10: setExternalEventOn | API Id | OpCode | OpCode | OpCode | OpCode |

The following application packet represents a broadcast message from the software architecture 10 to notify that external notification of the specified event has been turned on (Publish External On) and is a response to Set External On. See FIG. 28 for an example of the result of this command.

| API ID | Op Code              | Byte 3 | Byte 4 | Byte 5 | Byte 6 | Byte n |
|--------|----------------------|--------|--------|--------|--------|--------|
| 2      | 10: publishExternalOn | API Id | OpCode | OpCode | OpCode | OpCode |

The following application packet represents a directed message from a client to the software architecture 10 for turning off external notification for a specified event (Set External Off). The command instructs the software architecture to not externally notify clients of the event.

| API ID | Op Code               | Byte 3 | Byte 4 | Byte 5 | Byte 6 | Byte n |
|--------|-----------------------|--------|--------|--------|--------|--------|
| 2      | 11: setExternalEventOff | API Id | OpCode | OpCode | OpCode | OpCode |

The following application packet represents a broadcast message from the software architecture 10 to notify that external notification of the specified event has been turned off (Publish External Off) and is a response to Set External Off.

| API ID | Op Code                | Byte 3 | Byte 4 | Byte 5 | Byte 6 | Byte n |
|--------|------------------------|--------|--------|--------|--------|--------|
| 2      | 10: publishExternalOff | API Id | OpCode | OpCode | OpCode | OpCode |

Core DAQ API: API ID=2 (Type 4, Version 1-Extends Type 3, Version 1). The following application packet represents a directed message from a client to the software architecture 10 for getting event data (Get Event Data). Get Event Data instructs the software architecture 10 to send definition(s) of specified events. The definition is a mirror image of the data sent in the Create Event Op Code messages, which are shown above as Op Codes 1 or 2 for the Core DAQ API. The software architecture 10 will respond with a collection of Publish Event Data messages, which are shown below.

| API ID | Op Code | Byte 3 | Byte 4 | Byte 5 | Byte 6 | Byte n | Byte 8-Byte F |
|---|---|---|---|---|---|---|---|
| 2 | 5: getEventData | API Id (0xFF = all) | EventId# 0xFF = all) | EventId# | EventId# | EventId# | |

The following application packet represents a directed message from the software architecture 10 to a client for publishing numeric event data (Publish Numeric Event Data), and is a response to Get Event Data. Each event definition is reported in a separate internal network message and is governed by snapshot rules associated with the MMP flag of 28 of FIG. 4. The event definition contains the information specified about the event in Create Numeric Event.

| API ID | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 2 | 6: publishNumericEventData | address MSB | address LSB | size = 1, 2, 4 | API Id | Event Id | Change Operator | Change Val MSB | Change Val LSB | |

Event operators associated with Byte 8 of the above application packet are discussed in further detail following this section of exemplary application packets and are shown in the table that denotes event operators available when creating a numeric-based event.

The following application packet represents a directed message from the software architecture 10 to a client for publishing byte event data (Publish Byte Event Data) and is response to Get Event Data. Each event definition is reported in a separate internal network message and will be governed by the snapshot rules associate with the MMP flag of 28 of FIG. 4. The event definition contains the information specified about the event in Creation Byte Event.

| API ID | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 2 | 7: publishByteEventData | address MSB | address LSB | size | API Id | Event Id | Change Operator | byte index 0-255 | Change Val | |

Event operators associated with Byte 8 of the above application packet are discussed in further detail following this section of exemplary application packets and are shown in the table that denotes event operators available when creating a byte-based event.

The following application packet represents a directed message from a client to the software architecture 10 for creating a remote numeric event (Create Remote Numeric Event). The message allows the client or another module in the embedded system to configure feedback variables associated with an existing API and Op Code using an embedded variable map. Although the number can be 4 bytes, the change value is limited to 2 bytes. FIG. 26B illustrates the embedded variable map. FIG. 27 defines the interaction between 3 network nodes where Node A successfully creates a Remote Numeric Event on Node B. And where Node C attempts the same, but through the interaction with Node B, is able to accomplish the intent of the request without duplication of the Identifier (API Id and OpCode). This is accomplished because Node C is able to query Node B for the address in memory of the initial Identifier so that an alternative (non-duplicated) Identifier may be selected. The alternative identifier is then used to create the Remote Numeric Event by sending (see message 8 in FIG. 27) a new message to Node B with the original memory address and the alternative Identifier.

| API ID | Op Code | Byte 3 | Byte 4 | Byte 5 | Byte 6 | Byte 7 | Byte 8 |
|---|---|---|---|---|---|---|---|
| 2 | 12: createNumRemoteEvent | API Id | OpCode | Change Operator | Change Val MSB | Change Val LSB | ACK'd Event 1 = ACK'd 0 = unACK'd |

FIG. 26B illustrates the embedded variable map. FIG. 27 defines the interaction between 3 network nodes where Node A successfully creates a Remote Numeric Event on Node B. And where Node C attempts the same, but through the interaction with Node B, is able to accomplish the intent of the request without duplication of the Identifier (API Id and OpCode). This is accomplished because Node C is able to query Node B for the address in memory of the initial Identifier so that an alternative (non-duplicated) Identifier may be selected. The alternative identifier is then used to create the Remote Numeric Event by sending (see message 8 in FIG. 27) a new message to Node B with the original memory address and the alternative Identifier.

The following application packet represents a directed message from a client to the software architecture 10 for creating a remote byte event (Create Remote Byte Event). The message allows the client or another module in the embedded system to configure feedback variables associated with an existing API and Op Code using an embedded variable map.

| API ID | Op Code | Byte 3 | Byte 4 | Byte 5 | Byte 6 | Byte 7 | Byte 8 |
|---|---|---|---|---|---|---|---|
| 2 | 13: createByteRemoteEvent | API Id | OpCode | Change Operator | Byte Index 0-255 | Change Val | ACK'd Event 1 = ACK'd 0 = unACK'd |

FIG. 26B illustrates the embedded variable map. FIG. 27 defines the interaction between 3 network nodes where Node A successfully creates a Remote Byte Event on Node B. And where Node C attempts the same, but through the interaction with Node B is able to accomplish the intent of the request without duplication of the Identifier (API Id and OpCode). This is accomplished because Node C is able to query Node B for the address in memory of the initial Identifier so that an alternative (non-duplicated) Identifier may be selected. The alternative identifier is then used to create the Remote Byte Event by sending (see message 8 in FIG. 27) a new message to Node B with the original memory address and the alternative Identifier.

The following application packet represents a directed message from a client to the software architecture 10 for getting remote variable data from an embedded variable map (Get Remote Variable Data). The message instructs the software architecture to publish information concerning the data that exists in the embedded variable map. See FIG. 27 for an example of use of this command.

| API ID | Op Code | Byte 3 | Byte 4 | Byte 5 | Byte n |
|---|---|---|---|---|---|
| 2 | 14: getRemoteVarData | API Id | OpCode | OpCode | OpCode |

The following application packet represents a directed message from the software architecture 10 to a client for publishing remote variable data (Publish Remote Variable Data), and is a response to Get Remote Variable Data. It reports data from the embedded variable map, such as the API, op code, size, and address.

| API ID | Op Code | Byte 3 | Byte 4 | Byte 5 | Byte 6 | Byte 7 | Byte 8 |
|---|---|---|---|---|---|---|---|
| 2 | 14: publishRemoteVarData | Address Hi-Byte | Address Mid-Byte | Address Low-Byte | Size | API Id | OpCode |

Core Discovery API: API ID=3 (Type 3, Version 1). Referring to FIG. 6, the following application packet represents a broadcast message from a client to find nodes of the software architecture 10 (Find Node(s)). This broadcast message enables a node to locate other nodes of the software architecture 10.

| API ID | Op Code | Byte 3-Byte F |
|---|---|---|
| 3 | 1: findNodes | |

The following application packet represents a broadcast message (Publish Node) from the software architecture 10 allowing it to publish its presence to other components participating on 14. This message is sent when a node of the software architecture 10 powers up or is re-set or is sent as a response to Find Nodes. Additionally, this message can be sent when the node of the software architecture 10 through a secondary Discovery process adds (to itself) an API or adds Op Codes to an existing API. Publish Node is not sent when a client dynamically adds an API or Op Code to the software architecture 10 (via DAQ Op 1, 2, 12, 13). The payload of the feedback message contains a firewall password, which is to be used by the firewall security feature of the software architecture 10 (see FIG. 31 for an example of this feature). This allows the sender of the message to become a 'trusted' node on network 14.

| API ID | Op Code | Byte 3 | Byte 4 |
|---|---|---|---|
| 3 | 2: publishSANode | Firewall Password MSB | Firewall Password LSB |

The following application packet represents a message which can be either directed or broadcasts from a client to the software architecture 10 for getting API(s) (Get APIs) of the software architecture 10. This directed message allows the client to discover the APIs that are supported by a specific node of the software architecture 10. API Id must be unique within an appliance.

| API ID | Op Code | Byte 3-Byte F |
|---|---|---|
| 3 | 3: getAPIs | |

The following application packet represents a broadcast message from the software architecture 10 to a client for publishing API(s) (Publish API(s)) of the software architecture 10. This message is a response to Get API(s) and is a directed message that allows the client to discover the APIs that are supported by the sending node of the software architecture 10.

| API ID | Op Code | Byte 3 | Byte 4 | Byte 5 | Byte n | Byte 7-Byte F |
|---|---|---|---|---|---|---|
| 3 | 4: publishAPIs | API # | API # | API # | API n | |

The following application packet represents a message which can be directed or broadcast from a client to the software architecture 10 for getting API information (Get API Info). This directed message allows the client to discover Version and Type information about the specified API(s).

| API ID | Op Code | Byte 3 | Byte 4 | Byte 5 | Byte n | Byte 7-Byte F |
|---|---|---|---|---|---|---|
| 3 | 5: getAPIInfo | API # (0xFF = all) | API # | API # | API n | |

The following application packet represents a directed message from the software architecture 10 to a client for publishing API information (Publish API Info) and is a response to Get API Info. This directed message allows the client to discover Version and Type information about the specified API(s). There is one message per API, and the messages are bounded using the MMP flag of FIG. 4.

| API ID | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 3 | 6: publishAPIInfo | API Id | Type MSB LSB | Type | Version MSB | Version LSB | Number Instances | Descr Char 1 | Descr Char 2 | Descr Char n |

Bytes 4 and 5 represent an API's Type which can be used As an indication of a specific sub-classification of an API. The value of Type can be used to determine compatibility concerns between sub-components (APIs). Byte 6 and 7 represent an API (of a particular Type)'s Version. This value can be used to indicate bug fixes or changes to functionality. As with Type, it enables a runtime compatibility check, which can inform the client if the versions are compatible. Alternatively, Bytes 4-7 can be used in conjunction with Byte 3 to form a 5 byte class identifier where class refers to a class definition within a class library (whom one of typical competence with the state of the art would understand). Using the alternate approach, Byte 3 (API Id) is a runtime object handle and Bytes 3-7 numerically concatenated form the class id.

The Number Instances associated with Byte 8 signifies to the client than an API has multiple instances. The client can follow up with Get Instance Info, which is described below, to find the Instance Ids that belong to the API. The Descr Char 1-Descr Char n is an optional feature that can be helpful to developers. Descriptive text can be used to annotate API Id. For example, 'upper' or 'lower' could be used for the two cavities of a double oven.

The following application packet represents a directed message from a client to the software architecture 10 for getting instance information (Get Instance Info). This directed message allows the client to discover the Instance Ids for the APIs that report more than one Instance of an API. The first instance of any API uses API Id as its Instance Id. If there are multiple Instances of an API Id on the same addressable node, subsequent instances are assigned an Instance Id dynamically. These dynamically assigned Ids can be discovered by sending the Get Instance Info message. The value of the Instance Id should be used in place of API Id when there are multiple instances of an API on a physical network node.

| API ID | Op Code | Byte 3 | Byte 4 | Byte 5 | Byte n | Byte 7-Byte F |
|---|---|---|---|---|---|---|
| 3 | 7: getInstanceInfo | API # (0xFF = all) | API # | API # | API n | |

The following application packet represents a broadcast message from the software architecture 10 to a client for publishing instance information (Publish Instance Info) and is a response to Get Instance Info. This directed message allows the client to discover the Instance Ids. The first instance of any API uses API Id as its Instance Id. If there are multiple Instances of an API Id on the same addressable node, subsequent instances will be assigned an Instance Id dynamically. These dynamically assigned Ids are communicated via the Publish API Info message described above. For purposes of uniformity, Publish API Info is sent for the first instance (i.e., where API Id=Instance Id). There will be one message for Instance of API, which is bounded using the MMP flag. The value of Instance Id should be used in place of API Id when there are multiple instances of an API on a physical network node.

| API ID | Op Code | Byte 3 | Byte 4 | Byte 5 | Byte 6 | Byte 7 | Byte 8 | Byte 9 | Byte A | Byte n |
|---|---|---|---|---|---|---|---|---|---|---|
| | 8: publishInstanceInfo | API Id | Instance Id | Type[1] MSB | Type LSB | Version[2] MSB | Version LSB | Descr[3] Char 1 | Descr Char 2 | Descr Char n |

[1]Allows for APIs to be sub-classed or specialized. For example, API Id may refer to a washing machine API and Type may specify a particular washer model.
[2]Enables version control (i.e. bug fixes or changes to functionality). Enables a runtime compatibility check, which can inform client if the versions are compatible.
[3]Allows client to associate Instance Id with its physical function. For example, 'upper' or 'lower' could be used for the two cavities of a double oven.

Preferably, the Descr Char 1-Descr Char n allows the client to associate an Instance Id with its physical function. For example, 'upper' or 'lower' could be used for the two cavities of a double oven. However, the user of the software architecture 10 may use Descr Char 1-Descr Char n for any useful purpose.

Core Debug API: API ID=4 (Type 1, Version 1). The following application packet represents a broadcast message from the software architecture 10 to a client for publishing saturation (Publish Saturation). Saturation happens when the supporting layers of the internal network 14 are unable to deliver the data that the software architecture 10 has put into the outbound queue of WIDE 14A. The software architecture 10 has no queue; if the WIDE 14A cannot service the outbound data, then the software architecture 10 sends out Publish Saturation.

| API ID | Op Code | Byte 3-Byte F |
|---|---|---|
| 4 | 1: publishSaturation | |

The following application packet represents a directed message from a client to the software architecture 10 for setting a register for saturation (Register for Saturation). The client sends this message to a software architecture node, which enables the Saturation message. Only the node that enables saturation can disable saturation.

| API ID | Op Code | Byte 3 | Byte 4-Byte F |
|---|---|---|---|
| 4 | 2: Saturation On or Off | 1 = on<br>2 = off | |

Low Level API: API ID=5 (Type 1, Version 1). The following application packet represents a broadcast message from the software architecture 10 for publishing state (Publish State). This message sent as a result of a changed internal state of the machine, resulting from normal cycle progressions, user interactions, Op Code 2 below, or other messages received via network 14.

| API ID | Op Code | Byte 3 | Byte 4-Byte F |
|---|---|---|---|
| 5 | 1: publishState | state enum | |

Exemplary machine state enumeration values are presented in the following table. According to one embodiment of the invention, the running state is included. However, in some cases, the running state is somewhat ambiguous and additional phase variables must be exposed so that proper client side business logic can be written. In an alternative embodiment, the running state is eliminated in favor of a more granular and definitive state machine where each phase of each state is documented properly. In this embodiment, sufficient address space exists in the byte for the additional enumerations.

| Machine State Enumeration | |
| --- | --- |
| idle | 1 |
| running | 2 |
| programming | 3 |
| fault | 4 |
| development | 5 |
| end of cycle | 6 |
| pause | 7 |
| reserved | 8 |
| reserved | 9 |
| reserved | 10 |
| appliance specific | 11-255 |

The following application packet represents a directed message from a client to the software architecture 10 for toggling the household appliance 12 software operating environment 16 governing state of FIG. 7 between the development state and the idle state. Note that the development state not shown on FIG. 7, but one with ordinary skill in the art can contemplate a development state which can only be entered from an idle state and when an exited state goes back to an idle state.

| API ID | Op Code | Byte 3 | Byte 4-Byte F |
| --- | --- | --- | --- |
| 5 | 2: setDevelopmentState | 1 = on<br>2 = off | |

Core Key Press API: API ID=6 (Type 1, Version 1). The following application packet represents a directed message from a client to the software architecture 10 for pressing a key (Key Press). This directed message allows the client to send virtual key presses. Key indexes are not discoverable due to coding techniques used in the embedded processor; therefore, key indexes may be extracted from the source code files manually or through other automated mechanisms.

| API ID | Op Code | Byte 3 | Byte 4-Byte F |
| --- | --- | --- | --- |
| 6 | 1: pressKey | key index | |

The following application packet represents a broadcast message from the software architecture 10 to a client for publishing key press (Publish Key Press).

| API ID | Op Code | Byte 3 | Byte 4-Byte F |
| --- | --- | --- | --- |
| 6 | 2: publishKeyPress | key index | |

Exemplary key press index enumeration values are presented in the following table.

| Key Press Index Enumeration | |
| --- | --- |
| start | 1 |
| cancel | 2 |
| pause | 3 |
| reserved | 4-25 |
| appliance specific | 26-255 |

Memory/Port API: API ID=7 (Type 3, Version 1). The following application packet represents a directed message from a client to the software architecture 10 for writing memory (Write Memory). The Memory/Port port API is enabled via the Development State of FIG. 3 and the associated interaction is similar to the previously described association between Development State of FIG. 3 and the Low Level API (API ID=7).

This directed message allows the client to write to a specified RAM location. The write to the specified RAM location is limited to a single packet. In the current embodiment, this would be 13 bytes shown in 28A of 28. MMP (of 28)=1 is not valid for this message.

| API ID | Op Code | Byte 3 | Byte 4 | Byte 5 | Byte 6 | Byte 7 | Byte n |
| --- | --- | --- | --- | --- | --- | --- | --- |
| 7 | 1: writeMemory | Address Hi-Byte | Address Mid-Byte | Address Low-Byte | data byte | data byte | data byte |

The following application packet represents a directed message from a client to the software architecture 10 for writing EE memory (Write EE). The write to a specified EE location is limited to a single packet. In the current embodiment, this would be 13 bytes shown in 28A of 28. MMP (of 28)=1 is not valid for this message.

The Memory Port

| API ID | Op Code | Byte 3 | Byte 4 | Byte 5 | Byte 6 | Byte 7 | Byte n |
| --- | --- | --- | --- | --- | --- | --- | --- |
| 7 | 2: writeEE | Address Hi-Byte | Address Mid-Byte | Address Low-Byte | data byte | data byte | data byte |

| API ID | Op Code | Byte 3 | Byte 4 | Byte 5 | Byte 6-Byte F |
| --- | --- | --- | --- | --- | --- |
| 10 | 1: readPollVariable(s) | Event Id 1 (0xFF = all) | Event Id 2 | Event Id n | |

Poll Variable API: API ID=10 (Type 1, Version 1). Referring to FIG. 5, the following application packet represents a directed message from a client to the software architecture 10 for reading poll variables (Read Poll Variable(s)). This message instructs the software architecture 10 to send a Publish Poll Variable message, which is shown below, for poll-only variables. Poll variables can be hard-coded by a developer for a specific application and can be used if RAM/ROM resources do not allow the use of the DAQ API.

The following application packet represents a directed message from the software architecture 10 to a client for publishing poll variables (Publish Poll Variable) and is a response to Read Poll Variable(s). There is one message per poll variable index as specified in the initiating Read Poll Variable message.

| API ID | Op Code | Byte 3 | Byte 4 | Byte 5 | Byte 6 | Byte 7 | Byte n | Byte 9-Byte F |
|---|---|---|---|---|---|---|---|---|
| 10 | Event ID n: (publishPollVariable) | data MSB | data | data | data | ... | data LSB | |

A note on the event operators discussed in the DAQ API section above. Byte 9 of the Create Event Numeric and Byte message (DAQ API opcodes 1 &2) and Byte 5 of CreateNumRemoteEvent and CreateByteRemoteEvent (DAQ API op codes 12 & 13) are the event change operator shown in the NVOEventStructure of FIG. 33. Operators are instructions which describe to the software architecture 10 the mathematical condition at which the software architecture 10 should generate an event message. The table below describes examples of event operators. The arguments for event operators are dependant on the type of event being created (numeric-based or byte-based which are op codes 1 and 2, respectively).

Event operators are part of the DAQ API which has two variations: basic (Type 1) and an extended (Type 2). Note the fifth column in the table which denotes the availability of each Event Operator for the plurality of revisions (4) of the DAQ API. Note that Types 1 & 2 are deprecated and the preferred embodiments are the Basic Type 3 or the Extended Type 4 which is inclusive of Type 3 functionality.

The following table denotes the event operators available when creating a numeric-based event (API ID 2, Op Code 1 and 12):

| Name | Operator Id (Byte 8) | Arg 1 (Byte 9) | Arg 2 (Byte A) | DAQ API Type Availability |
|---|---|---|---|---|
| On Change | 0 | — | — | 1, 2, 3, 4 |
| Deadband | 1 | Deadband Val (MSB) | Deadband Val (LSB) | 2, 3, 4 |
| Check Value == | 2 | Compare Val (MSB) | Compare Val (LSB) | 2, 3, 4 |
| Boundary <= \| => | 3 | Compare Val (MSB) | Compare Val (LSB) | 2, 3, 4 |
| 25 msec increments | 4 | — | time = val * 25 ms | 1, 2, 3, 4 |
| Seconds | 5 | — | time = val (sec) | 1, 2, 3, 4 |
| Minutes | 6 | — | time = val (min) | 1, 2, 3, 4 |
| Reserved | 7 | — | — | — |
| BIND | 8 | API Id: DAQ = 2 | Event Id | Unavailable at this time. |

The following table denotes the event operators available when creating a byte-based event (API ID 2, Op Code 2 and 13):

| Name | Operator Id (Byte 8) | Arg 1 (Byte 9) | Arg 2 (Byte A) | DAQ API Type Availability |
|---|---|---|---|---|
| On Change | 0 | Offset (1 - size) | — | 1, 2, 3, 4 |
| Deadband | 1 | Offset (1 - size) | Deadband Val | 2, 3, 4 |
| Check Value == | 2 | Offset (1 - size) | Compare Val | 2, 3, 4 |
| Boundary < or > | 3 | Offset (1 - size) | Compare Val | 2, 3, 4 |
| 25 msec increments | 4 | — | time = val * 25 ms | 1, 2, 3, 4 |
| Seconds | 5 | — | time = val (sec) | 1, 2, 3, 4 |
| Minutes | 6 | — | time = val (min) | 1, 2, 3, 4 |
| Bit Mask | 7 | offset | mask | 1, 2, 3, 4 |
| BIND | 8 | API Id: DAQ = 2 | Event Id | Unavailable at this time. |

The BIND operator allows the client 16 to create multiple memory events from a single event trigger. In other words, once an Event ID has been assigned, subsequent events can be created which will automatically be sent when the original master event is triggered.

When a byte based event (op code=3) is set up with the On Change operator, a value of 255 in byte 9 will instruct the software architecture 10 to do a change detect for all bytes in the range specified by the address and size arguments.

The Bit Mask operator allows the ability to watch for bit transitions within a byte. The mask value should be set such that bit==1 is a 'care about' and bit==0 is a 'don't care'. When set to 'don't care' a value transition at that bit location will not result in an event generated.

The software architecture 10 does not provide an explicit solution for time synchronization, but does provide an enabling mechanism. The capability of the client 16 to create an event that is periodically broadcast allows the client 16 to maintain a time of day clock which is synchronized with the appliance 12. Since the software architecture 10 may not explicitly expose a time of day clock API, the client 16 can have the address in memory where time of day is stored. It is to be understood that an external client 22 can have all or at least some of the same messaging, discovery, broadcasting, and other capabilities of the client 16.

The software architecture 10 core has several design considerations which can be considered and contemplated to create alternative embodiments of the invention described herein.

The following items can be considered when determining alternative embodiments of the core implementation of the software architecture 10:
  Message Architecture
  Payload Structure or Message Size
  Multi-Payload Message Integrity Checking
  State Aware Messaging
  API Versioning—Discovery
  Connection Integrity
  Traffic (flow) Control and Acknowledged Messages
    Inbound Invalid
    Inbound Valid
    Outbound
    Power-up Condition
  State Integrity
  Key Presses vs. Logical API
  Multi-Node Network
    Multiple Nodes
    Multiple Clients
    Multiple API implementations on same network
    Multiple API implementations on the same network node
    API(s) using same op codes—Namespace
    SAP assignment
    SAP discovery Message Architecture Message architecture is a primary design element whose solution has many dependent design consequences. The internal communication network 14 packet structure 28 provides new possibilities for event driven message architecture as opposed to previous networks. An element to consider is whether nodes will poll one another if they will register for notification messages.

Polling is a practice of nodes, which can be clients or components 16, periodically sending messages to the owners of data requesting updated values (e.g. continually request data every 100 ms). Polling is generally simpler to implement and more commonly used, and can maintain connection integrity verified with each request. However, when polling, the client must continuously ask for information. Network Bandwidth is used up with data that is not changing (bandwidth is the amount of data that can be passed along a communications channel in a given period of time and there are several factors that effect bandwidth such as: number of nodes on a network, the transmission frequency [baud rate], and the protocol overhead [CRCs, acknowledgements, source/destination IDs, etc], the transport protocol hardware, and cabling govern the limits of bandwidth, however, the Application protocol has the responsibility to make the most efficient use of the available bandwidth). Polling architectures do not scale: as nodes increase the number of messages increases exponentially. Assuming there is information on each node that every other node needs: messages=$n^2-n$. Data is typically not synchronized with the memory of the control and message latency can be as much as twice the polling rate.

Eventing is a practice of nodes registering with the owners of data to be notified under certain conditions with new value of data. The data owner is then responsible to send a message to the observing nodes when the data meets the criteria originally specified during registration. (e.g. send data only when data changes). In an eventing model, bandwidth usage is optimized because data is only sent when it changes. This model scales well with message traffic and minimizes latency. Data is synchronized with the control. However, a connection validation (heartbeat) is needed. Otherwise, a client may not know when an event source is offline. Alternatively, connection validation in an eventing model can be achieved using acknowledgments which are an additional message transmitted from the event observer back to the event source. When the event source transmits an event message, the event source will not consider the transaction to be complete until an acknowledgement message is received. After a timeout has expired, the event source may retransmit the event. This process may repeat for a configurable number of acknowledged event transmission retries.

In eventing architectures, the message binding capabilities of FIG. 9 that are governed by the MMP bit of the packet structure 28 can be used to group events which were generated from the same 'scan' of the microcontroller.

In this case, the preferred embodiment is an eventing model since eventing has advantages listed above as well as the simplicity of the remedies which address the disadvantages of eventing. Connection validation is addressed by use of a heartbeat and/or acknowledged events. When the heartbeat is used, the event source will send out an event periodically so that all of the event listeners of that node can know that the event source is healthy. Likewise, implementing the heartbeat such that its frequency is programmable can also be used to notify all event subscribers that the event source is healthy. The heartbeat period is configurable from the network. Acknowledged Events which are described in detail herein are an alternate method which can be used in addition to the heartbeat or programmable heartbeat to insure connection integrity. Message binding is addressed with the message bounding bit in the payload of each packet structure 28. This allows the software architecture 10 driver to collect messages corresponding to the same microcontroller scan and present those to the application layer as a whole.

Using a the a sub-component of the invention known as the DAQ 30, the software architecture allows a client 16 to dynamically register with a component 16 for appliance control, which is enabled with the software architecture 10 and including the optional sub-component of the software architecture DAQ 30, via the internal communication network 14 to receive notification when the value at a specified memory location changes relative to a specified condition. This relieves the component 16 for appliance control from having hard-coded feedback variables and allows real-time feedback to change according to the application, without client polling because event-based updates are accurately broadcast as needed.

Figure 33:
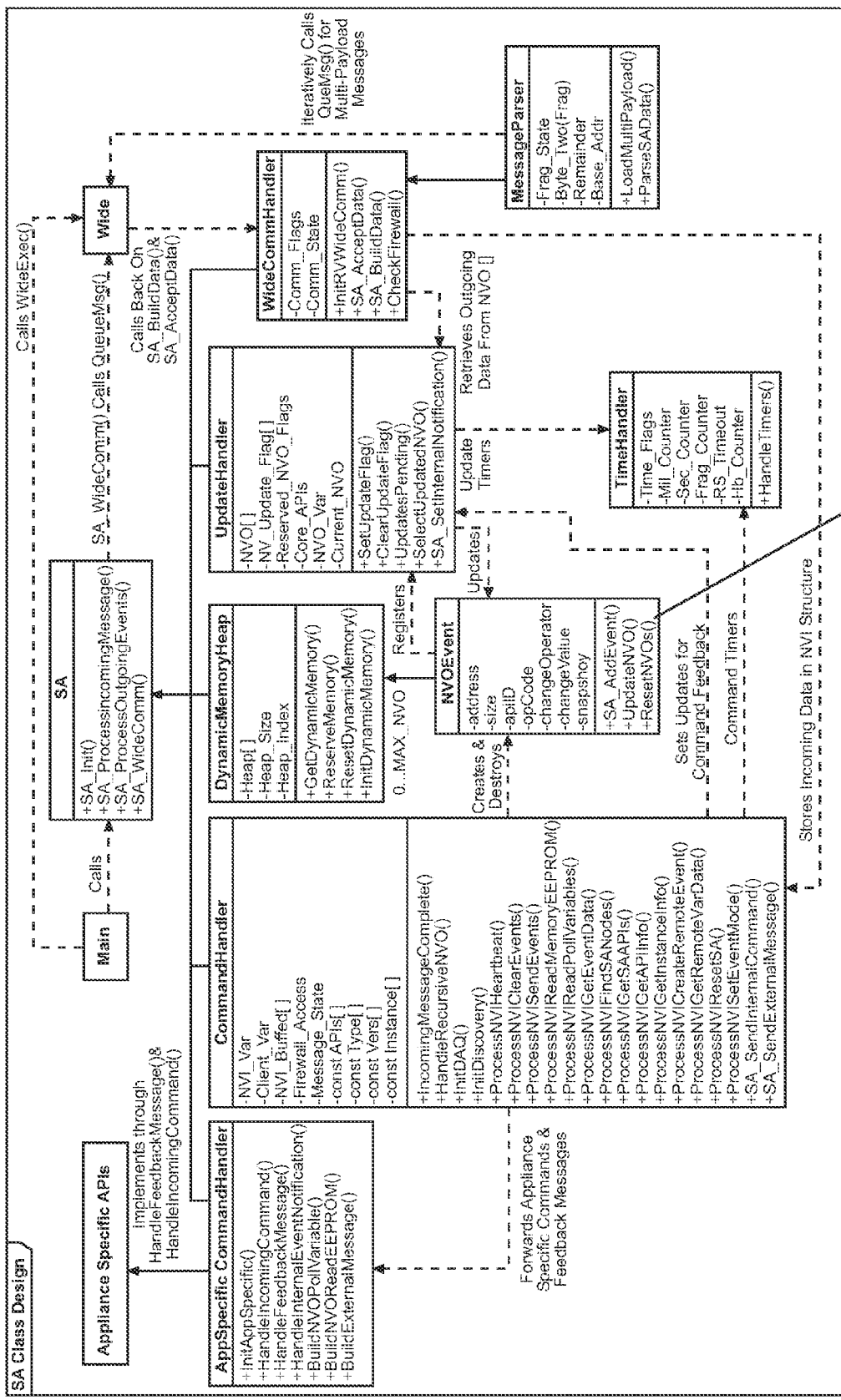
FIG. 33 is a UML class diagram illustrating the preferred implementation of the SA.

A dynamic memory heap of FIG. 33, which is a memory reserved for runtime-configurable feedback messages, is employed wherein the size of the heap is configurable at compile time. It has been found that each feedback event variable requires about 10 bytes of RAM. The events registered in the heap (NVOEvent of FIG. 33) can be added or reset through internal communication network 14 commands issued by the client to a component enabled by the software architecture having also installed the optional sub-component DAQ 30.

Payload Structure

One example of payload structure is a static compound payload which consists of grouping multiple variables together (at design time) so that the client can, with one transaction, send a complete command to, or receive the complete state of a component within the appliance 12. In the case of a command, the client may not intend to change every variable in a payload; therefore, a pre-requisite status update is required to populate the command payload with the current status for those variables which are not intended to change. Moreover, the variables that change may not map directly into a single payload definition resulting in multiple messages containing interspersed changed and non-changed data.

In a simple payload structure, only one variable can exist in a payload. This has a simpler, easier implementation and can approximate a dynamic compound payload (described below). However, bandwidth is not optimized because of a larger ratio of message overhead to data and message binding needed as variables are sent separately.

In a dynamic compound payload structure, payloads are not statically defined at design time, but are dynamically created by the sending node. In this case, the length of the payload is determined by the data, which the sender wishes to send, and moreover, there must include identifiers and possibly delimiters in the payload, which will allow the receiving parser to un-marshal the component parts of the payload. To reiterate, the receiving node must have a parser sophisticated enough to separated the multi-variable payloads into their component parts. This payload structure optimizes bandwidth but can increase ROM requirement due to the sophistication required by the parser. There is also some added overhead to the application protocol since the dynamic compound payload must embed op code lengths as part of messages, requires additional parsing by the receiving component and can be hard to understand and implement.

It is a preferred embodiment of this invention to employ a simple payload structure for the application protocol. The complexity of a dynamic compound payload can have difficulties in a cost-benefit analysis for the messages employed in the software architecture 10. To maximize the use of the software architecture 10, the complexity of the interface should be preferably minimized. By way of using compound payloads, by their complex nature, would potentially retard the use of the software architecture 10, especially with embedded clients. Simple payloads are a good approximation of dynamic compound payloads even though there can be additional message overhead (i.e., there are five bytes of overhead for every the internal communication network 14 message). There is an additional two bytes of overhead to support the software architecture 10 packet structure 28. This leaves 13 bytes per the internal communication network 14 protocol packet structure 24 for data in some application-specific conditions. Using a static compound payload can be inflexible and wasteful.

The message binding of FIG. 9 is addressed with the use of the MMP bit in the payload of each message packet. This allows the software architecture 10 driver to collect the messages corresponding to the same microcontroller scan and present those to the application layer as a whole.

State Aware Commands

Relative to a user interface for an appliance 12, the appliance 12 acts like a state machine. As keys are pressed, the state machine transitions from one state to another. For each state, it is known what keys are valid candidates for the next push. Likewise it is also known which keys are not valid for the next push.

Generally, when a key is pressed that is invalid, the appliance 12 will produce an audible alarm to indicate to the user that the appliance was in an inappropriate state for that key. The same concept applies to commands being sent by an external client 22, which may or may not be in the form of key presses, in that some sort of indication can be produced when the commands are invalid.

In general, two types of state machines are developed for appliance control: the key press state machine (as mentioned above) and a process state machine. An example of a typical process state machine is shown in FIG. 7.

FIG. 7 is a schematic illustration illustrating various states of a household appliance 12, such as a washer shown by example in FIG. 7, and to the interaction of the software architecture 10 through various states 32 and a fault error mode 34. The various states 32 of the example washer appliance are shown in FIG. 7 as idle, washing, rinsing, spinning, and pause. Other states for this example appliance 12 as well as states for different appliances 12 are contemplated and the example shown in FIG. 7 should be by example only.

The states of the process state machine can be reported to the internal client 16 or external client 22. However, upon inspection, it can be seen that the process state machine in FIG. 7 does not address events from all possible user inputs (i.e. clock set, spin speed selection, load size option, etc). In general, the logic in the component 16 for appliance control has a final else clause which handles all other cases which were not pre-defined.

It can be desirable for the client 16, 22 to understand the rules governing the state transitions of the control so that the client 16, 22 can avoid sending invalid commands. Accounting for the fact that the client 16, 22 will not typically be sending key press commands, the designer must understand that there is no available document or data structure allowing client side validation (i.e., validation before the request is sent). Eventually, this can lead to client applications that are likely to send a command that the receiving component 16 will not execute due to its validation logic, which is based on the exemplary state of FIG. 7.

The solution can have an effect not only on bandwidth usage, but also on the overall robustness and end user satisfaction of the application. From a bandwidth perspective, it can be stated that a message not resulting in the desired action, but rather, an error code or retry is a waste of bandwidth when the problem can be prevented. From a user satisfaction perspective, applications that prevent the user from making mistakes are generally considered more "user friendly" than those which allow the user to make mistakes and then use dialog boxes to explain what happened.

Various embodiments of state appropriate commands have been contemplated in accordance with this invention.

Using a client-coded rules section, a subset of state information is used to develop case logic or an emulation of the state of the control for the purpose of preventing invalid requests. This model typically does not impose change on the control architecture but can have the client and control can easily be out of sync. The rules and logic development can be based on trial and error (e.g., code, test, re-code). A client design will rapidly evolve, creating poorly designed procedural code.

Using a design-time state-based API data model, a data model is developed such that the client can interpret it and prevent invalid requests. In essence, it is a correlation between state and valid op codes (op codes are message identifiers). The advantage to this is that the developer of the Op Code or API is also responsible to publish information to the client developer (at design time) allowing the designer to emulate the state machine on the client. This emulated state machine enables the client application from sending invalid requests. It is necessary for the control to expose each state defined in the API data model. The design-time data model requires the control developer to be responsible to communicate state rules governing Op Code usage. The client and control can easily get out of sync because data is not available at runtime. A document must be created which reflects the as written code. This document must be maintained and published. The document must be parsed or converted into client side logic and this does not work all of the time. The appliance state can change just as a command is being sent resulting in an invalid command.

Using a run-time state-based API data model, this solution is identical to the previous with the exception that the data model is not shared between developers at design time, but between client and control at runtime. Some additional messaging is required for this data to be communicated from the control. In the runtime data model, the control developer must be responsible to communicate state rules governing Op Code usage. A client can discover at runtime the Op Code/State correlation definition. The client and control are always in sync and the client and developer activities are optimized— no manual translation to/from a document. Additional code (ROM) (written once) required to marshal and un-marshal Op Code/state correlation definition. Some network bandwidth required for transmission of data and some start-up latency as a result of transmission of data. This does not work all of the time. The state can change just as a command is being sent resulting in an invalid command.

Using a post-command acknowledgment enumeration model, the three options above have the goal of preventing the command from being issued by client to control in the invalid state. This solution does not attempt this pre-emption. Instead, this technique allows the client application to send any command at any time. If the command is invalid, an acknowledgment will occur so that the client can take appropriate action. This acknowledgment may or may not include an enumerated reason code. In a post-command reason code model, there is no change imposed on the control architecture but a client is more likely to send commands which will be rejected. The client developer must design a strategy to handle rejection acknowledgment and the end-user experience may not be as pleasant due to frequency of rejected command messages.

Using a design-time naming convention and source code parsing model which is a combination of the design and runtime data models, this has the least impact on the structure of the embedded code, as well, delivers the desired runtime functionality. It is accomplished by creating a client-side parser which can parse the embedded source code and determine the variable to be monitored for each external Op Code. The requirements for this solution are: (1) each non-diagnostic external command (Op Code) will have an associated single Boolean variable which represents the permission state required for execution; and (2) a naming convention is used such that a parser can associate each permission variable to the corresponding external Op Code. In a source code parsing model, the control developer is responsible to communicate state rules governing Op Code usage. A client can discover at runtime the Op Code/State correlation definition pending proper versioning and the client and control are always in sync with proper versioning. The extra reference document is not needed, however, there are non-trivial changes to coding practice, additional logic to be executed each scan, small additional RAM and ROM required, and only sophisticated clients are able to parse source code.

Using a learning client model, this solution requires no change to the embedded system. In this case, the client would "learn" after each rejected command and build a client side permission map that could, over time, achieve the desired runtime behavior. In a learning client model, there is no change imposed on the control architecture, however, this assumes that the correct state variables are being evaluated at the time of rejection. If no state variables are being observed, then the client cannot learn what caused the rejection.

It has been found that several of these options are preferred embodiments. For now, a main preferred embodiment is the runtime API data model. An exemplary beneficiary of this design would be the home control application. The model, however, requires additional embedded design. And because the current business environment does not create a requirement for this embodiment, the post-command acknowledgment is adopted until such time that the cost-benefit of adopting the runtime API data model (also referenced as Taxonomy Engine) becomes favorable.

One of the challenges of the software architecture 10 is to provide functionality without impacting the production schedule of the appliance 12. The software architecture 10 can implement an acknowledged request model. NVORecipeStatus (API ID=1, Op Code=1) is a preferred acknowledgment message that the software architecture 10 sends after each message received.

API Versioning—Discovery of FIG. 6

Although the core of the software architecture 10 is independent of any API, its purpose for the software architecture 10 is to expose multiple APIs. It is realistic to expect that APIs will be continually added to the software architecture 10 over time. In anticipation of this, consideration for API discovery and versioning is made.

It is also conceivable that as the software architecture 10 applications grow, the microprocessor resources will not be sufficient to support all the software architecture 10 APIs and functions simultaneously. With the use of compiler directives, the software architecture 10 can be configured so that APIs will appear and reappear for the same model over the development life of the machine.

Discovery is a key to the long-range success of the software architecture 10. A fundamental purpose of the software architecture 10 is to act as middle-ware between client 16 and control component 16. Given the scenario described below, it will be necessary for clients 16 to query the control to discover what the current capabilities are. If certain capabilities are not present (i.e., compile time decision), it is desirable for the application to be able to gracefully fail and communicate to the user that the support for the application is not currently compiled into the appliance control software.

There can be dozens of client implementations and dozens of cross-platform and platform specific APIs. Compiler directives can be developed to include or exclude certain functions of the software architecture 10. There may not be space on the control for all possible functions of the software architecture 10 to exist on the microprocessor simultaneously.

Various embodiments of the invention described herein relating to the versioning and discovery methods of APIs are contemplated without departing from the scope of this invention.

Using a model number-based discovery model, the client is responsible to understand the capabilities of the control. This can be done using client-based data structures, remote data bases, or runtime code delivery vehicles like OSGi which include all relevant information on a particular model number for an appliance 12. In a model number-based discovery model, there is no additional requirement on the appliance control. However, a model number is not typically assigned at beginning of a product development cycle so it is not available in early software development. Model numbers can be changed due to color schemes, branding, and other irrelevant factors. Different APIs can be residents on the same model due to compiler directives. The client can be required to be responsible to acquire capabilities definition or equivalent code after discovery.

Using an API ID-based discovery model, API-based discovery does not rely at all on model number, but rather defines any product as a collection of well-defined interfaces. This technique allows for the same APIs to be resident on multiple products resulting in some reuse. In an API ID-based discovery model, the reference to API ID compensates for the shortcomings of a model number-based approach. This model allows multiple products to share same compiler directives and same API definitions and can promotes sub-function reuse of the software architecture 10. However, the client can be responsible to acquire capabilities definition or equivalent code after discovery, additional management overhead can be required to maintain and assign unique APIs, and additional resources from a control microprocessor can be required to support discovery Op Codes (i.e., additional messaging).

Using a capabilities discovery model (also referenced as a Taxonomy Engine), this model takes API Discovery an additional step. In addition to the ID of an API, the client will also request and obtain the data definition corresponding to that API. In other words, the client will discover each function call; each function calls arguments, and all the valid values for each argument. In the capabilities discovery model, no secondary lookup is required to acquire capability definition. This model approaches a UPnP or Web Service type concept and sets the foundation for the conversion to LCD screen user interfaces which can be data driven. However, this concept may be cost deficient when applied to low margin mechanical key pads and actuators. And, to take advantage of this technique, the client 16 must develop an interpreter for the capabilities definition which can require more intensive modeling effort by the software architecture 10 sub-function developer and significantly more resources from the control microprocessor.

It has been found that, at the time this application was prepared, an API ID-based discovery model is a preferred embodiment. In addition to API ID, each API can have a type and a version, so that many different permutations of an API can exist over time. This can make the protocol much more flexible (e.g. there can be many types of APIs for a particular appliance 12, such as a dryer, as well as a different version of each type: Dryer API, Horizon Dryer Type, Version 1).

Discovery can be initiated in a number of ways according to the invention. On power up, each node enabled with the software architecture 10 broadcasts a message on the internal communication network 14 called Publish Node.

Secondly, a node, at any time, can broadcast a message on the internal communication network 14 called Find Nodes. This message will result in all nodes responding with a Publish Node message. This API is discussed in more detail with respect to FIG. 5 and the Discovery API.

As discovery is a key to the software architecture 10, versioning is a key to successful discovery. The same rationale used to justify API discovery can be applied to API versioning. Versioning allows the client to find out more information about the API which it has discovered.

During API discovery, the API version and type is reported within the same data structure as the API ID. For example, a simple number bumping approach can be employed. Further, a one- or two-byte or n byte data structure for API ID and a version number are contemplated.

Connection Integrity

In eventing architectures, connection integrity is an issue; whereas in polling architectures, connection integrity is inherent. In eventing architecture, the client 16 can successfully register to listen for feedback (such as for a temperature reading). Once registration is complete, the client relies on the control for notification of changes to temperature. As such, the client would interpret a network problem as a constant temperature. By contrast, in a polling architecture, the client would constantly ask the control for temperature feedback the response or lack thereof would immediately indicate the integrity of the connection.

Using an optional heartbeat model to perform connection integrity, a client must register for a network-based heartbeat. Using an automatic heartbeat model, the software architecture 10 produces a heartbeat automatically when a notification registration buffer is not null. Heartbeats can be broadcast messages or messages directed at a specific node.

In an optional heartbeat model, if there is an instance when it is not needed, the heartbeat can be eliminated. In instances where it is needed, a client must configure the software architecture 10 to produce a heartbeat. In an automatic heartbeat model, there is no effort required for desired functionality—the software architecture 10 is inherently robust. In a broadcast heartbeat, fewer messages need to be sent, a custom heartbeat can be accomplished through time-based event updates and it has simpler implementation. However, this can result in message handling from other network nodes which are not participating in the software architecture 10 collaboration. Also, nodes not properly handling broadcast messages can misinterpret incoming messages. In a directed heartbeat model, only enabled nodes need to handle the software architecture 10 application protocol. However, more messages can be sent using a directed heartbeat model.

For this invention, it has been found that a preferred embodiment is a heartbeat for connection integrity, and specifically, a broadcast messages can be used for a heartbeat. Clients that do not prefer the broadcast heartbeat rate can alternately use a periodic time-based NVO event update instead. Making the heartbeat automatic can lessen the burden on the client. With respect to the APIs contained in the software architecture 10, the following functions are supported as part of the Core API (Id=1): Heartbeat Message, Set Heartbeat Period. The heartbeat is preferably automatically initiated with a default period upon receipt of the first message from a client 16.

Figure 29:
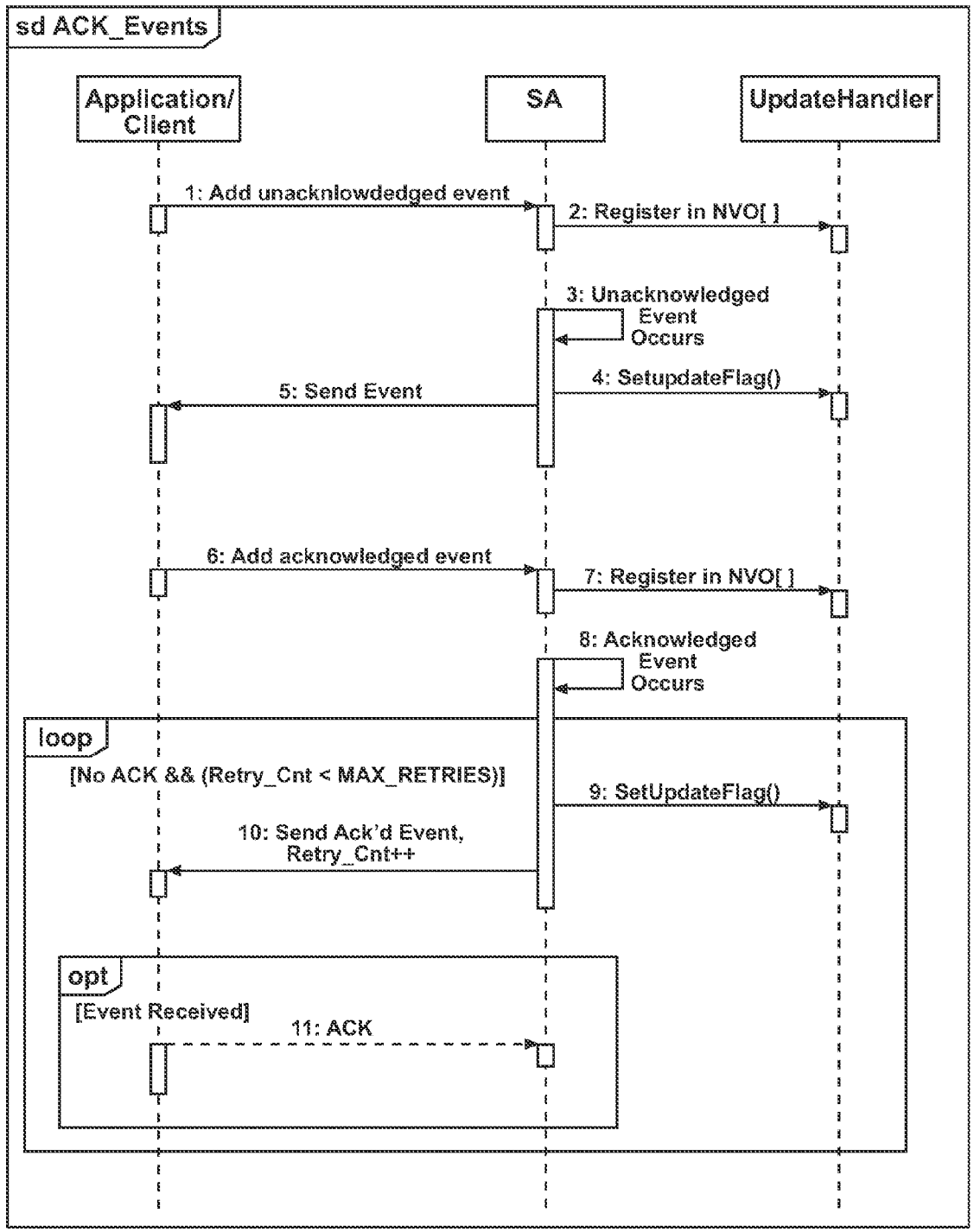
FIG. 29 is a UML sequence diagram of an acknowledged event within the SA, where the controller SA waits a predetermined time for an acknowledgement message from the client SA until processing the next event.

An additional optional preferable method for connection integrity can be introduced into the software architecture 10. It has been found that as the application of the software architecture proliferated, it was determined that an additional method of connection integrity was needed. Using the heartbeat method for connection integrity is appropriate for many application scenarios. This method is chosen because it represents a good tradeoff between utilization of bandwidth and confidence level of the event source. However, it is possible that an event message sent by the software architecture 10 will fail to be processed by the intended event subscriber even when the event subscriber did not detect a missing heartbeat. In this case, the event subscriber cannot detect failure and therefore cannot take corrective action. The corrective action, in the case of a detected missing heartbeat, is that the event subscriber may request that the event source re-send (all or a sub-set of all) events so that the event subscriber has the most current data. To address this potential undetected failure mode, a second method of connection integrity has been made available through the software architecture 10. The method, known as acknowledged events, allows the integrity of each event message to be individually managed. FIG. 29 illustrates the functionality of the acknowledged event. Further details concerning acknowledged events are described in the descriptions of FIG. 29.

Traffic (Flow) Control

Configurable asynchronous processes are powerful, but can fail when configured beyond their physical processing and bandwidth limits. Mechanisms are introduced to prevent saturation in four known failure scenarios: inbound invalid requests, inbound valid requests, outbound message events, and a power-up condition.

Inbound Invalid Requests. It is likely that the client will format and send a request that cannot be properly parsed or understood by the control or may be invalid per the state of the control.

Inbound Valid Requests. Without consideration, the client may ask the control to do a second task before the control has been able to process the first.

In a buffering model, a receive buffer could be used allowing the client to send many requests without concern for the control's ability to service them. In this model, the client has no responsibility even though the implementation of this model is simpler. However, buffering does not solve the flow control problem; it only delays or makes the problem less likely or less frequent and buffering requires more RAM.

In a flow control model, messaging can be used so that the client is required to wait until a control is 'ready' before sending a second request. In a flow control model, the flow control problem is solved robustly, and failure modes are eliminated. However, a client must implement a flow control protocol.

In an acknowledged request model, a control provides a response either positive or negative to each client request. In an acknowledged request model, this model allows a client 16 to develop simple re-try or recovery scenarios. However, this model requires more bandwidth for the acknowledgments and additional ROM and design is required.

In an unacknowledged request model, client requests are un-acknowledged—a client must use state information to determine if the command succeeded. In the unacknowledged request model, less bandwidth and ROM is employed. However, application user experience can suffer, a client application has no indication if an issued command was successful and therefore cannot automate retries, and a user will notice an unsuccessful command and need to manually replicate the command actions.

It has been determined that a preferred embodiment of this invention is a flow control protocol with an acknowledged command model. Moreover, acknowledgments can be enumerated such that a client process can develop the most robust recovery scenarios as possible. Because the acknowledgement message previously mentioned in this invention provides the API and op code for the acknowledged command, a client can discern the command being responded to. This prevents confusion in a multiple control board network, in which multiple control boards inside of an appliance all utilize the software architecture 10. Flow control and command acknowledgment are techniques which allow the client to send data as rapidly as possible without saturating the control. The benefits can be very responsive applications without introducing unnecessary latency or unexpected application failures.

The flow control benefits are achieved using publish Acknowledgement, API Id=1, Op Code 1. Each command is acknowledged with a publish Acknowledgment response. A new command is only allowed after receipt of a publish Acknowledgment value of READY or UNSUPPORTED. Publish Acknowledgment has the state machine for command flow control as shown in FIG. 8.

Figure 8:
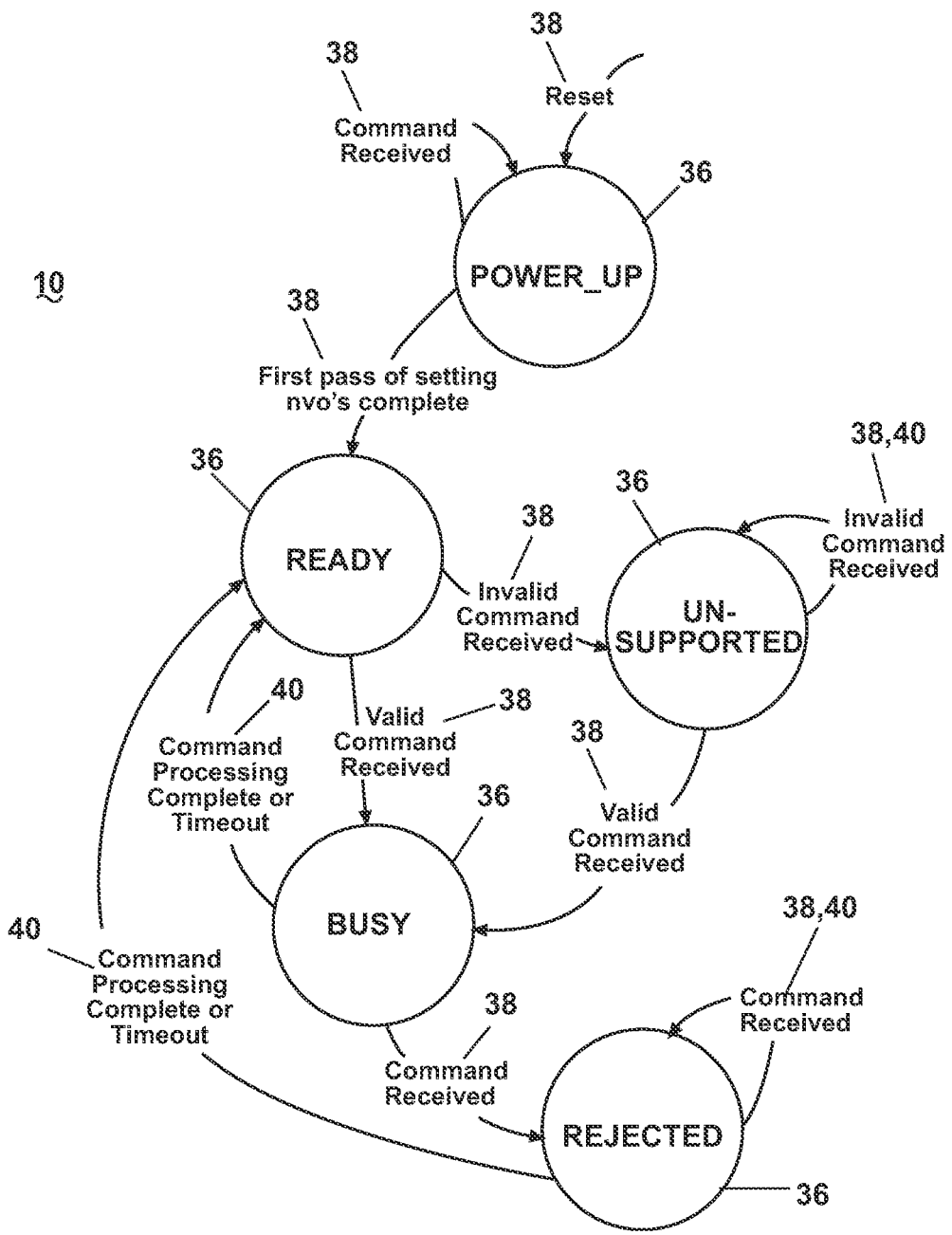
FIG. 8 is a schematic illustration showing the response of the controller SA to various information exchanges in the form of commands issued and received by other SA installations to validate or reject those commands based upon the state of the household appliance as well as the internal state of the controller SA.

FIG. 8 is a schematic illustration showing how the architecture 10 of FIG. 1 interacts with incoming commands according to the invention and validates or rejects those commands based upon the state of the household appliance. Various flow control status indicators are shown in FIG. 8 with reference numeral 36 as, e.g., POWER_UP, READY, BUSY, REJECTED, and UN_SUPPORTED based upon various commands 38 and issued responses 40.

Outbound Messages Events (Feedbacks). During each scan of the microcontroller, the DAQ 30 of software architecture 10 collects byte arrays representing the events that must be sent out on the bus (see PROCESS DAQ EVENTS state of FIG. 36. The DAQ 30 of software architecture 10 is configurable as shown in FIG. 5 and therefore it is possible that the client or clients could configure the software architecture 10 to transmit more data than is possible for the bandwidth of the communication bus (i.e., over configuration).

In order to prevent this, a configuration limit model can be employed which would limit the ability of clients 16 to configure the software architecture 10 to avoid this problem. In a buffering model, the software architecture 10 can be equipped with a transmit buffer. In a saturation message model, the software architecture 10 detects when there is too much data presented to the transport layer such that the data may not be sent to the client. In a require re-initiation model, event distribution is suspended and an event saturation message is send out and/or broadcasted. Eventing is resumed once a SendEvents (e.g., 255=ALL) message is received. In a no re-initiation model, a saturation message is sent out and/or broadcasted and then the software architecture 10 continues eventing.

In the transmit buffer model, the client has no responsibility and client implementation is simpler. However, buffering does not solve problem; it only delays or make problem less likely or less frequent and requires more RAM.

In the configuration limit model, this model would prevent problem so that a recovery process is not necessary, it is impossible to derive a configuration limit, and the limit is based on machine state transitions which are of a random nature relative to the software architecture 10.

In the saturation message model, the client can detect that the software architecture 10 was unable to submit new data to the internal communication network 14 on at least one scan. The client is unable to determine if data was missed and the saturation message does not necessarily mean there was failure—only the possibility of missed data.

In the no re-initiation model, the client has no responsibility, however, the client developer is not forced to implement saturation recovery process, the client developer can not be aware that events can be dropped due to over configuration of the software architecture 10. This type of failure is not catastrophic and therefore client applications may be oblivious to the loss of data.

In the require re-initiation model, the client developer must consider the saturation failure and its implication to the application, this prevents transient hard to find bugs, and the failure modes are catastrophic and/or obvious. However, the client must implement a saturation recovery process and there may be momentary latency during a required re-initiation process.

In a do nothing model, unnecessary work is avoided but an unforeseen situation may arise causing client developer to spend time troubleshooting something which can be diagnosed pro grammatically.

It has been determined that a saturation message that does not require re-initiation to be available via compiler directive is a preferred embodiment of this invention. The saturation message must be successfully transmitted before further events are put into the transport layer transmit buffer. The following messaging functions are supported as part of the software architecture 10 Debug API (API Id=4): get Saturated and Register for Saturation Message.

As shown in FIG. 4 packet structure 28, all packets of the software architecture 10 use a Cmd/Fb flag enabling the possibility of namespace conflict. Thus, it is possible to overlap op codes under the same API using the Cmd/Fb flag for discernment.

Power-Up Condition. If the software architecture 10 node experiences a transient loss of power or micro reset, it might be possible for the client to have an incorrect snapshot for the software architecture 10 modules variables. For robust operation, the software architecture 10 can notify its client that the previously exported variables can no longer be considered valid. When considering the transient condition, the configuration of the software architecture 10 could potentially be stored in non-volatile memory, which would allow for the automatic resumption of communication.

In a broadcast message model, the software architecture 10 can send a special broadcast message notifying all clients to 'dump their cache' upon power-up. It is understood that some applications of client 16 may not need to consider this failure mode and therefore would not make use of the special message. It is also known that the software architecture's software operating environment could experience a failure (resulting in a reset of its internal memory) and a recovery within the heartbeat period. With only the heartbeat as a means of detection, this fast recovery would obfuscate the probability that the client's 16 memory holding copies of certain values from the memory of the software operating environment of the software architecture would no longer correspond to the current values within the memory of the software operating environment. To address this failure scenario, a power-up message can be included in the software architecture 10. This message is independent of the heartbeat and would indicate to any client 16 that any previously held values of the memory of the software operating environment of the software architecture 10 would be most probably be invalid and that the client should, through the use of the sendEvent message of API 1 Op Code 7, re-acquire the current values. It is also understood that the client should suspend or modify any logic or calculations which operate on these memory values in an appropriate way until the current values are re-acquired.

In a loss of heartbeat model, the software architecture 10 can discontinue its heartbeat, allowing the client to determine the proper failure mode action. However, as described above, loss of heartbeat model does not cover all failure scenarios. This is especially true when using the automatic resumption model.

In an automatic resumption model, the software architecture 10 can automatically resume normal operation from the last known state after a power-up or reset. In the automatic resumption model, the client may misinterpret the information received as state transitions that did not occur. In other words, for some State A existing before a Reset or Power-up and some State B which is the initial power up State; without additional indication of a State I representing power-up or reset, the client may interpret a State A to State B transition as occurring without having passed through State I.

In a require re-initiation model, a client developer must consider the scenario of the preceding paragraph and its implication to the application. This can prevent transient, hard to find bugs, because the failure is catastrophic and as such easily identified and fixed. However, the client must implement transient recovery process and there can be a momentary latency during re-subscription/data re-acquisition process.

It has been determined that a loss of heartbeat model requiring re-subscription after a power-up/reset is a preferred embodiment of this invention. The advantage of a special broadcast message indicative of the state of initial conditions is also understood to be a useful indication when the resources within the software operating environment allow for such additional feature. Even though the heartbeat mechanism can be made to approximate the utility of a power-up message mechanism by making the heartbeat time out small, a preferred solution will include a power up message when resource constraints of the software operating system are not prohibitive. For this reason, the software architecture 10, supports as an optional feature, a power up message which is API Id=3, Op Code=2, publishSANode. Re-subscription can be required because the dynamic event triggers are stored in RAM and will be lost on a power up.

Preferably, the software architecture 10 module does not send any messages out until it has detected a client except the optional power up message publishSANode. A client is detected by the receipt of a valid command. Once the client is detected, a configurable heartbeat message begins broadcasting and the software architecture 10 is then ready for normal operation. Therefore, if the host microprocessor for the software architecture 10 experiences a power-up/RESET, the client will be notified by sensing the absence of the Heartbeat message (see API Id 1 Op Code=2) and optionally sensing the message, publishSANode (see API Id=3 and Op Code=2).

State Integrity

The DAQ 30 of FIG. 5 of the software architecture 10 provides several distinct advantages over a commercially available DAQ systems. The software architecture 10 can expose any variable in the microprocessor memory. In general this will also include the I/O signals of interest. Prior art DAQs cannot do that. The software architecture 10 is available to production machines via a single 3-wire plug, whereas prior art DAQs or emulators require more wiring or harnessing. Prior art DAQs are not practical in the context of a consumer field test. The software architecture 10 can be deployed on the production system. The software architecture 10 coupled with a modem can provide remote monitoring.

The most fundamental aspect, making the software architecture 10 different from prior art devices is that it runs as a blocking subroutine (SA_ProcessOutgoingEvents of FIG. 36 and FIG. 11) called synchronously from the main( ) function of the microprocessor. This insures that the client can have (within the limits of network bandwidth) a complete scan-by-scan snapshot of microprocessor memory exactly as the execution engine of the microprocessor scanned it. This opens up many interesting possibilities ranging from low-cost emulation and debugging to hybrid algorithm development using the software architecture 10 to enable PC-aided co-processing with the production electronics.

A comparison of asynchronous data collection and synchronous data collection methods will now be described. In asynchronous collection:

1. Let A and B be variables inside the appliance control memory.
2. Let C be a variable calculated in the client as the product of A and B.
3. Let A=23 and B=67.
4. Client polls for A: A=23.
5. A and B change. A=56, B=77.
6. Client polls for B: B=77.
7. Client calculates C: C=A*B=23*77 (this combination of A and B never occurred on the microprocessor).
8. Client presents invalid value for C to the consumer or end user of the application.

Most applications will work with asynchronous data collection. It is simple and straight forward. However, problems associated with asynchronous collection are extremely time-consuming to debug and identify.

In synchronous collection, the client defines or registers A and B with the software architecture 10. This allows the software architecture 10 to maintain coordinated values of A and B on every scan.

1. Client registers for A and B
2. Client requests a send all.
3. Current values for A and B are sent by the control to client.
4. A and B change. A=56, B=77
5. Control sends bounded event(s) containing A=56 and B=77
6. Client does not calculate C until the bounding or end delimiter bit is reached.
7. Client calculates C=56*77
8. Client presents correct value of C.

With synchronous data collection, the data collection is robust and virtually bulletproof. It enables applications which have not yet been conceptualized and allows for 'real time' debugging of production software w/o special coding on the production electronics. However, additional RAM is required on the control to maintain snapshots of client "care about" variable or property list.

It has been determined that the software architecture 10 preferably can support and promote the synchronous data collection technique. However, asynchronous memory polling is available in the Core API (API ID=1).

With the synchronous data collection technique being employed, the concept of bounded updates should be discussed. Bounded updates are events that are grouped together as a snapshot of the appliance state taken during the same scan of the host microprocessor's Main( ) loop execution. The appliance control main loop will allow for an iterative update of feedback variables that are registered with the DAQ API (e.g., every 25 ms). Each registered variable is monitored and only those that change value according to their memory monitor change operator are broadcast as updates to the client. When updates are in the process of being broadcast, no new updates are allowed in order to preserve the snapshot in time. A snapshot is communicated to the client using the MMP flag in Byte 2 of the software architecture 10 header as shown in the packet structure 28 in FIG. 4.

While the MMP of the packet structure 28 of FIG. 4 is true, more messages are pending for the snapshot. When MMP is false, the current message is the last message in the snapshot. Therefore, if the first message of a snapshot is the only message in that snapshot, MMP will be false.

The example in FIG. 9 illustrates a bounded command (Cycle+Temperature+MMP) with acknowledgements, followed by two consecutive bounded updates. Where bounded refers to elements of protocol which indicate to the receiver that more messages are coming from the source and that data processing by the application logic of the receiving component should be delayed until the bounding indicators of the protocol within the packet structure 28 (MMP bit 7) indicate a complete transaction at which time data processing by the application logic is permitted. The bounded command is shown by reference numeral 42 and the two consecutive bounded updates are shown by reference numbers 44 and 46, respectively. Notice that updates do not begin until bounded command execution is complete, providing the client the ability to filter away transient feedback data. Bounded commands are provided by the same mechanism, MMP found in the packet structure 28, as bounded updates in order to provide applications a greater level of control.

The example of FIG. 9 is conceptual. The actual mechanism is MMP found in the packet structure 28. However for illustrative purpose, the bounded command begins with an initial "begin" command initiator (MMP set) and includes commands to set a washer cycle to wash, a recipe status to ready, a water temperature to medium, again a recipe status to ready, and finally a cycle start indicator, followed by a command terminator (MMP unset). It can be noted that, in FIG. 9, updates (such as by eventing) are disabled to prevent updates from happening before the bounded command is complete. In addition, a "process command" indicator is shown periodically throughout the bounded command processing in the appliance 12 to illustrate the portions of the command issued from the client 16 through the internal communications network 14 are processed.

In the bounded updates 44, the updates are once again enabled (since they were disabled at the beginning of the bounded command 42) to allow the appliance 12 to report its status to the client 16. In the example shown in bounded updates 44, the acknowledgment state is shown to ready, the cycle is reported as wash, the state is reported as running, the basket is reported as fill, the pump is reported as on, and the temperature is reported as medium. Again, beginning and terminating indicators enclose the bounded update 44. These beginning and terminating indicators can be reported by use of the flag, MMP, in the application packet structure 28 as discussed in FIG. 4 or another method which would be apparent to one skilled in the art of network protocol.

In the bounded update 46, the basket is reported as agitate, the pump is reported as off and the motor is reported as on. Again, beginning and terminating indicators (MMP) enclose the bounded update 46.

API Strategy (Key Presses vs. Logical API)

In almost all cases, the appliance 12 is controlled by an integrated keypad. The embedded software handles the key presses or user events generated by the keypad and action is taken. In effect, the key press handling function(s) are the API for the appliances. In other embodiments, a second API can be developed for an external client 22.

In a key press model, to use the Key Press API, the external client 22 can create virtual key presses and transmit those over the network. The external client 22 can be designed with the knowledge of the integrated keypad so that these key presses can be generated correctly. This requires an external network interface card to generate key presses. In this model, no modification is needed for the underlying keypad programming. However, the client 22 must monitor the current keypad state in order to determine the key presses needed to achieve a desired state. The Client API must change if the design of the key pad changes rather than machine capabilities. This architecture breaks best practices of software development by interposing a presentation tier between a middle tier and the persistence tier. Extended commands can be included for energy management, service, diagnostic testing, and the like that are not available in the basic keypad interface. A logical API can be used while leveraging as much as possible the validation code associated with the key press handling routines without needing to duplicate code.

In a logical API model, by contrast, the logical API is developed from an abstraction of the machines capabilities rather than the design of the keypad. For example, Bake on a European oven using key presses might require that the client read the encoder position of the cycle dial and programmatically change the encoder to correspond to a Bake setting. If using a logical API, the client need only send the Op Code for set Cycle with the enumeration value for Bake: {0x01, 0x01} (setCycle(Bake)). In the logical API model, the client 16 need not be concerned with the keypad state, keypad design, or key press handling routines. The API remains independent of changes to the keypad design, allows for extended commands, and is an industry best practice.

It has been determined that the software architecture 10 will use a logical API which is integrated with the key press handling routines. The logical API exposes many of the extended commands, which enable various value-added applications. In the appliance control, when a key on the user interface is pressed or an external command is issued, it is directly mapped to a Logical API function call as a common entry point (e.g., when the WASH key is pressed or an external WASH network command is issued will both call the SetCycle(WASH) function in a washer with the software architecture 10 installed thereon). A Logical API function aims to describe a set of functionality in a parameterized manner so that it can be re-used. For example, non-logical specialized functions for temperature might be IncrementTemp( ) or DecrementTemp( ), which cannot easily be used to set the temp to any value. But a logical API function can be: SetTemperature(newTemp, or temp++, or temp−−). This last function can be used by both key presses and external commands.

A command handler for the software architecture 10 can comprise a method for the embedded software to response to either logic commands (e.g., setCycle(bake)) or key presses (e.g., pressing the "Bake" button on an oven appliance 12). The method translates incoming key presses and results in an invocation of the appropriate function within the logical API.

As much validation and state-based logic as possible exists inside this Logical API function so that external commands are treated the same and execute the same code as key presses. This API can be implemented without a major redesign of appliance control software. Only the Customer Interface Manager software must be reorganized and grouped to call API functions as the entry point for each key press command. This is not a requirement of the software architecture 10, however. It only serves to minimize the amount of code that must be written. If a collection of Logical API functions is not available to the external command engine, then validation and state logic found scattered in the appliance control must be duplicated for each external command, resulting in larger code size and increased possibility for error.

Identification: Multi-Node Issues

The discussion above on API Versioning and Discovery established a benefit for a mechanism to discover the APIs resident on any one node having the software architecture 10 installed thereon. Taken to the next step, there are additional considerations:

1. Multiple nodes
2. Multiple clients
3. Multiple installed nodes which implement the same API
4. A single node with multiple duplicate APIs
5. Multiple APIs using the same Op Codes
6. SAP Assignment
7. Client discovery of the nodes supporting the software architecture 10 protocol Multiple Nodes. It is probable that multiple components 16 on the network will implement the software architecture 10. Therefore, considerations should be made for networks with multiple components which implement the software architecture 10.

In a façade pattern model, the façade pattern is used to create simple access to a collection of objects. This is done by creating an interposing software layer between the client and the various target objects so that the client has a simple interface to a single object. This single source is then responsible to forward requests to the appropriate target object. In the façade pattern model, this model is easier to manage because the API is centrally defined. In most applications, the façade presents a simpler interface to the client. However, this model requires compile time design to include other nodes' APIs into the façade node. Additional RAM/ROM can be required for the façade to handle and forward requests to the target node. And, if two nodes are clients to one another, then the façade pattern would create unneeded processing, as the façade node would first make request through its own façade only to forward those to the target node.

In a distributed services model, this method uses discovery protocol as the means for the client to find the target objects. The client is responsible for the independent interaction with each target object. In other words, the client will discover the software architecture 10 node(s) and then will interrogate each as to what API(s) are supported by each node. In the distributed service model, this model scales well such that components can be plugged together at runtime. However, this model can require multiple documents to manage the network variable definitions (APIs).

It has been determined that the software architecture 10 will use the distributed service model for managing multiple enabled nodes on the network 14. The façade approach can be undesirable because changes to the target object API require changes to the façade (change, compile, download, test). Whereas in a single compile time environment supported by good re-factoring tools, façade could be a good choice. In a distributed environment, the more flexible distributed service model will allow for faster development and flexible configurations. However, in some cases there may not be enough resources on each microprocessor in the system to support the software architecture 10. In other cases, there may be legacy protocol and there is no desire to make modifications to a legacy board. In these cases, façade can be a good alternative to the distributed service model.

Multiple Clients. As shown in FIG. 1, multiple nodes or clients 16 on the network 14 will implement the software architecture 10. Therefore, considerations should be made for networks with multiple occurrences of 10. One major consideration is that of event registration and notification. If multiple clients register with the software architecture 10 for events, the software architecture 10 should be able to manage the event distribution.

Using a node ID directed message eventing model, the software architecture 10 will store the node ID(s) of each event requestor such that when that event is triggered, a directed message will be sent to the requesting node(s). In this model, messages are only sent to nodes that care about the event. However, this model requires one byte per message to store the node ID and requires more RAM to create additional memory structures for each requesting node.

In a node ID directed message eventing with API ID Identifier, using this approach, the software architecture 10 stores the node ID(s) of each event requestor such that when that event is triggered, a directed message is sent to the requesting node(s). In addition, the API ID of the host node is included in the event. This model allows the client transport layer to better route messages internally. However, this model also requires one byte per message to store the API ID and requires more RAM to create additional memory structures for each requesting node.

In a broadcast message eventing model, using this approach, the software architecture 10 does not track the node ID of the event requester. When the event is triggered, the software architecture 10 sends a broadcast message. In this model, the software architecture 10 implementation is simpler and smaller; there is no need to spend one byte per message to store the Node ID. However, broadcasting can create unnecessary event processing by other nodes.

A forth, hybrid approach, which is the preferred approach, comprises a model where broadcast messages are used which eliminates the need to store node Id. However, the client will include API Id and Op Code in the Event Creation Messages of the DAQ (API Id 2, Op Codes 1,2,12, & 13) such that they are dynamically assigned (as discussed in the paragraph below). Using this approach, the resultant event message will contain the assigned API Id and Op Code (as shown in the publishEvent message of API Id=1) In this message (publishEvent), the API Id and Op Codes of Bytes 1 and 2 of 28 in FIG. 4, are those assigned by the client 16 using the event creation messages (cited above).

It has been determined that the software architecture 10 described herein will use the broadcast messaging model which includes the API ID and Op Code. This will provide the benefit of routing by trading API ID storage for node ID storage. Given the discussion on SAP below, the risk of broadcast messaging is much lessened. Although some amount of processing will be used by the nodes to discard irrelevant messages, it is superior to directed messages which could eventually cause saturation of the network and of the software architecture 10 code. Including the API ID allows the client to configure the control with dynamic APIs which will encourage better, modular designs in the future.

Using the Same API on Multiple Nodes. It is probable that some optional network component will implement the same API as does the UI or Appliance Manager board (i.e. service/diagnostic or energy). This will allow the optional network component 16 to manifest itself to an external client 22. Thus, the software architecture 10 can permit the client 16, 22 to interact with two physical nodes—each implementing the same API. This design consideration is at the intersection of several others, and likewise, its resolution is a combination of pre-existing design solutions.

Optional nodes are possible through dynamic membership. The client will be able to find out which nodes support the packet structure 28 through the discovery API (see FIG. 6). Each node may be interrogated to find out what APIs are supported through discovery as well. Op codes are not globally unique, but the internal communication network 14 node id coupled with the API ID and the Op Code are unique. The API ID is embedded into each event.

To summarize, the client may first discover the software architecture 10 nodes and then discover the support APIs of each. The client may then initiate an interaction with each API of each node. As each packet includes both the node ID and the API ID, both client and target will be able to avoid namespace conflicts and route messages to the appropriate application space.

Multiple Instances of APIs on the same Network Node. There are appliance 12 designs, which lend themselves to API re-use on the same microprocessor. Examples would include a double oven (i.e., two separately-controlled baking chambers) or a two-compartment refrigerated drawer. In other words, in some cases there are multiple cavities that perform the same function and can therefore be controlled via the same API. The design approach for this case is discussed.

In a unique function name model, the designer will create an API ID that has unique Op Codes for each command or variable without concern for re-using the definition. In other words, Op Code 10=lower oven set temp and Op Code 11=upper oven set temp. In this unique function names model, there is less messaging during discovery. However, this model does not promote modular design and code reuse.

In a multiple API ID model, the designer uses the same Op Code definition, but will designate a unique API ID for each instance of the API. In other words, upper oven API Id=1, lower oven API Id=2. In this model, there is less messaging during discovery and this model promotes modular design and reuse. However, this model will result in consuming the available API IDs at a faster rate.

In an instance ID model, the software architecture 10 dynamically assigns the API ID to each instance of the API except for the first instance. The first instance of the API will be identified by a global API ID repository. To enable this, the software architecture 10 specifies API IDs (e.g. 246-255) as reserved APIs for dynamic assignment to API instances. This model promotes modular design and code reuse, and does not consume API IDs. However, there is more messaging during discovery.

The software architecture 10 is an object oriented protocol designed to allow objects to discover and collaborate with each other in a robust manner. Basic to these requirements are: (1) collaboration entities must be uniquely addressable so that messages can be appropriately routed on the network and (2) collaboration entities must be uniquely identifiable so their messaging contracts, rules for interaction, and compatibility concerns may be understood. In a single runtime environment, the compiler is capable to enforce item (2). In a networked or distributed environment, embedded compilers do not generally address item (2).

Collaboration entity (object or API) addressing uniqueness is governed by the combination of a 3-bit node ID (found in the address field of the protocol packet structure 24 in FIG. 4) and an 8-bit API or Instance ID (found in byte 1 of packet structure 28 in FIG. 4). Any network message containing these two pieces of information can be correctly routed. This provides for 255 unique collaboration entities (or objects) for each network node.

Entity identification is defined by an 8-bit API ID (a class identifier), a 2-byte type ID (sub-class or specialization), and a 2-byte version ID, where the type ID is representative of intent and the version ID is representative of compatibility This two-tiered approach recognizes uniqueness of addressing separately from uniqueness of identification. This separation provides for a more efficient use of bandwidth by removing four bytes of identification information from each packet. In turn the client must cache the identification information and index it by the eleven total bits of address.

It has been determined that the Instance ID model is a preferred embodiment of this invention. The Discovery API (API ID=3) has support for the Instance ID in messages, Publish API Info, Get Instance Info, and Publish Instance Info. Instancing is a very powerful concept, which can be exemplified by its use in the protocol.

API-Op Code Namespace. Messages on a serial network generally have a ASCII or numeric identifier which allow the receiver of the message to route the data contained in the message to the appropriate internal function. This function will then operate on the remaining data in the payload.

The remaining data in the payload is defined at design time in a document. This document describes the meaning of each bit and/or byte in the payload. From this, internal software message handlers are developed specifically for each payload definition. Therefore there is, in general, one message handler for each unique Op Code and Cmd/Fb pair.

Normally, if there were multiple independent payload definitions that shared the same Op Code without any additional identification mechanism, it would be impossible for the receiver to route that message to the appropriate message handler. However, this invention provides the Cmd/Fb flag to support the overlap of Op Codes using, the flag for differentiation. Thus, this invention provides the functionality to overlap a command and its corresponding feedback message using the same Op Code.

This section discusses techniques that can be employed to provide unique identification to message payload definitions.

In a globally-unique Op Code model, using this approach, Op Codes must be globally unique. In other words, each platform or API developer must be allocated an Op Code range (e.g., 350-385) which must not overlap with the Op Code range of any other project. This model is inefficient due to range allocations which require spare IDs. Further, API developers will not have control over their Op Code numbering scheme and this model requires an order of magnitude more coordinated decisions (information handoff).

In a globally-unique API ID model, using this approach, Op Codes are grouped into logical collections forming an API. The API will be assigned a globally unique ID composed of API Id, Type, and Version. Therefore, thy Op Codes therein need only be unique within the API. In this model, there is no need for allocated spare IDs, API developers can start at Op Code=1, and this model requires less information coordination to avoid namespace conflicts.

It has been found that this invention employs the globally-unique API ID strategy as a preferred embodiment. Certain fixed Op Codes, which are part of the software architecture 10 Core API, revert to the common starting number (1) and the Core API can preferably be assigned an API Id of (1).

SAP Assignment. SAP found in the protocol packet structure 24 identifies the structure of the payload portion or SDU 26. It is the same concept as an API ID, which was introduced earlier herein. The advantages of SAP are also the same, in that incoming messages need to be identified and routed to the correct internal handlers or quickly discarded. In the example WIDE network 14 discussed herein, there are sixteen available SAPs. The software architecture 10 fits the criteria for SAP membership. In this scenario, the internal communication network 14 administrator can approve the software architecture 10 application protocol and assign the software architecture 10 an official SAP. Other network identifiers for the protocol packet structure 24 are contemplated without departing from the scope of this invention. For example, the software architecture 10 can be assigned a default SAP of 1 on the internal network 14.

A SAP (or other sub-protocol identifier) allows the internal communication network 14 node to participate in the software architecture 10 and non-architecture messaging. The software architecture 10 SAP fits into global architecture, and adds more scope to the software architecture 10. The internal communication network 14 SAP is a sound concept from both a technical and practical perspective. Securing a network 14 specific ID provides the software architecture 10 with global visibility and official acceptance which can help to proliferate its use and propel it to a global standard.

The software architecture 10 Discovery FIG. 5. In the previous section, it was established that the software architecture 10's API ID is analogous to the internal communication network 14's SAP. Likewise, in previous sections, it is established that it is advantageous for the client 16 to discover by interrogation the API(s), which reside on each physical node of the software architecture 10.

A similar question and/or solution can be presented for the software architecture 10 discovery. If a service tool wanted to dynamically discover all of the software architecture 10 API(s), it would first need to discover the node IDs of the internal communication network 14 node(s), which supported the software architecture 10 protocol. This can be accomplished by a broadcast message model that sends a broadcast command that the nodes will respond to. In this model, the software architecture 10 can broadcast a new API which is added to the software architecture 10 or can broadcast the addition of new network 14 node(s) that implements the software architecture 10. The Discovery API of FIG. 6 can serve as the mechanism for the software architecture 10 discovery. There can be both a polling discovery message and an unsolicited broadcast message available as is discussed with respect to the Discovery API (API ID=3).

Multi-Payload Message Integrity

The frag flag, which can comprises bit 6 of byte 2 in the software architecture 10 header, enables the software architecture 10 to send payloads greater than that of the underlying protocol (i.e. that of the internal communication network 14). When the frag flag is set, the receiver should realize that the current message will be fragmented into multiple packets or fragments.

In the message-fragment id model, the first fragment of a fragmented message uses the standard packet structure as described in FIG. 4. This initial fragment provides the message's API, Op Code, and Cmd/Fb flag. All subsequent fragments of the message will preferably assume the fragmented message structure described in FIG. 24. In this structure, the frag flag still exists (along with the MMP flag) to reinforce the data. However, byte 2 now contains the more fragments pending flag (MFP) in bit 5, message ID (MID) in bits 3-4, and fragment ID (FID) in bits 0-2.

The MFP flag informs the receiver that at least one more fragment of the current message should be expected. The transition of MFP from 1 to 0 informs the receiver that the current packet is the final packet of the current message. MID provides an 2-bit identifier for each message. Thus, each fragmented message (group of fragments) will be assigned a MID, and this MID will then increment for each subsequent fragmented message (group of fragments). The MID will increment to 3 and then rollover back to 0. FID provides a 3-bit identifier for each fragment within a message. Thus, for a particular message, the first fragment will always be assigned and FID of 0. For each subsequent fragment of that message, the FID will be incremented. The FID will increment to 7 and then rollover back to 0.

The fragmentation protocol provided by this invention allows the receiver to check the integrity of a fragmented message. By monitoring the frag and MFP flag, the receiver can ensure no erroneous halts to a fragmented message. By checking that the MID does not change within reception of a single fragmented message, the receiver can ensure that two separate fragmented messages do not become merged (perhaps due to a lost fragment). By checking that the FID correcting increments per fragment, the receiver can ensure that not fragment is lost within a message (or received out of order). See FIG. 25 for an example of the message-fragment id model.

In a summary CRC model, this solution makes use of a well-known existing cyclic redundancy checksum (CRC) concept. An additional two-byte CRC can be appended to the last payload of a multi-payload message. The CRC is the CRC representation of all payload bytes concatenated into a single combined payload. The sender generates this CRC. The receiver validates this CRC according to well-known methods. In this summary CRC model, this solution re-uses existing CRC algorithms which are established and well known, however, the CRC algorithm is more complex than frame counter and the CRC may not be easily portable to a third party vendor.

Therefore, it has been determined that the message-fragment id model is a preferred embodiment for confirming multi-payload message integrity in the software architecture 10 according to the invention. The message-fragment id model is easier to implement for third parties and is easier to add to the existing architecture 10.

Software Organization

Figure 10:
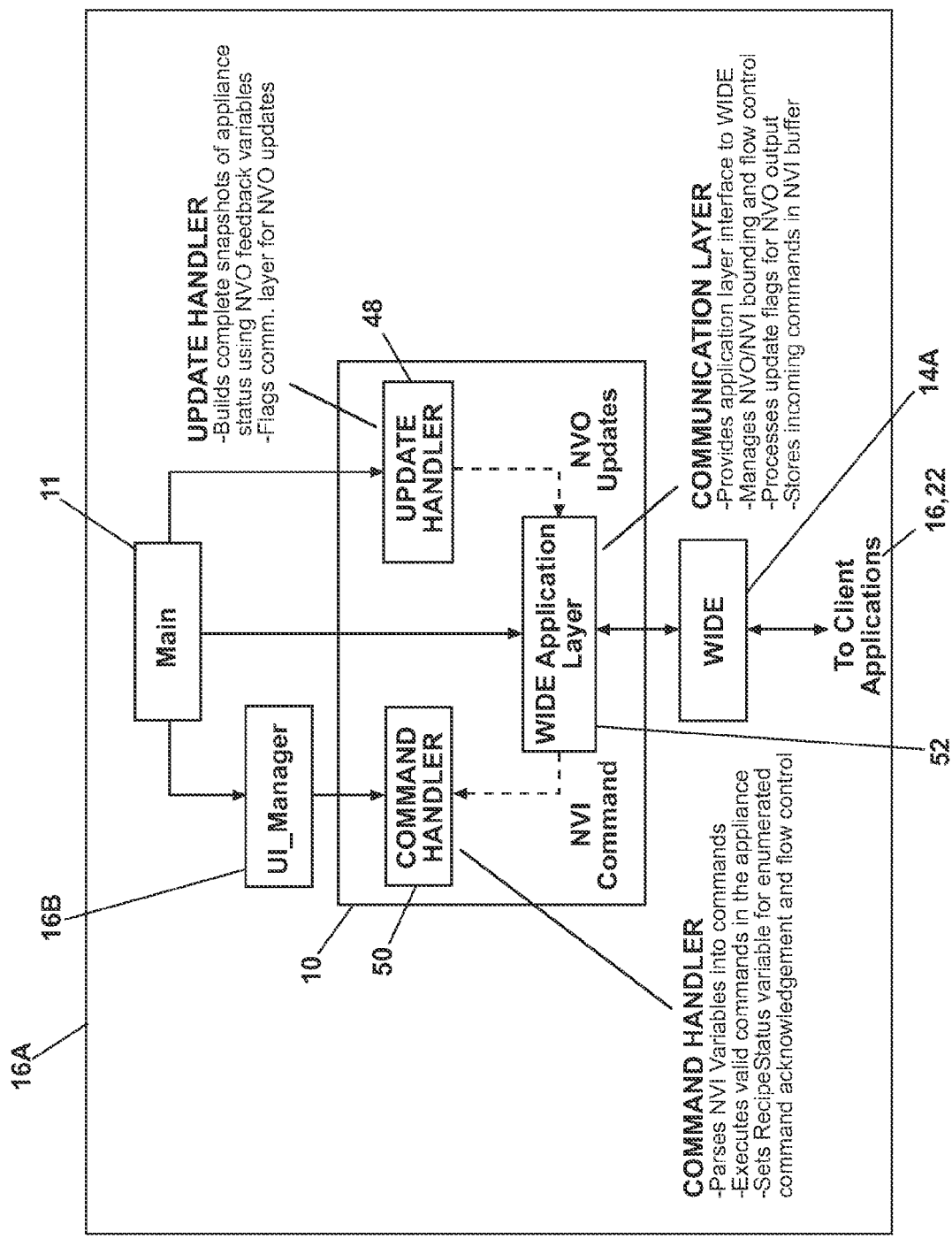
FIG. 10 is a schematic illustration showing the SA in relation to the overall software environment of a component, where the software environment comprises various software operating layers, with the software architecture comprising a command handler, an update handler and an internal communications network layer interface for interconnecting the SA to the internal communications network of the household appliance.

With respect to the software architecture 10, the code organization and implementation files will now be discussed with respect to FIG. 10. FIG. 10 is a schematic illustration showing the software architecture 10 of FIG. 1 according to the invention in relation to the software operating environment 16A of a component 16 containing various software components 16B wherein the software architecture 10 comprises a command handler 50, an update handler 48 and an internal communications network layer interface 52 for interconnecting the software architecture 10 to the internal communications network software operating layer 14A, which creates and sends data over the communications network 14 of the household appliance 12. Also shown is an example of how other software components 16B within the software operating environment 16A would invoke on and interact with the components of the software architecture 10 (50, 52, and 48).

In order to create a more generic implementation of the software operating environment 16A, dependency upon the UI Manager, which is one of several software components 16B within the software operating environment 16A, can be eliminated. In this implementation, a main controller software component 16B executes the invocation onto the command handler 50. It was previously believed that the previous implementation afforded more accurate and robust performance of the software architecture 10 due to the particular timing details associated with the execution timing associated with the UI Manager software component 16B.

To define the first level of detail for the software architecture 10, three main software components 16B (sub-components) are shown: the update handler 48, the command handler 50, and the internal communications network layer interface 52. The update handler 48 interacts with the DAQ engine 30 in order to identify information flagged for updates within the operation of the DAQ such that the internal communications network layer interface 52 can process said information resulting in interaction with internal communications network software operating layer 14A resulting in a packet structure 24 transmitted onto network 14. The command handler 50 validates and processes incoming commands from the internal communications network layer interface 52 invoking onto the appropriate software operating function according to the Identifiers API Id and Op Code values of packet structure 28. The internal communications network layer interface 52 is meant to decouple (as much as practicable) the particulars of the software architecture 10 from the internal communications network software operating layer 14A, the network 14 of FIG. 1, and the packet structure 24 of FIG. 4. The internal communications network layer interface 52 interfaces with the internal communications network software operating layer 14A, which creates and sends data according to the definition of FIG. 4 over the communications network 14 of the household appliance 12.

Software operating layer sub-components 48, 50 and 52 of the software architecture 10 shown in FIG. 1 work together to manage communications with other components 16 or clients 22 which also have the software architecture 10 or an alternative capable to interact with packet structure 24.

Figure 34:
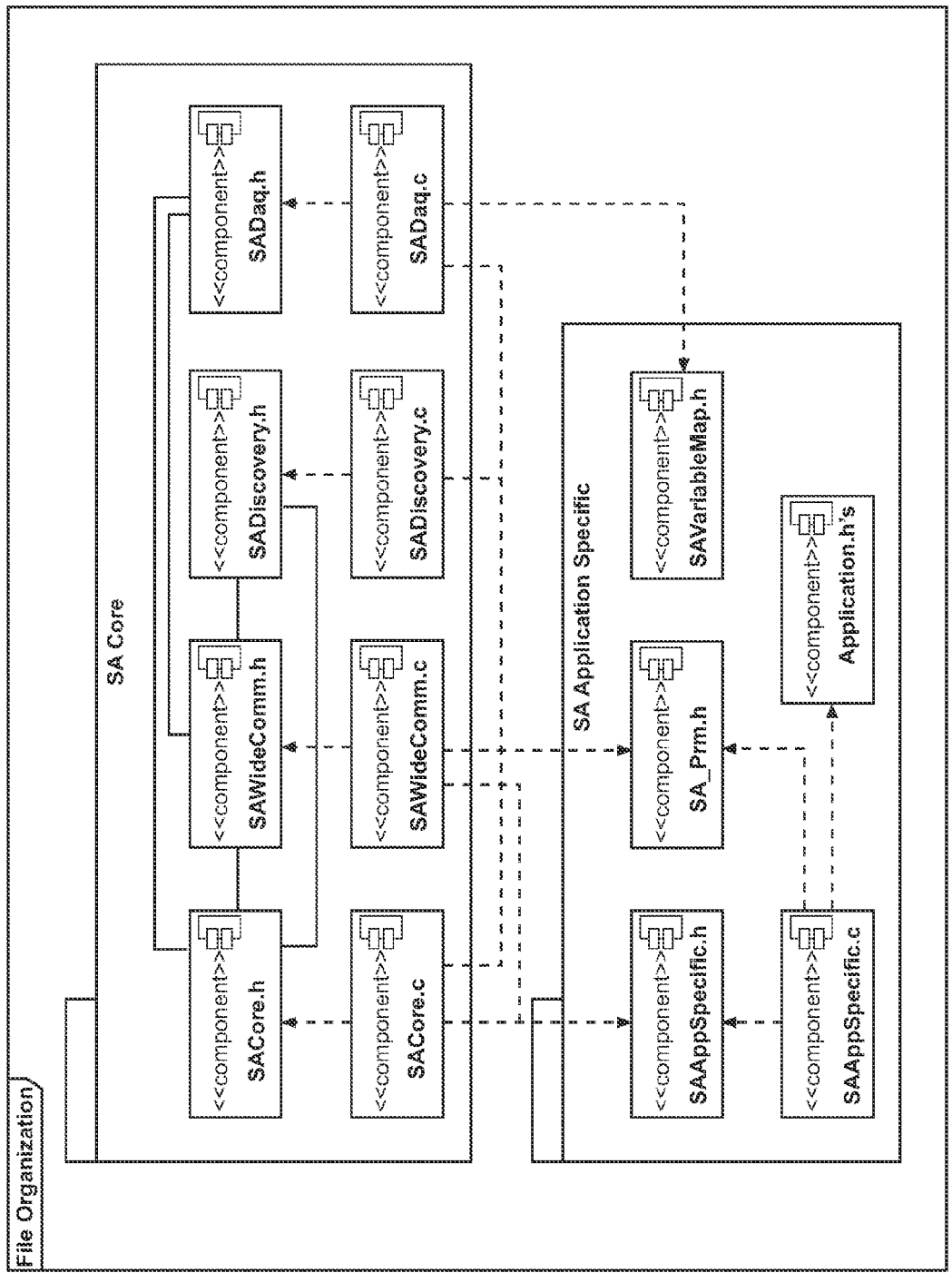
FIG. 34 shows the preferred organization of source code files of the SA.

FIG. 34 shows several implementation files which are contemplated for use with this invention.

SA_prm.h. The software architecture 10 includes configurable parameters and command enumerations.

SACore.c/.h. This file for the software architecture 10 core software contains the update handler 48 and command handler 50 which processes commands, manages flow control feedback, and takes snapshots of appliance data for dynamic updates.

SAAppSpecific.c/.h. This file for the software architecture 10 core software contains appliance-specific command handlers and command implementations for driving a particular type of appliance 12 (such as a file specifically directed for management and communication with a washing machine, for example). Any command that is not generic to all appliances 12 is implemented in this function. These commands are enumerated in SA_prm.h and are called by the command handler.

SAWideComm.c/.h. This file contains the internal communication network 14 application layer 52 which provides the interface to the internal communication network 14 protocol and controls bounding of messages into snapshots, parsing incoming commands, and processing update flags to send out update messages.

SADaq.c/.h. These files contain all functionality for the DAQ engine 30. Thus, all functionality concerning the update handler 48 and eventing is contained here.

SADiscovery.c/.h. These files contain all functionality for a node implementing the software architecture 10 to discover other nodes (and the corresponding functionality of) other nodes which implement the software architecture 10.

SAVariableMap.h. This file contains the embedded variable map which allows for event creation by an external client without knowledge of a variables address in memory.

FIG. 11 illustrates an example interface of the software architecture 10 with an appliance control where the software architecture 10 of FIG. 1 is thrice invoked from the supervisory scheduler (MAIN) according to the invention. Also shown is MAIN's invocation onto WIDE.WideExec( ). WIDE.WideExec( ) subsequently calls back onto the software architecture 10 according to FIG. 33 where the component of the software architecture 10, WideCommHandler, exposes functions. SA_AcceptData( ) and SA_BuildData( ). Also shown is MAIN's invocation onto SA_WideComm( ) (also a function exposed by a component of the software architecture 10) which ultimately results in the invocation shown in FIG. 33 onto the function WIDE.QueueMsg( ) of the component WIDE of the software operating environment 16A.

Figure 13:
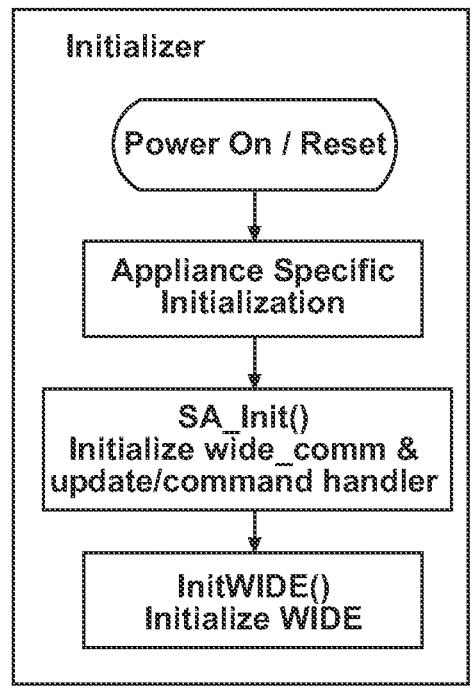
FIG. 13 is a schematic illustration of the example implementation of the software architecture shown in FIG. 11 including an appliance initialization section.

FIG. 13 is a schematic illustration of the example implementation of the software architecture shown in FIG. 11 including an appliance initialization section. The initialization function calls SA_Init( ) from an initialization routine before entering the main execution loop shown in FIG. 11.

The table following this paragraph illustrates a documentation example of how APIs will be managed, including the mechanism of Compiler Directives to control the deployment of the functionality exposed through the APIs of the software architecture 10.

| API Name | API ID | Type | Version | Compiler Directive | ROM Use | RAM Use | Notes |
|---|---|---|---|---|---|---|---|
| CORE | 1 | 1 | 2 | SA_COR | 1810 | 43 | Based on 30 dynamic events registered |
| Data Acquisition (DAQ) | 2 | 1 | 2 | SA_DAQ | 1658 | 373 | Based on 30 dynamic events registered (10 bytes RAM/event) |
| Data Acquisition Extended (includes SA_DAQ) | 2 | 2 | 1 | SA_DAQ_EXT | SA_DAQ + 1064 | DAQ | Based on 30 dynamic events registered (includes SA_DAQ) |
| Discovery | 3 | 1 | 1 | SA_DISC | 516 | 3 | |
| Debug | 4 | 1 | 1 | SA_DEBG | | | |
| Low Level | 5 | 1 | 1 | SA_LOLV | | | |
| Key Press | 6 | 1 | 1 | SA_KEPR | | | |
| Memory - Port API | 7 | 1 | 1 | SA_PORT | 342 | 0 | |
| Energy Management | 8 | 1 | 1 | SA_ENGY | | | |
| GMCL | 9 | 1 | 1 | SA_GMCL | | | |
| Poll Variables | 10 | 1 | 1 | SA_POLL | | | |
| Service and Diagnostics | 11 | 1 | 1 | SA_DIAG | | | |
| Unused (140-240) | | | | | | | |
| Non-Standard (241-245) | | | | | | | |
| Reserved for API Instance Id (246-255) | | | | | | | |

In the above table, API Ids in the 241-254 range can be used without consideration for standards. They are intended to allow a designer the flexibility to use the software architecture 10 in an application where the expectation of re-use is minimal. In such cases, this will eliminate the need to develop a specific API Id and Type for a collection of messages which are expected to be a 'one off'. These Ids can also be used for candidate standard APIs which have not yet received their official ID. Additionally, in the above table, the RAM and ROM estimates are taken using Motorola HC08 Cosmic Compiler version 4.3f with the software architecture 10 configured to have 30 dynamic events allowed (i.e., heap size=300 bytes), 7 APIs defined, and a maximum command size of 15 bytes.

Figure 14:
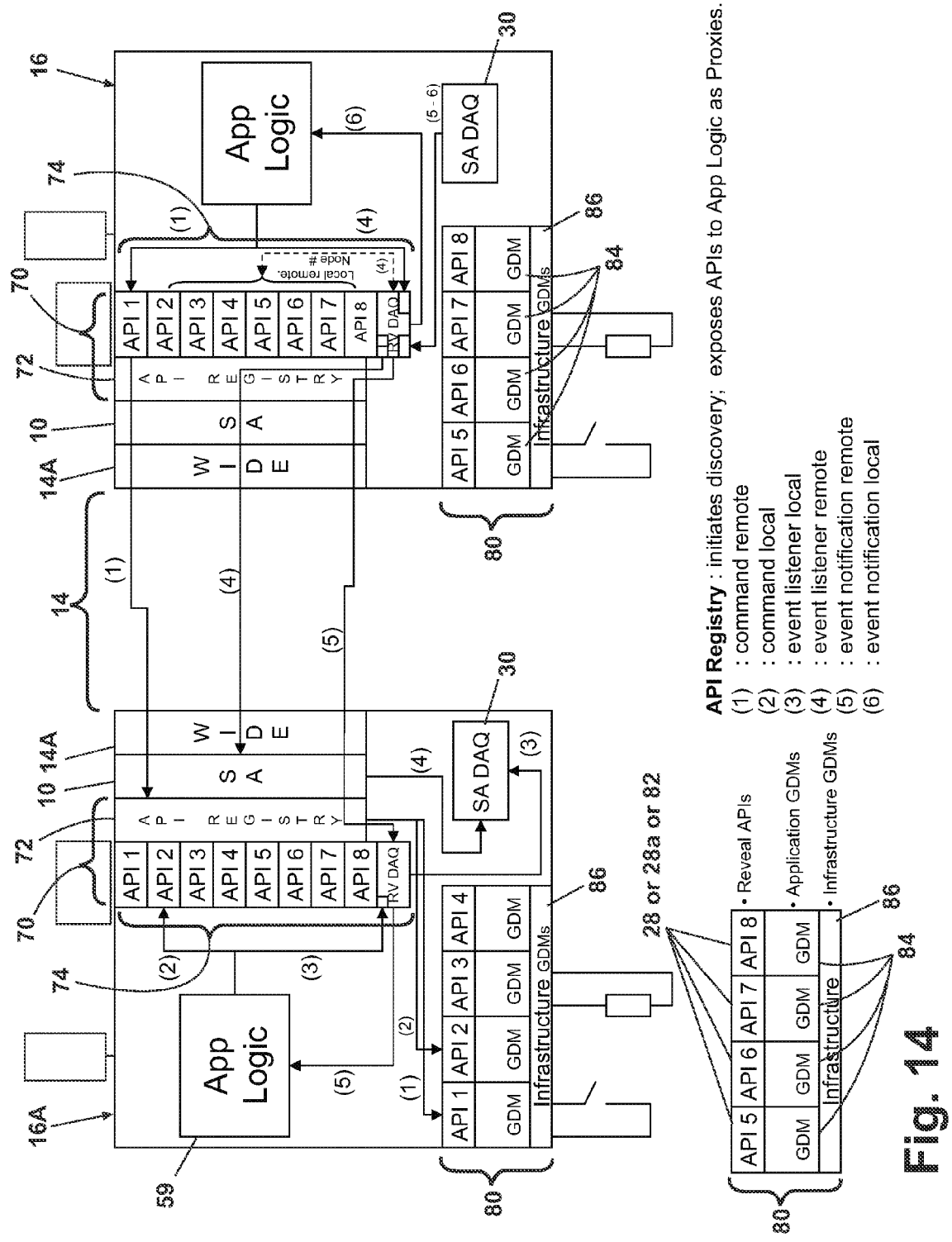
FIG. 14 is a schematic illustration of a pair of software operating environments, each corresponding to a different component with its own SA, and connected by the internal communications network.

FIG. 14 is a schematic illustration of a virtual router incorporating the software architecture of FIG. 1 according to the invention showing a mapping between a pair of software architecture implementations. The virtual router of FIG. 14 is a software design which encapsulates the API implementations (objects, see APIs 1-8 in each side of the router of FIG. 14) of the software architecture 10 such that the collaboration between an embedded client (application logic, algorithms, closed loops, sequencers, and state machines) and embedded components (the software architecture 10 API implementation: objects like defrosters, heaters, temp sensors, valves, etc.) is uniform and identical regardless if the entities collaborate over the network or share a runtime environment.

FIG. 14 shows six unique collaboration examples labeled as such illustrative of how a pair of software operating environments 16A existing on separate hardware components 16 and connected by a network 14 will use the various software components 16B of the software operating environment 16A to create transparent access between the operating logic of application logic 59, which is part of each software operating environment 16A of each component 16, and the software components 16B of both the right hand and the left hand software operating environments.

Prior to describing the collaboration examples, a description of the structure of FIG. 14 should aid in the understanding of the collaboration examples. Each software operating environment 16A contains representations of a sub-set of useful software operating components 16B, including the software architecture 10, internal communications network layer interface 52, a sub-component of the software architecture 10, the DAQ 30, and a hardware abstraction layer 80.

The hardware abstraction layer 80 comprises a mechanism to encapsulate the particular fixed address of the connected electrical circuits on which the software operating layers of the hardware abstraction layer 80 will operate. The hardware abstraction layer 80 uses software interfaces (28, 28A, or 82) to encapsulate occurrences of 16B in the form of one of the following: the packetized representation (an ordered collection of bytes) of a message in the form of application packet structure 28 exchanged by the software architecture 10, the packetized representation (an ordered collection of bytes) of a message exchanged by the software architecture 10 representing only the packet structure 28A (the valid data arguments) expected by the software operating component 84 or 86, or an alternate representation 82 of either application packet structure 28 or packet structure 28A where the intent and data values and resultant actions are functionally identical but not of the form of an ordered collection of bytes. The alternate representation 82 is in the form of a unique software function having arguments represented by individual named variables whose value are derived from 28A or represented by an ordered collection of bytes derived from 28A.

Application GDMs 84 are variants of software components 16B known as global design modules which are standard software operating components having been subjected to a standard development process including functional and nonfunctional requirements, testing, documentation, and implementation guidelines. Application GDMs 84 address appliance specific concerns such as defrosters, heaters, door closure. Application GDMs 84 can be classified in at least two variants. The first variant contains specific application logic apart from the application logic 59 used to govern the behavior and gather information from a collection of other software operating components including a plurality of other GDMs 84, 86. The second variant contains specific application logic apart from the application logic 59 used to govern the behavior and gather information from a specific electro-mechanical device or sensor such as a heater, evaporator, motor, valve, solenoid, relay, pressure or temperature sensor. The second variant can be configured to address specific concerns made relevant by the specific manufacture's variant of the device, by the particular configuration of the device based on the usage mode determined by the application requirements (i.e. scaling values), or by a confluence of factors which create specific concerns not mentioned heretofore.

Infrastructure GDMs 86 address specific recurring concerns which are independent of the application of the system architecture of FIG. 1. They can be re-used across a plurality of appliances such as refrigerators, cooktops, dishwasher, dryers, clothes washers, etc. Infrastructure GDMs 86 can be classified in at least two variants. The first variant is associated with a particular concern resulting from a recurring combination of electrical components or electrical constraints. Some examples are: manufacture interface constraints, device duty cycles, electrical load characteristics examples of which are inrush and steady state current limits, or other constraint such as the mode of analog conversion to digital examples of which are 4-20 mA current loops vs. 0-5Vdc analog voltage feedbacks. The second variant is associated with appliance and application independent software components known as utility functions. They provide logic used by other 16B components including application logic 59 and hardware abstraction layer 80. The second variant may contain or use references to the first variant of the infrastructure GDM 86. Examples include timers, zero cross detection, and other useful software components whose purpose is more utilitarian than driven by application or electro-mechanical requirements.

An embedded virtual router 70 provides an encapsulating layer by which architectural dependencies (the method by which one software component 16B is accessed by or exposed to another 16B [examples of 16B are 30, 84, 86] within or between at least two software operating environments connected by the network 14 alone or a combination of network 14 and other networks) between the application logic 59 (of the software operating environment 16A of the component 16) and the components comprised by the hardware abstraction layer 80, DAQ 30, another instance of application logic 59 or component therein, or any other useful component 16B are minimized or eliminated.

A software component 72 used by other software components 16B to obtain references to any other software components 16B where the referenced software component 16B may be part of a software operating environment 16A existing in or on: the same hardware component 16, a different hardware component 16 connected by the network 14, an external client 22 connected by a combination of network segments including the network 14, or a different hardware component 16 of a different appliance 12 connected by the network 14 or a combination of different network segments between the two appliances 12 and the network 14 of the first appliance 12.

The software component 72 also provides the mechanisms for other software components 16B residing within the same software operating environment 16A to publish the necessary identification and/or routing information into the memory of 72 such to enable the aforementioned enumerated uses of 72. The identification and routing information may be associated with components residing within the same software operating environment 16A or the identification and routing information may be associated with components apart from the components residing within the same software operating environment, but are known by components residing within the same software operating environment.

Structures 74 in the memory of 70 are able to receive messages or provide functions for invocation of messages and are able to send messages or provide callback functions for the distribution of information. These structures having an access definition of 28, 28A, or 82 corresponding to an occurrence of a software component 16B, such as components within 80, 59, or any other useful software component located in the aforementioned enumerations of 72, and the capability to route the information to that software component 16B or to an appropriate intermediate software component 16B having the same or similar purpose of 74.

Looking now at the possible collaboration examples, it is expected that the structures 74 of 70 will be created and populated based on discovery queries containing requests for access to specific software components 16B which are both identifiable and routable, invocations implying said access, or by software components 16B which are able to invoke on 70 on behalf of themselves or other components 16B resulting in creation and population of structures 74.

Collaboration 1: a command is issued by software component 59 of the right-hand software operating environment 16A and received by a software component contained in the collection of 74 with an identifier of API 1 within component 70 of the same software operating environment. Using the identification and routing information contained within 70, the component identified by API 1 transmits the received information through the other local software operating layers 10 and 52, and finally transmitted over 14 and received by 52 of left hand software operating environment. The message is then handled by 10 and routed to the appropriate component within 74 of the left hand software operating environment. The appropriate 74 of the left hand software operating component using identification and routing information contained within 70 of the same software operating component then invokes on or sends the message to the local implementation of API 1 contained in the left hand software operating environments hardware abstraction layer 80. Thus the application logic 59 within software component 16B of the right hand software operating environment invoked a function implemented in the software operating environment of the left hand side without information contained therein for the realization of said invocation. Therefore, the value of the design implied by FIG. 14 is that application logic 59 is re-useable with respect to the location of the of the other software operating components 16B within a plurality of software operating environments 16A connected by a network 14 or a plurality of network segments which may include 14.

Collaboration 2: In this case, the initiation of the message is from 59 of the left hand software operating environment 16A. Illustrated is the case where the final invocation is on a software component (in this case API 2) within the same software operating environment using the same methodology described in greater detail in Collaboration 1. Therefore, in Collaboration 2, an alternative architectural disposition between an occurrence of Application logic 59 to some other useful software component (API 2 of Hardware abstraction Layer 80) is shown to have no effect on the implementation of either. And furthermore, it is the purpose of software component 70, also being able to comply with the Identification and interface requirements imposed by the software architecture 10, to provide this capability.

Collaborations 3-6 show additional uses for the Embedded Virtual Router 70. The mechanisms used to accomplish these variants are the same as described in Collaborations 1 and 2. They are included to illustrate the usefulness of the design and the expected additional message patterns to be available with respect to the DAQ 30. Local event listeners (3) and remote event listeners (4) of Application Logic 59 are provided with an interconnection to a representation of the DAQ engine 30 providing not only a connection to the DAQ in the local software operating environment, but also to the DAQ(s) which reside in remote operating environments. DAQ generated messages based on the occurrence of DAQ events can be transmitted locally (6) and remotely (5) through mechanisms available in 70.

Figure 14A:
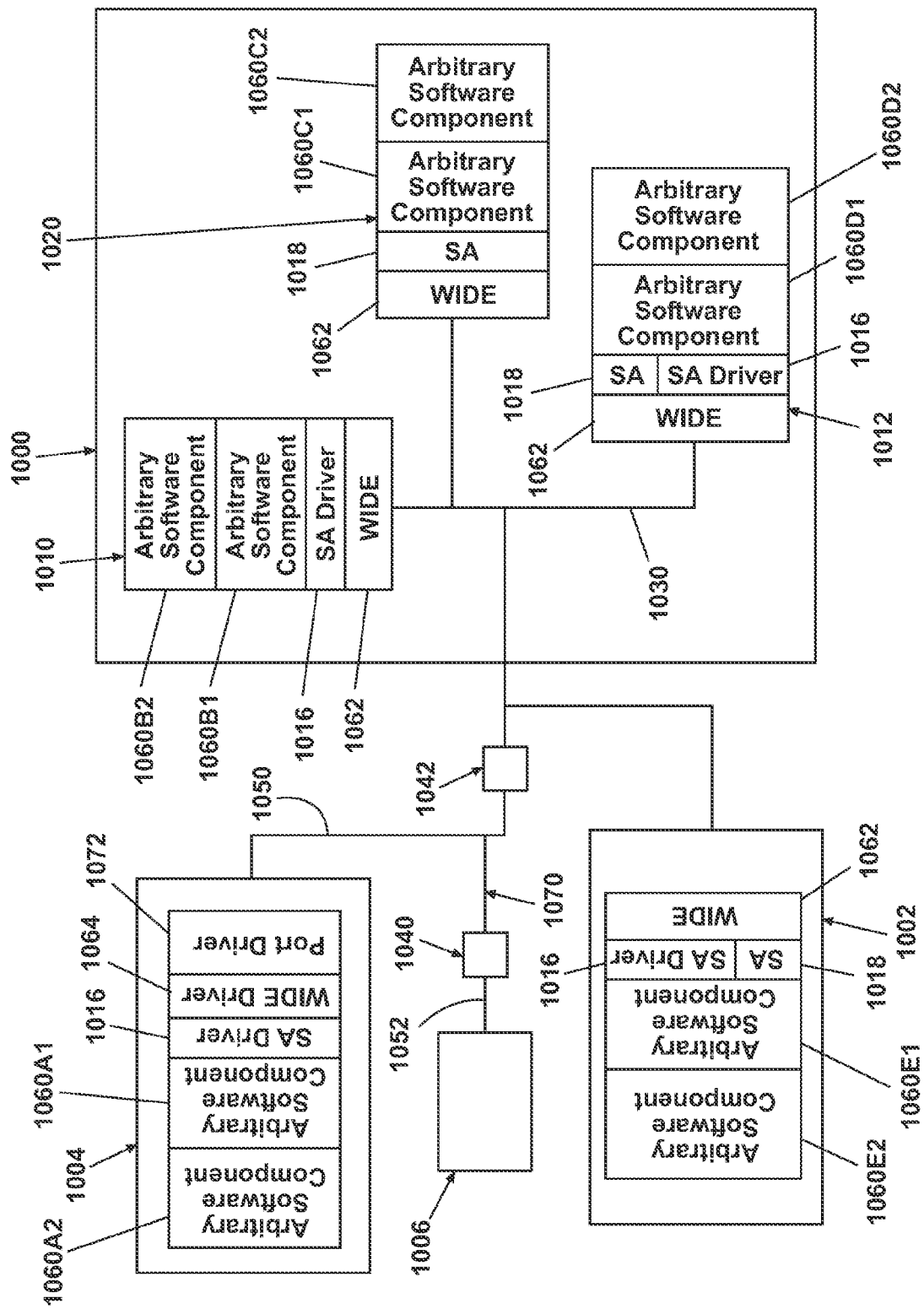
FIG. 14A is a schematic view of a network of appliances and clients connected on multiple networks by couplers.

In an extended application of the embedded virtual router 70 illustrated in FIG. 14A, an appliance 1000 is connected to external clients 1002, 1004 and a second appliance 1006 by a plurality of networks. A first network 1030 comprises a first internal client 1010, a second internal client 1012 and the external client 1002. A second network 1050 comprises the external client 1004. And a third network 1052 comprises the second appliance 1006. Each client is characterized as a node on the respective network. Local clients are clients that communicate with nodes on the same network. Remote clients are clients not directly coupled to the same network as the node to which they are communicating. In this embodiment, external client 1004 would be a remote client of the nodes on the first network 1030.

Each client node 1002, 1004, 1010, 1012 comprises a software architecture driver (SA driver) 1016 for exchanging messages with any node having a software architecture (SA) 1018 thereon. The nodes on any given network are in operable communication with the other nodes in that network and are optionally in communication with the nodes present on other networks.

The appliance 1000 further comprises at least one node 1020 having the SA thereon. The second appliance 1006 will also likely have a node with the SA on it, and may have one or more clients as well. The first network 1030 also comprises the node 1020.

Smart couplers 1040, 1042 are special devices that connect to the appliance and/or to a network and/or to two or more networks and communicate therebetween. Each smart coupler can comprise all the functionality of a node, and each node can comprise all of the functionality of a coupler. In the embodiment shown in FIG. 14A, the coupler 1040 couples the second network 1050 to the third network 1052, and can function as a node on each network. The smart coupler 1042 couples the second network 1050 to the first network 1030. It could also be considered as coupled to the appliance 1000. A smart coupler can comprise a processor, memory (fixed and/or removable), software, components and circuitry coupled to at least one transmission media. The smart coupler is configured to take information from the memory of its processor and, with the circuitry and components, produce a signal representing that information onto a transmission media. A smart coupler can also comprise a source of power, a GFA sensor, an opto-isolation circuit, a converter circuit, an interface expander 324, network health analyzing circuitry and software.

The smart coupler can be used to communicatively couple at least one external client 1002, 1004 to a network of the appliance 12 such that the external client and the appliance 12 can exchange messages therebetween. The external client and the smart coupler can each comprise a network. If desired, multiple external clients can be communicatively coupled to the appliance 12 using one or more smart couplers.

Either of the couplers 1040, 1042 can propagate discovery messages issued by the SA or an SA driver across the networks in order to enable the SA and SA drivers or their coupled arbitrary software components to develop references to identifiers of functionality for the different nodes. Each coupler 1040, 1042 can have a routing table stored in a memory for enabling communication between nodes on different networks. The memory can also store identifiers identifying the functionality of each node. The identifiers can be linked to the routing information held within the routing tables so that when a message comprising an identifier is sent to either of the couplers 1040, 1042, the coupler receiving the message can send the message to the appropriate next node.

Each node can comprise a unique combination of software elements. The software elements on any given node include at least one of the SA and an SA driver. The SA driver enables a node to communicate with the SA. The SA inherently includes an SA driver or a variant of the SA Driver. Each node comprising the SA can communicate with other nodes comprising the SA. However, a node can have both the SA and separate SA driver thereon. Each node must also include a suitable communication protocol or communication protocol driver for the respective network type to which it is coupled. An exemplary protocol is the WIDE network protocol 1062, a proprietary appliance network protocol utilized by Whirlpool Corporation. For a client not having WIDE network protocol that needs to communicate WIDE messages (e.g., external client 1004), a WIDE driver 1064 can be used. A port driver 1072 couples the external client 1004 to the network 1050.

Each node can also comprise one or more arbitrary software components. Here, each node is shown as having two arbitrary software components. Thus, node 1004 has arbitrary software components 1060A1 and 1060A2, node 1010 has arbitrary software components 1060B1 and 1060B2, node 1020 has arbitrary software components 1060C1 and 1060C2, node 1012 has arbitrary software components 1060D1 and 1060D2, and node 1002 has arbitrary software components 1060E1 and 1060E2. The SA driver 1016 is a software element configured to allow an arbitrary software component to communicate with the SA 1018 over at least one network. An arbitrary software component is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. The SA driver 1016 can receive and at least partially interpret messages from the SA and/or from another SA driver, which are specified as feedback events. In some instances, the SA driver 1016 can also send command messages to the SA 1018. In this respect, the external clients 1002, 1004 can have full capability act as an accessory to communicate with and to enhance or alter the operation of the appliance.

It will be understood that any or all of the external clients 1002, 1004, the couplers 1040, 1042, and the internal clients 1010, 1012 can be physical devices that have a processor, a memory, software, circuitry, and some source of power. In the general sense, they are coupled to transmission media and are preferably configured to take information from the memory and with the processor and the circuitry, produce a signal representing that information in the transmission media. When the information includes an identifier in memory, the node or client is discoverable by other nodes connected via the transmission media.

Discovery is a process by which a first node in communication with at least one coupled network sends discovery messages to the network or networks. Discovery messages generally comprise at least some query information specifying what the sender of the discovery message seeks. The information sought can be information such as another node, an appliance, a client, an arbitrary software component, a device comprising a node, a coupler, or one or more of a plurality of identifiable software elements on any node.

A discovery confirmation message is a reply message sent to the sender of a discovery message. Discovery reply messages typically comprise confirmation information and identification information. The confirmation information is an acknowledgment in the form of a positive or a negative response. The identification information is information enabling the sender to send subsequent messages to that which has been discovered. The identification information could be raw routing information or could be an identifier which could be used to pull raw routing information out of a routing table. Further the identification information could be an identifier used to get raw routing information from a routing table and other functional identification information out of a routing table. With the ability to create routing tables either by the method of propagated discovery or by a combination of propagated discovery and manual or semi-manual configuration, clients can establish useful communications with other communicating nodes and can rely on the propagated message and the routing table to enable the useful communications without the arbitrary software components of the clients to have knowledge of the routing information required to enable the useful communication.

Where more than one network is connected by a smart coupler, such as couplers 1040, 1042, a message received by the smart coupler from one network can be propagated and sent to the second network. The smart coupler may create a second separate message with the same information compatible for a second network, but together, the first and the second messages are considered a single propagated message, even though they may be literally two messages. A propagated discovery message, then, is a discovery message that is propagated to a receiver. A coupler may be configured to inspect propagated messages to prevent propagation of a circular message, i.e., a sent message that is also received by the sender on a second network to which the sender is coupled.

Figure 14B:
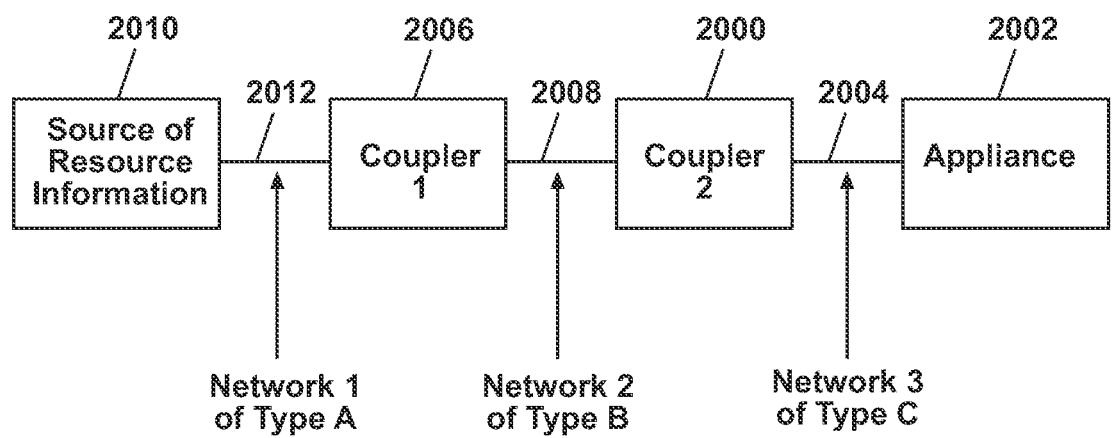
FIG. 14B is a schematic view of a source of information about resources connected to an appliance through two couplers.

See, for example, FIG. 14B illustrating a system where resources in an appliance can be monitored, managed, or changed as in the energy controller accessory of FIG. 13. A likely scenario has a coupler 2000 connected to an appliance 2002 by a network 2004. The coupler 2000 also connects to a coupler 2006 via network 2008 that may be a different type of network from network 2004. Coupler 2006 connects to a source 2010 of information about resources used or generated by the appliance 2002 by a third network 2012 that may be a different type of network from either network 2004 or network 2008. Assume that the source 2010 wants to send information about the resource to the appliance 2002. The invention enables a node in the source 2010 on network 2012 to communicate with a second node, having SA for example, which may be among several on the appliance 2002. We assume that the source 2010 has at least an appropriate communication driver, or one of the couplers has software to translate any message from the source to the communication protocols of the incorporated PCT/US2006/022420, for example.

In this scenario, the source 2010 sends a discovery message over the network 2012 seeking any consumer of resources to which the source wants to send information. The coupler 2006 receives the discovery message, translates the message, if necessary, and propagates the discovery message to the next nodes over the network 2008, including coupler 2000. Coupler 2000 receives the discovery message, translates the message, if necessary, and propagates the discovery message to the next nodes over the network, including the appliance 2002. The relevant nodes in the appliance 2002 evaluate the message and determine a discovery reply message, and send respective replies. Here, we assume at least one reply is positive.

The discovery reply message is received by the coupler 2000, which populates its routing table and sends it to the coupler 2006, which populates its routing table and sends it to the source 2010 in accord with the foregoing process. Each node retains the relevant identifiers so that subsequent message can be communicated without repeating the discovery sequence. As well, those nodes with memory, such as the couplers, can be configured to save messages.

With this structure, a source of information about a resource such as electricity, hot water, gray water, gas, water, replaceable parts, or other consumables, can request a change in the operation of the appliance based on the information. For example, if an electric utility is facing a brownout, a source of information about the electricity can request that an electric dryer not commence an operation for a period of time. Similarly, a source of consumables, such as filters or spare parts, can ascertain from an appliance the status of the consumable and send information about the timing and availability of replacement.

At least the smart coupler 1042 can hold a routing table constructed from a plurality of discovery confirmation messages. In one embodiment, the routing table holds identifiers from other nodes with each identifiers routing information. In a second embodiment, the routing table holds identifiers from other nodes with each identifier's routing information and with a new identifier that will be used to represent the identifiers from other nodes. The new identifier can be considered a proxy identifier.

In a third embodiment, the routing table can have software function pointers linking the arbitrary software component to the functional identifiers and associated routing information instead of proxy identifiers. As stated previously, nodes can have the same functionality as couplers. This embodiment is an exemplary embodiment where the routing table is coupling an arbitrary software component to another arbitrary software component or to a routing table held by a coupler, or to second arbitrary software component on another node.

In addition to the six collaboration examples, a seventh collaboration example includes first and second arbitrary software components comprised within the application logic 59 where both the first and second arbitrary software components have identifiers and can be identified within the structures 74, which can comprise the routing table. In this collaboration, the first arbitrary software component sends a message to the second arbitrary software component by invoking a software function linked to a plurality of function pointers within the routing table. One of the function pointers of the plurality of function pointers links the message to at least the second arbitrary software component. Likewise, if there is a second instance of the second arbitrary software component residing in the application logic of 16, the first arbitrary software component function invocation may not change. In this case, the plurality of function pointers would include a pointer linking the invocation to routing information contained in the routing table. The routing information is necessary for enabling the message to be routed from the invocation to the receiving second instance of the second arbitrary software component.

It is preferred that the routing tables are populated by one of at least discovery confirmation messages, propagated discovery confirmation messages, manual configuration, semi-manual configuration, hard coded configuration software, and the software compilation process. It should be noted that using discovery messages to populate routing tables is the preferred embodiment. However, routing tables can also be populated using conventional configuration methods involving a manual or semi-manual configuration process, such as with the use of a visual configurator (see, for example, FIGS. 52 and 53 used for another purpose). In addition, a manual or semi-manual configuration process can be used in addition to discovery generated routing tables. In this approach, the discovery process or the configuration process can incrementally add or delete routing information within a routing table.

The various techniques described above with respect to the use of the embedded virtual router 70 can also be applied in a variety of other network configurations in order to enable communication between objects in the system. Examples include but are not limited to enabling communication between two different arbitrary software components within an application logic 59, an arbitrary software component of an application logic 59 and an arbitrary software component of a hardware abstraction layer 80, any arbitrary software component of a first processor and any arbitrary software component of a second processor on the same component 16, any arbitrary software component of a first processor and any arbitrary software component of a second processor on different components 16 within an appliance 12, any arbitrary software component of a first processor and any arbitrary software component of a second processor on different components 16 in different appliances, any arbitrary software component of a first processor and any arbitrary software component of a second processor on different computers where the computers can be dislocated from one another but coupled via a network.

It should be understood that the arbitrary software components above are preferably associated with an identifier associated with the functionality of the software component (a class) and with an arbitrary identifier used as an object handle. A comprehensive namespace can contain unique identifiers for each arbitrary software component on the system. An exemplary namespace can create identifiers comprising a class ID including of an API ID, an instance ID, and a type ID; and an object ID comprising a node ID and an instance ID. Other namespaces can use any desired combination of identifiers to give each arbitrary software component a unique identifier.

Figure 15:
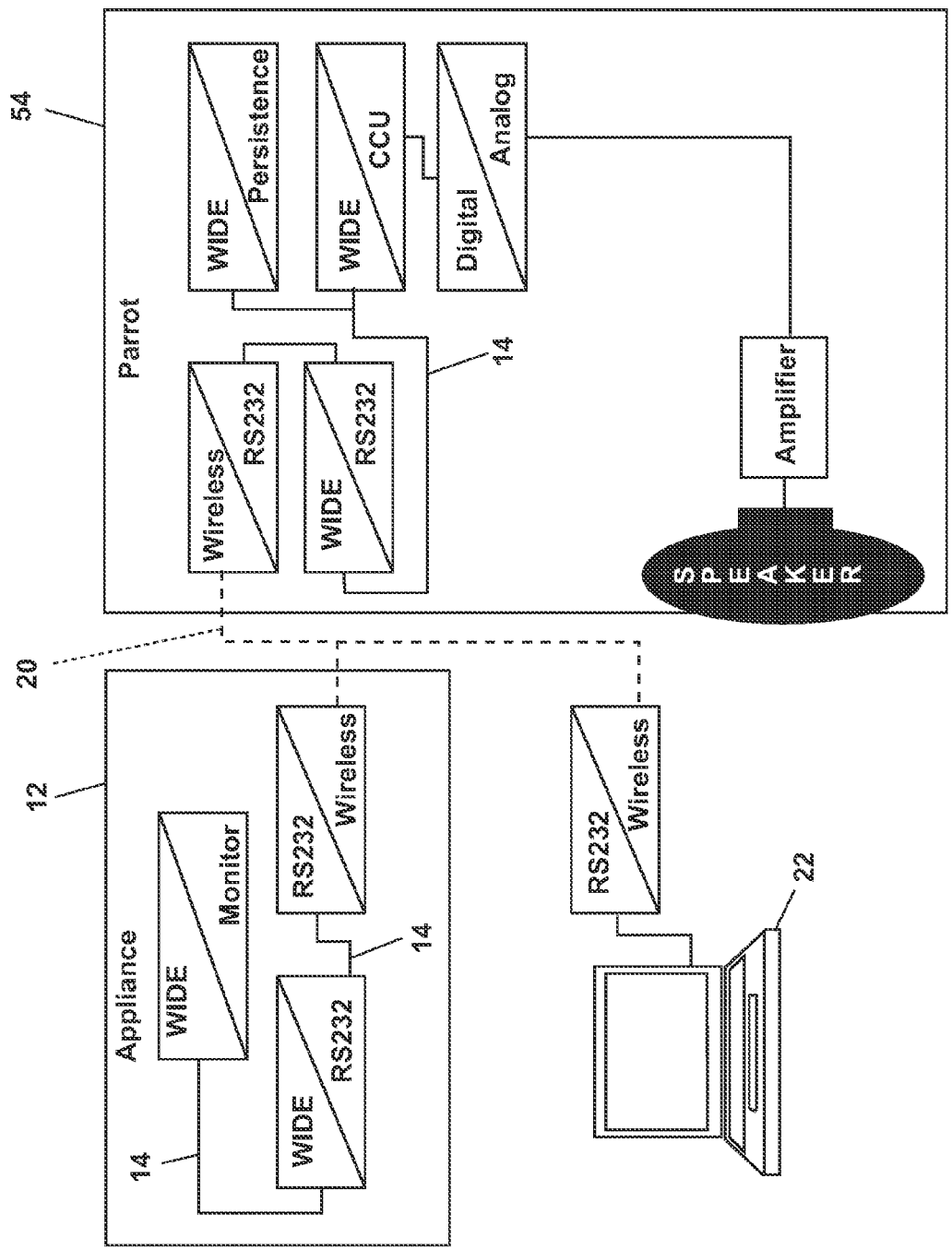
FIG. 15 is a schematic illustration of a persistence node exposed to other components within the Parrot Appliance via network 14 and supporting packet structure 28 of the software architecture 10 of FIG. 1 according to the invention.

FIG. 15 is a schematic illustration of a persistence node 54 incorporated within the software architecture of FIG. 1 according to the invention. Whereas the state of the art in embedded systems is to provide data persistence local to the PCB, the persistence node according to this invention provides a persistence service exposed to components 16 and 22 through the mechanisms of the software architecture 10 and/or the embedded virtual router 70.

Various examples of the connectors and protocols (RS-232, wireless, WIDE, etc.) are shown within the components of each client which communicate with one another along an internal network on each component 16, appliance 12 and persistence node 54. In summary, the persistence node 54 is a logical entity which is discoverable and useable by all components 16 sharing a network 14, 20 or a runtime connection. This entity will provide services and protocol mechanisms necessary to read, write, and store information.

As discussed above, appliances 12 are "state" driven machines and typically have a user interface (e.g., a keypad) using which a user can effect a change in state of the appliance 12 (e.g., change a washer from an idle state to a "wash" state). As applications are developed that require external communication with an appliance 12 (e.g., testing, diagnostics, remote control, etc.), there are three possible techniques to perform this interface: (1) translate external commands into key presses (see FIG. 16 and discussion); (2) use custom software to execute state-change commands (see FIG. 16 and discussion); or (3) simply translate key presses into a logical API (see FIG. 17 and discussion).

Figure 16:
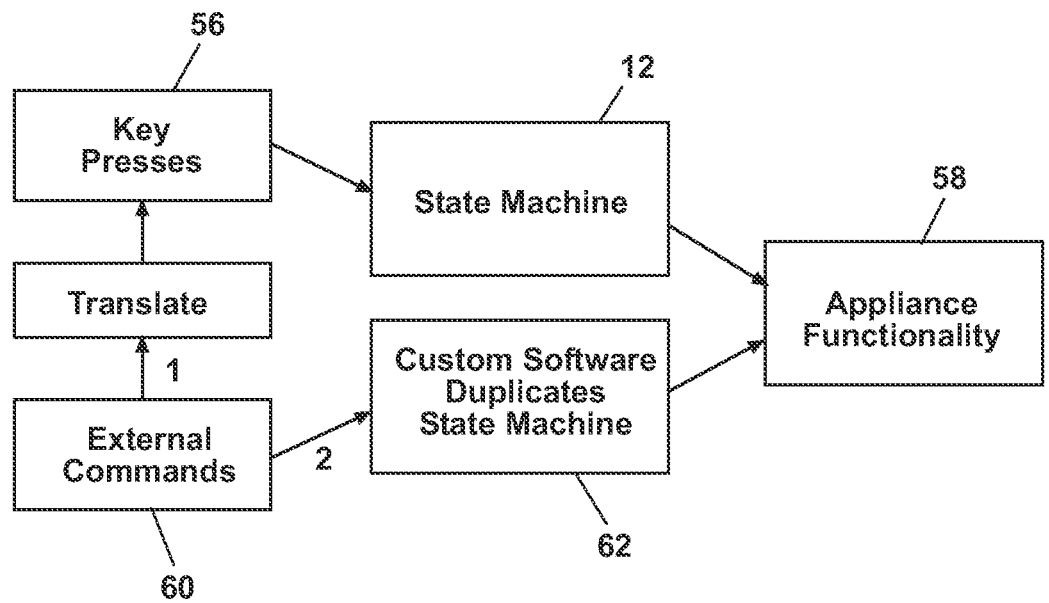
FIG. 16 is a schematic illustration of a prior art method by which external commands are translated into key presses for testing household appliance functionality.

FIG. 16 is a schematic illustration of a prior art method by which external commands are translated into key presses for testing household appliance functionality. In the prior art method, a user would actuate an appliance 12 via one or more key presses 56 to change the state of the appliance (referred to in FIG. 16 as a "state machine" 12) to affect the appliance functionality 58. In order to test the functionality 58 of the appliance, the user would prepare external commands 60 and either (1) translate the external commands 60 to key presses 56; or (2) prepare custom software 62 which would emulate the state machine appliance 12 to attempt to duplicate the appliance functionality 58. This can be difficult and error prone.

Figure 17:
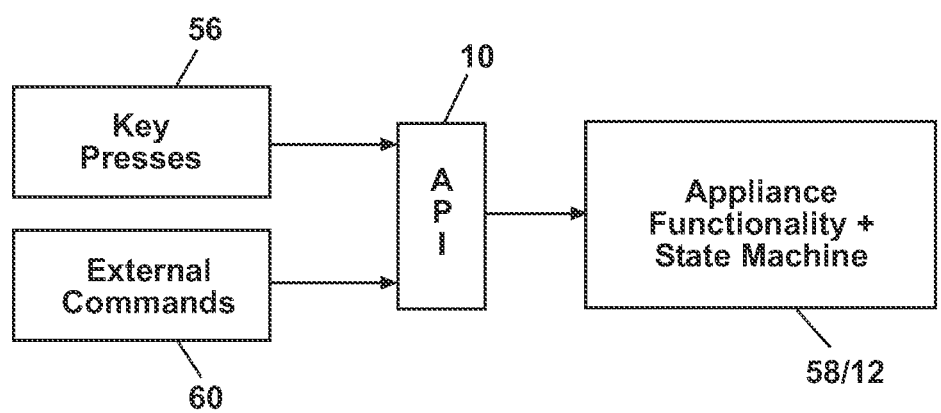
FIG. 17 is a schematic illustration of the interaction of user-initiated key presses and externally-fed software commands are passed as arguments to the SA for issuing commands to a household appliance to, e.g., test household appliance functionality and/or change the state of the household appliance machine.

In an new method of operating and testing an appliance, FIG. 17 is a schematic illustration of the interaction of user-initiated key presses 56 and externally-fed software commands 60, typically from a client, are both passed as arguments to the software architecture 10 of FIG. 1 according to the invention for issuing commands to a household appliance 12 to, for example, test household appliance functionality 58 and/or change the state (i.e., actual operation) of the household appliance 12.

The method discussed with respect to FIG. 17 is novel because, instead of translating external messages, treating the appliance 12 as a closed system, it exposes the functionality of the appliance 12 independently of whether the message is received as an external key press or a software command local or remote to the appliance 12. The messages (commands) are processed through an API of the software architecture 10 (now an open system as opposed to the prior art "closed" system), while preserving key-press validation and feedback to the user.

Currently, appliance control software is not set up to validate and execute external commands. To remedy this, an appliance API is defined that includes both user functionality as well as low-level machine control commands. During normal operations, when a key is pressed or an external command is issued, it is directly mapped to an user functionality API function call as a common entry point (e.g., a WASH key is pressed on a user interface [keypad] or an external WASH command is issued will both call a setCycle(WASH) function immediately, regardless of the state of the appliance 12). All validation and state-based behavior will exist inside this function so that external commands are treated the same end execute the same code as key presses 56.

This API can be implemented without a major redesign of appliance control software. Only a user interface software would need to be reorganized to call API functions as the entry point for any command instead of just reacting to key presses inside of the state machine 12. Use of this method of FIG. 17 enables the manufacture of an appliance 12 to test and diagnose the keypad/user interface separately. This saves time and effort in development, diagnosis and testing of appliances. This will also eliminate the need for complex mechanical keypad actuation devices as well as mechanical actuation harnesses which were conventionally used to test user interfaces and appliance functionality.

In addition, the appliance 12 API contains a command to send the appliance into a diagnostic or factory test mode. In this mode, all state-based behavior and command validation code is disabled to allow for a low-level API. API commands in this mode can access and control low-level parts of the appliance 12 such as reading and writing to EEPROM, pressing keys (56), reading sensor values, writing to cycle parameters, actuating relays and other actuators, etc.

The API interface discussed with respect to the software architecture 10 is an object-oriented software package that is effective when one object (appliance functionality) has multiple clients that need to interact with it (e.g., both key presses 56 and external commands 60). This is a new approach because appliances do not currently contain object-oriented software and are generally thought of as being a closed system and having only one client: user interface keys. This invention contemplates that appliances 12 will have many clients through the introduction of an internal communication bus (i.e., network 14) and external connectivity 20. These clients may include web applications, diagnostic tools, testing tools, and home automation systems, among others.

Appliances 12 with the API software architecture described herein will be "future proofed" and ready for many advanced remote applications that customers may request. These can include energy management, improved service and diagnostics tools, and remote control and monitoring. In addition, since the API is the entry point into all appliance functionality, customers can benefit from improved automated development testing and factory testing of appliances 12.

The software architecture 10 also contemplates that the virtual device model can be aware of the current capabilities of the physical device (the appliance 12). For example, if an oven is baking, the appliance clock cannot be modified. Capabilities synchronization is a general solution meant to allow a virtual model to recognize changes to the capabilities of a device based on its state.

Currently, this purpose is achieved through code which is written per appliance 12. The solution contained in the software architecture 10 replaces device specific code with a general solution. This solution is comprised of additional messages which the software architecture 10 broadcast containing the current set of invalid commands (API and Op Code). This information is evaluated at runtime so that the user interface will be expressed in such a way that the user may only modify those device characteristics which are modifiable, so that the customer is not given the opportunity to modify a device characteristic which is currently immutable as dictated by the actual device.

The software architecture 10 is a cross-product system of applications and tools. These applications help to increase both quality and speed to market in the product development process. This is done by interacting with the data that is stored in memory inside the appliance 12.

In order to stay flexible, configurable and generic, the applications interact with the appliance by specifying numeric memory locations (addresses) which are required. Each time the software in the appliance changes, however, these locations in memory can move around and take on a very different meaning. In order to solve this problem, a variable map file standard and generator were created.

The variable map file generator takes the software names (textual descriptions) written in code and associates them with the numeric address and size of that piece of data. It then outputs this information in a standard file format. This is executed each time the code is changed and compiled. The information in this standard file provides independence from both the compiler and from where data is located in memory.

The variable map file is then read by any application that wants to interact with a software architecture 10-based appliance 12. Applications are coded against the meaningful textual names of data, rather than the numeric addresses of data which greatly simplifies application development.

The variable map file format and usage process are described in the table below.

| Module | Variable Name | Address | Size |
| --- | --- | --- | --- |
| appman.h | Hour_Timer | 0213 | 1 |
| appman.h | Zone1 | 020e | 3 |
| appman.h | Zone1.Act_Temp | 0210 | 1 |
| appman.h | Zone1.Zone_State_Tmr | 020f | 1 |
| appman.h | Zone1.Zone_State | 020e | 1 |

An example of the method used in working with the variable map concept includes the following steps.

1. An engineer builds an application coded against the textual descriptive names of meaningful data located in the appliance control.

2. The appliance control code changes, resulting in new locations of the meaningful application data.

3. An engineer compiles the new appliance code, which also automatically generates an associated variable map file. The new code and variable map file are deployed together.

4. When the application is run against the new code, it does not have to change, as long as it has the proper variable map file.

5. If new data is required by the application, it can be easily identified or retrieved from the variable map file.

Thus, as shown above, the development engineer need only remember the "Variable Name" column in the table above, and not need to constantly look up the constantly-changing address values in the "Address" columns above.

Figure 18:
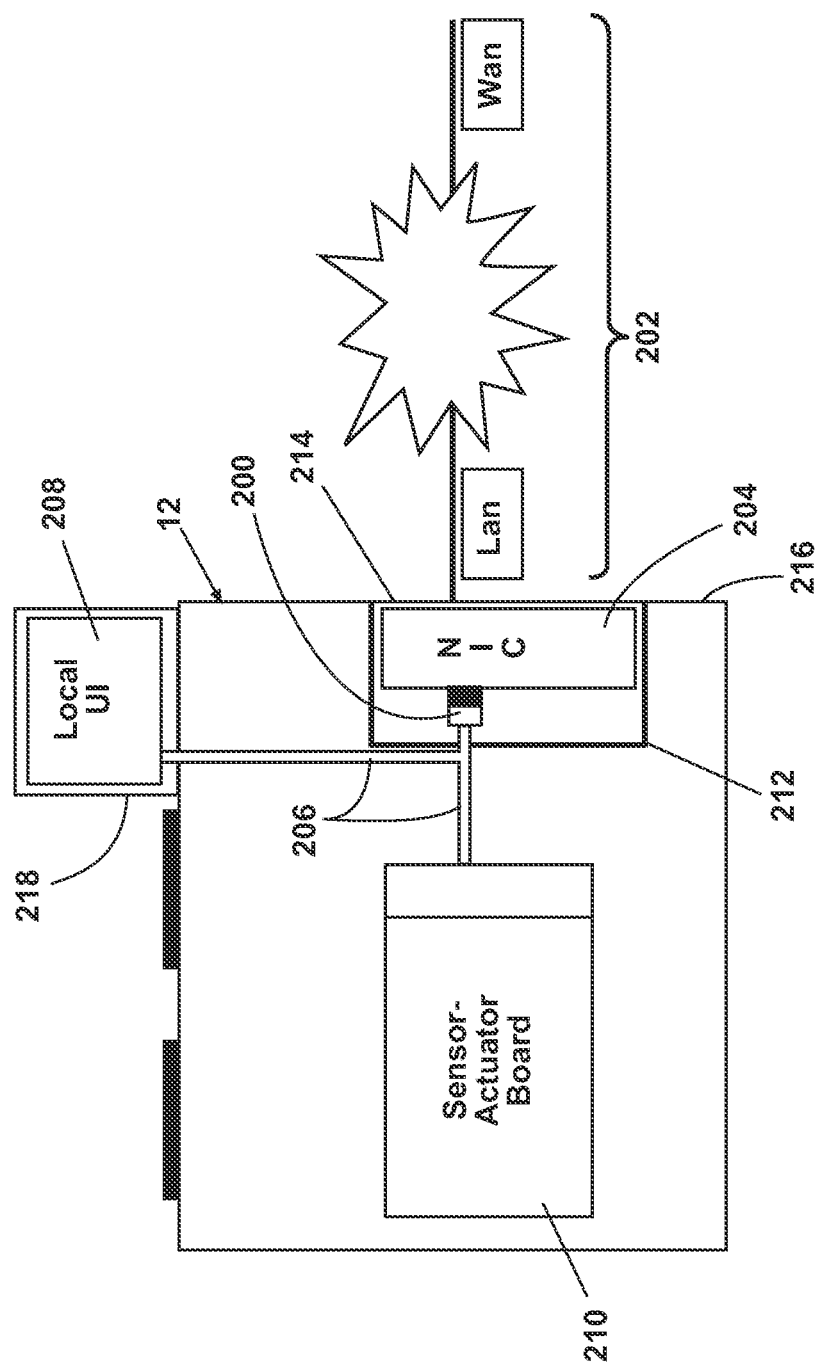
FIG. 18 is a schematic illustration showing mounting of a NIC in a recess formed in a rear side of the appliance.

Referring now to FIG. 18, the household appliance 12, which is shown as an oven for exemplary purposes, having an internal communication bus 200 can be electrically coupled to an external network 202 through a network interface card (NIC) 204 similar to the aforementioned network interface connector 20. A NIC is a well-known device that connects a computer or other client to a network, and any suitable NIC can be utilized with the appliance 12. According to one embodiment of the invention, the NIC 204 is electrically connected to the internal communication bus 200 and adapts an internal communication bus protocol to a standard communication protocol, such as TCP/IP and GSM, so that the appliance 12 can communicate with an external client (not shown) through the external network 202, such as a local area network (LAN) and/or a wide area network (WAN). Thus, the external client can communicate with the software architecture 10 associated with various internal components of the appliance 12 that reside on the internal network 14. For example, the appliance 12 in FIG. 18 is shown as comprising a user interface (UI) 208 and a sensor-actuator board 210, each comprising a printed circuit board (PCB) with the corresponding software architecture 10, and the external client can communicate with the software architectures 10 through the NIC 204.

The NIC 204 can be mounted to the communication bus 200, which is preferably externally exposed, of the appliance 12 through any suitable mounting means, as is well-known in the computer network art. According to one embodiment of the invention, the communication bus 200 is located in a recess 212 defining an opening 214 that is flush with a wall, such as a rear wall 216, of the appliance 12, as shown in FIG. 18. When the communication bus 200 is located within the recess 212, the communication bus 200 and the NIC 204, when mounted to the communication bus 200, are protected from damage that can occur during transport of the appliance 12.

The NIC 204 can be supplied with the appliance 12 at the time of manufacture or can be purchased separately from the appliance 12 as an accessory. Thus, a customer can choose to purchase the appliance 12 without the capability to connect to the external network 202 and upgrade the appliance 12 at a later time to add connectivity, if desired.

Figure 19:
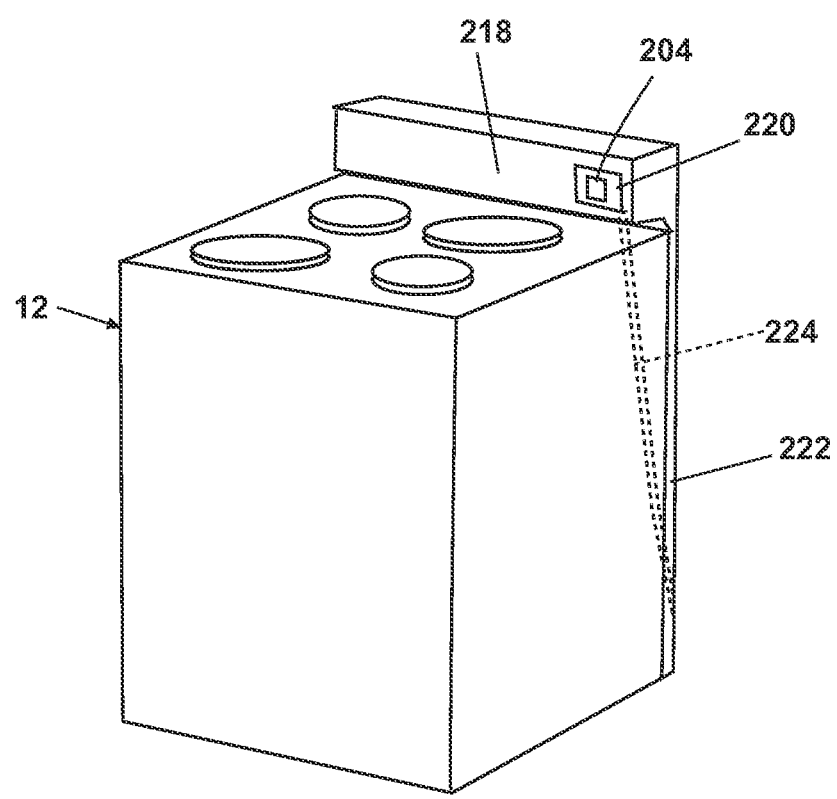
FIG. 19 is a schematic illustration showing mounting of the NIC to a front side of the appliance and a wiring conduit extending from the mounting location of the network interface card to the rear side of the appliance.

The NIC 204 can communicate with the external network 202 through a wired connection or wirelessly. For example, the NIC 204 can communicate with the external network 202 via wireless infrared (IR) communications or other short range wireless means. In such situations, the NIC 204 is preferably mounted to a front side 218 of the appliance 12 to facilitate robust communication. According to one embodiment of the invention, the NIC 204 can be mounted in a recess 420 at the front side 218 of the appliance, as illustrated in FIG. 19 with respect to an oven, for example. When mounted to the front side 218 of the appliance, the NIC 204 can be connected to a rear side 222 of the appliance via wires disposed in a wiring conduit 224 that extends from the mounting recess 420 at the front side 218 to the rear side 222 of the appliance 12, where the wires enter the appliance 12.

Figure 20:
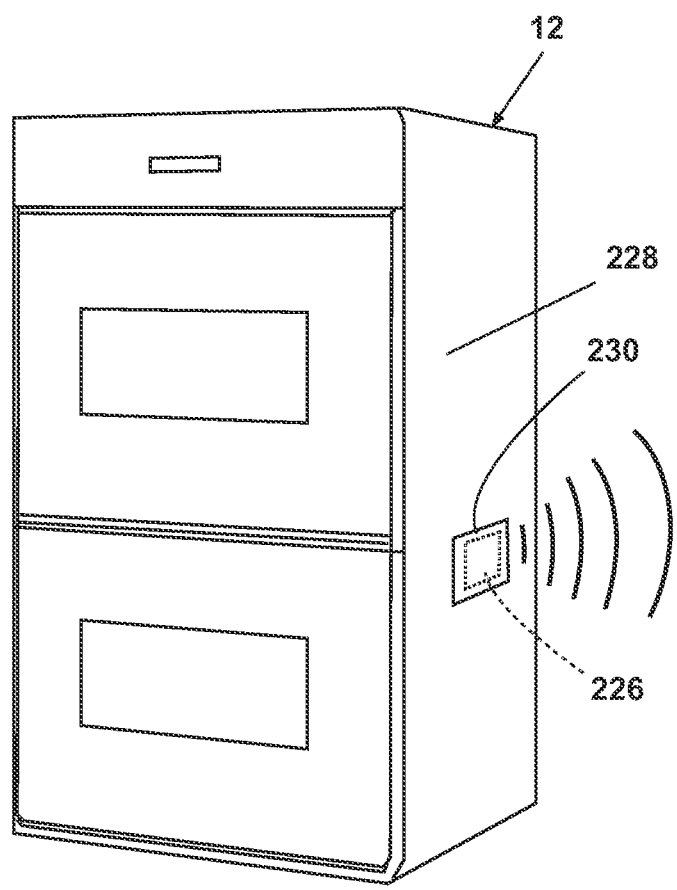
FIG. 20 is a schematic illustration of the appliance comprising a safety barrier that allows communication from an RF PCB located in the appliance and prevents human contact with excessive heat and/or electricity.

Another example of wireless communication is radio frequency (RF) communication. For example, a RF printed circuit board (PCB) 226 can be located inside the appliance 12, which requires connection between the RF PCB 226 and an externally mounted antenna. Alternatively, the RF PCB 226 can be mounted externally of the appliance 12, but this configuration requires an electrical connection between the RF PCB 226 and appliance control electronics, and an installer must open a cabinet or case 228 of the appliance 12 during installation of the RF PCB 226. According to one embodiment of the invention, the RF PCB 226 is mounted within the appliance 12, and a non-metallic safety barrier 230 that is a poor conductor of heat and electricity is provided as part of the appliance case 228. An exemplary safety barrier 230 is a plastic window, such as a Plexiglas window, integrated with the appliance case 228, as shown in FIG. 20 for an appliance 12 in the form of an oven for illustrative purposes. The safety barrier 230 allows for RF communication with the internally mounted RF PCB 226 without an external antenna and prevents human contact with excessive heat or electricity.

Figure 21:
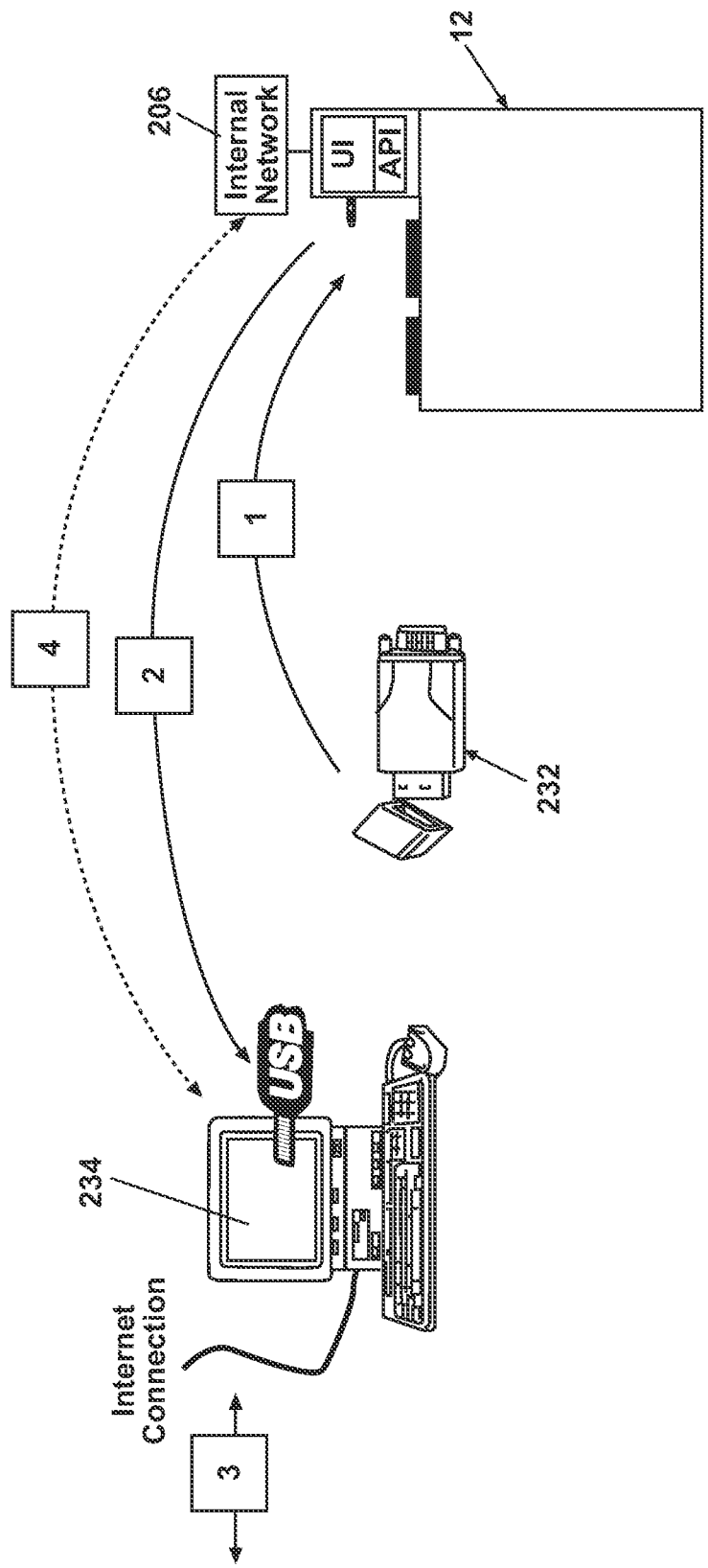
FIG. 21 is a schematic illustration illustrating the use of a service module that obtains diagnostic data from the appliance and uploads the diagnostic data via a personal computer over an external network.

Referring now to FIG. 21, the appliance 12 can be configured with hardware to facilitate service and diagnostics of the appliance 12. In one embodiment, a service module 232 adapted to removably connect with a standard communication bus on the appliance 12 is configured to record diagnostic data, such as by communicating with the software architecture 10 on the internal network 14. The service module can readily connect to the internal network 14. The connection of the service module 232 to the appliance 12 is represented by step 1 in FIG. 21. The service module 232 is then removed from the appliance 12 and connected to a personal computer 234, such as through a USB port or other suitable standard communication bus. The connection of the service module 232 to the computer 234 is represented by step 2 in FIG. 21. After the service module 232 is connected to the computer 234, the service module 232 connects to the Internet, preferably automatically, and uploads the diagnostic data to a remote client (not shown), as indicated by step 3 in FIG. 21. The remote client processes the diagnostic data to identify an appliance problem or failure and potentially prevent a service call or, if the problem or failure requires a service call, to optimize the effectiveness and efficiency of the service call. Optionally, the service module 232 can download customized testing scripts based on the diagnostic data to run tests on the appliance 12 to further diagnose or eliminate the problem or failure. Reconnection of the service module 232 to the appliance 12 to execute the testing scripts is represented by step 4 in FIG. 21.

An exemplary architecture for the service module 232 is illustrated schematically in FIG. 21A. The service module 232 comprises a pair of communication buses, such as external serial buses. According to the illustrated embodiment, the service module comprises a USB 236 at one end for connection to the personal computer and an RS-232 (EIA-232) bus 238 at an opposite end for connection to the appliance 12 and particularly to the software architecture 10 residing on various nodes of the appliance internal network 14. The service module 232 further comprises memory 240, such as flash memory, for storing the diagnostic data, the testing scripts, and other data. The flash memory 240 communicates with a service logic 242 that controls the operation of the service module 232.

Figure 22:
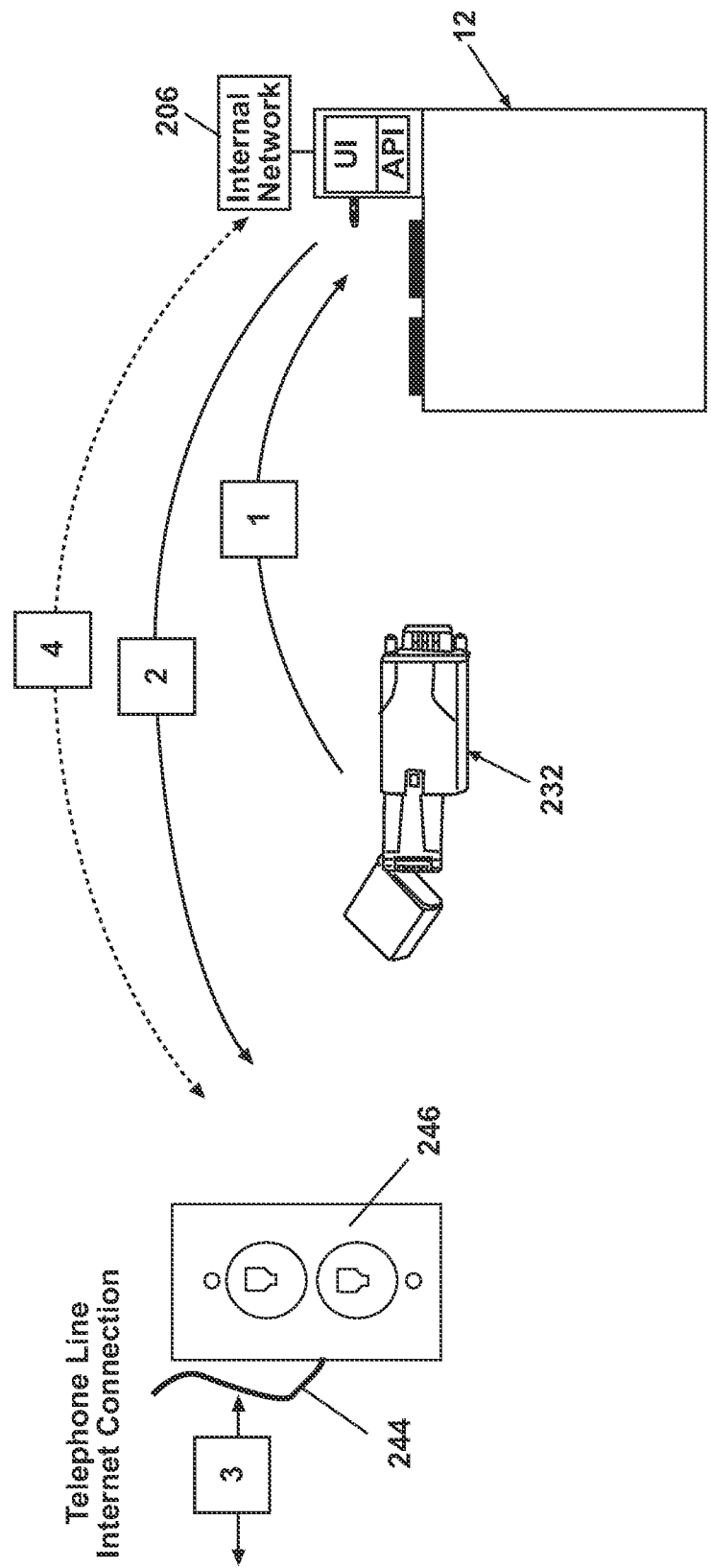
FIG. 22 is a schematic illustration similar to FIG. 21 with the service module uploading the diagnostic data via a telephone line.

FIG. 22 illustrates an alternative hardware architecture for service and diagnostics of the appliance 12. This architecture is similar to that shown in FIG. 21, except that the personal computer 234 is replaced with a telephone line 244, and the service module 232 is adapted for connection to the telephone line 244. Thus, the alternative architecture of FIG. 22 is more suitable for appliance users who do not own a personal computer or do not have a personal computer connected to the Internet. The process for obtaining diagnostic data is the same as described above with respect to FIG. 21; however, rather than connecting the service module 232 to the personal computer 234, the user connects the service module 232 to a standard telephone jack 246, and the service module 232 automatically connects to the Internet through the telephone line 244.

Figure 22A:
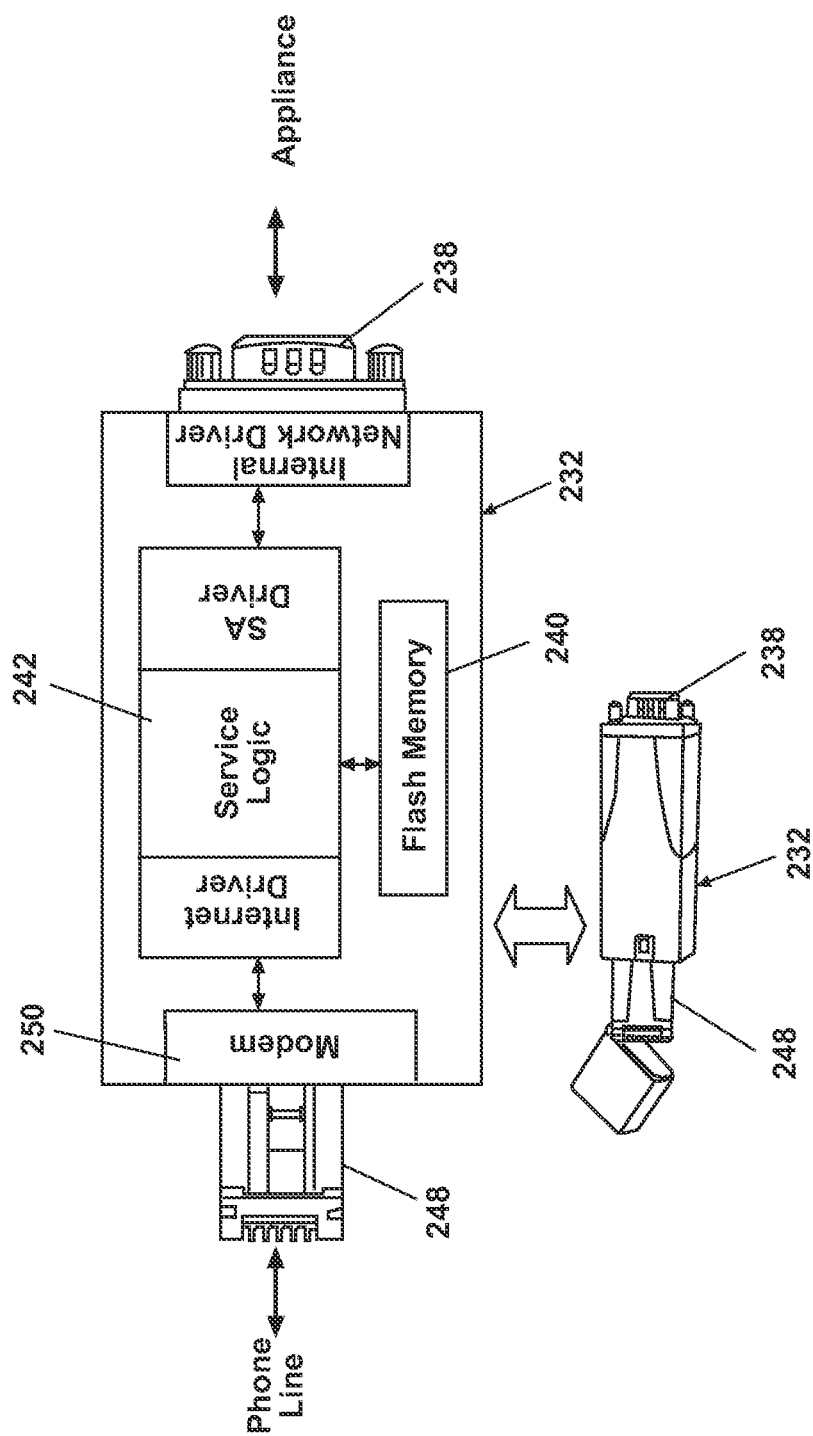
FIG. 22A is a schematic illustration of architecture for the service module of FIG. 22.

Referring now to FIG. 22A, the service module 232 for use with the system shown in FIG. 22 is similar to the service module 232 illustrated in FIG. 21A, except that the USB 236 is replaced with a telephone line plug 248, such as an RJ11 plug, for connecting a modem 250 of the service module 232 with the telephone line 244 to establish a connection to the Internet.

Figure 23:
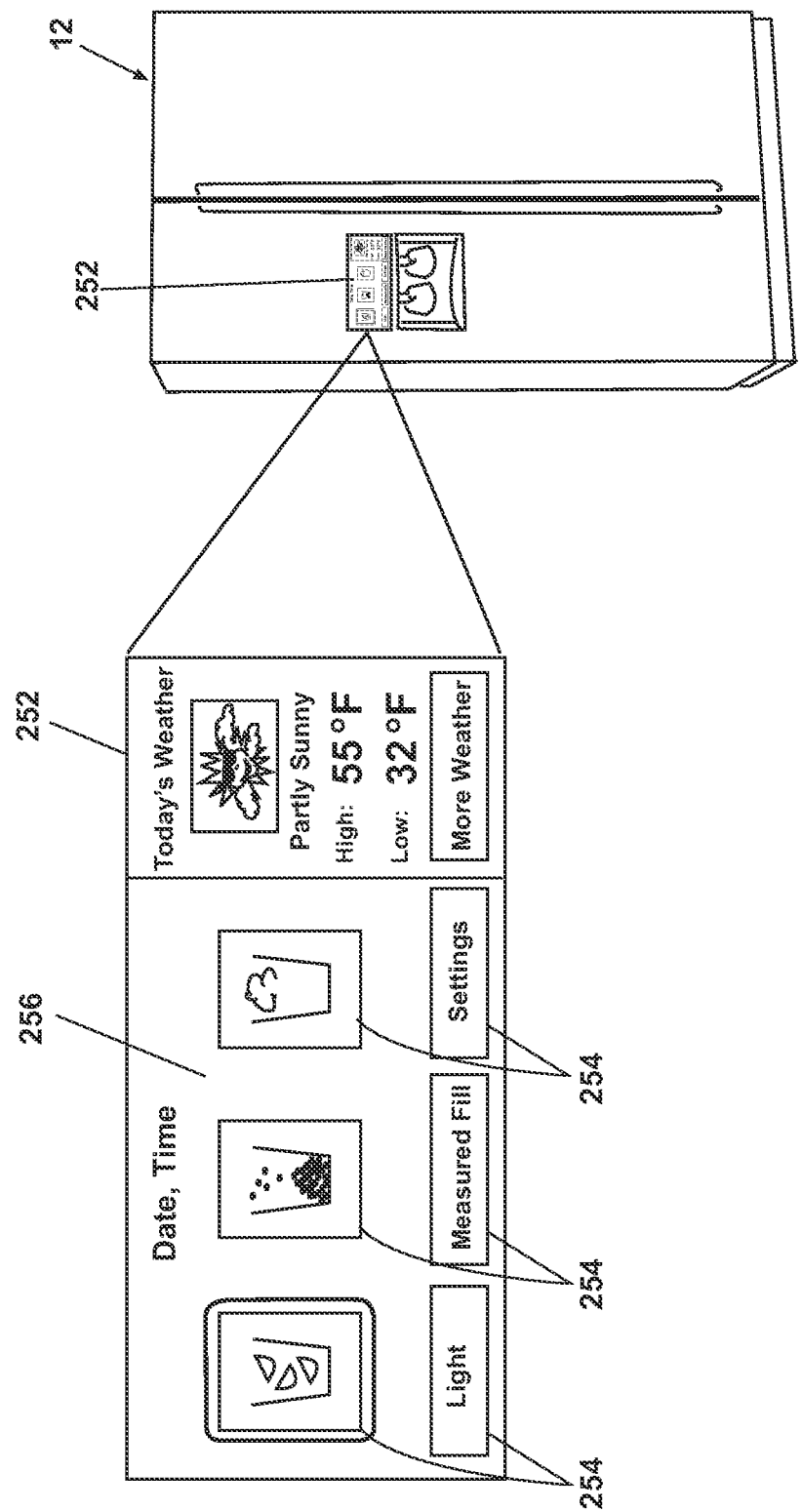
FIG. 23 is a schematic illustration of the appliance in the form of a refrigerator equipped with an exemplary accessory module in the form of a weather station module forming a component with a client SA enabling the weather station module to become operational without manual configuration.

The service modules 232 described above can be supplied with the appliance 12 at the time of manufacture or sold as an accessory during or after the sale of the appliance 12. Other various types of accessory modules can be provided with the appliance 12 or purchased later by a customer for upgrading the appliance 12. An exemplary accessory module can comprise a display operably connectable to the internal network 14 and the external network 202 and visible to the user when mounted to the appliance 12. The display can communicate various data the user, including, but not limited to, data, such as operational status, related to the appliance and obtained via the software architecture 10 on the internal network 14, or information downloaded from the Internet through the external network 202. An exemplary accessory module is a weather station module 252, which is shown in FIG. 23 as mounted to an appliance 12 in the form of a refrigerator for illustrative purposes. In addition to displaying weather-related information or other information that can be downloaded from the external network 202, the display of the weather station module 252 can also include one or more touch pads or a touch screen 256 with selector areas 254 for controlling various operations of the refrigerator, such as for controlling an ice dispenser and a light, and for accessing settings, such as temperature, of the refrigerator.

FIG. 24 illustrates the preferred packet structure for a fragmented message. Such a packet structure is preferably used for communication when the message payload is larger than that of the underlying protocol. This fragmentation packet structure was previously described in the discussed concerning multi-payload message integrity; however, as brief summary can be listed here. In a fragmented message, the standard packet structure described in FIG. 4 is preferably used in the first fragment. All subsequent fragments preferably use the packet structure described in FIG. 24. The difference between these protocols is in Byte 2.

For the entirety of a fragmented message, the flag should bet set. The MFP flag (more fragments pending) should be set until the final fragment of the fragmented message. MID (message id) gives each fragmented message (the group of fragments) a handle or id, preventing merging of separate fragmented message. FID (fragment id) gives each fragment of a fragmented message a handle or id, allowing the detection of a lost fragment. A more in-depth explanation can be found in the discussion on multi-payload message integrity.

FIG. 25 provides example operations of the fragmentation protocol discussed given in FIG. 24. Explanation of this protocol can be found in the multi-payload message integrity section.

Figure 26A:
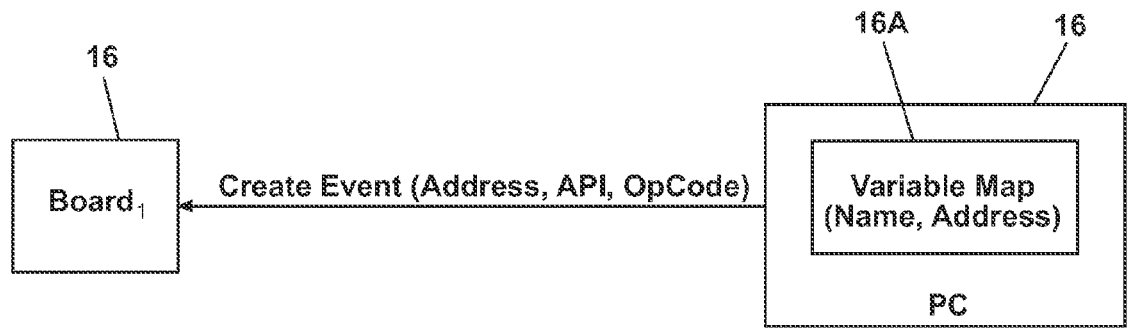
FIG. 26A is a schematic illustration of the location of variable map information at a central location, such as the main controller PC board, which is then communicated to the boards of the other components.
Figure 26B:
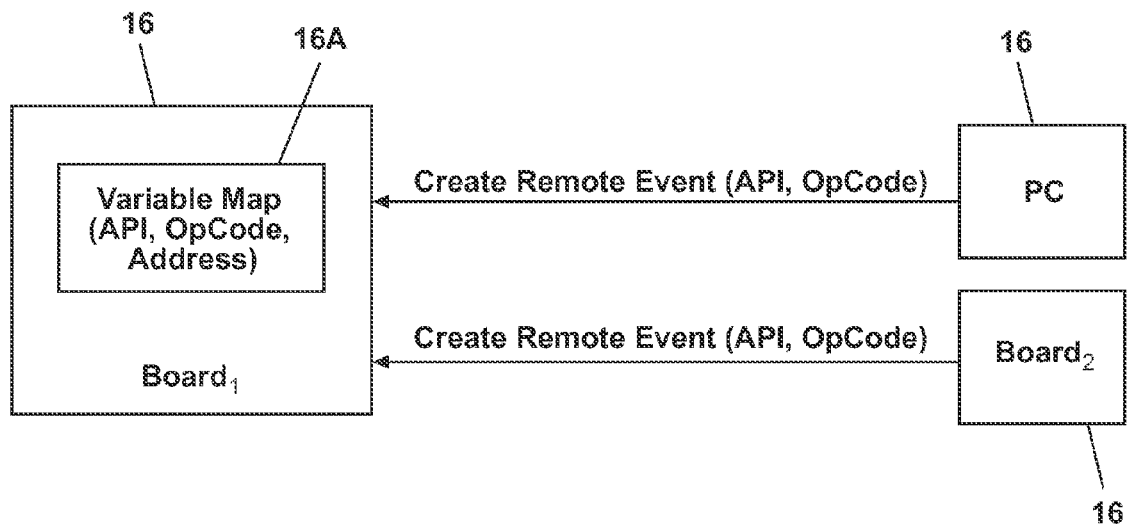
FIG. 26B is a schematic illustration of the location of variable map information on the controller of the component, which is collected from the other components on the network.
Figure 27:
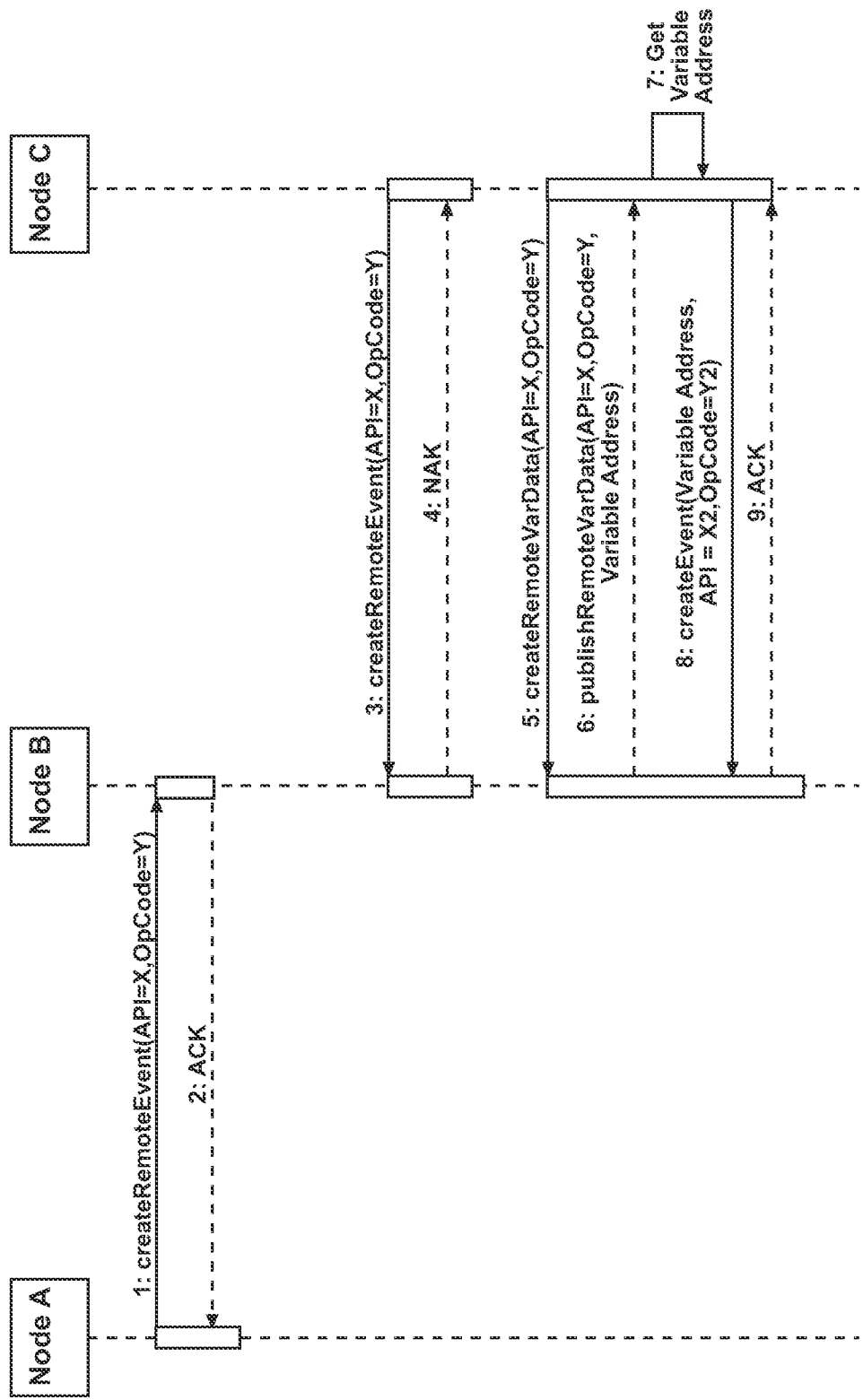
FIG. 27 is a UML Sequence Diagram showing a messaging scenario where a duplicate event request is assigned a variable address to permit both requests to reside in the network.

FIGS. 26A and 26B represent alternate architectures for locating the address and Identifier information such that well formed messages can be constructed and sent to the software architecture of FIG. 10 resulting in event creation within the DAQ 30 of FIG. 5. As previously mentioned, the DAQ engine 30 requires a variable's memory address for event registration. FIG. 26A illustrates an example of using the client-configured data acquisition scheme in which the client (computer or other client) holds a current memory map that relates a variable's name to its memory location. This memory address, in addition to the identifier (API Id and Op Code), is used to construct a well formed message which is sent to the DAQ resulting in DAQ event creation. FIG. 26B illustrates an example of using the client-configured data acquisition scheme in which the client (e. another control board) does not know the memory address's of desired event variables. In this case, the client can utilize the embedded variable map functionality of the invention. Thus, the client must only provide an API and Op Code and is not required to include the memory address of the variable in the well formed message to be sent to the DAQ. Because, in this case, the software of the DAQ performs the additional task of acquiring the memory location of the variable specified by the Identifier. Once acquired, the DAQ uses the same function calls referenced in the previous case of FIG. 26A to create the event structures in the DAQ's array of event structures contained in the DAQs memory heap.

Variable map information in FIG. 26A relates variable symbolic names to their address in the memory of 16A. FIG. 26B relates variable identifiers (API Id and Op Code) to their address in the memory of 16. The rational for the alternate architectures is that these support both interactions with a human actor who might find it advantageous to work in symbolic names (which tend to be meaningful and communicate will the usefulness of the variable) and interactions with other instances of the software architecture 10 or some component 16 or 22 or some other software component which is able to interact with the software architecture 10. In software based interactions (non-human interactions) it is advantageous not to use symbolic names as they require more memory to store, more bandwidth to transmit, and more computational cycles to process. Instead, numeric identifiers can be substituted for symbolic names. The software architecture 10 uses the numeric identifier API ID and Op Codes as numeric substitutes for symbolic names. Additional numeric identification is available for any valid occurrence of API Id. Where the former numeric identification is sufficient to provide a unique index per component 16 residing on the network 14 and where the latter, the additional identification information can be obtained using a secondary query requiring a component of the former numeric identification, API Id. Then together, API Id and the additional numeric identification (the latter) provides identification unique within the totality of possible software components able to be represented within the software architecture 10.

FIG. 27 provides an example of use of the client-configured data acquisition scheme using the embedded variable map. Here, Node A registers for an event on Node B using the publicly know API X and Op Code Y that links to the desired event variable. Next, Node C attempts to register for the same event using API X and Op Code Y. Because the API and Op Code pair have previously been registered by Node A, Node C's request is rejected. However, Node C then requests data from the remote (embedded) variable map with the get Remote Variable Data command. Node B responds with information, including the desired variable's memory address. Node C then uses this memory address to register for an event, but this time with a different API and Op Code pair.

FIG. 27 can also be thought of as disclosing two message scenarios relating to the event creation suggested in FIG. 26B. The first scenario describes the Messaging between Nodes A and B both of which communicate via internal communication network 14 and which is compatible with software architecture 10. In the first scenario, Node B is able to comply with the request from Node A. The second scenario describes the Messaging between Nodes C and B both of which communicate via internal communication network 14 and are compatible with software architecture 10. In this scenario, Node B cannot comply with the request from Node C because the API Id and Op Code in message 3 has already been allocated by a previous request. In this case, Node B responds appropriately resulting in a query (5) from Node C resulting in a network message (6) from Node B containing the necessary information allowing Node C to re-create the same NVOEvent memory structure of FIG. 33 with an API Id and OP Code unique to the DynamicMemoryHeap of FIG. 33 of Node B's software architecture 10.

Figure 28:
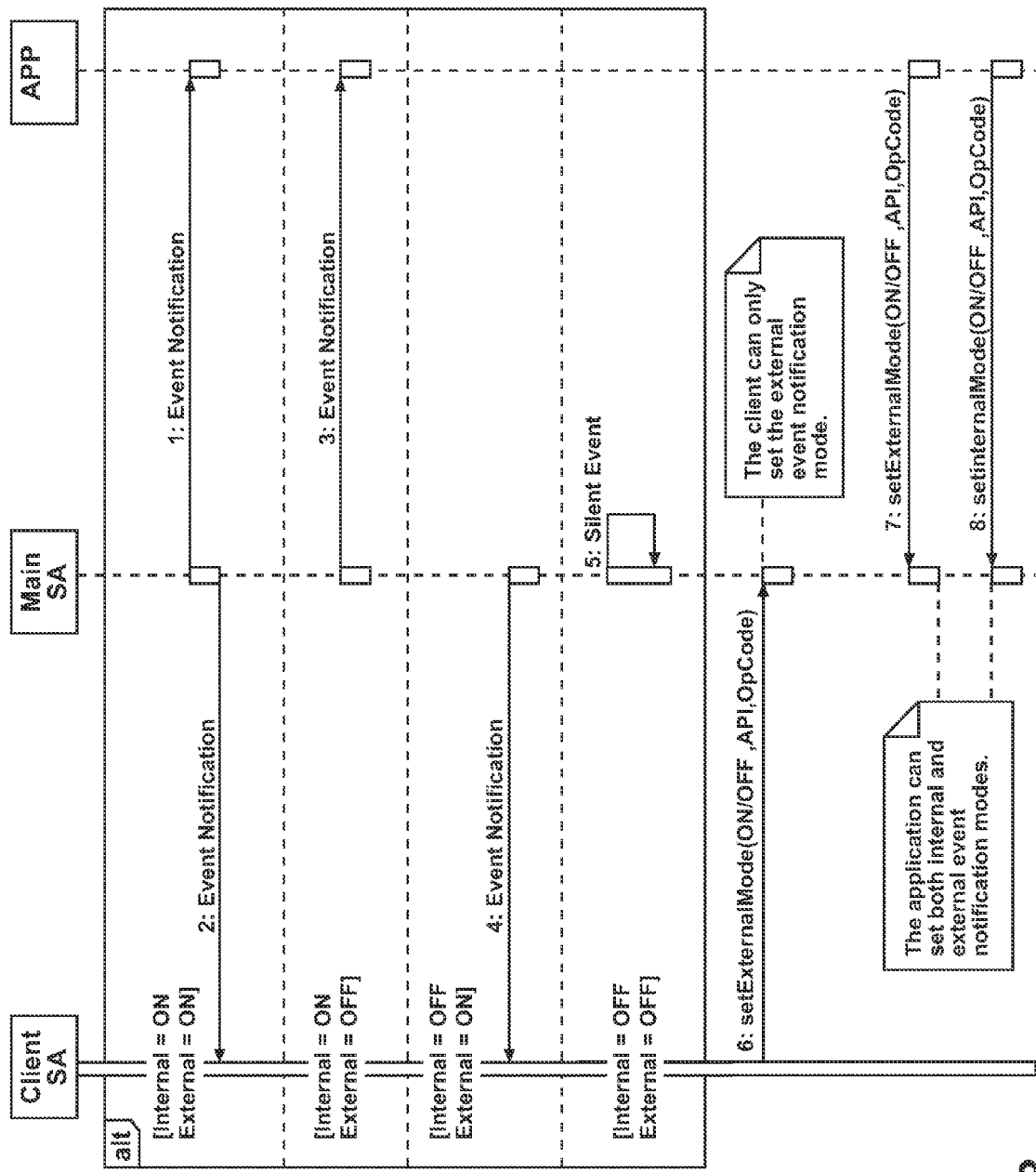
FIG. 28 is a UML sequence diagram of a standard format illustrating the disabling and re-enabling of the realization event requests.

FIG. 28 illustrates the configurable event notification functionality provided by this invention. Preferably, events would only notify external clients when triggered by default. However, it may be desired that this external notification be "muted" at some times without actually removing the event from the DAQ engine 30. Additionally, it may be desired that the internal application within the software architecture 10 be notified when an event occurs. Thus, this invention provides such functionality. As previously discussed, external notification can be altered using the Set External Event On/Off command within the DAQ API. Additionally, the software architecture 10 preferably provides an internal function to turn internal notification on and off. FIG. 28 shows examples of event notifications under the possible configurations.

In this way, the invention has the ability to disable and re-enable the realization of the NVOEvents of FIG. 33 onto the internal communication network 14. In addition, the ability to disable and re-enable the realization of the NVOEvents of FIG. 33 as internal messages sent to software component 16B within the same software operating environment 16A of the software architecture 10.

FIG. 29 illustrates the functionality of an acknowledged event within this invention. In an acknowledged event, the software architecture waits a pre-determined time for an acknowledgement message from the client until processing the next event. If the pre-determined time expires, a pre-determined number of retries are executed. Preferably, all events are assumed to be unacknowledged by default. Thus, after sending an event to the client(s), the DAQ engine 30 immediately processes the next event. However, some applications require that events be acknowledged to insure that the message was received by the event requester. Using this technique, the sender can resend the event if the acknowledgment is not received. The acknowledgment confirms that the requestor has received the event. The advantage to the preferred embodiment of providing the option for acknowledged events is that it is the requestor who determines the necessity of the acknowledgement according to the application requirements. Therefore, when the requestor creates the event using the mechanisms provided by the software architecture 10 within the interface to the DAQ 30, information is included in the message 28A which provides a further classification of the event as acknowledged or unacknowledged. As shown in the example in FIG. 29, upon occurrence of an acknowledged event the software architecture blocks all other event while waiting for an acknowledgment from the client. If no acknowledgement is received, the software architecture 10 will re-send the event after a configurable amount of time. This retry sequence will occur a configurable amount of times, until finally the software architecture stops attempting to send the event and notifies the application through a call-back function of failure.

Figure 30:
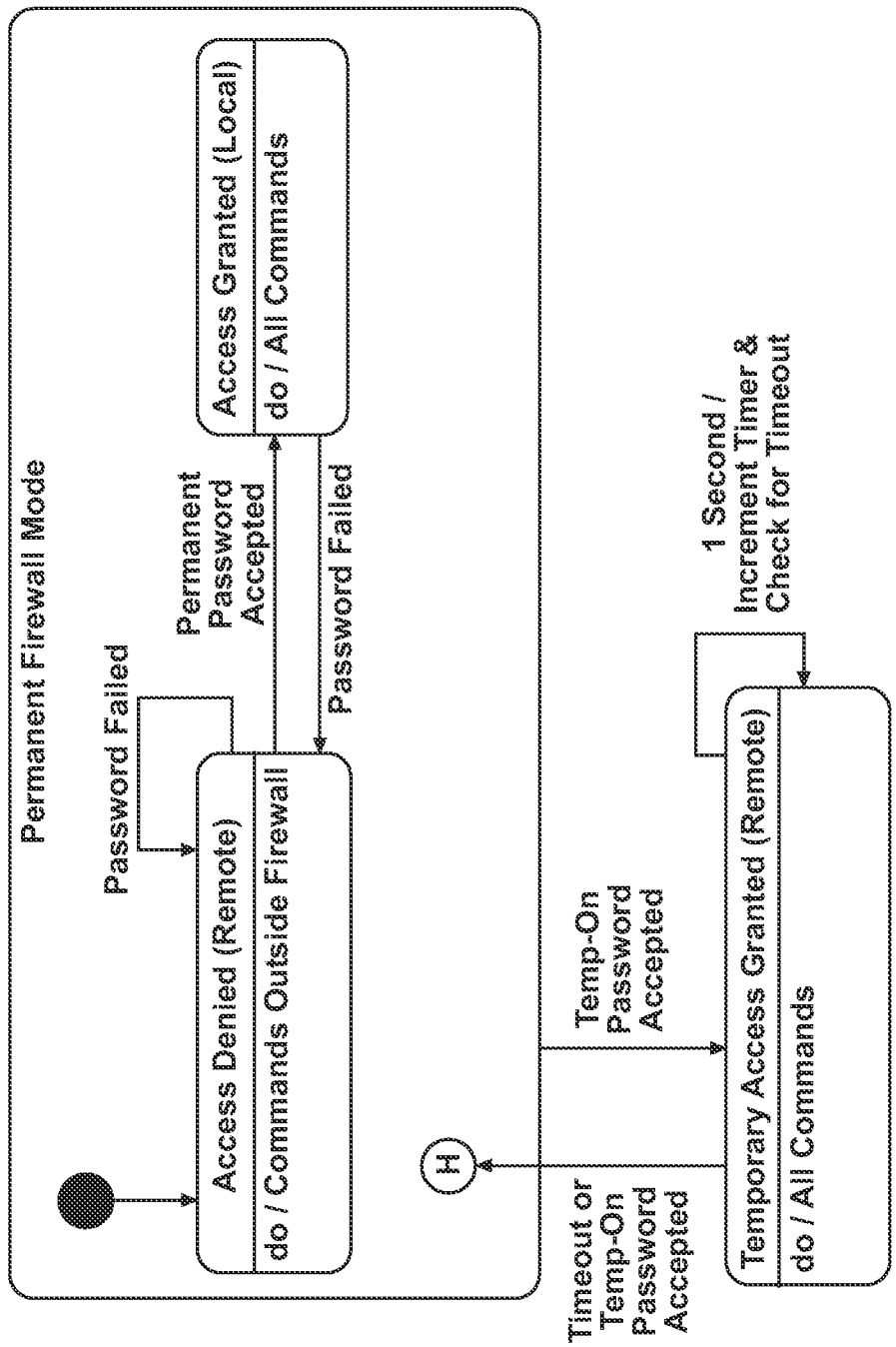
FIG. 30 is a UML state diagram of a standard format illustrating the security modes and firewall provided by this invention.

FIG. 30 illustrates the security features provided within this invention. Because the execution of critical functions by external nodes is possible through the previously described protocols, this invention provides a firewall mechanism to restrict access to command execution. Commands that are deemed safety critical can be listed in a table, preferably in the file SAVariableMap.h, before compilation. Commands can be listed specifically (with an API and Op Code) or as entire APIs (with a specific API and an Op Code=0xFF). The commands listed in this table are claimed to be behind the firewall. As shown in FIG. 30, invention provides three levels of security access: Access Denied, Access Granted, and Temporary Access Granted.

Preferably, all nodes start with an access level of Access Denied by default. In this access level, the node is only allowed to execute the commands in front of the firewall. Thus commands behind the firewall (or listed in the firewall table) are not allowed to be executed. Upon successful submission of a permanent password (within the payload of the Publish Node feedback message), a node is promoted to the Access Granted security level. In this access level, the node is allowed to execute all commands, in front of and behind the firewall. For temporary access behind the firewall, a node can successfully submit a temporary access password (within the payload of the Publish Node feedback message). In this access level, the node is given access to all commands, in front of and behind the firewall, for a configurable amount of time. After this time has expired, the node's access level is reverted to its previous state.

Specifically, FIG. 30 contemplates two passwords each representing a security level recognized by the logic of the command firewall. A password will be transmitted by a component or client when the message of the DAQ API, publish SA Node is broadcast (see bytes 3 and 4 or Op Code 2). One of the passwords represents permanent access to all special commands that are considered to be behind the firewall. The second password will grant temporary access to all special commands that are considered to be behind the firewall. Without a password, clients will have access to all commands which are considered to be in front of the firewall. The engineer responsible for the installation of the software architecture 10 onto a component 16 of the household appliance 12 will determine which commands are in front of and which commands are behind the firewall of FIG. 30.

Figure 31:
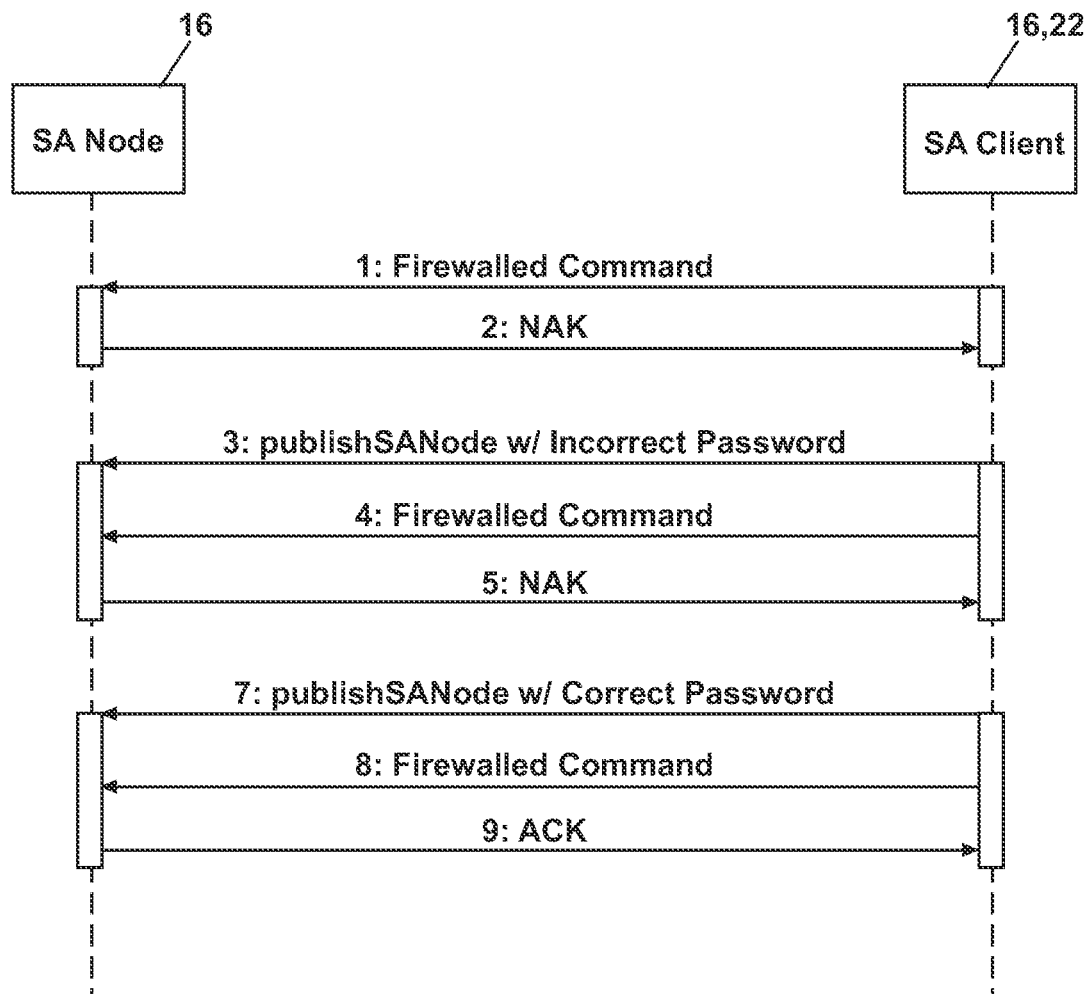
FIG. 31 is a UML sequence diagram illustrating the methods of interaction between a client which must negotiate with the firewall of FIG. 30 before application messaging can be fully processed.

FIG. 31 illustrates an example of operation of the firewall security provided by this invention and shown in FIG. 30. By default, a node does not have access to commands behind the firewall. Thus, as shown, if a node without access attempts to execute a firewalled command, it will be rejected. After an incorrect password submission, the firewalled command will still be rejected. Only after a successful password submission is the node allowed to execute the firewalled command.

Figure 32:
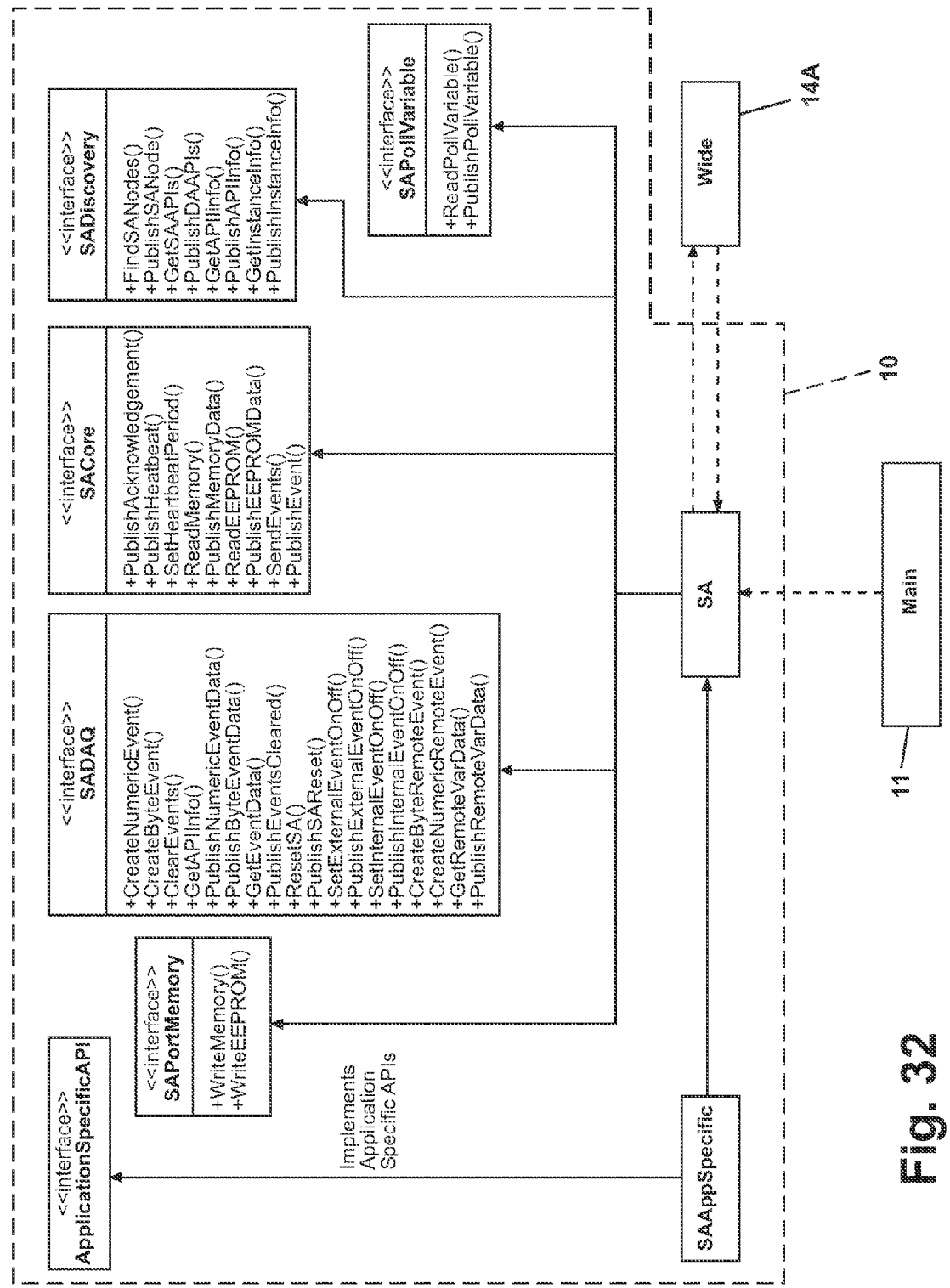
FIG. 32 is a UML class diagram illustrating the standard public interfaces which the SA is able to implement.

FIG. 32 illustrates the standard public interfaces which the software architecture 10 is able to implement. Shown is the ApplicationSpecificAPI which is further populated with useful functionality by the designer according to the needs of the application. Also shown is an example of associations with other software components of the software operating environment with which the software architecture 10 would interact.

FIG. 33 illustrates the preferred implementation of the software architecture 10. Shown are the internal functions and memory allocations needed to perform and support the functionality implied by FIG. 32. Also shown are helper classes (Command Handler, Dynamic Memory Heap, Update Handler, NVOEvent, TimeHandler, WIDECommHandler, MessageParser, and AppSpecificCommandHandler) which show the functional grouping of the internal functions and memory allocations needed. Also shown are the associations between the helper classes.

FIG. 34 shows the preferred organization of source code files of the software architecture 10.

Figure 35:
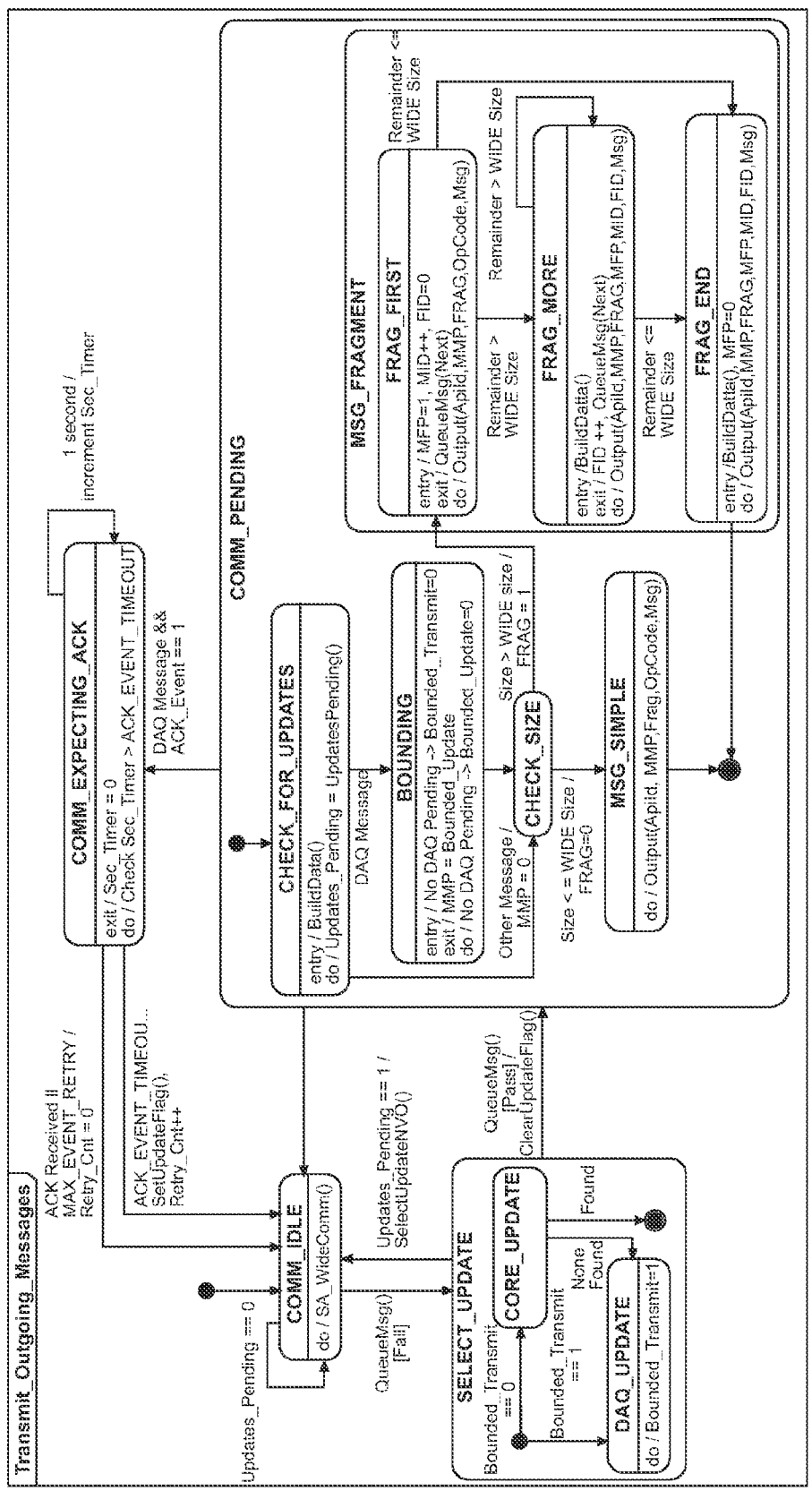
FIG. 35 shows a collection of inter-related UML state diagrams illustrating 3 primary states (COMM_IDLE, COMM_EXPECTING_ACK, and COMM_PENDING), each of which possibly having a plurality of sub-states.

FIG. 35 shows a collection of inter-related state diagrams for three primary states (COMM_IDLE, COMM_EXPECTING_ACK, and COMM_PENDING), with each state possibly having a plurality of sub-states, and so on. The functionality represented here is related to the collaboration associations shown in FIG. 33. Its invocation is also referenced in FIG. 11 as one of the standard interface functions invoked from the MAIN execution loop of the software operating system onto the software architecture 10.

The MAIN function of the software operating environment a6A (shown in FIG. 33 and in FIG. 11) invokes on SA_WideComm( ) shown in the SA class definition (where SA and its aggregate functionality is the Software Architecture 10). The result of the function invocation, is shown in FIG. 35. As shown in FIG. 11, MAIN invokes on SA_WideComm( ) periodically within the software operating systems execution.

FIG. 35 shows a $2^{nd}$ indirect interaction with MAIN which is a result of MAIN invoking on the WIDE function WIDE_EXEC( ). This collaboration is shown in FIG. 11 and in FIG. 35. In this case, WIDE software operating layer within the WIDE_EXEC( ) function invocation calls WIDE.BuildData( ) which in turn calls SA.WideCommHandler.SA_BuildData( ) 52. In FIG. 35, this invocation is shown within the COMM_PENDING state. This path of execution occurs when, in the previous state of COMM_IDLE, the logic within the sub-states of COMM_IDLE result in a pending outbound message for the WIDE network 14. As shown in FIG. 33, this state transition is realized by the invocation of the function WIDE.QueueMessage( ). This invocation, results in the invocation of the logic contained within the COMM_PENDING state of FIG. 35.

The COMM_EXPECTING_ACK state of FIG. 35 is a result of an outbound event having been initially created with a special indicator denoting acknowledgment required. If the event (also referred to as update) which is being operated on within the COMM_PENDING state requires acknowledgment, the state transition from COMM_PENDING will be to COMM_EXPECTING_ACK. In this case, the event will be re-sent, by re-entering the COMM_PENDING state if a time out has expired without receipt of the expected Acknowledgment message. This process will be repeated until either an Acknowledgement is received or until the configurable retry parameter (MAX_EVENT_RETRY which is incremented each time the event is re-transmitted) is exceeded.

FIG. 36 shows a collection of inter-related UML state diagrams. Shown are four primary states (READY, TRANSMIT SNAPSHOT, UPDATES_BLOCKED, and PROCESS_DAQ_EVENTS). The functionality represented here, is related to the collaboration associations shown in FIG. 33. Its invocation is also referenced in FIG. 11 as one of the standard interface functions invoked from the MAIN execution loop of the software operating environment onto the software architecture 10.

The purpose of the functionality represented by FIG. 36 is to evaluate the structures (NVOEvent) 31 of FIG. 33 determining if the conditions for event transmission have occurred, collecting those, and setting the appropriate flags (Updates_Pending & Bounded Update) so that when the State Machines of 35 are executing, events conditions detected by the DAQ 30 are realized as WIDE Packets 24 onto the WIDE bus 14.

Figure 37:
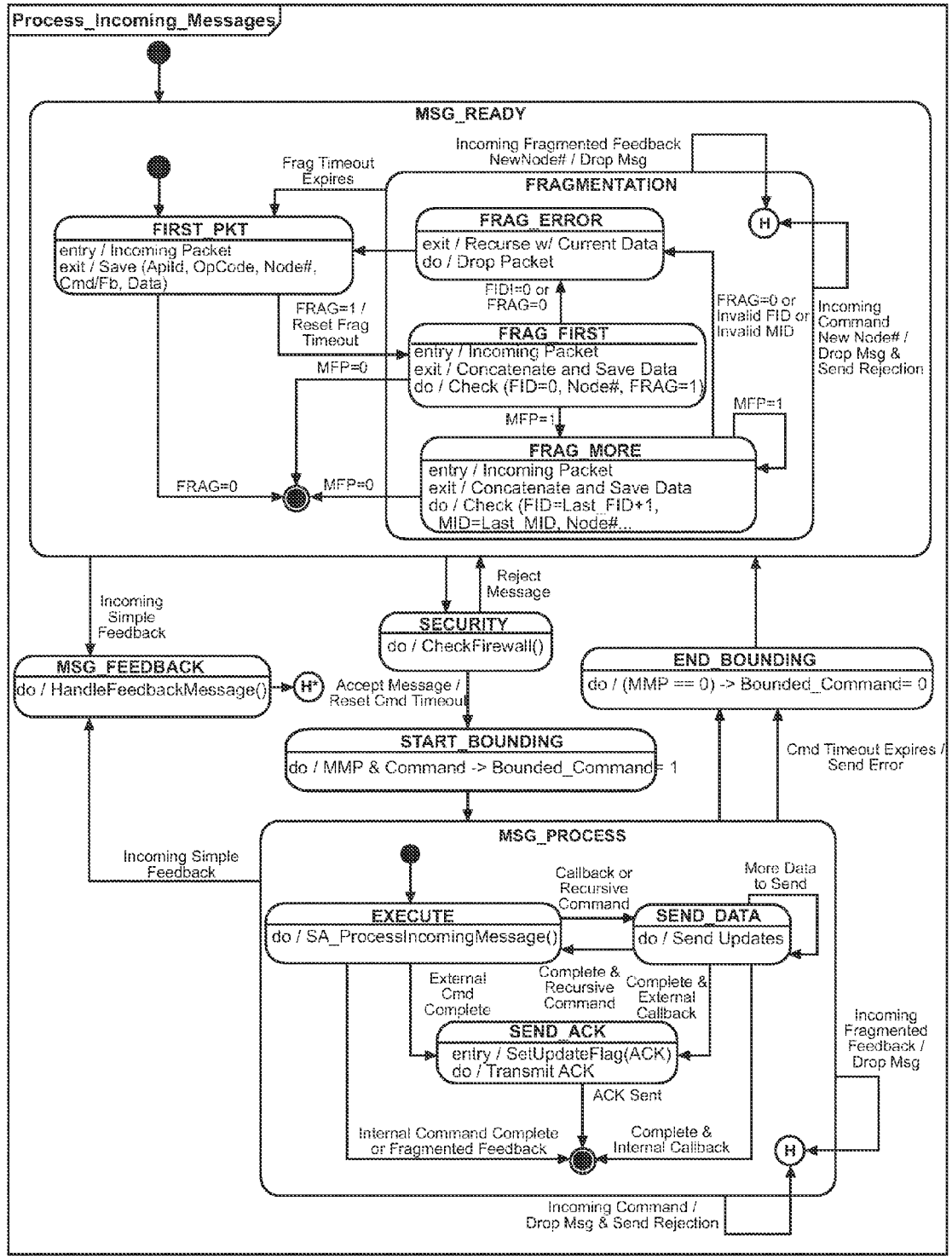
FIG. 37 shows a collection of inter-related UML state diagrams illustrating 2 primary states (MSG_READY and MSG_PROCESS).

FIG. 37 shows two primary states (MSG_READY and MSG_PROCESS). The functionality represented here is related to the collaboration associations shown in FIG. 33 where WIDE calls SA.WideCommHandler.SA.AcceptData( ). Invocation into these state machines are also referenced in FIG. 11 as functions invoked from the MAIN execution loop of the software operating system onto the software architecture 10 where MAIN calls SA.SA_ProcessIncomingEvents( ). These inter-related state machines govern the execution of incoming commands, responses to requests, and the handling of events.

Figure 38:
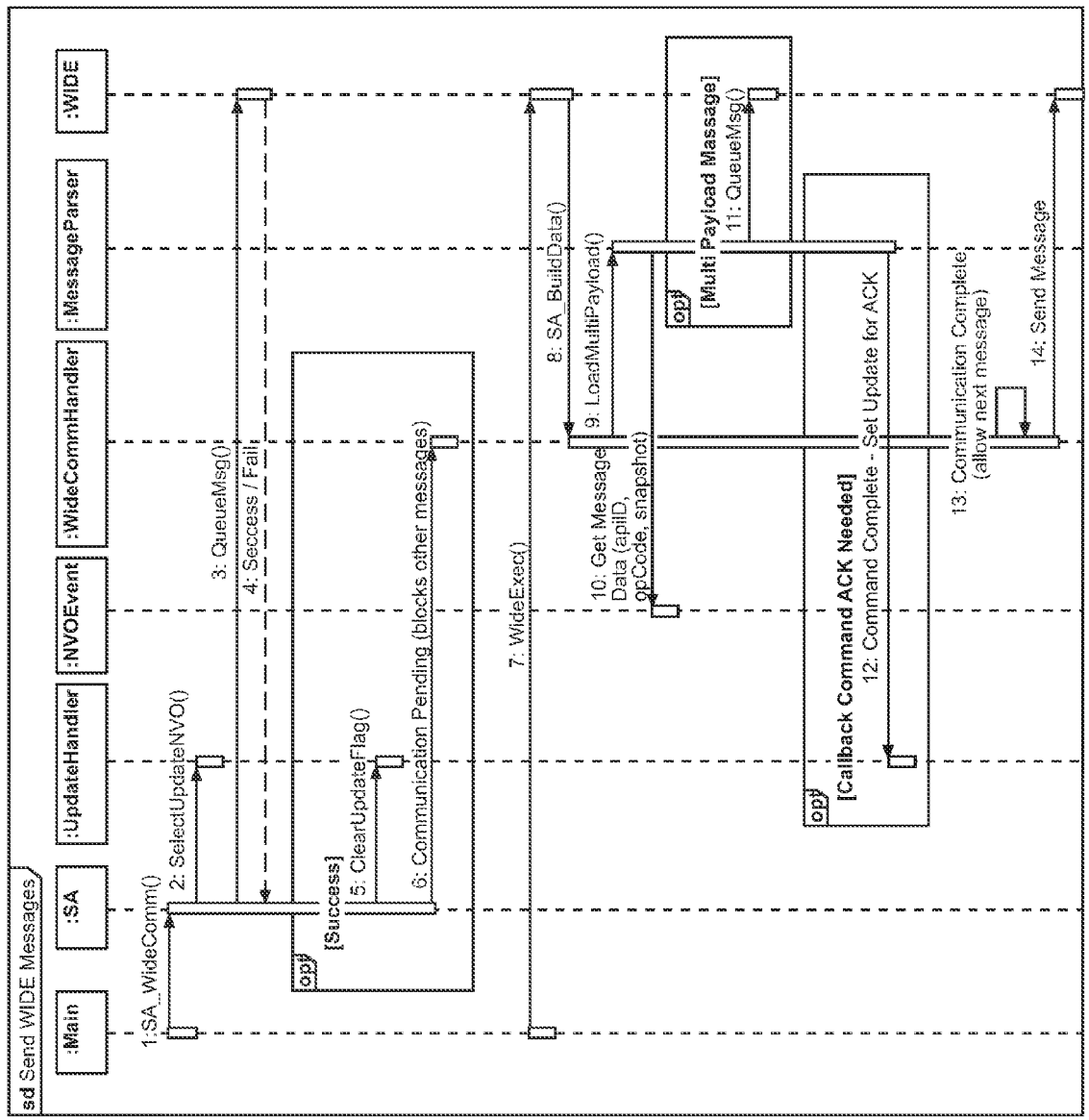
FIG. 38 is a UML sequence diagram illustrating the execution of an ordered collection of internal messages between components for the purpose of producing a network message on the internal network from the SA.

FIG. 38 shows the execution of an ordered collection of messages of the classes in FIG. 33 of the software operating environment. These messages represent the execution path for a common set of logic referenced as 'Send WIDE Message' in FIGS. 39, 40, 41, and 42. The invocation from MAIN and WIDE (via WIDE_EXEC( )) are shown in FIG. 11.

Figure 39:
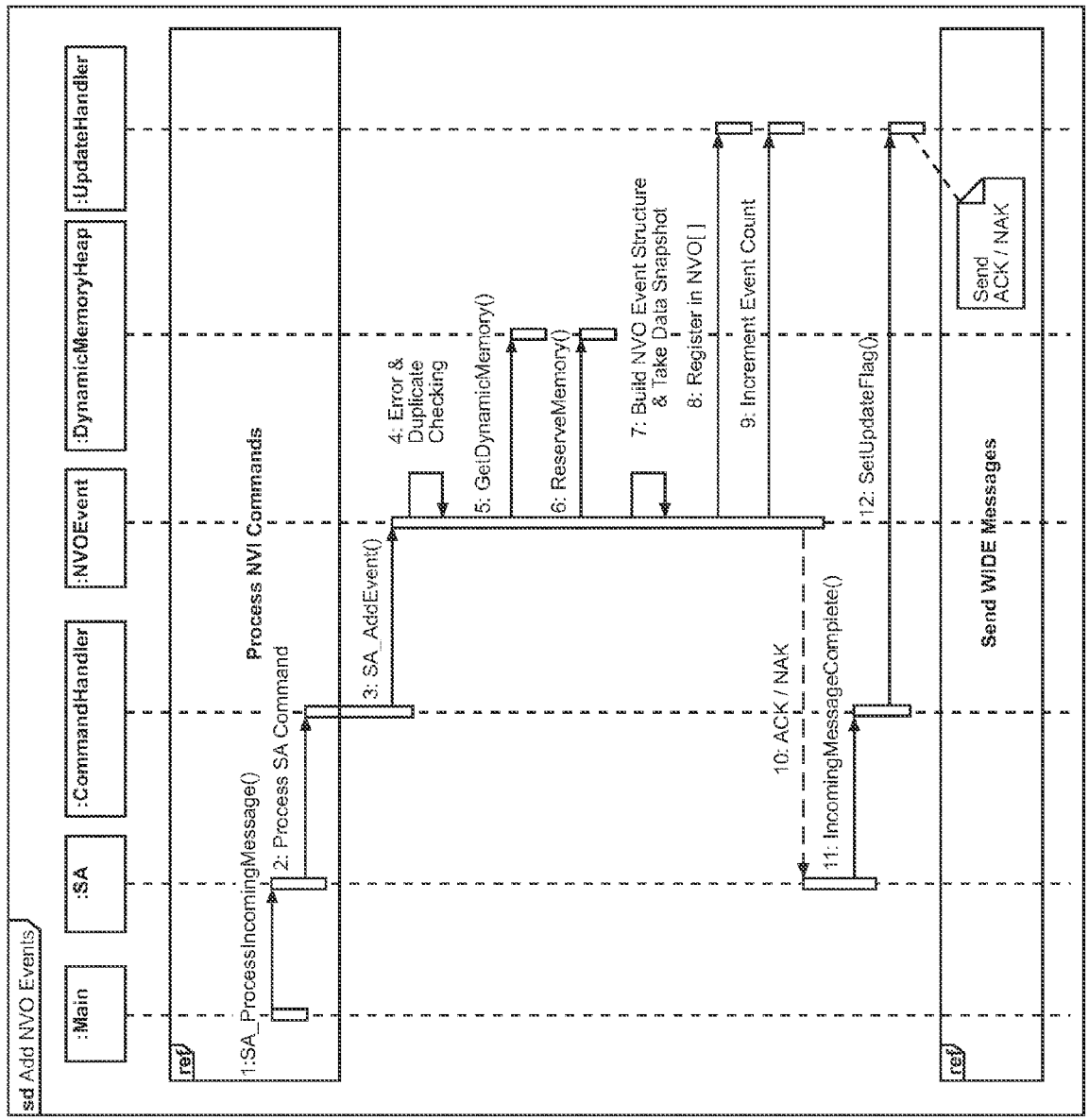
FIG. 39 is a UML sequence diagram illustrating the execution of an ordered collection of messages of the classes in FIG. 33 of the software operating environment.

FIG. 39 shows the execution of an ordered collection of messages of the classes in FIG. 33 of the software operating environment. These messages represent an interaction within a software operating environment containing the software architecture 10. The invocation from MAIN is shown in FIG. 11. The diagram illustrates the messaging required to add a well formed NVOEvent memory structure to the DynamicMemoryHeap.

Figure 40:
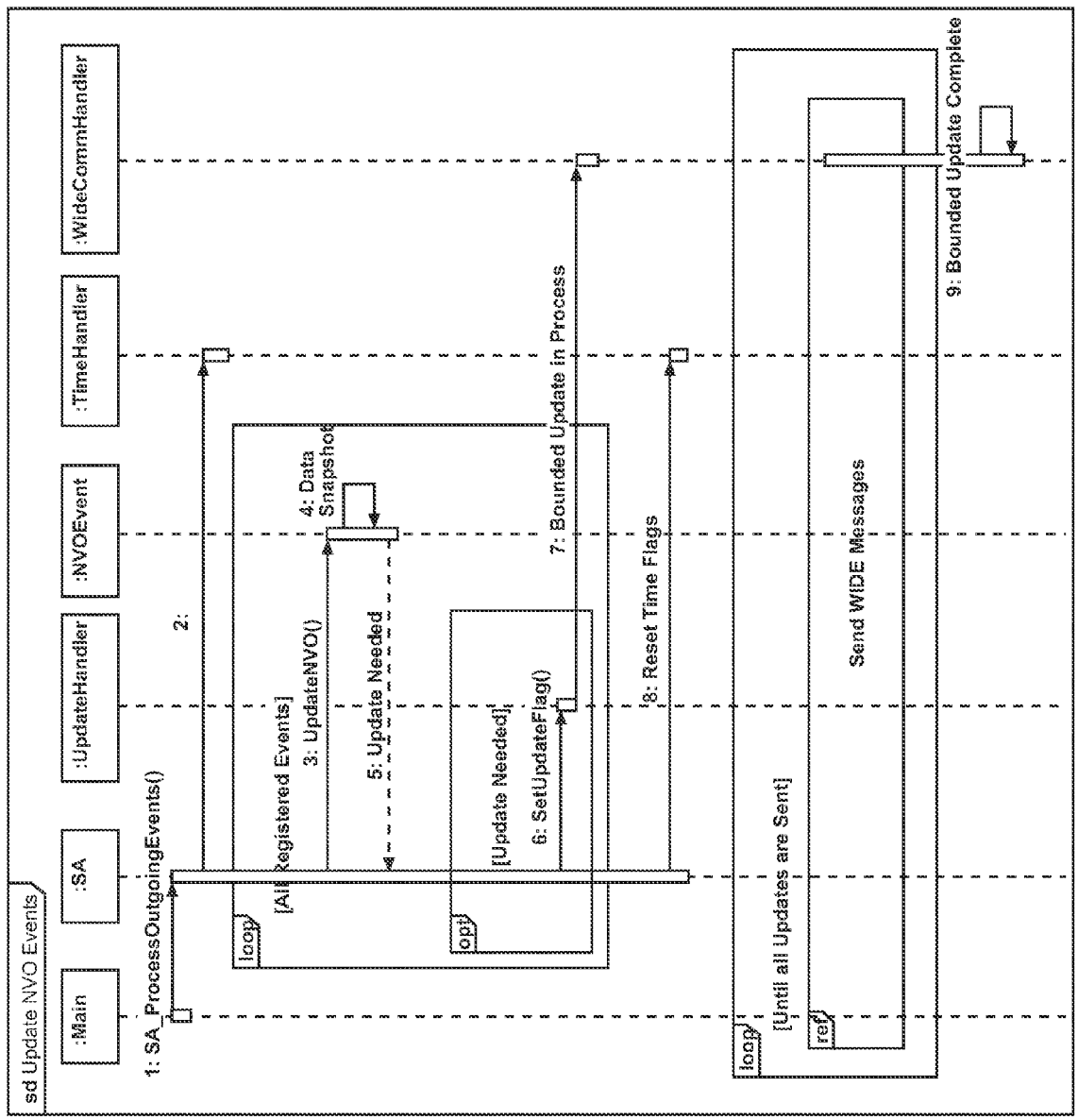
FIG. 40 is a UML sequence diagram showing an ordered collection of messages of the classes in FIG. 33 of the software operating environment.

FIG. 40 shows an ordered collection of messages of the classes in FIG. 33 of the software operating environment. These messages represent an interaction within a software operating environment containing the software architecture 10. The diagram illustrates the message execution of FIG. 37. And the invocation from MAIN is shown in FIG. 11. The purpose of the functionality represented by the diagram is to evaluate the NVOEvent memory structures contained within the DynamicMemoryHeap, collect those and their appropriate data values whose event triggering criteria have been met, and to insure a realization of packets 24 onto the internal communication network 14 for the purposes of notifying other clients 16/22 of the NVOEvents which have met there trigger criteria and the associated data values.

Figure 41:
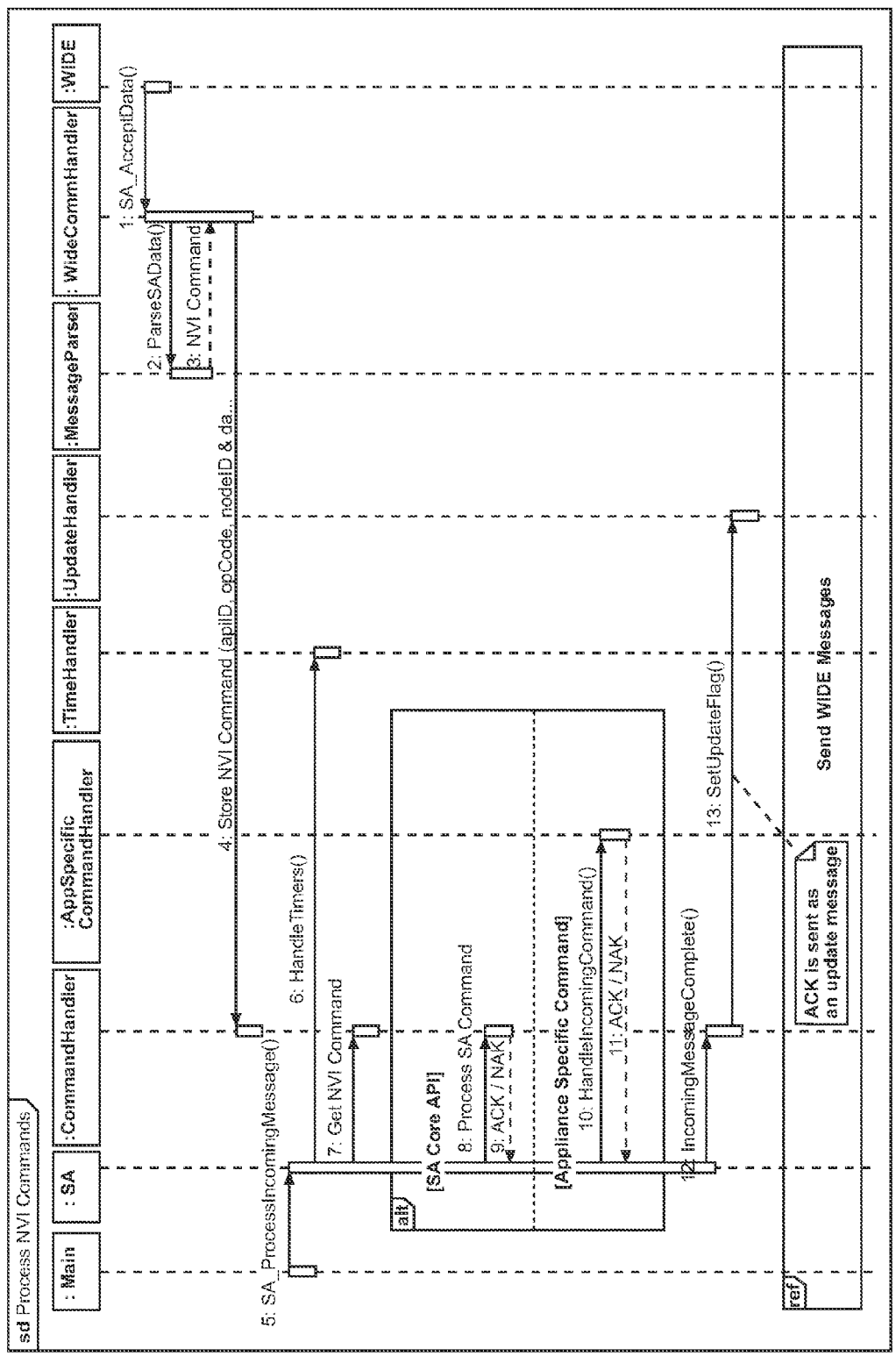
FIG. 41 is a UML sequence diagram illustrating the messaging required to process incoming messages from the WIDE bus 14 from clients 22/16 which do not require a response containing meaningful data other than a response transmitting the success or the reason for failure of the incoming message (the ACK or NAK of API ID=1, Op Code=1).
Figure 42:
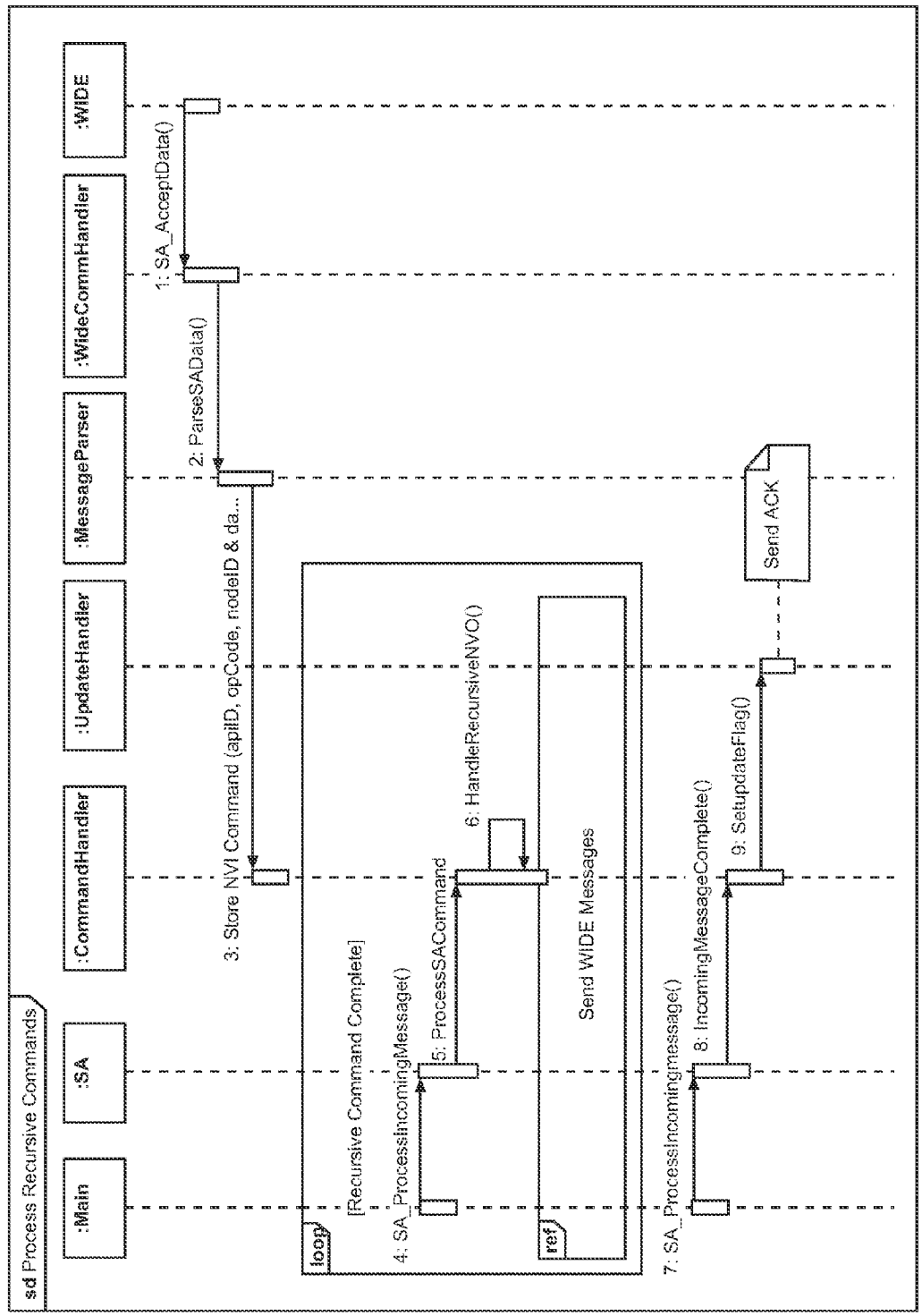
FIG. 42 is a UML sequence diagram illustrating the messaging required to process incoming messages from the WIDE bus 14 from clients 22/16 which require a plurality of response messages containing meaningful data in addition to a response which transmits the success or the reason for failure of the incoming message (the ACK or NAK of API ID=1, Op Code=1).
Figure 43:
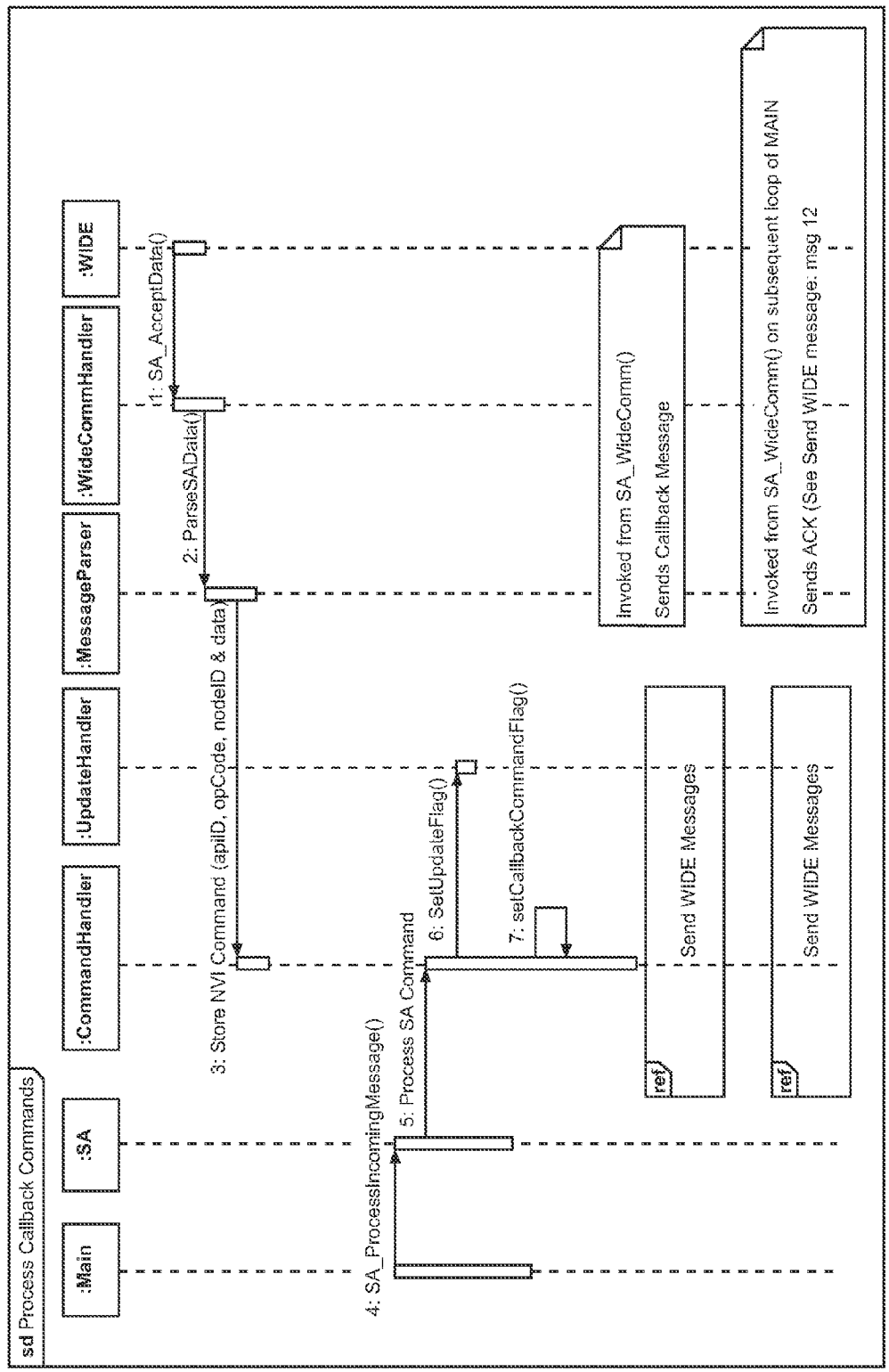
FIG. 43 is a UML sequence diagram illustrating the messaging required to process incoming messages from the WIDE bus 14 from clients 22/16 which require a single response messages containing meaningful data in addition to a response which transmits the success or the reason for failure of the incoming message (the ACK or NAK of API ID=1, Op Code=1).

FIGS. 41, 42, and 43 show an ordered collection of messages of the classes in FIG. 33 of the software operating environment for the purpose of processing incoming commands (NVOs) from the Network 14. These messages represent an interaction within a software operating environment containing the software architecture 10. The invocations from MAIN and WIDE (via WIDE_EXEC( )) are shown in FIG. 11. The figures, described individually in subsequent paragraphs, represent 3 cases of alternate paths for execution.

FIG. 41 illustrates the messaging required to process incoming messages from the internal communications network 14 from clients 22/16 which do not require a response [Command-NoReponse] containing meaningful data other than a response transmitting the success or the reason for failure of the incoming message (the ACK or NAK of API ID=1, Op Code=1).

FIG. 42 illustrates the messaging required to process incoming messages from the WIDE bus 14 from clients 22/16 which require a plurality of response messages [Command-MultipleResponseRequired] containing meaningful data in addition to a response which transmits the success or the reason for failure of the incoming message (the ACK or NAK of API ID=1, Op Code=1).

FIG. 43 illustrates the messaging required to process incoming messages from the internal communication network 14 from clients 22/16 which require a single response messages[Command-SingleResponseRequired] containing meaningful data in addition to a response which transmits the success or the reason for failure of the incoming message (the ACK or NAK of API ID=1, Op Code=1).

Taxonomy Control

A typical prior art approach to using a new controlling device to control an appliance is to have the software component of the new controlling device duplicate the logic of the appliance controller so that the new controlling device does not inadvertently request the software component of the appliance controller to perform an operation of which it is incapable. This prior art approach further requires communications between the appliance and the new controlling device regarding the current state of the appliance. This prior art approach is inefficient since it requires a lot of overhead on the new controlling device and takes time to be loaded on to the new controlling device and translated into a form understandable by the new controlling device. Furthermore, this prior art approach requires that a variant of the software component for the appliance controller must be constructed for each new appliance and each time the appliance gets a new or altered functionality.

The purpose of a control taxonomy is to avoid requiring this duplication of software logic (often called business logic) between two interacting software components in a controlling device and a controlled appliance. In particular this permits a command generator in a controlling device to readily control an appliance without any information about the appliance being controlled except the control taxonomy itself. This can increase the flexibility of introducing "generic" control devices to control new appliances, adapting control devices to newly available cycles or functionalities which have been added to an appliance, and switching appliances between modes of operation where different operating cycles or functionalities are available. It also makes control of appliances easier for users since they need only be presented with choices which are currently available from the appliance.

The present invention uses a structured taxonomy dataset to efficiently communicate to the controlling device just that information which the controlling device needs in order to generate a well formed command for the appliance. As used herein, a well formed command is a command which has meaning and is performable by the appliance. The information conveyed by the dataset includes a hierarchy of options and data inputs required to form the well formed command. In the preferred embodiment, it also includes semantic or contextual information to communicate in word or iconic form the available options so that a user can understand the available choices and enter the appropriate data. This is preferably accomplished by labels within the dataset that are associated with arbitrary or non-user friendly identification elements. This allows the logic of the software componentry which must interpret and process the taxonomy to be decoupled from the presentation of the taxonomy on a user interface (e.g., foreign language, labels, units).

Figure 44:
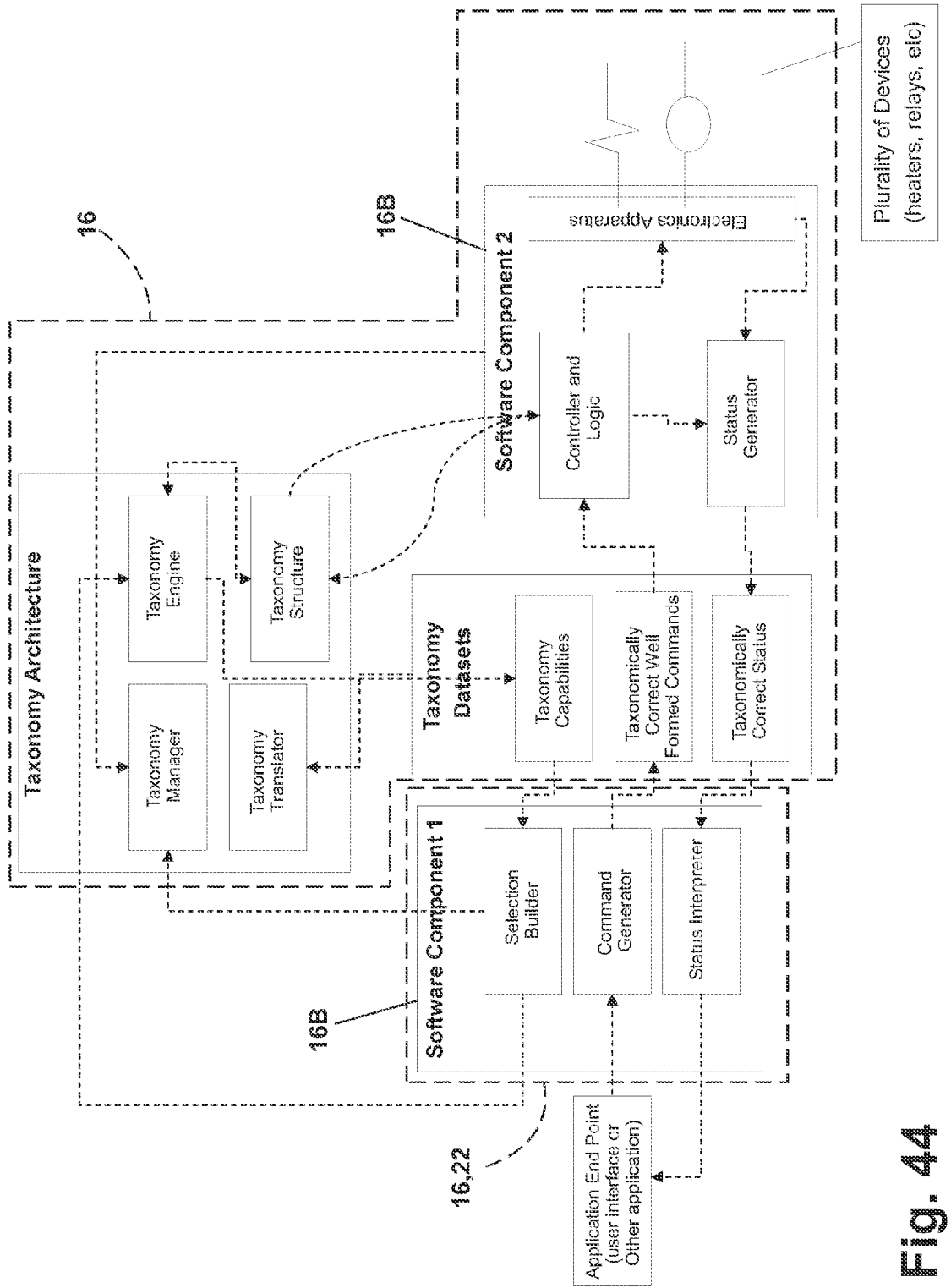
FIG. 44 schematically illustrates a taxonomy control using a taxonomy dataset in combination with the software architecture to control the operation of one or more components within the appliance without direct knowledge of the functions for the component.

Referring to the FIG. 44, generally, illustrating the improved control structure and method of the present invention, the appliance 12 being controlled has a software component 2 16B having a appliance controller and status generator. The controlling device 16, 22 used to control the appliance has a software component 1 16B with a command generator, a selection builder and a status interpreter. The controlling device 16, 22 may be a programmable user interface such as a PDA, web tablet, a cell phone, an LCD attached to the appliance or a client device.

The taxonomy architecture, shown disposed in the appliance controller 16 and logic, may alternatively be disposed in a remote location, such as in a controlling device or on the internet. The taxonomy architecture includes a taxonomy generator, a taxonomy engine, a taxonomy translator and a taxonomy structure. The taxonomy architecture generates a taxonomy dataset defining taxonomy capabilities facilitating the creation, by the software component 1, of well formed commands that can be executed by software component 2. Each of these components and their interrelationships are described in greater detail below.

Creation of the Taxonomy Dataset

The taxonomy dataset is derived from the operational capabilities of the appliance controller 16 structured in a manner to allow the command generator in the software component 1 to interpret the dataset to accomplish several results. More particularly, from time to time the taxonomy engine uses the taxonomy structure and the state aware information to generate a taxonomy dataset reflective of the subset of the universe of options for commands that would be available from an appliance to those that are currently available from the appliance.

For example, the taxonomy dataset describes the available functions supported by a software component 16B, each functions argument, and the valid values of each argument in a data structure. In addition, taxonomy dataset defines the valid values of feedback variables. Since this in a data structure, it can be transmitted and re-transmitted to clients 16 or 22 as required. Changes to taxonomy dataset occur as the cycles of operation progress and the available commands or the valid values of their arguments change. Moreover, additional commands may become available or may become invalid as the cycle of operation progresses from Idle (see FIG. 7).

More particularly, the selection builder registers with the taxonomy manager to receive notifications for new taxonomy engines. In response, the taxonomy manager passes references to all known taxonomy engines back to the selection builder. The selection builder then requests from each taxonomy engine a taxonomy capabilities data set. The taxonomy engine evaluates a taxonomy structure comprised by the controller logic of software component 2 or, alternatively, a document to generate a taxonomy capabilities dataset. The selection builder then populates a set of pseudo command structures appropriate for an application end point and passes those structures to the application end point allowing the application end point to be configured. Examples of application end points are user interfaces for control or service, or other intermediate application layers, like an energy controller or home automation mode such as vacation or goodnight. Alternatively, the selection builder may directly configure the application end point.

Communication and Use of the Dataset.

When a controlling device is networked with the appliance, the taxonomy manager establishes a relationship between the software component 1 and the taxonomy architecture allowing the command generator to query for the existence of taxonomy datasets, providing the software architecture 10 access to a taxonomy dataset, and allowing the command generator and status interpreter to subscribe to taxonomy dataset updates. The taxonomy translator is an optional component that translates the taxonomy datasets between software components 1 and 2.

The taxonomy dataset is communicated to the controller of software component 2 and to the selection builder of software component 1. Optionally, the taxonomy translator translates the taxonomy dataset to a different schematic definition of the command generator.

The command generator uses the taxonomy dataset to construct and populate a set commands structures available for selection by a user interface or other client applications comprising a set of valid commands, their valid arguments, and each arguments valid values. More particularly, the command generator uses the taxonomy dataset to construct one or more well formed commands which can then be transmitted to the controller. Since the taxonomy dataset can be reset and sent at different times by the taxonomy engine, or the dataset can be updated by revisions from the taxonomy engine, the command generator can have a current set of command structures then available for selection by a user interface or other client application.

Thus, in essence, through use of the taxonomy architecture, the software component 2 or its proxy (the taxonomy translator) communicates to software component 1 a rule set that can be interpreted by software component 1 so that software component 1 does not request something of software component 2 which software component 2 cannot accommodate and does not operate on a state variable which is set to an invalid value.

Before the application end point is able to commence execution, it will request or register for status updates with a status interpreter. This will allow the application end point to be populated with valid state variables from the controller before logic is executed and before user interface componentry is rendered. The status interpreter will process taxonomically correct status datasets and validate those datasets against the taxonomy capabilities data set. The status interpreter request or register for status updates from the status generator of software component 2 via the taxonomy engine. Upon receipt of a taxonomically correct status, the status interpreter will provide new status values to the application end point.

The application end point executes resulting in a rendering of the current status of software component 2 and a rendering of selectable pseudo command structures. Each time a selection is made from the pseudo command structure, the selection builder populates a set of valid sub-commands appropriate for the selection for further selection by the application end point. When a complete selection is made, a structure containing all pseudo commands are passed to the command generator.

The command generator will construct a taxonomically correct well formed command and optionally via the taxonomy translator, invoke the command onto the controller of software component 2 via the taxonomy engine.

Execution

The well formed command is delivered to the controller of the appliance and executed by the appliance.

Typically, the command will result in a state change to the associated memory of software component 2, which will trigger a status update created by the status generator and resulting in new renderings of state to the application end point. This change in state will result in a new capabilities taxonomy or a partial capabilities taxonomy which can replace portions of the original capabilities taxonomy. The new capabilities taxonomy resulting in a different set of valid selections for controlling the cycles of operation of software component 2.

Validation

The status interpreter uses the taxonomy dataset to validate status updates from the controller or taxonomy translator. The dataset contains information structured in such a way to allow the controller to fully validate incoming commands according the structure without additional logic outside of the dataset. For example, the dataset can be conceptually thought of as one or multiple decision trees, with each level of the taxonomy forming a different decision branch, with each of the options and/or data inputs can form a different level. The key presses on the user interface required to select the options and/or data inputs in forming the well formed command can be compared against the decision tree to confirm that each key press is found within a common branch on the decision tree. If the key presses are not found, then it is an indication that the command contains an error. The taxonomy structure thus serves to populate the user interface with available options and data inputs for a given state of the appliance and also serve as the logic for validating the resulting command.

The taxonomy dataset can be thought of as all available options and settings for an appliance at the current state. For example, the appliance comprises multiple components interconnected by the internal network. Each of the components can have one or more devices. Each of the devices has one or more functionalities, which has one or more settings. All of the functionalities for all of the devices will not necessarily be available during each state of the appliance. As such, the taxonomy dataset will comprise all options and data inputs for all devices that are currently available.

FIGS. 45-48 illustrate one example of the Taxonomy control in the context of a user interface 16, 22 for a microwave that is populated with a taxonomy dataset indicating the available functions of the appliance 12 for the current state. The user can select from the parameters of the dataset to form the well formed command that will be issued to control the operation of the appliance 12.

Figure 45:
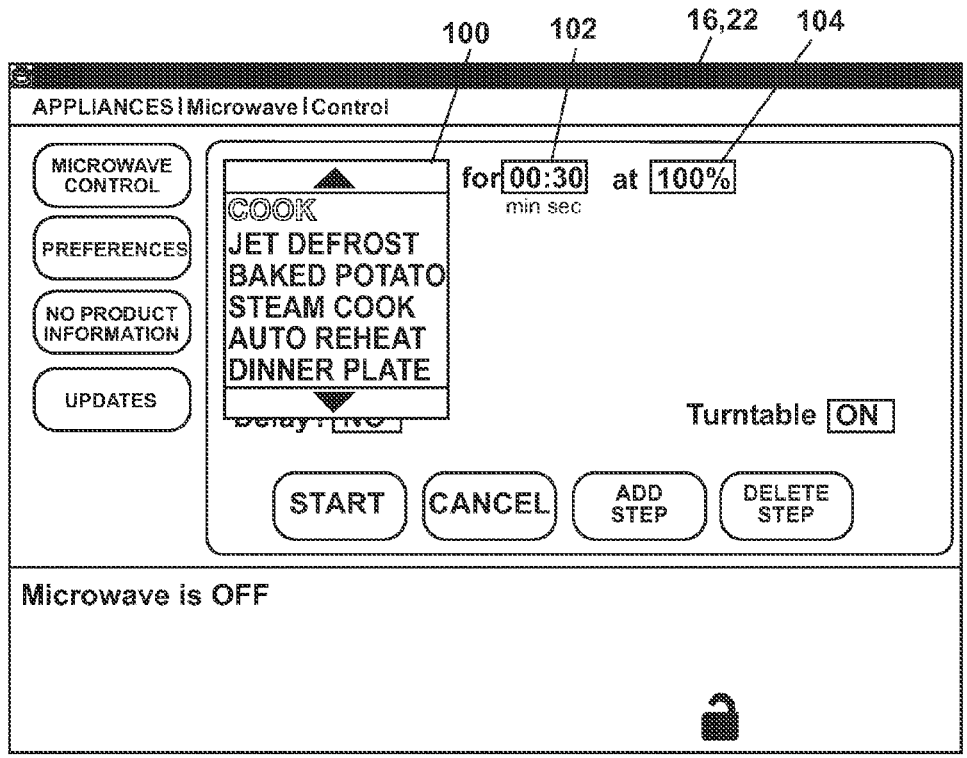
FIG. 45 schematically illustrates a user interface populated by a taxonomy dataset comprising a hierarchy of options and data inputs that will lead the user to selecting options and data inputs to generate a well formed command.

FIG. 45 illustrates the available hierarchy of options and data inputs. The top level of the hierarchy begins with the cycle 100, which is shown to have the options of COOK, JET DEFROST, BAKED POTATO, STEAM COOK, AUTO REHEAT, AND DINNER PLATE, as illustrative examples. The user must select one of the options from the top level.

Figure 46:
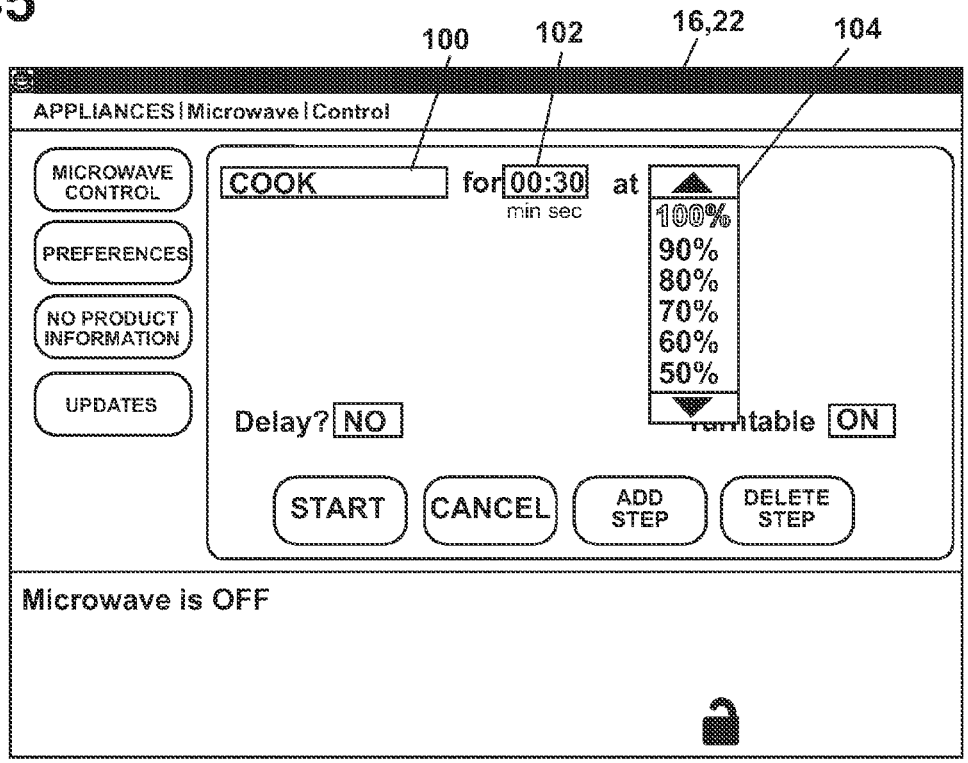
FIG. 46 schematically illustrates the options available for a top level option selection with associated data inputs.

Once the user selects an option from the top level, the next level of the hierarchy is exposed to the user based on the top level selection. In FIG. 46, the user has selected the COOK option and the user interface then displays data inputs, in the form of TIME 102 and POWER LEVEL 104, available for that option and necessary to form the well formed command.

Figure 47:
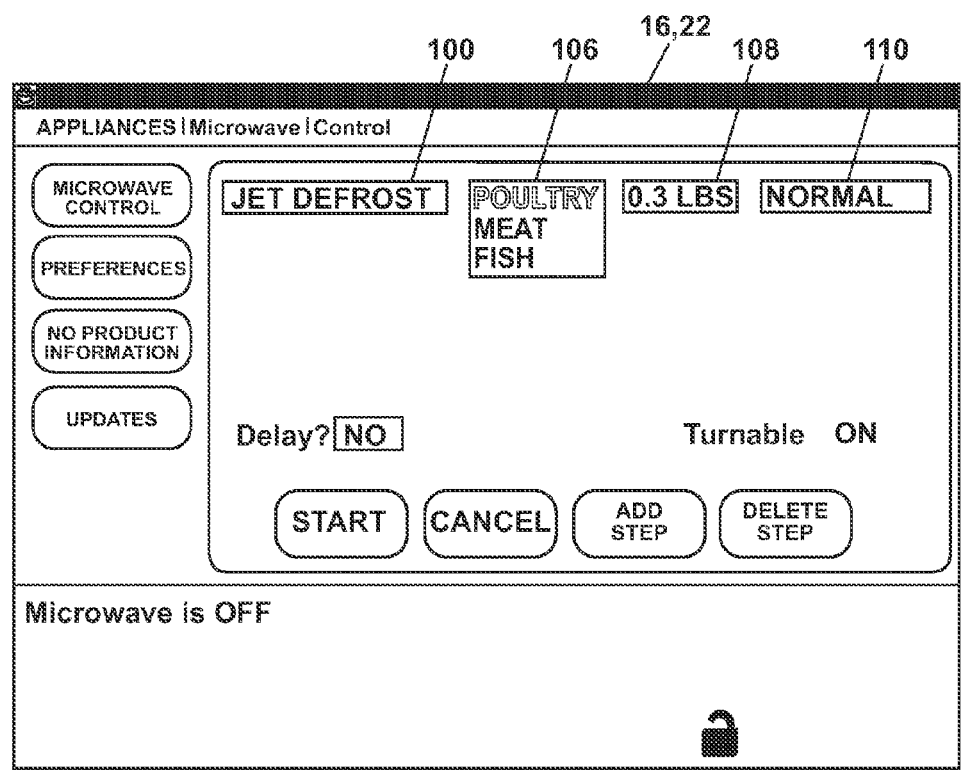
FIG. 47 schematically illustrates the options available for a sub-level option selection with associated data inputs.

FIG. 47 illustrates the situation were the selection of a top level option exposes options at a sub-level. In FIG. 47, the JET DEFROST is selected, which exposes the sub-level of types of meat 106. The user must select the appropriate meat option in completing the well formed command. Data inputs in the form of weight 108 and defrost level 110 are exposed and must be selected to complete the well formed command.

Once the user has selected the options and data inputs from the taxonomy dataset accessed by the user interface, the command generator will form the well formed command and send it to software component 2 on component of the appliance for implementation. This is done only after the well formed command has passed through the validation process. The controller and logic of software component 2 then uses the well formed command to control the operation of the devices to effect the well formed command.

A detailed example of the creation of the taxonomy dataset and the well formed command should prove useful. The creation of the taxonomy dataset for the microwave of FIG. 45 that discloses multiple cooking cycles was constructed by the selection builder from the taxonomy capabilities dataset as is illustrated in XML as follows:

```
<device id="microwave" label="Microwave Oven">
    <device id="ovenCavity" label="Microwave Oven">
        <char name="cycle" label="Cycle" default="timedCook">
            <setting name="timedCook" label="COOK" />
                <char name="turntable" label="Turntable"
                default="on">
                    <setting name="on" label="ON" />
                    <setting name="off" label="OFF" />
                </char>
                <range name="duration" label="Duration"
                default="30" units="seconds" max="6039"
                min="60" inc="1" />
                <range name="power" label="Power Level"
                default="100" units="%" max="100"
                min="50" inc="10" />
            </setting>
            <setting name="jetdefrost" label="Jet Defrost"/>
                <char name =foodType label ="Food Type"/>
                    <setting name="poultry" label="POULTRY" />
                    <setting name="meat" label="MEAT" />
                    <setting name="fish" label="FISH" />
                </char>
            </setting>
            |
            |
            |
            etc
        </char>
```

-continued

```
        </device>
</device>
```

If the user of the microwave of FIG. 45 chooses to Cook for 30 seconds at 90% power with the turntable on, a well formed command of the taxonomic schema would be transmitted optionally to the taxonomy translator and to the taxonomy. The command of the form:

```
            <command id=" microwave ">
              <device id="ovenCavity">
                <sequence>
                  <step id="21">
                    <char name="cycle" setting="bake"/>
                    <char name="power" setting="90"/>
                    <char name="duration" setting="30"/>
                    <char name="turntable" setting="on"/>
                  </step>
                </sequence>
              </device>
            </command>
```

The taxonomy engine would then traverse the taxonomy structure to transform the well formed command of the taxonomic schema to a well formed command of the controller of software component 2 of the packet structure 28. The taxonomy structure is a superset of the taxonomy capabilities dataset. For each specifiable command element above (i.e. cycle, power, duration, and turntable) an additional collection of key words and values necessary to form packet structure 28A would be associated within the taxonomy structure. These key words would include API Id, Op Code, and position index into the packet structure 28A where position index could be a byte offset or a bit offset.

The taxonomy dataset could be constructed to directly represent the universe of possible commands of the APIs of software architecture 10 providing useful functionality for a service, factory, or laboratory engineer or technician.

Figure 48:
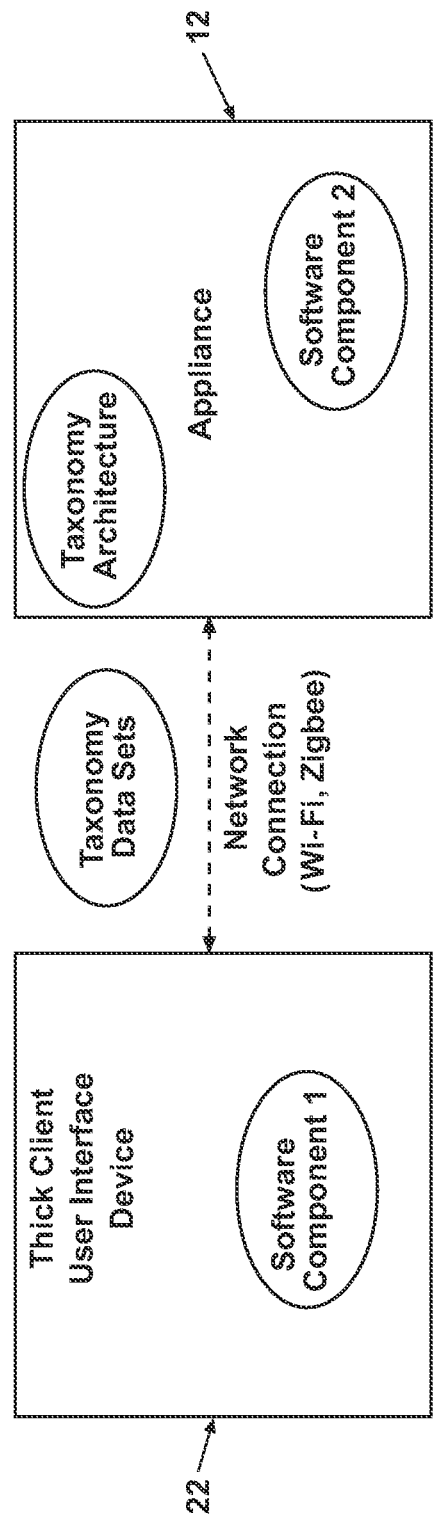
FIG. 48 schematically illustrates one embodiment of a taxonomy architecture according to the invention.
Figure 49:
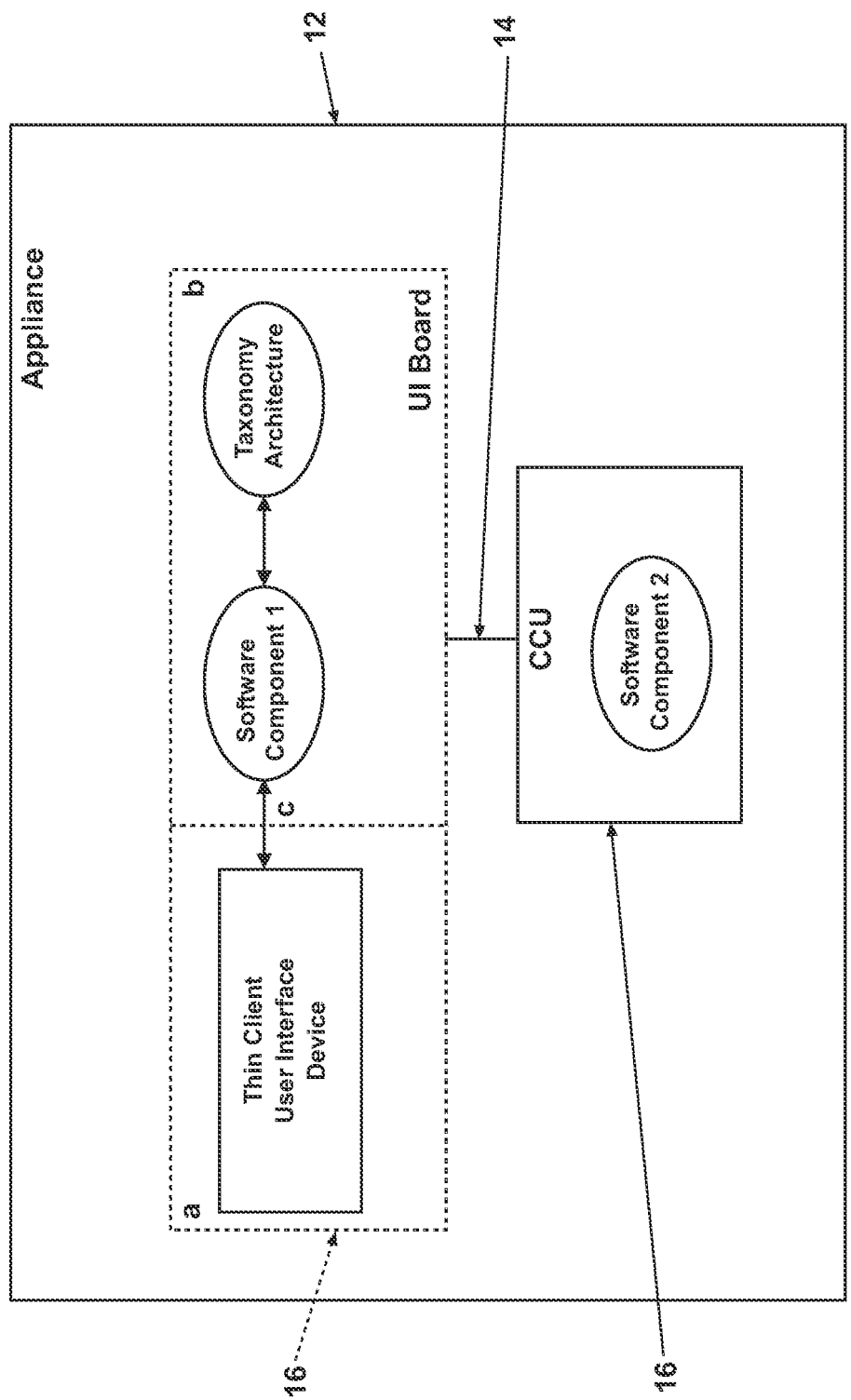
FIG. 49 schematically illustrates a second embodiment of a taxonomy architecture according to the invention.

Referring again to FIG. 44, it will be understood that the structure illustrated in FIG. 44 is more conceptual than physical. FIGS. 48 and 49 show embodiments of the taxonomy architecture of FIG. 44, partitioned according to the physical architecture of an appliance or an appliance network as shown, for example, in FIG. 1.

The software component 1 (16B in FIG. 44) is represented as being within a remote client 22, such as a remote controller with a user interface. Consequently, the sub-components of software component 1 (the selection builder, the command generator, and the status interpreter) are specialized for this user interface application. FIG. 48 shows software component 1 in such a user interface device, identified here as a "thick client." A thick client would have the ability to parse a data structure such as an XML document, interpret its meaning, and implement the 'Selection Builder' functionality. Software component 2 and the taxonomy architecture reside in the appliance 12.

FIG. 49 depicts a second embodiment of the taxonomy control architecture where all components are included within an appliance 12. In the structure of FIG. 49 the taxonomy architecture uses a taxonomy translator (not necessary in the embodiment of FIG. 48), thereby rendering the status interpreter of software component 1 to the reduced functionality of an input handler. The UI board in this case comprises an "a" side and a "b" side, each with is own processor. Both sides are connected to each other, preferably by a serial communication "c". The UI board is connected by another connection 14 to a CCU with software component 2, where the connection 14 can be the same type as connection "c", or it can be different. The "a" side is preferably an LCD controller that exposes a low level API, and lacks the full capabilities of a thick client. Hence, the "a" side can be referred to as a "thin client." The "b" side comprises the taxonomy Architecture and Software Component 1.

Figure 50:
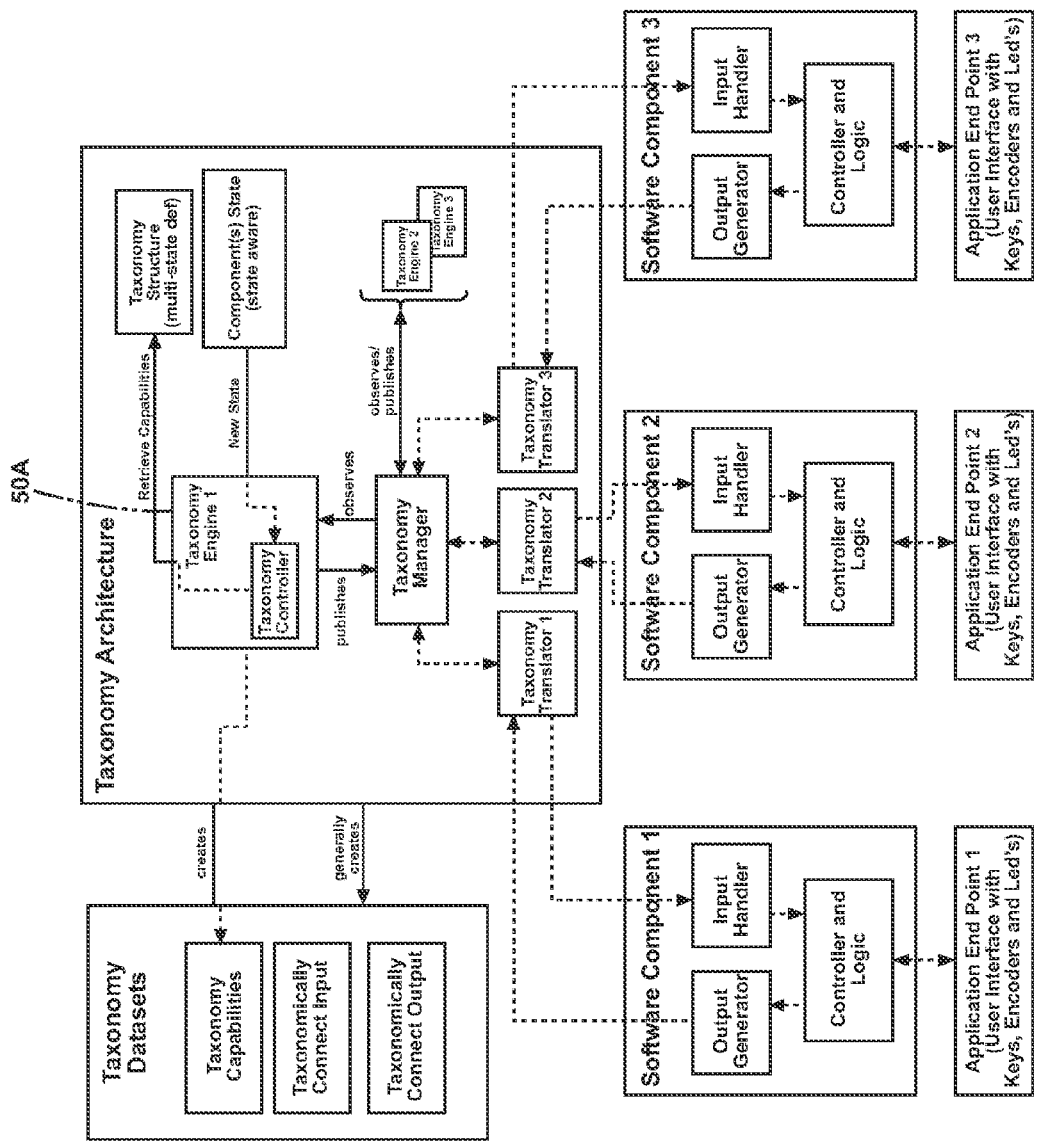
FIG. 50 is a modified version of the software architecture of FIG. 44 for another operating environment.
Figure 50A:
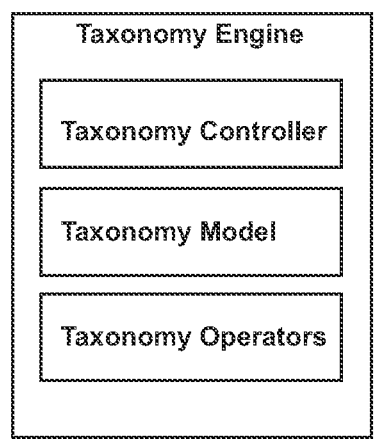
FIG. 50A is a detailed portion of the taxonomy engine of FIG. 50.

FIG. 50 is a more generalized block diagram of the architecture of FIG. 44 with elements rearranged for clarity and to show a less specialized configuration. In FIG. 50*a*, it can be seen that the taxonomy engine comprises a taxonomy controller, a model, and a collection of operators. The taxonomy controller is aware of the state of the componentry for which it is controlling, and is responsible to retrieve from the taxonomy structure the state appropriate taxonomy model and inform the taxonomy engine of the change. This action provides an event to the appropriate taxonomy operator to examine the new taxonomy model and generate a new taxonomy capabilities data set. The taxonomy engine then publishes the new capabilities to the taxonomy manager, who then distributes the new information to the appropriate translators or other software components that have registered for notification.

It will be apparent from FIG. 50 that the selection builder, the status interpreter, and the command generator found in the software component 1 of FIG. 44 is now in the taxonomy translator. Taxonomy translator 2 comprises the selection builder and is responsible for the conversion of taxonomy datasets to software component specific interfaces. Therefore, in this example the software components are not comprised with the functionality of interpretation or generation of taxonomy datasets. Rather, they are comprised with handling inputs from the translator and sending outputs to the translator.

It is contemplated that a taxonomy architecture, through the use of multiple translators, can simultaneously connect to software components similar to software component 1 of FIG. 44 and software component 2 of FIG. 50.

Figure 51:
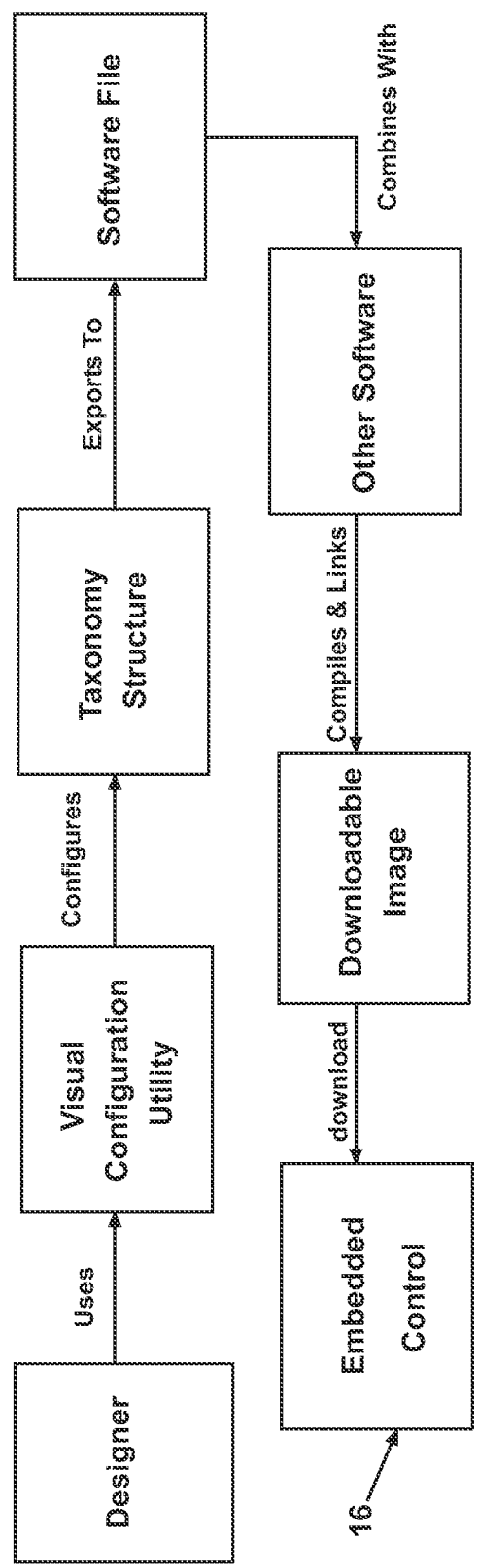
FIG. 51 schematically illustrates a method utilizing the taxonomy architecture according to the invention.

Looking now at FIG. 51, it is generally known that complex data structures have tremendous advantages because they can be easily varied and re-used with a single complied source code. But this complexity can be troublesome to understand, create, troubleshoot, debug, explain, and generally manage. Object-oriented languages provide some level of hiding complexity relative to non-object oriented languages such as C. Similarly, XML data structures are human-readable, in contrast to byte arrays, and therefore can eliminate complexity. But it is currently cost prohibitive to implement technology such as XML or Java in most appliances for domestic use. The invention offers a visual configuration utility that simplifies handling complex data structures at much less cost than known systems.

Following the flow of FIG. 51, a designer in step 1 starts the visual configuration utility. A designer can be someone who does the role of product or feature planning, user experience, or user interface design, engineering, or anyone else with a need to retrieve value from or provide value to the information contained by an instance of a configuration held within the memory of the visual configuration utility. In step 2, the designer uses the configuration utility. In this step, the design will load a configuration file from a persistent store such as a hard drive or database or web site. Alternatively, it may be checked out from a document version control system such as visual source save.

In step 3, the designer creates a new configuration comprising a taxonomy structure or begins editing an existing configuration comprising a taxonomy structure. The editing process includes steps like adding new taxonomy elements, deleting taxonomy elements, moving taxonomy elements, or modifying the properties of a taxonomy element. Other sub-steps of step 3 may include binding taxonomy elements to message identifiers or functional identifiers of arbitrary software components of which taxonomy elements either relate to or represent. In step 4, the designer will save the taxonomy configuration appropriately and notify the appropriate office mates such that if one of the office mates is the appropriate controls development engineer, he may immediately acquire the saved taxonomy configuration file and begin step 5. In step 5, an appliance controls development engineer will generate a software and software data file appropriately configured such that a compiler can be invoked preferably from the Visual Configuration Utility to create a downloadable image appropriate for execution by a processor. Further, the controls development engineer will combine the generated software and software data file with a plurality of other arbitrary software components. Preferably, the Visual Configuration Utility can accomplish this task. In step 6, the appliance controls development engineer will invoke the compiler on the combined file and the compiler will generate a downloadable image. And in step 7, the appliance controls development engineer will download the downloadable image to the embedded appliance control processor and test the result. At any step in the process, the process actor may stop activities and move another step taking appropriate action to mitigate the incomplete step and/or the potential re-ordering of steps.

Figure 52:
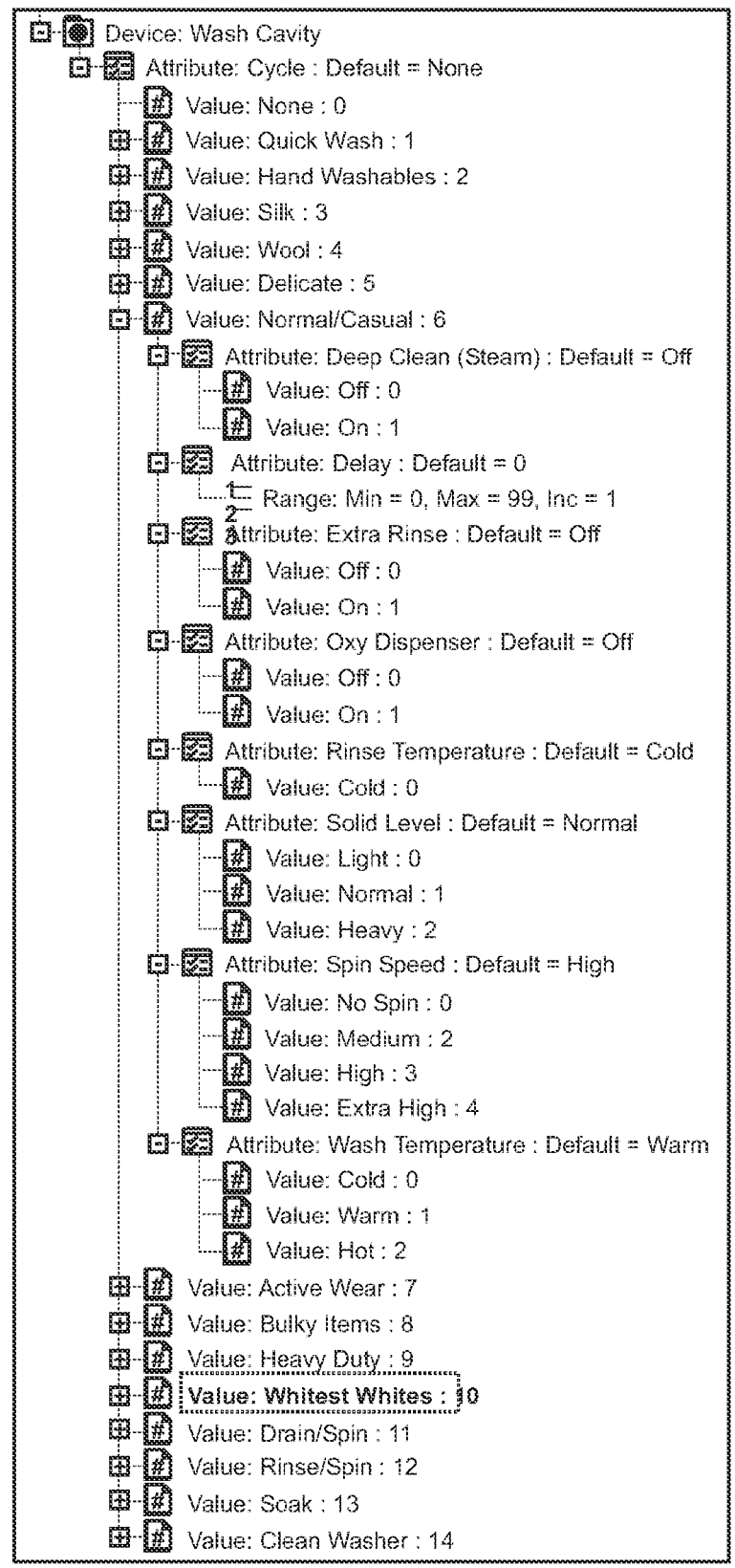
FIG. 52 illustrates an exemplary data structure used in the taxonomy architecture of the invention.
Figure 53:
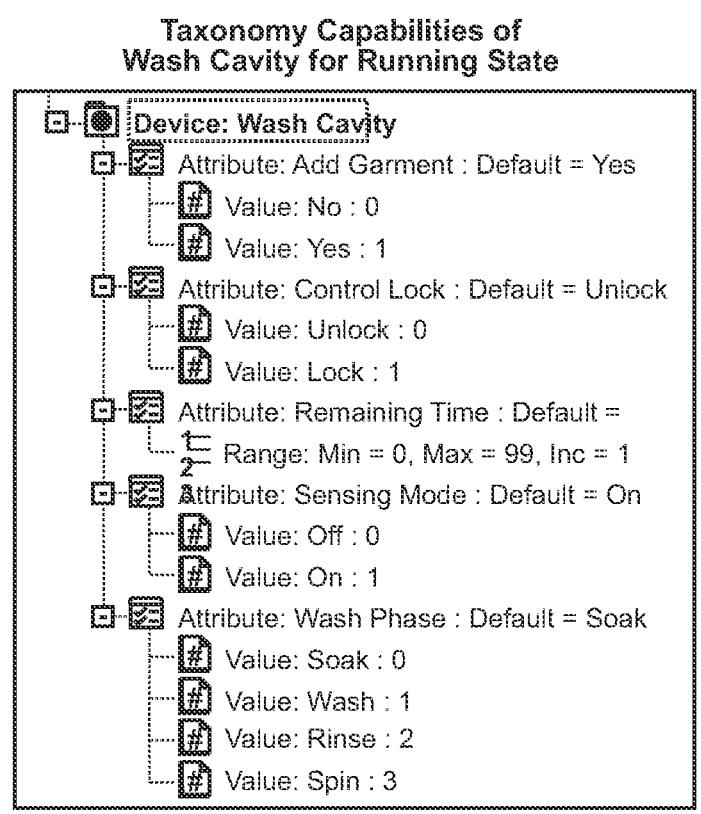
FIG. 53 illustrates a second exemplary data structure used in the taxonomy architecture of the invention.

FIGS. 52 and 53 depict an application built using a proprietary application framework. The taxonomy visual configurator of FIG. 52 would be used as a rule set to develop taxonomy structures. Once the taxonomy structure is configured visually, it can be transformed and exported into a functionally equivalent complex embedded data structure. (See step 3 of FIG. 51). Note how the taxonomy structure comprises multiple taxonomy structures, each associated with a unique appliance state. Examples of unique appliance states are found in FIG. 7.

Looking more closely at the example of FIG. 52, it can be seen that there is no wash phase definition. This is because a wash phase is not a valid feedback until the appliance is in a running state. In FIG. 53, there is no cycle definition. This is because during running, the cycle definition cannot be changed.

The data structure of FIGS. 52 and 53 is very powerful and is the heart of the taxonomy architecture. It consists of a nested tree of elements where each element of the tree has a type where that type dictates to the taxonomy operators of FIG. 50 how to properly traverse and extract information from the Tree. Attributes should have corresponding Active Values which are one of the child Values of the plurality of child Values. Attributes contain a plurality of child Values which represent the valid selections of the Attribute. A Value which contains a plurality of Attributes is a Value which must be further specified by having each contained Attribute be defined by its contained active or selected Value. When a child Value is selected or active, the taxonomy operator looks to see if the child Value contains children of the Attribute type. If so, the taxonomy operator continues the tree traversal repeating the function of the taxonomy operator on the next level of the tree. Ranges are children of Attributes and are equivalent to a plurality of Values which can be mathematically derived from the values of min, max, and inc.

The information contained in the data structures of FIGS. 52 and 53 is therefore more useful than one would at first realize. For example, taxonomy operators can be written to do a variety of useful functions across a number of the elements of the taxonomy architecture, especially when there is a graphical user interface or an external client. A first taxonomy operator could use the data structure to determine what content should appear on a user interface. As a user makes selections on the user interface, the first taxonomy operator could re-examine the current active selections of the user and repopulate the user interface with the new valid user selections and the valid options of each. A second taxonomy operator could be informed of changes to the appliance state. Upon change to the state of an appliance, the second taxonomy operator could retrieve a new taxonomy capabilities dataset so that the user interface could be repopulated based on the new valid selections and or new valid operators for each. A third taxonomy operator can be configured to receive taxonomically correct inputs and check to see that the input corresponds to a valid well-formed command. The third taxonomy operator would accomplish this by walking the taxonomy structure in the taxonomy architecture of FIG. 50. The third taxonomy operator would evaluate all of the potential roots of the taxonomy structure and find a corresponding root identifier in the taxonomically correct input structure. From the root, the third taxonomy operator would begin to recourse down the tree, determining which branches of the tree to continue down by finding a corresponding identifier in the taxonomically correct input structure. When the third taxonomy operator reaches the end of the tree or alternatively exhausts the elements in the taxonomically correct input structure having used all of them at least once, a valid taxonomically correct input structure is determined if both there are no other un-accounted for elements in the taxonomically correct input structure, and there are no child elements remaining un-walked in the taxonomy data structure. This third operation is the equivalent of portable state-based business logic enabling the thin client 22 of FIG. 48 to be completely devoid of any logic associated with the operation of the appliance. The benefit of this is that user interfaces and all external clients with proper communication and taxonomy dataset interpretation operators can be developed with only knowledge of how to interoperate with taxonomy datasets, and therefore can be devoid of all knowledge of the connected device with which it is in operable communication.

Figure 54:
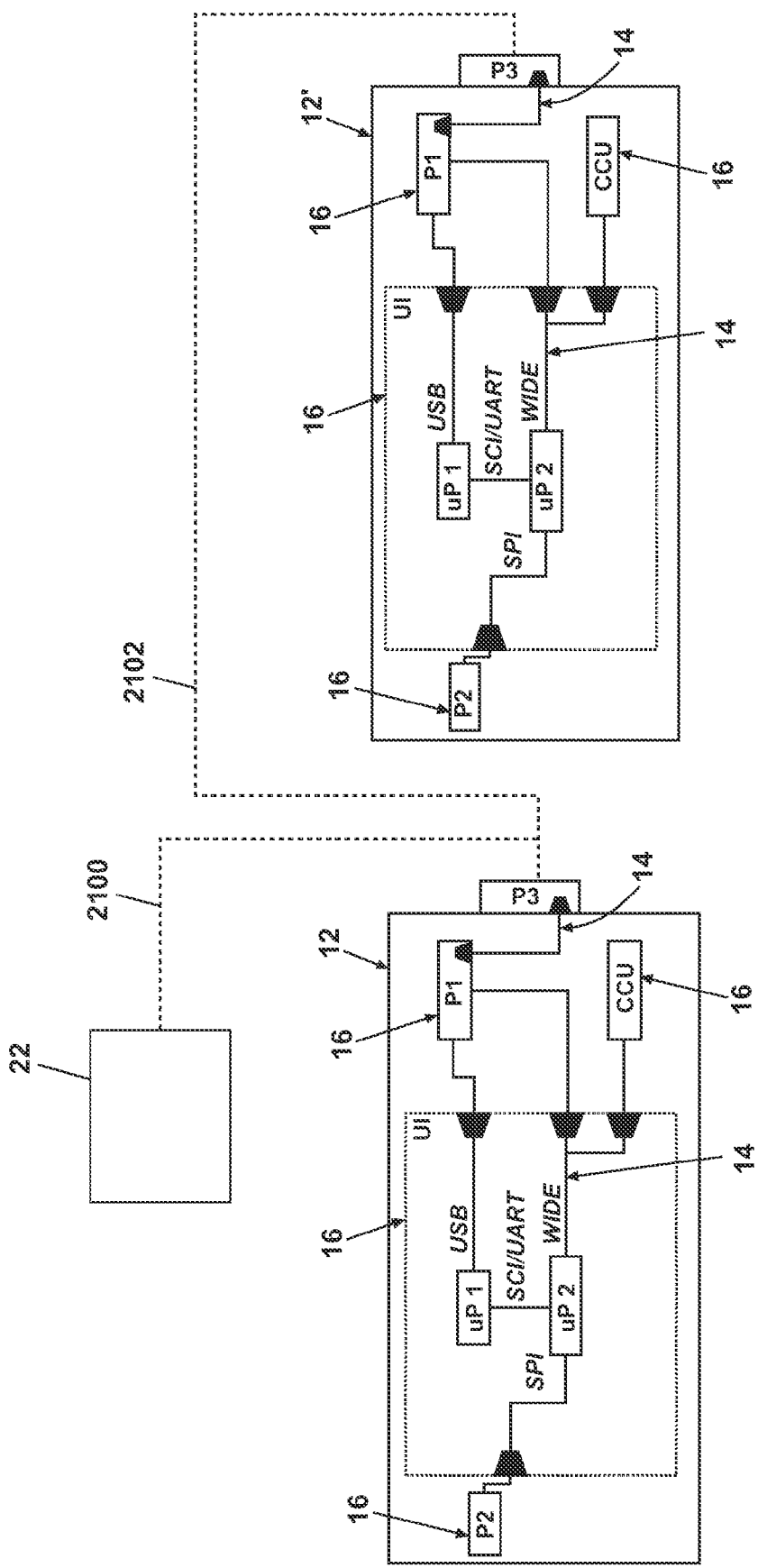
FIG. 54 is a schematic view of a network of appliances and clients connected on multiple networks by couplers.

FIG. 54 illustrates a network architecture comprising two appliances 12, 12' and a third party device 22 of the type shown in FIG. 1. Each appliance has a plurality of nodes 16 comprising, in this embodiment, a CCU, a user interface UI, and several peripherals P1, P2, and P3 in communication with each other by a local network 14. Each peripheral can be a circuit board which may or may not have at least one microprocessor. On the UI board, there are shown two microprocessors uP1 and uP2, connected by a serial communication bus which is different from 14. The UI board typically has multiple network connections on USB, WIDE, and SPI networks. The third party device 22 may be able to send messages which are organized according to FIG. 4. Alternately, the third party device 22 may send messages in the form of a taxonomy dataset. In the latter case, the peripheral P3 could contain a taxonomy architecture which could create well formed commands as shown in FIG. 4. The appliances 12, 12' communicate with each other over network 2102 and the third party device 22 communicates with the appliances over network 2100.

It will be seen in FIG. 54 that messaging can occur among microprocessors on the same board connected on a network different from 14. As well, messaging can occur between boards 16 on at least two networks where the networks are not of the same type. Further, messaging can occur between appliances 12, 12' between boards 16 carried on at least three networks where at least one of the three networks is a network external to the appliance. Yet further, the third party device 22 can communicate with nodes implementing SA or nodes that can route messages to a node implementing SA in accord with the invention.

It will be understood that the architectural characteristics of a network configuration normally impact the implementation of the arbitrary software components which communicate within the architecture. By "architectural characteristics", we refer to the distinctive features of individual networks, the way the various boards 16 are interconnected, and the combinations of network routes interposed between connected boards 16. An embedded virtual router in a processor on a board 16 in accord with the invention will enable the arbitrary software components in that board 16 to communicate independently of the architectural characteristics of the associated networks.

An advantage of an embedded virtual router according to the invention can be seen in an appliance having a plurality of useful arbitrary software components, each providing at least one useful consumer benefit. Since different consumers typically prefer different combinations of features, it has been a long standing problem in the appliance industry to be able to supply only the sub-set of specific features that an individual consumer would prefer. Typical approaches include (1) providing multiple appliance models or sku's, each with a unique feature set, and (2) providing an appliance with the superset of features insuring that the customer can have all the available features. Both are costly because arbitrary software components in appliances are hardware dependent; at a minimum, software for a board controlling a device in an appliance must be reworked for use in a different appliance, even if it is the same or similar device. This invention provides a third, more cost-effective alternative. With the use of an embedded virtual router according to the invention, all arbitrary software components are independent of one another with respect to their architectural location. An appliance manufacturer can thus provide a user-specific capability for an appliance at much lowest cost by providing an external client having any combination of arbitrary software components that can be purchased separately as part of an external accessory, but with full capacity to participate in all forms of useful communication with other arbitrary software components within the appliance because of the embedded virtual router.

Assume, for example, an appliance with three possible features: (a) a door switch, (b) an LED, and (c) an LCD, either or both of the LED and the LCD to indicate the state of the door switch. All versions of the appliance will have a door switch. But some will have only an LED, some will have LCD, and some may have both an LED and an LCD. With the prior art, the manufacturer has to provide three software architectures: one for communication between the door switch and the LED, one for communication between the door switch and the LCD, and one for communication among the door switch, the LED and the LCD. With an embedded virtual router according to the invention, designer need only have software architecture for the door switch and an embedded virtual router. An accessory can enable the door switch in any version of the appliance having an embedded virtual router to handle communication with any combination of LED and LCD, without further software architecture.

For another example, assume an appliance with three controller circuit boards, each having a feature. If a manufacturer sought to save costs by combining two features on a single board, any costs savings would have be adjusted by the added cost of reconfiguring the software architecture on the third board. A software architecture with an embedded virtual router according to the invention would enable such a change without the necessity of reconfiguring the software architecture.

Figure 55:
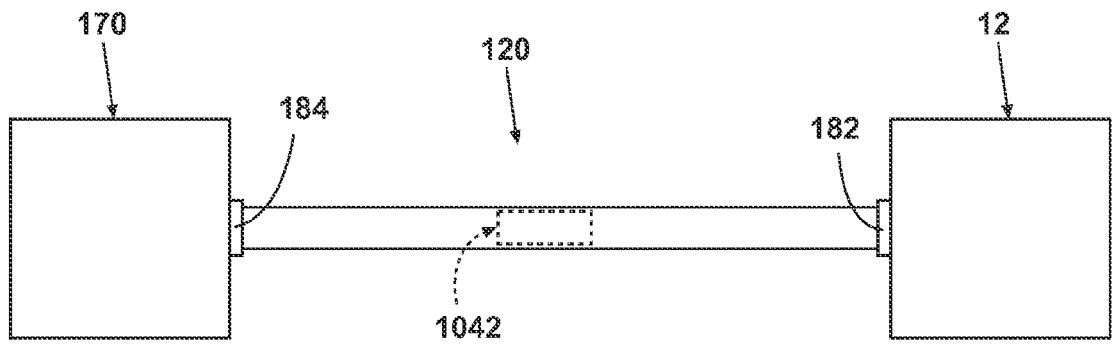
FIG. 55 is a schematic view of an over-molded smart cable comprising an embedded smart device according to one embodiment of the invention for use with an appliance.

In an embodiment of the invention embodiment shown in FIG. 55, a smart cable 120 comprises a smart coupler 1042 enclosed within a length of conduit with connectors 184 and 182 on either end. The smart cable 120 includes wiring between at least one external device 170 and the appliance 12 by way of the smart coupler 1042, such that the external client 170 and the appliance 12 are able to exchange information via the smart coupler 1042. Alternatively, the smart cable 120 can be hardwired to a network having the external client 170 thereon. The smart cable 120 can comprise any type of transmission line within the length of cable suitable for the purposes described herein. The smart cable 120 can comprise multiple types of cable and is preferably over-molded. The advantage of an over-molded cable is that it is a single article not subject to inadvertent separation from its component functional parts. This will make the total cost of ownership less and will make the distribution and testing of the smart cable 120 simpler. Examples include but are not limited to multicore cable, twinax cable, ribbon cable, optical fiber, twisted pair cable, dielectric slabs, or electric power lines, or any combination thereof.

Figure 56:
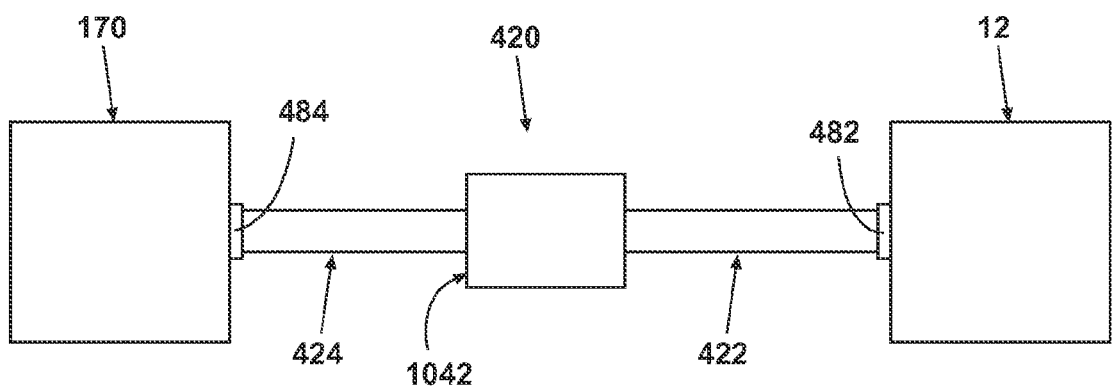
FIG. 56 is a schematic view of a smart cable comprising a discrete smart device according to one embodiment of the invention for use with an appliance and an external device.

In another embodiment illustrated in FIG. 56, a smart cable 420 comprises an appliance pigtail 422 and an external client pigtail 424 with a smart coupler 1042 connected therebetween. Both the appliance pigtail 422 and the external client pigtail 424 comprise a length of cable. The pigtails 422, 424 also include an appliance connector 482 and an external client connector 484 on their respective ends. The connectors 482, 484 are configured to communicatively couple the smart cable 420 to the appliance 12 and to the external client 170, respectively. The pigtails 422, 424 can be permanently coupled to the smart coupler 1042 at ends opposite the connectors 482, 484.

Figure 57:
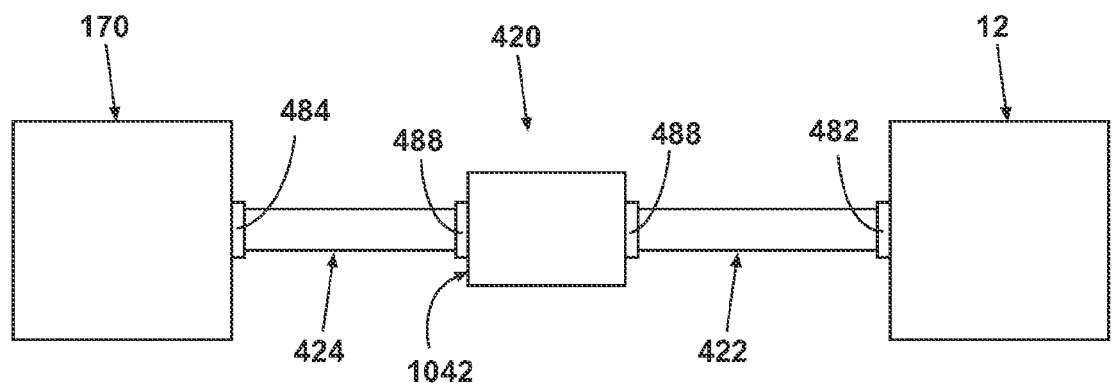
FIG. 57 is a schematic view of a smart cable comprising a discrete smart device and smart device connectors according to one embodiment of the invention for use with an appliance and an external device.

Alternatively, as illustrated in FIG. 57, the pigtails 422, 424 can be removably coupled to the smart coupler 1042 by smart device connectors 488 at ends opposite the appliance connector 482 and the external client connector 484, respectively. The smart device connectors 488 enable the pigtails 422, 424 to be interchanged with other pigtails having smart device connectors 488 on one end and different types of appliance connectors 482 and external client connectors 484 on the other. This facilitates connection of the smart cable 420 to a plurality of different appliances 12 and external devices 170.

Alternatively, appliance connector 182 or 482 can be coupled to a smart connector [defined below] for the purpose of coupling the smart cables 182 or 482 or a smart wireless coupler to an internal communicating node of the appliance not directly compatible with the interface provided for by 182 or 482.

The smart cables 120, 420 can be different types of cables in order to accommodate different transmission standards employed by different appliances 12 and external devices 170. For example, if the external device 170 connected to the smart cable 120, 420 uses two-wire cable, and the appliance 12 connected to the smart cable 120, 420 uses one-wire cable, the smart cable 120, 420 can comprise a one-wire portion of cable and a two-wire portion of cable with a suitable converter therebetween. Alternatively, the appliance 12, the external client 170, or the smart coupler 1042 can comprise a suitable converter for transmitting messages between different types of transmission lines.

Preferably, a conventional opto-isolation circuit for providing separation between the electrical networks of the coupled devices 12 and 170 is included in some portion of the apparatus comprising the smart cable 120, 420 and any smart connectors interposed between the client 170 and the appliance 12. Opto-isolation requires a 2 wire communication configuration, so preferably, the opto-isolator is provided in the portion of the apparatus where there is 2 wire communications. The opto-isolation circuit electrically isolates the appliance 12 from the smart cable 120, 420. A grid friendly appliance sensor (a type of frequency sensor—see discussion below) can also be included in the smart coupler 1040, the appliance 12, or any another node in communication on the network. The grid friendly appliance sensor instructs the appliance 12 when the AC Voltage frequency falls below a given threshold. An exemplary threshold is a lower threshold of 59.95 Hertz; when the monitored frequency falls below 59.95 Hertz, various loads of the appliance can be instructed or requested to turn off. A software component configured to respond to resource-related commands will determine the appropriate response to the information provided by the grid friendly sensor. Generally, the software component configured to respond to a resource-related command will not compromise the appliance cycle of operation with respect to any consumer benefit.

The smart coupler 1042 can be used as the primary smart component within several embodiments. For example, it is the smart component within the smart cable 120, 420. It can also be operated in a "stand alone" mode. In the stand alone mode, the smart coupler, 1042 can be connected to only one of the appliance 12 and the external client 170. The smart coupler, 1042 can receive power from the external client 170 or the appliance 12 in the stand alone mode or it can be powered by an auxiliary power source, which will be discussed in more detail hereinafter. The smart coupler 1042 is also the primary smart component within the embodiments of FIGS. 55, 56, 57, 58, 59, and 61.

Figure 60:
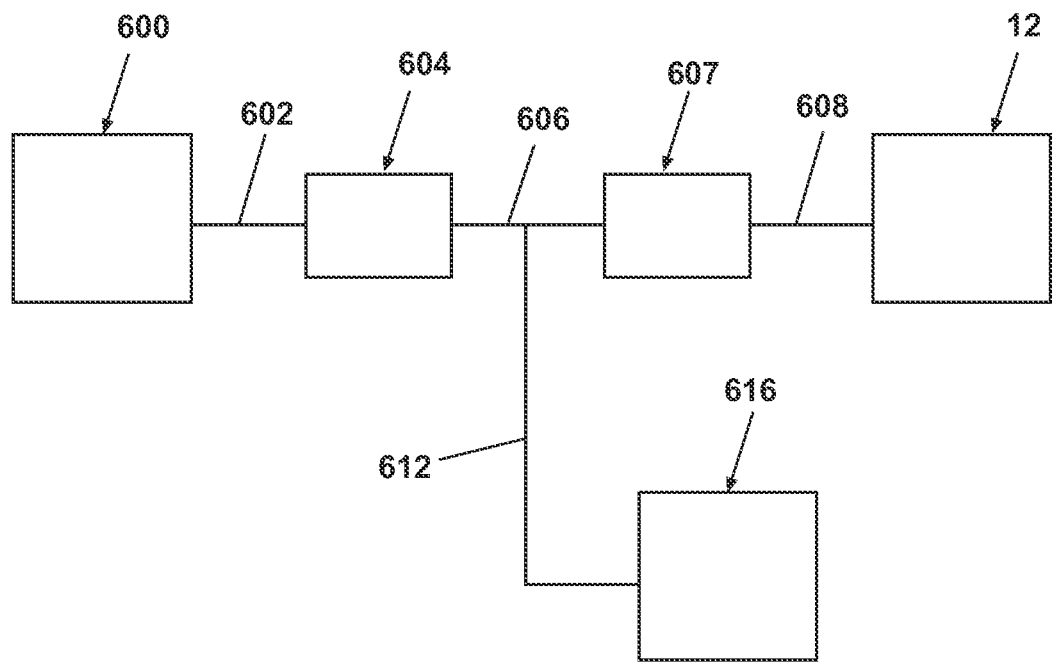
FIG. 60 is a schematic view of a source of information about resources connected to an appliance with a smart coupler directly coupled to an appliance connection element.

Looking now at FIG. 60, the smart coupler 607 can also provide information to any software component configured to respond to resource related commands with respect to certain standard energy information signals when it is in communication with a source of information about a resource 600. Such software component can reside on the smart coupler itself, in the appliance 12, in smart coupler 604, in client 600 and/or in device 616. An example of a source of information about a resource would be a power utility that would be in communication with a smart coupler. The signals can include but are not limited to a demand response (DR) signal instructing a component of the appliance 12 to reduce consumption of the resource, a signal indicating time-of-use pricing of the resource (TOU pricing), a critical peak pricing of the resource (CPP) signal indicating a significant short-term price increase due to demand exceeding supply or inability of the power grid to handle high-energy demands, a signal specifying real-time pricing (RTP), and critical peak rebate (CPR) signals indicating a rebate for reduced consumption at a given time. The software component configured to respond to a resource related command can reside in the smart coupler 1042, in the appliance 12, in the source of information about a resource 600, in a second appliance, or in any other node in communication with the smart coupler.

Referring again to FIGS. 55-58, the smart coupler 1042 or smart wireless coupler can also include authentication and encryption capabilities. Authentication serves to validate the connected appliance 12 and/or external client 170, and/or applications included on the appliance and/or on the external client 170. Encryption acts as a key to unlock and expose the appropriate services to the connected appliance 12, external client 170, or application and prevents the unauthorized use of services which are not exposed and not intended for use by a non-authenticated appliance, external client, or application. The smart coupler 1040 whether wired or wireless can include special, proprietary electronics that enable communication between the appliance 12 and the external client 170. As a result, unauthorized persons who lack the smart cable 120, 420 or smart wireless coupler cannot couple an unauthorized external client 170 with the appliance.

Any of the connectors 182, 184, 482, 484, 488 or an appliance connection element 400 can be a smart connector. A smart connector is a wired or wireless connector that has specialized circuitry, structural adaptations, hardware, and/or software that provide additional functionality beyond that of a conventional connector. Conventional connectors are passive devices that do not modify or examine the packets sent therethrough. The function of a conventional connection is to electrically mate the pins of one connector to the corresponding sockets of another connector. In addition to the conventional function of a connector, smart connectors can incorporate one-wire to two-wire conversion, other types of conversion, level shifting of the electrical signals, power management functionalities, protocol translation, opto-isolation, authentication, encryption, mechanical adaptations or any combination thereof. A smart connector can be more or less permanently connected to an appliance. Smart connectors can be ganged or daisy chained together to provide a composite function from a collection of functions comprised by each individual smart connector. Power management functionalities can include AC/DC conversion and the ability to control the amount of power drawn through the smart connector. Smart connectors can also be designed so as to expose additional networks or other points of connectivity; for example, a smart connector can have a first connection point designed to accept a smart cable 120, 420 as well as a second connection point designed to accept a second cable of a specialized diagnostic device. Preferably, the appliance connection element 400 is a smart connector (see FIGS. 60A and 400).

Figure 58:
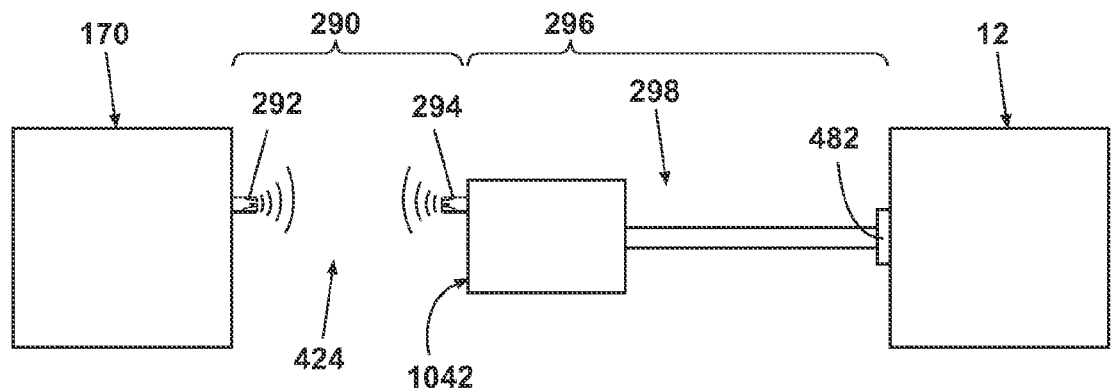
FIG. 58 is a schematic view of a combination smart wireless coupler and smart cable according to one embodiment of the invention for use with an appliance and an external device.

For example, the embodiment illustrated in FIG. 58 comprises a smart wireless coupler 290 coupled to a smart cable 296. The smart wireless coupler 290 comprises a first wireless communicating component 292 communicatively coupled to an external client/smart device 170 and a second communicating component 294 in communication with the first communicating component 292 and communicatively coupled to a smart coupler 1042 of the smart cable 296. The smart cable 296 comprises the smart coupler 1042 and an appliance pigtail 298 similar to the appliance pigtail 222. The appliance pigtail 298 communicatively couples the smart device 170 to the appliance 12.

Figure 59:
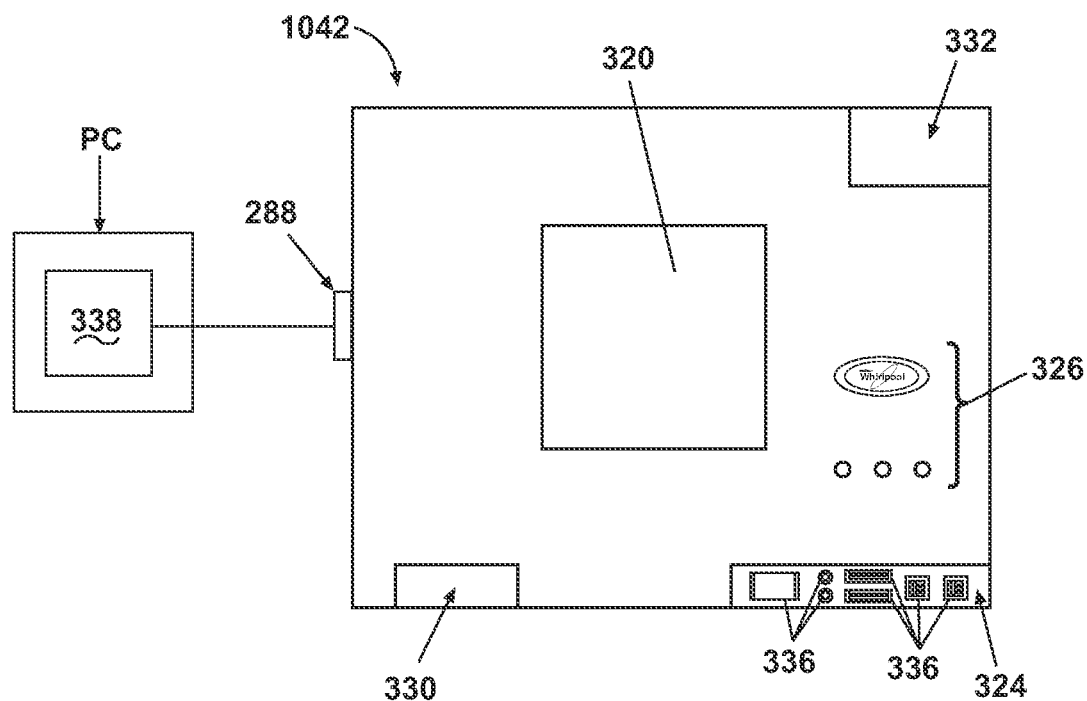
FIG. 59 is a schematic view of a smart device according to one embodiment of the invention.

Looking now to FIG. 59, the smart coupler 1042 comprises a microprocessor 320 having at least one arbitrary software component stored in the memory thereon. The arbitrary software component can be an application or driver stored in memory thereon and accessible by any external clients 170 or other appliances connected to the smart coupler 1040. Preferably, the arbitrary software component comprises at least a driver for enabling communication between the smart coupler 1042 and a second device coupled to a network on which coupler 1040 is also coupled. An exemplary arbitrary software component is an SA driver. Referring again to FIG. 14A, client 1004 can establish minimal functional communications with smart coupler 1042 as long as 1004 is configured with the proper port driver 1072. Further, SA driver 1016 or a useful application such as a service and diagnostic software application in the form of an arbitrary software component 1060 can be automatically sent to or loaded by client 1004 from the memory of smart coupler 1042. In this way, a smart coupler can enable connected clients to install software components necessary of full functional communications from the smart couplers with which they are connected, or conversely, the smart coupler can install the software on the client. Likewise, a smart coupler can use the internet connection of its connected clients to retrieve new arbitrary software components for its own internal operation or for further distribution to other any other coupled clients 170 or any appliances 12. The smart coupler 1042 can further comprise any number of additional arbitrary software components.

Looking again at FIG. 59, the microprocessor 320 can include any number of elements common to microprocessors, such as ROM, RAM, on-chip flash memory, transistors, and various communication buses. The smart coupler 1042 further includes analyzing circuitry and software that monitors physical signals associated with the circuitry coupled to at least one transmission media. This feature can be useful during the diagnosis process because the client 1004,170 can check the health of 1030 before commencing any useful diagnosis processes requiring communications with appliance 1000, 12.

The smart coupler 1040 can further comprise an alternate power source 332, an interface expander 324, a variable display 326 enabled to display licensable content simultaneous with indications about the information relating to the smart coupler 1040 and information about devices with which it is in communication with, and a removable memory 330. The smart coupler 1040 can be powered via connection to the external client 170 and/or the appliance 12. When in "stand alone" mode, or at a user's selection, the smart coupler 1040 can also be powered by the alternate power source 32, which can be electrically isolated from the appliance 12 and/or the external client 170. The alternate power source 32 can be a battery. The alternate power source 32 can also be a connection to another power source, such as a wall transformer that can be plugged into a conventional electrical outlet.

The interface expander 324 comprises a plurality of ports 336 for enabling the microprocessor 320 to communicatively couple with a plurality of additional external auxiliary sources of information. Each port 336 can be configured by a port configuration tool 338 in order to communicate with the plurality of external auxiliary sources of information having their own physical connection and protocol requirements. The port configuration tool 338 can reside on a PC and couple to the smart coupler 1042 via 484 (for example). The importance of the port configuration tool is that it allows the interface expander 324 pin definitions to be redefined by the client 170,1004. Alternatively, the port configuration tool 338 can be stored in the memory of the smart coupler 1042 and for uploading by or installing on the client 170, 1004.

The removable memory 330 can also be used to configure the interface expander 324 by using an external client 170 having the port configuration tool 338 thereon to write instructions to the removable memory 330. Once the removable memory 330 is connected to the smart device 180, the microprocessor 320 can read the instructions on the removable memory 330 and configure the ports 336 accordingly. Examples of the different pin configurations on the interface expander 324 include but are not limited to a general purpose input/output, a power port, a wireless port, a USB port, a serial ports like SCI, SPI or RX, TX, a ground, an analog-to-digital converter port, a plurality of Boolean IO Points, analog inputs and outputs configured in the form of 0-5Vdc, +/−10Vdc, 4-20 ma, PWM outputs. The removable memory 330 can also be used with the smart coupler 1042 to deliver upgrades, deliver applications, store data and event logs, deliver and store data about a cycle structure, deliver and store information about a resource, deliver drivers or other applications to an external client 170, hold data about messages, hold data to populate a routing table, and hold data about consumables. The display 326 can visually convey information about the status of the smart coupler to a user. An exemplary display can consist of tri-color LED lights that produce different patterns depending on the status of the smart coupler. The display 326 can also include an illuminated image depicting a brand name, logo, or other indicia associated with the appliance.

The interface expander 324 can be configured to couple to any electronic peripheral including sensors, data sources, and auxiliary communicating nodes. An auxiliary wireless device 350 can be coupled to the interface expander 324 when it is properly configured. It is anticipated that when smart coupler 1042, receives a propagated message, smart coupler will propagate the message to the networks to which its coupled including any network configured to receive the propagated message that is in communication to the smart coupler 1042 coupled to the smart coupler 1042 via the interface expander 324.

Figure 60A:
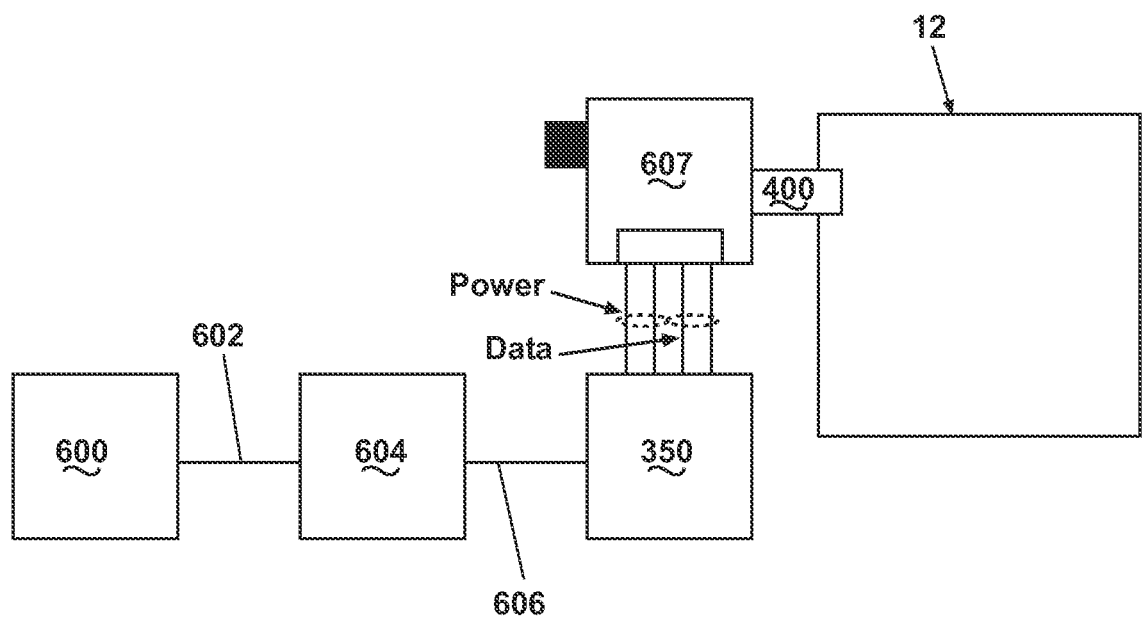
FIG. 60A is schematic view of a source of information about resources connected to an appliance by a combination.

Referring now to FIG. 60A, the smart coupler 607 is directly coupled to appliance connection element 400 on the appliance 12 in a direct mount configuration. In this embodiment, smart coupler 1042 further has a smart auxiliary wireless communicating component 350 coupled to the smart coupler 607 via the interface expander 324. In this embodiment the interface expander 324 has at least some of its pins configured as general purpose input Booleans with an associated component of software configured to receive messages from a source 600 of information about a resource. In this embodiment, the path of the messages is between the source 600 of information about a resource and a first coupler 604, then between the first coupler 604 and the smart auxiliary wireless device 350 which acts as a second coupler. Then the messaging passes between the smart auxiliary wireless communicating component 350 and the smart coupler 607 directly mounted to the appliance 12, where the transmission media coupling smart auxiliary wireless communicating component 350 to the smart coupler 607 is the Boolean or Binary network provided by the interface expander 324. The advantage of this network, optimally configured for resource messages, is that it allows a decoupling point between two complex halves of the network where the first half comprises componentry from the source 600 up to the interface of the interface expander 324, and the second half comprising the interface expander 324 through the appliance 12. As the configuration of the interface expander 324 in this embodiment is exceedingly simple, the information contract comprising the aforementioned exemplary energy management signals (DR, TOU, and the like) is most easily and rapidly described, promoted, and adopted. Further, the information contract is advantageous when the messaging architecture and protocols implemented by the smart couplers in communication on either side of that contract are different from one another, and where the dissimilarities of the differences are significant from one region of the country to the next or one type of appliance coupler to the next, and so on.

Figure 61:
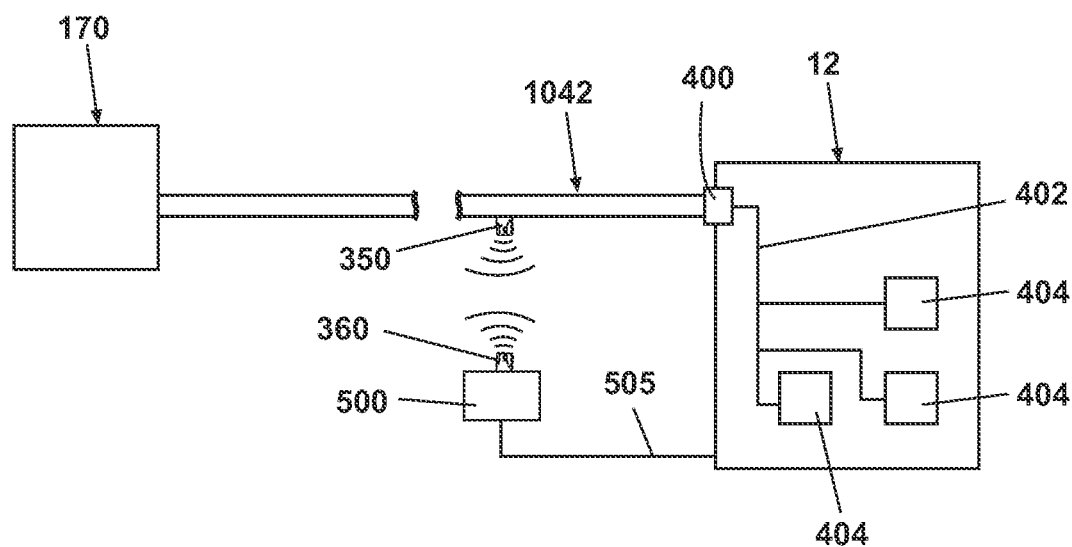
FIG. 61 is a schematic view of a source of information about appliance operation connected to an appliance through a smart coupler.

The appliance connection element 400 provides access to an internal network 402 of the appliance 12 as is illustrated in FIG. 61. The internal network 402 connects the various internal components 404 of the appliance 12. The appliance connection element 400 can connect to any internal component 404 of the appliance, such as a control board, or it can connect directly to the internal network 402. The appliance connection element 400 can be a standardized connection element integrated into all appliances manufactured by a particular company, or it can be a specialized connection element unique to certain models of appliances. A single instance of an appliance 12 typically comprises multiple various and different embodiments of the connection element 400 where there is at least one connection element on each node 404 in communication with the network 402 and at least one additional connection element 400 for connecting external clients such as a smart coupler 1042.

Referring now to FIG. 61, an appliance connection element 400 can be a conventional connector or it can be a smart connector. It can be configured to facilitate communication between the appliance 12 and the smart coupler 1042. If the appliance connection element 400 is not structured to receive the desired connector on the smart coupler 1042, a suitable connector adapter can be used, e.g., a conventional connector or a smart connector. In this way, the smart cable 120, 420 or a smart coupler 1042, or the 'Appliance Half' of the smart wireless coupler can be connected to any appliance connection element 400 by using a suitable connector adapter. An example would be a converter dongle that plugs into the appliance connection element 400 and provides a suitable port for receiving the connector 482 or 182 (see FIGS. 55-58). Another example is an adapter comprising a length of cable with connectors at each end configured to couple to the smart coupler and to the appliance 12, respectively. Adapters and smart connectors can also be used to communicatively couple the external device 170 with the smart coupler. Preferably, an appliance comprises an appliance connection element 400 configured as a smart connector and further configured to receive external clients either by a direct mount or by a length of cable and further configured to receive external s installed by the consumer without uninstalling the appliance 12 and without, or without significant tool usage.

FIG. 60 illustrates a system where resources in the appliance or any other resource consuming device configured for communication can be monitored, managed, or changed as in the form of an energy controller accessory. The energy controller accessory can stand alone or be incorporated into any element of the system. A likely scenario has a smart coupler 607 directly mounted and connected to the appliance 12 by a network 608. The network 608 can be a WIDE network as described previously herein. The smart coupler 607 also connects to a connecting element 604 via a second network 606 that can be a different type of network from network 608. The connecting element 604 can be a second smart coupler, a smart connector, or a conventional connector. If network 602 is a different type of network from network 606, the connecting element 604 is a smart coupler or a smart connector having protocol conversion capabilities. An example of the network 606 is a wireless Zigbee network and an example of the network 602 is the Internet.

Smart coupler 604 connects to a source of information about at least one resource 600 generated or used by the appliance 12 and/or by a different kind of resource consuming device 616 such as a light switch, ceiling fan, water heater, or the like. The connection between the smart coupler 604 and the source 600 is by a third network 602 that can be a different type of network from either network 608 or network 606. Assume that the source 600 wants to send information about at least one resource to the appliance 12 or to the device 616. The information can include a request for a change in the operation of the appliance 12 based on the information. The resource can be electricity, hot water, gray water, gas, water, replaceable parts, or other consumables. The source 600 can send information about multiple resources if desired. The invention enables a source of information about a resource 600 in effective communication with consumers of the resource to affect the level of consumption of that resource. Preferably, the source 600 of information about a resource is communicatively coupled to the network 602 to communicate with a second node, having SA for example, which may be among several on the appliance 12 or on the device 616. We assume that the source 600 has at least an appropriate communication driver, or one of the smart coupler 607 and the connecting element 604 has software to translate any message from the source 600 to the aforementioned communication protocols, for example.

In this scenario, the source 600 sends a discovery message over the network 602 seeking any consumer of resources to which the source 600 wants to send information. The connecting element 604 receives the discovery message, translates the message, if necessary, and propagates the discovery message to the next nodes over the network 606, including the smart coupler 607 and devices 616. Coupler 607 receives the discovery message, translates the message, if necessary, and propagates the discovery message to the next nodes over the network 608, including the appliance 12. The relevant nodes in the appliance 12 evaluate the message and determine a discovery reply message, and send respective discovery confirmation messages. Here, we assume at least one reply is positive.

The discovery confirmation message is received by the smart coupler 607, which populates its routing table with routing information about the replying nodes and with identifiers about the replying nodes and sends at least one identifier representing the information in its routing table to the connecting element 604, which populates its routing table preferably using the same technique as 607 and sends at least one identifier representing the information in its routing table to source 600 in accord with the foregoing process. Each node retains the relevant identifiers (routing information) so that subsequent message can be communicated without repeating the discovery sequence. As well, those nodes with memory, such as the couplers, can be configured to save messages.

The functionality described above can be extended to communicate information from the source 600 to an additional device 616 connected to the network 606 by a network 612. The device 616 can be an additional appliance 12 or other device that is configured to utilize information from the source 600.

With this structure, if an electric utility is facing a brownout, for example, a source of information about the electricity can send a general message asking for resource consumption reduction to the plurality of communicating nodes which had previously positively responded to the first discovery message sent from 600. The general message is propagated by the plurality of smart couplers coupled to 600 via the network 602 or other networks to which 600 is coupled. Similarly, a source of consumables, such as filters or spare parts, can ascertain from an appliance the status of the consumable and send information about the timing and availability of replacement.

In certain embodiments, there could be a first appliance with a graphical user interface coupled to a smart coupler in communication with a source of information about a resource. The first appliance could also be in communication with a second appliance via at least one smart coupler. The second appliance does not have a graphical user interface. A user of the first appliance could input a parameter into the graphical user interface, such as a price threshold at which the user would prefer to reduce the level of consumption of a resource. This parameter could be stored in the memory of a node in first appliance, in the memory of a smart coupler in communication therewith, or in the memory of the source of information about a resource. When a message is received from the source of information about a resource, the software component configured to respond to information about a resource can use the parameter to determine the response to the information about a resource. The response could be to change the operation of the appliance to reduce a level of resource consumption. The response could also include sending message to the second appliance. The message to the second appliance could either be a command to reduce a level of resource consumption or a message to a second software component configured to respond to the information about a resource. Further, information about the response to the information about a resource can be displayed on the graphical user interface, and the information about the response can come from the first and/or the second appliance.

It should be noted that using discovery messages to populate routing tables is the preferred embodiment. However, routing tables can also be populated using conventional configuration methods involving a manual or semi-manual configuration process. In addition, a manual or semi-manual configuration process can be used in addition to discovery generated routing tables. In this approach, the discovery process or the configuration process can incrementally add or delete routing information within a routing table.

As illustrated in FIG. 61, a smart coupler 1042 can be communicatively coupled to the appliance 12, an external client 170 in the form of a diagnostic PC, and a source 500 of information about operation of the appliance 12 so that failures or other problems in the appliance 12 can be diagnosed, monitored, and/or resolved. The smart coupler 1042, which could be a smart cable 120, 420, is communicatively coupled to a network 402 of the appliance 12 via connection element 400. The smart coupler also connects to the source 500 directly via the interface expander port 324 or via an auxiliary wireless or wired communicating component coupled to the smart coupler via the interface expander port 324 and via a wired or wireless communicating component 350 (see FIG. 60A). The wireless communicating component 350 can be any arbitrary wireless or wired communicating component able to establish communications with the wired or wireless communicating component coupled to the interface expander port 324.

The source 500 connects to the appliance 12 in a manner enabling the source 500 to obtain information about at least one operational parameter or measured value associated with the operation of the appliance 12, e.g., direct connection 505. Exemplary operational parameters include power consumption, temperature, data about the cycle of operation, vibration, noise, and the like. The source 500 can communicate with the network 402 to send information about at least one operational parameter of the appliance 12 to the smart coupler and/or diagnostic PC. Alternatively, the source 500 is not in communication with the network 402 and monitors at least one operational parameter of the appliance 12 by other means. For example, if the appliance 12 is a conventional washing machine, the source 500 can be in communication with an accelerometer attached to the exterior of the washing machine for monitoring vibrations, which enables the detection of an imbalance in the washing machine.

The source 500 can communicate with the smart coupler, the appliance 12, the diagnostic PC, or any combination thereof. We assume that the source 500 has at least an appropriate communication driver, or at least one of the smart coupler, the appliance 12, and the diagnostic PC has software to translate any message from the source 500 to the aforementioned communication protocols, for example. It should be understood that the functionality employed by the source 500 can include functional identifiers which can be discovered through propagated messages by any node in communication therewith.

If the appliance 12 experiences a failure that requires a service person to visit the appliance 12 in the home, the service person can couple a PC or other portable computing device to the appliance 12 to diagnose the problem using at least one of the smart cable 120, 420 or using the smart wireless coupler, or by using a service key, or by using a central collector. Problems can be diagnosed by sending low-level commands to the appliance from the PC instructing various components in the appliance to turn on or off and/or change their operating parameters. One exemplary way of accomplishing this is by using multiple modes of operation as disclosed above, whereby the client puts at least one software operating layer into a different mode, and the different mode configures the software architecture to receive and act on a different set of messages that provides a different set of functionalities to the external client. Information from the source 500 regarding the operation of the appliance 12 can then be examined in order to see if the instructions from the PC have resulted in a predictable outcome. For example, in order to test a heating element in an oven, the PC would send a command to the oven instructing the heating element to turn on. A measured temperature of an oven cavity having the heating element therein can be sent to the PC by the source 500 or from componentry (including a smart cable) connected to or in communication with internal components 404 or preferably both. This information can be used to determine whether the heating element is functioning properly and heating the oven cavity to a desired temperature.

Information from the source 500 can also cause the PC or any other element in the system to prompt a user at a user interface to choose at least one component 404 to be turned off in the appliance 12, or to take some other action. A user can also enter default actions at the user interface to be taken in response to the receipt of certain information from the source 500. For example, a user can configure the heating element to turn off if the source 500 notifies the system that the temperature of the oven cavity is dangerously high.

Alternatively, the failure code can be sent directly to the appliance 12 to turn off a low-priority component 404. Failure codes can also be sent to the smart coupler, which can use the processor 320 to analyze the code and generate appropriate instructions to be sent to the appliance 12.

Figure 62:
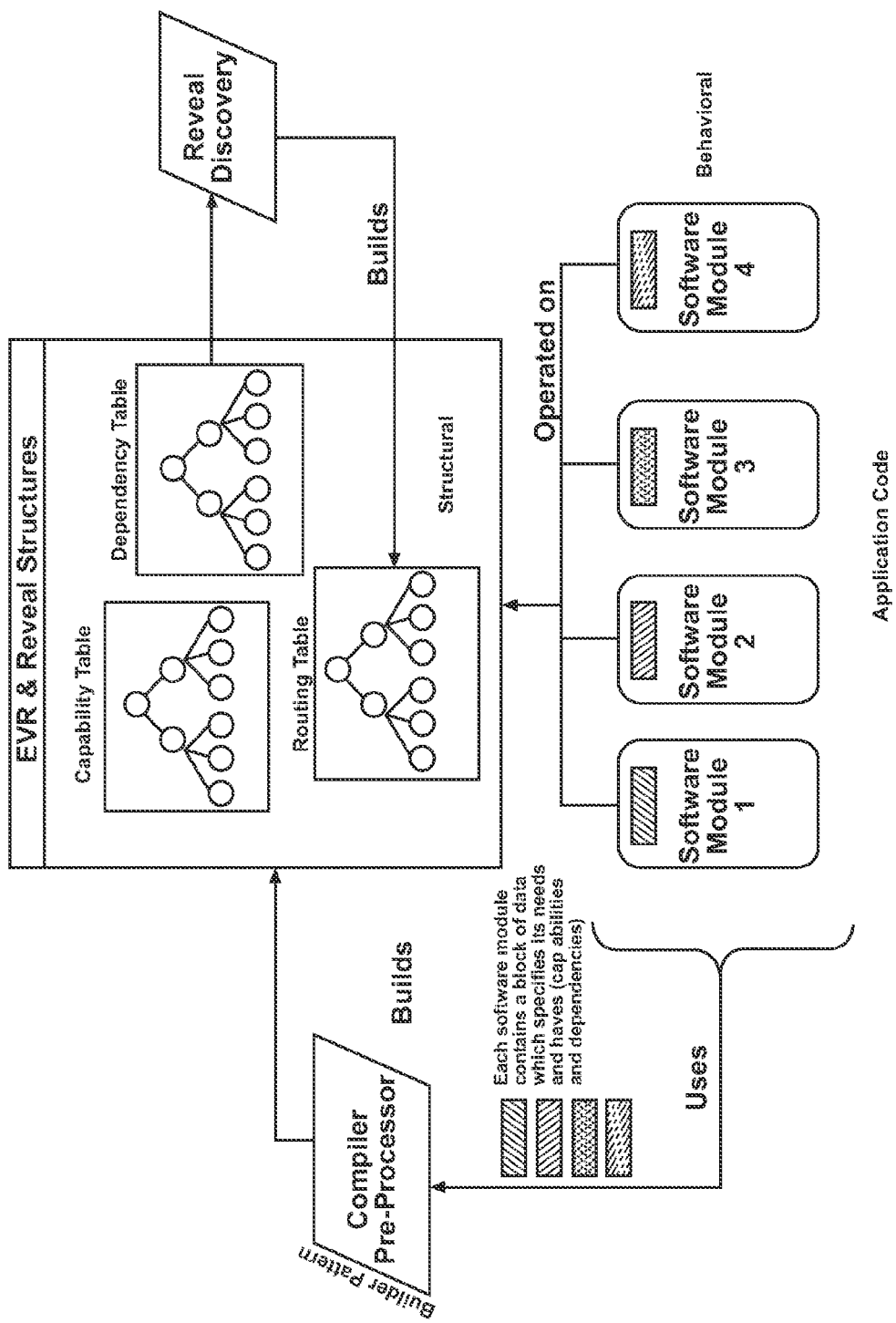
FIG. 62 is a schematic view illustrating the process of creating main structures of an embedded virtual router.

FIG. 62 illustrates the process of creating the main structures 74 of the embedded virtual router 70 (see FIG. 14). The three main structures 74 comprise a capability table, a dependency table, and a routing table. Each software module operating over the appliance network or among appliances and accessories contains its own capability and dependency information. The compiler pre-processor executes a set of EVR builder macros at compile time to create a capability table and a dependency table (that may be in composite form) for the downloadable software image. Reveal discovery completes the process by populating the routing table. Although FIG. 62 shows the creation of the dependency and capability table on compiling, all can be created at runtime. The routing tables simply inform the application layer how to 'get to' other software specified in its dependency list. Routing tables are populated based on a first set of software modules stating a set of "needs" in the dependency table and a second set of software modules stating a set of "haves" in the capability table. For "needs," the implementer specifies what software modules (classes) are needed by this software module. For "haves," the implementer specifies what software modules (classes) are available.

Figure 62A:
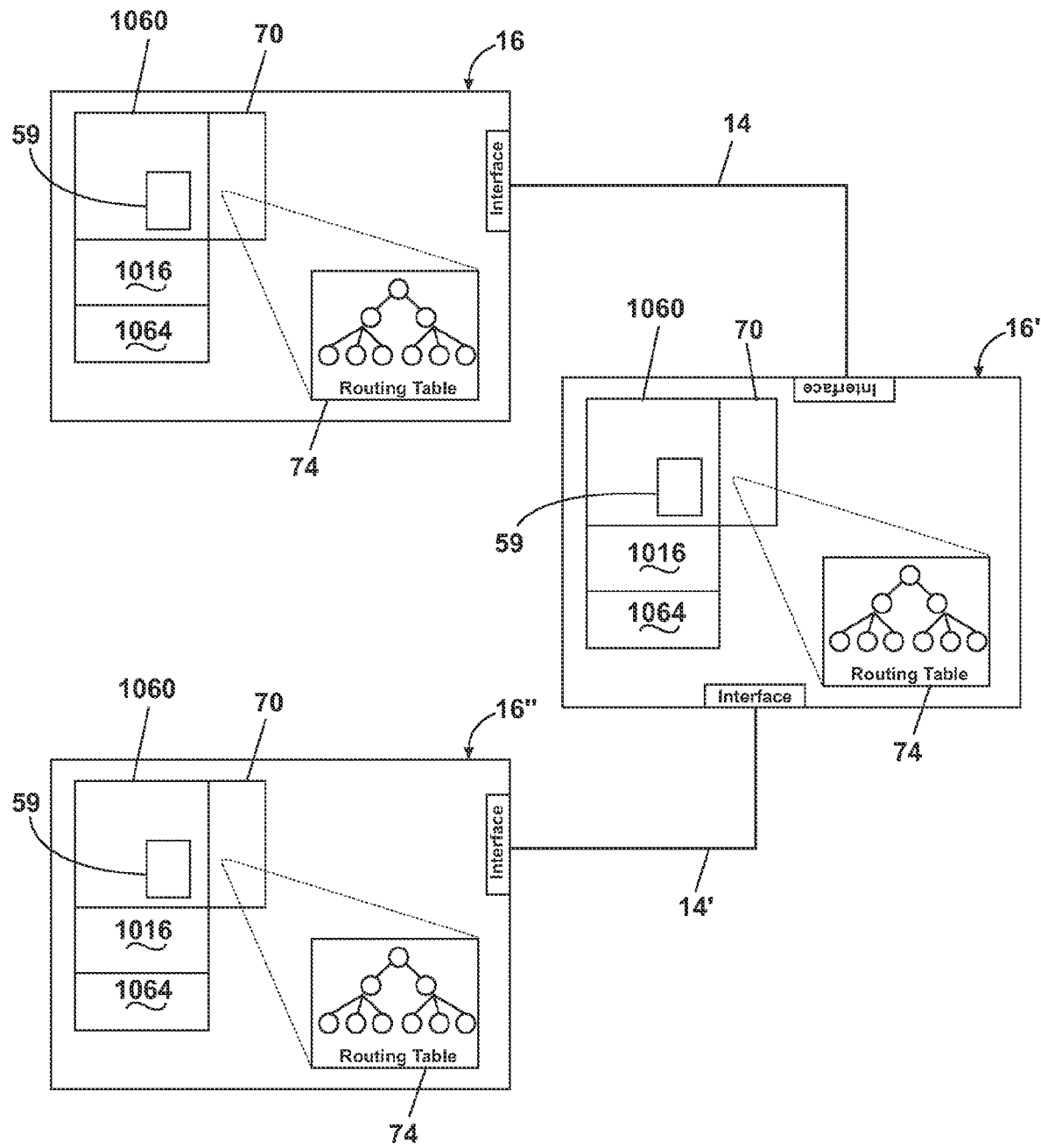
FIG. 62A is a schematic view of a plurality of hardware components that are communicatively connected using chaining.

FIG. 62A illustrates how the embedded virtual router 70 can enable different hardware components 16, 16', 16" to be virtually chained together. This virtual chaining enables messages to be sent from the application logic 59 of a first hardware component 16 to the application logic 59 of a third hardware component 16" without the first hardware component 16 having to know anything about the route that a message will have to take by using structures 74 contained in each component's embedded virtual router 70. Each hardware component 16 16', 16" includes at least one arbitrary software component, e.g., software components 1060 (see FIG. 14A). Each hardware component 16, 16', 16" also includes an SA driver 1016 and a WIDE driver 1064 (see FIG. 14A). Network 14 connects the first hardware component 16 to the second hardware component 16', and network 14', which is a different network from network 14, connects the second hardware component 16' to the third hardware component 16". Routing tables comprising the information on the structures contained in the memory of the first hardware component 16 and of the second hardware component 16' of FIG. 62A are used to encapsulate the complete route from the first hardware component 16 to the third hardware component 16". This enables a message to be sent from the first hardware component 16 to the third hardware component 16" without the first hardware component 16 having knowledge of the route between the second hardware component 16' and the third hardware component 16". The message can be propagated such that a first message is sent from the first hardware component 16 to the second hardware component 16' while a second message is sent from the second hardware component 16' to the third hardware component 16". In this manner, the routing information necessary to route the message from the first hardware component 16 to the third hardware component 16" is contained in part within each of the first and second messages.

Object Oriented Control Protocol

Figure 63:
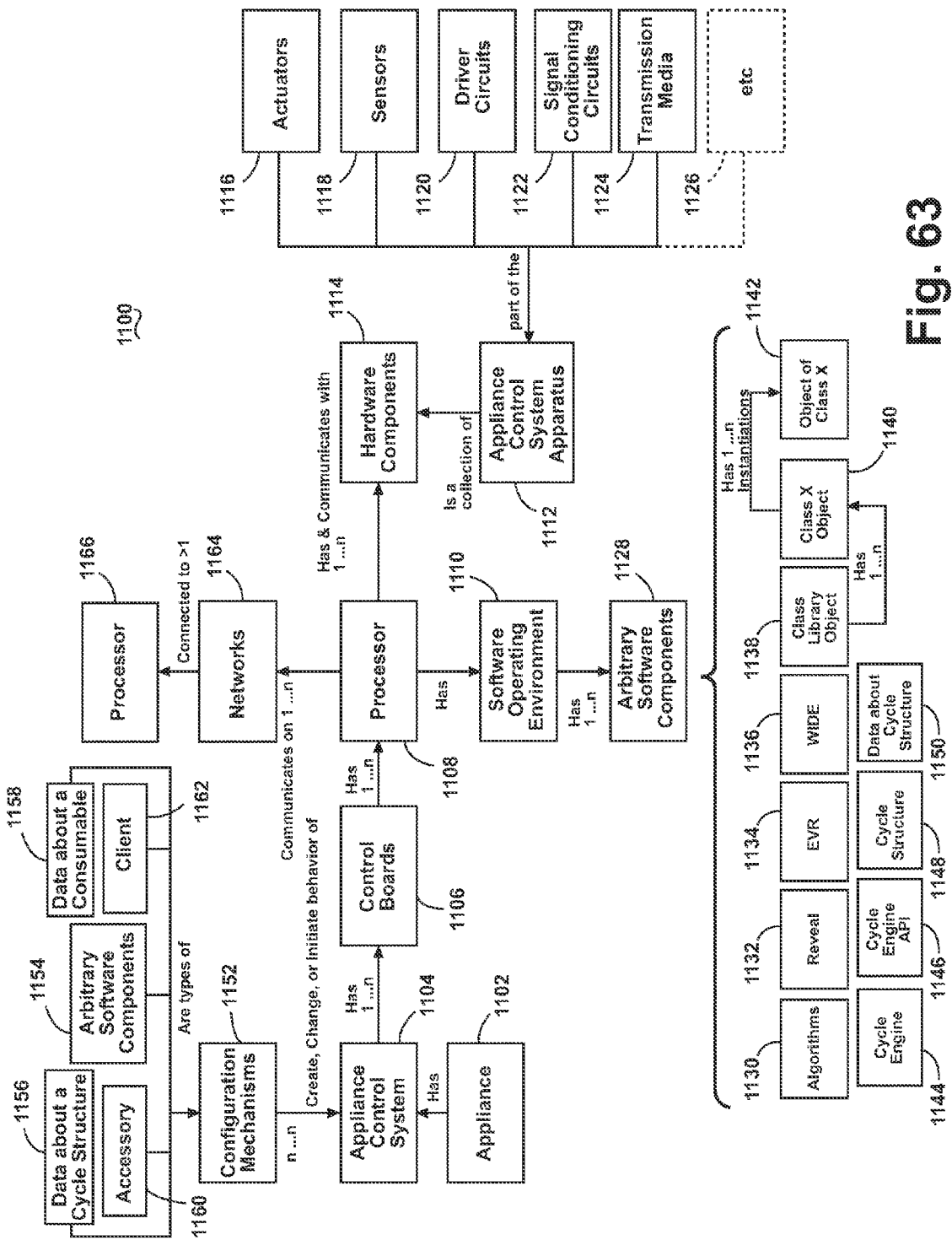
FIG. 63 is a schematic view of relationship between structural components within an appliance control system.

FIG. 63 exemplifies the relationships among the structural components within an appliance object-oriented control protocol 1100 according to the invention. An appliance 1102 has an appliance control system 1104 enabling it to perform a physical operation on an article. The appliance control system 1104 has at least one control board 1106 of a type well known in the art, each control board 1106 having at least one processor 1108 able to execute software (also known sometimes as firmware) within a software operating environment 1110 and control some part of an appliance control system apparatus 1112. Controlling an appliance control system apparatus 1112 means changing the state of one or more hardware components 1114 in communication with the processor 1108 by an action of the processor 1108. The appliance control system apparatus 1112 comprises such things as electrochemical actuators 1116, sensors 1118, driver circuits 1120, signal conditioning circuits 1122, transmission media 1124, and other hardware components 1126 necessary to effectively perform a physical operation on an article, including, but not limited to, electro-mechanical devices and electro-thermal devices. For example, a valve may be changed from a closed state to an open state in response to a signal from the processor 1108. This represents the control of the valve by the processor 1108. The processor 1108 may effect this change of state by changing the state of one of its IO Pins which is in effective communication with the hardware component 1114 or by sending a network message where the network is in effective communication with the hardware component. Effective communication refers to the ability to send and receive messages with meaningful information without defining the exact means by which communication is achieved. The software that the processor 1108 executes can comprise any of a plurality of arbitrary software components 1128, each with a well defined functional purpose and a well defined interface for enabling a second component to be compatibly designed and to be communicatively coupled. An arbitrary software component 1128 is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. Other examples of arbitrary software components 1128 as shown in FIG. 63 include algorithms 1130, a software architecture 1132, an embedded virtual router 1134 (such as 70 in FIG. 14), an internal appliance communication protocol such as WIDE 1136, a class library object 1138, a class X object 1140, an object of class X 1142, a cycle engine 1144, a cycle engine API 1146, a cycle structure 1148, and data about a cycle structure 1150. Class library object 1138, class X object 1140, and object of class X 1142 are described more fully below with reference to FIG. 64. The processor 1108 can also be in communication with one or more other networks 1164, each of which can have one or more other processors 1166. This organization has numerous advantages including increased manageability, readability, portability, configurability, and re-usability.

Various configuration mechanisms 1152 are available to create, change or initiate the behavior of the appliance control system 1104. The configuration mechanisms 1152 include anything that can create, delete, change, stop, or initiate behavior in the appliance control system 1104. The configuration mechanism 1152 can, for example, be an arbitrary software component 1154, data about a cycle structure 1156, data about a consumable 1158, an appliance accessory 1160, a client 1162, or other examples not illustrated in FIG. 63, including, but not limited to a control board, data about an algorithm, data about a consumer benefit, data about a consumer preference, data about a consumer, data from a consumer, data from a user interface, a functional component with a driver configured to communicate with an appliance, a remote user interface, a functional component able to generate or communicated a taxonomy dataset, any other functional component in operable communications with the appliance control system, or any functional component of the appliance control system or another appliance control system. The invention introduces methods, techniques, messaging protocols, and software componentry as the building blocks for a new, intelligent appliance control system that will enable the appliance control system 1104 to be effectively built from re-usable components and to be dynamically configured by at least one among a variety of different configuration mechanisms 1152. An object-oriented control system 1100 according to the invention will deliver the benefits of re-usability, robustness, quality, and configurability.

Configurability is one of the hallmarks of the oriented control system 1100. Object oriented programming has not heretofore been suited for inexpensive real time embedded control systems because it generally requires more memory and was thought to be cost prohibitive as compared to procedurally-oriented or hard-coded control systems. Moreover, real time embedded control systems are very in-flexible due to the nature of the procedural programming methodologies used in very small micro-processors exemplified by those ranging from 4-16 bits of address space and 8 k to 64 k of ROM with very little RAM. The present invention anticipates that sufficient and cost-effective memory is now or soon will be available for an embedded real time control system to allow the cost-effective commercialization of an object oriented real time control system. The present invention also incorporates an expansion of an object-oriented real time control system to include a distributed object oriented real time control system wherein at least one object-oriented real time control system is operatively coupled to another node on a network or to a component with an embedded virtual router provided to direct message traffic. The expansion enhances the invention by allowing multiple components of the design to be interoperable and useful in a plurality of various combinations, therefore further enhancing the value of the invention in the areas of re-use, configurability, flexibility.

Definitions of Object Oriented Terms: Basic. Object oriented techniques in software architecture, such as the software architecture 10 discussed with reference to FIGS. 1-3, 5, 6, 8, 10, and 14, and 4018 in FIG. 14A, and 1132 in FIG. 63 promote and enable software re-use. A first component enabling re-use is the class library. Class library contains a plurality of class definitions. A class definition comprises an interface with a plurality of method definitions and a plurality of field definitions.

Field definitions are named variables that have a known data type. The value of a field definition must be a value corresponding to the field data-type. For example, say field x is an unsigned integer. The value of x can be a number within the range of 0 to 65535. Field definitions can also have a data-type corresponding to another class definition.

A method definition is a function with a name and a description, a return value, and a set of arguments. Each argument of the method can also have a name and a description. Each argument can also have a data-type and a set of valid values. The data-type can also be a class definition.

Each method definition further comprises executable software which can use the arguments in conjunction with the executable software so that the executable software returns a result and/or executes the behavior corresponding to the logic of the executable software and the values of the argument received in the set of arguments. A method definition can further comprise invocations onto other method definitions of its containing class or to method definitions which it has visibility to. The approach to gaining visibility to other classes' methods is known in the art. The return values from the other method definitions can be used by the executable software of the first method either to influence the return value of the method or to influence the behavior of the logic of the executable software.

Preferably, a class definition is confined to a single logical purpose to which the plurality of methods contributes the enablement thereof. A class library can be governed independently of the appliance control system to which it is applied. Class library governance includes deployment, documentation, development, testing, bug fixes, revision control and the like.

Class definitions are made executable in two ways. The first way is via a method known as static. When a class is executing statically, all executions of the methods of the class are occurring within the same memory of the processor. This means that if there are two executions occurring simultaneously, the methods of the class must be designed such that any state information used within the execution and stored in memory by a first execution is guarded against inadvertent use by a second execution.

Two factors giving rise to the second way are that 1) it is advantageous for methods to store state information in memory for later use and 2) to enable the first way, it is required to index that state information to a particular execution or execution context so that when there are multiple executions or execution contexts that the method can retrieve the appropriate state information.

Therefore, the second way a class definition is made executable is by instancing a class into an object thereby creating the mechanisms to assign an instance of a class to a particular execution or execution context. Instantiation refers to the allocation and assignment of memory sufficient to hold a unique collection of information associated with a unique object instance and defined by the field and method definitions of the class definition.

Instantiation is the mechanism which allows a class's state information and references to other objects to be encapsulated together and associated with a particular execution or execution context and to expose that instantiated memory to other objects via some type of memory pointer or unique identifier.

An object has the ability to store information associated with its execution context and in its fields. When an object has a field of a data-type that corresponds to a class, the value of the field can be an object. In this way, objects can be composed of their own fields of data and methods and of a plurality of other objects.

Definitions of Object Oriented Terms: Advanced. Patterns, pattern categories, frameworks, and layer architectures are terms of art that reference certain advanced design concepts which are not applied to real time embedded control systems. A design pattern is a standard solution that addresses a recurring design problem. Well known design patterns include Composite, Recursive Composition, Observer, Builder, Factory, Abstract Factory, Strategy, Decorator, Façade, Singleton, Adapter, Proxy, Command, State, Hierarchical State, Iterator, Façade, Flyweight, Template, and Chain of Responsibility. Patterns are organized into Categories of Creational, Structural, and Behavioral wherein each pattern belongs to only one category. Structural patterns are used to organize objects into appropriate structures associated with the domain of the design. Objects organized according to creational patterns facilitate the creation of the structures. Objects organized according to behavioral patterns operate on the structures for the purpose of creating a result such as modification, addition, deletion, data extraction, data calculation, and the like. The advantage of this type of organization is that certain arbitrary software components are more re-usable. For example, a portion of a cycle engine that executes the cycle can be the same software for every appliance because it is configured to operate on the components configured using the composite pattern to representing a cycle structure. A second portion of the cycle engine is configured according to the builder pattern so that it can retrieve data about the cycle structure and create the cycle structure from the data about the cycle structure. Using this technique, a plurality of appliances can be configured to perform a plurality of operations providing a plurality of consumer benefits using exactly the same software except for the values of the data about the cycle structure. Even the location of the data about the cycle structure can be different and distributed by configuring the Creational component with advance discovery techniques (previously described in CyclesOfOperationsAccessory). Without these techniques, a reasonable level of re-use and configurability would not be possible.

Frameworks are more specialized than pattern. Frameworks are a plurality of software components operatively coupled to address a specialized problem domain with an expected set of variability. In other words, a framework is designed to solve a set of related problems wherein some instances of the related problems are not known but anticipated and wherein the framework can operably address the some instances when the some instances occur without additional changes to the framework. A layered architecture is a plurality of frameworks that are in operable co-operation wherein each of the frameworks is independent and can be used in other occurrences of layered frameworks.

The invention further includes an appliance control system for controlling an appliance control system apparatus using a layered architecture of a plurality of frameworks wherein each framework comprises at least one implementation of an object oriented pattern. Preferably, there are multiple patterns implemented wherein there are patterns for creating structures, structures, and behavioral patterns that operate on the structures.

Alternatively or additionally, the invention comprises an appliance control system for controlling an appliance control system apparatus using objects instantiated from class definitions.

Typically, a software operating environment which supports object oriented techniques is able to allocate RAM memory dynamically at runtime. Dynamic memory allocation might be used when new objects are created because address and memory space must be allocated to hold the data associated with the object and any address identifiers required for operable use. There is a correlative relationship between memory allocation and object creation; as well there is a correlative relationship between object creation and configurability of the behavior of the arbitrary software components within the object oriented software operating environment. The invention encompasses an appliance control system configured to allocate memory at runtime for the purpose of assigning memory to instantiated objects.

Dynamic Configuration. As previously stated, objects can be composed of a plurality of other objects according to the objects field definitions. If an object comprises a method which has executable software to set the value of a field defined to hold an object, then that object can be reconfigured by changing the value of the a field from a first object to a second object. This reconfiguration can then result in a different composite or overall appliance control system behavior. There are many useful purposes for an appliance control system whose behavior can be changed by changing the values in a first objects field to a third object from a second object. For example, a cycle accessory could use this technique to change a cycle structure. Likewise, both a consumables reader and a recipe book wand could use these techniques to customize the behavior of the appliance control system according to the data about the cycle, the data about a consumable, and the like.

There are many mechanisms which can initiate and manage the Dynamic Configuration of an appliance control system. However, these mechanisms (see FIG. 63) will need a common design framework with which to accomplish the dynamic configuration. And some portions of the dynamic configuration can be accomplished during the compile process while other portions may be accomplished at post-compile time (a/k/a runtime).

Figure 64:
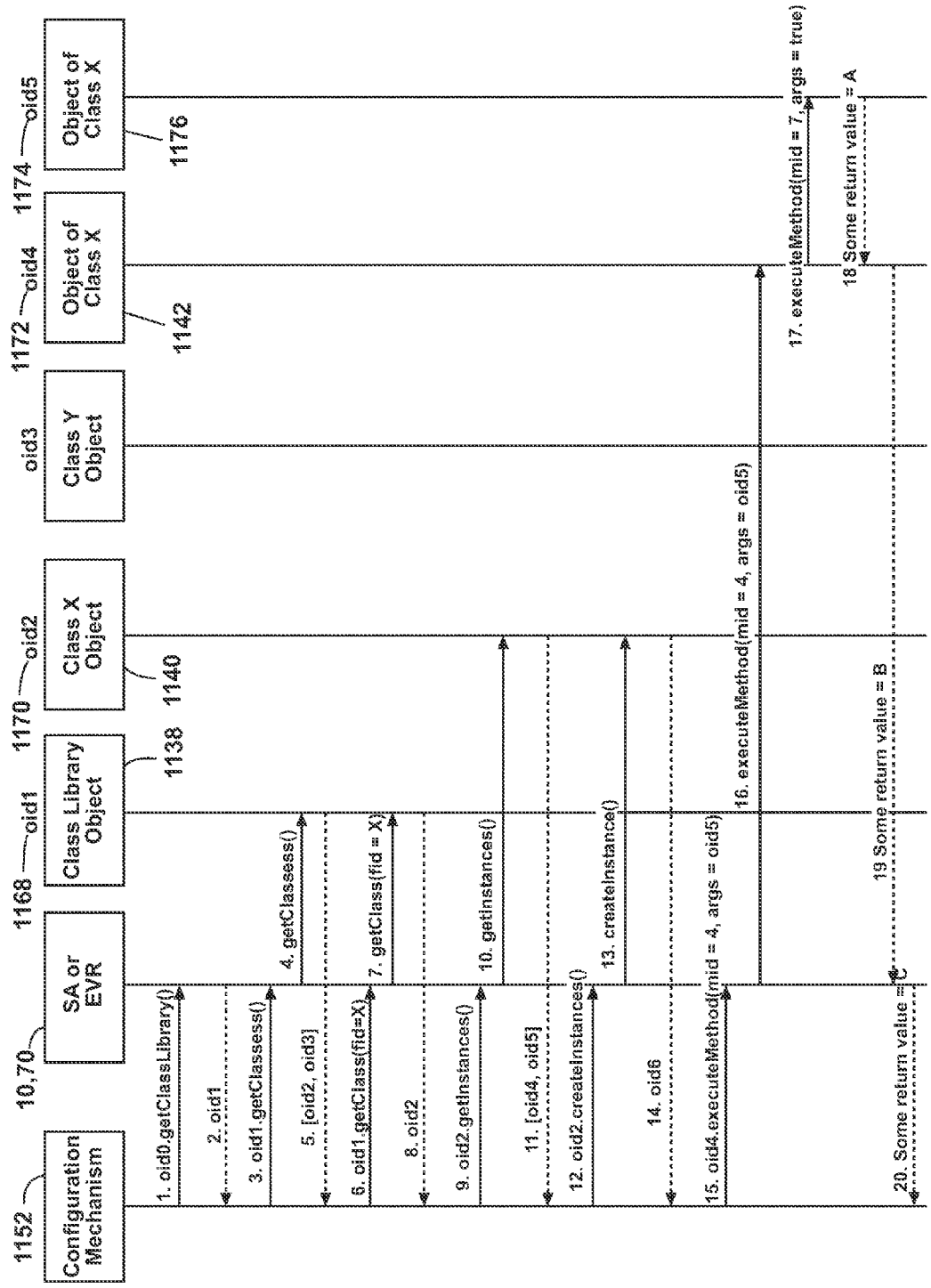
FIG. 64 is a schematic view of the basic mechanisms which can create and manage the software portion of an appliance control system.

In any event, FIG. 64 discloses the basic mechanisms needed to create and manage the software portion of an appliance control system, such as the appliance control system 1104 from FIG. 63, comprising at least one class library 1138 with classes that can be instantiated as objects 1140 and referenced to other objects in a form of at least one composite structure, and the configuration mechanism, such as the configuration mechanism 1152 from FIG. 63, which may be a client, client accessory, or another arbitrary software component, either within a shared runtime environment with the other objects in the diagram or in effective communication with the other objects across a network.

In message 1, the configuration mechanism 1152 is able to discover the available functionality of the software operating environment exposed with the discovery software architecture 10 (FIG.) or the embedded virtual router 70 (FIG.) by sending a message to the discovery software architecture 10 or the embedded virtual router 70 to getClassLibrary( ).

This message is a form of discovery of functional identifiers, and is restricted to discovery of classes and not instances of classes. The class library 1138 is itself an object instantiated from the ClassLibrary class. An example of a unique numeric functional identifier in an appliance would include an API ID plus Type and Version.

In message 2, a unique numeric addressing identifier is returned so that the configuration mechanism 1152 can address the class library object 1138 directly. An example of a unique numeric addressing identifier in an appliance would include Node ID plus API ID.

In message 3, the configuration mechanism 1152 sends a message to the discovery software architecture 10 or the embedded virtual router 70 with a unique numeric addressing identifier 1168 enabling it to be forwarded to the object corresponding to the unique numeric addressing identifier (in this case, oid1 for the class library 1138).

In message 4, the discovery software architecture 10 or the embedded virtual router 70 forwards the message getClasses( ) to the class library object 1138.

In message 5, the class library object 1138, returns unique numeric addressing identifiers for objects representing the classes contained by the class library objects.

In messages 6 and 7, the configuration mechanism 1152 sends a message to the class library object 1138 requesting unique addressing identifiers 1170 for objects 1140 instantiated on Class X. Class X is specified as an argument to the message and Class X is represented by a unique numeric functional identifier also known as a class identifier.

In message 8, the unique numeric addressing identifier 1170 is returned allowing the configuration mechanism 1152 to address subsequent messages to the object 1140 representing the Class which is identified by the unique numeric functional identifier of X [where X can be any number].

In messages 9 and 10, the configuration mechanism 1152 sends a message to the object 1140 representing Class X requesting unique numeric addressing identifiers 1172, 1174 for all objects 1142, 1176 instantiated on Class X.

In message 11, a collection unique numeric addressing identifiers 1172, 1174 are returned.

In messages 12 and 13, the configuration mechanism 1152 requests that the object 1140 representing Class X create a new instance of Class X.

In message 14, Class X returns the unique numeric addressing identifier of the new instance.

In messages 15 and 16, a method is invoked on an instance of Class X where the first argument is MID which is an identifier of the method to which the request is purposed for. [MID is the equivalent of OP code discussed above.] A second set of arguments are arbitrary and will correspond to the method definitions of the class of which the object is instantiated. In this case, one of the arguments is a second unique numeric addressing identifier for a second object different from the object receiving messages 15 and 16. This allows the oid4 to address a subsequent message contained within the software of the method corresponding to MID to oid5.

In this case, the software of the method corresponding to MID could have set a field value of oid4 to oid5 resulting in oid4 being partially composed by oid5. Composition is a preferred technique to create re-usable structures. Black-box re-use refers to establishing or changing structures of composition of objects at runtime by enabling objects to obtain references to other objects at runtime. Adopting this technique allows an object-oriented control system to be modified at runtime by a plurality of configuration mechanisms. Several embodiments of appliance functional configurations can benefit from black-box re-use techniques. Examples are appliances with cycle engines, appliances that need to change or allow their cycle structure to be changed in response to an interaction with a consumable or consumable reader, a recipe book, or any other configuration mechanism, especially those which effect the cycle of operation either directly or indirectly by way of data about themselves, a consumable, a person, an appliance, a benefit, an outcome, or a behavior.

Appliances can also hold data about themselves, their componentry, and the organization of their componentry. In one embodiment, the appliance would have a composition with a root container of an appliance object having attributes of model number and serial number, methods for setting and getting those attributes, and at least one attribute containing a plurality of other objects representative of a first set of child containers. An example of a first set of child containers might be an appliance control system which in turn might have a second set of child containers of control boards wherein each object within the composition would also comprise a plurality of known methods and attribute names such as part numbers, model numbers, vendor ids, serial numbers and the like wherein some of the methods could be exposed to other local or remote objects for invocation and wherein the attribute names would be associated with values determined by the instance of that appliance, its current or past state, other factors, or any combination thereof. The classes available to be composed in the composition could be designed such that a client could bi-directionally traverse the composition and collect relevant attribute data or invoke appropriate methods according to the behavioral purpose of the client. In one embodiment, the client would be configured as a behavioral component of the visitor pattern within the same software operating environment of the composite structure. In a second embodiment, the client would be external to the composite structure and would access the structure over a network preferably using an embedded virtual router to encapsulate the difference between the external interface of the network and the internal interface of object to object collaboration within a single software operating environment. In one embodiment, the object composition of an appliance control system would be comprehensive and would be representative of the types of objects suggested in FIG. 63.

For an object-oriented control system to be distributed means that multiple software operating environments, each with a plurality of objects, will have the objects in operable communication. The invention blends object oriented messages between messaging in a runtime environment with messaging between objects across a network. A communications network like WIDE having a protocol like SA can be used to enable the operable communications between objects not sharing a runtime environment. Further, an embedded virtual router can be used to selectively encapsulate the communications between objects independent of the interposing architecture. It is preferred, then, that the packet structure be specifically designed and optimized for object oriented messaging. Therefore a plurality of namespaces comprising identifiers, either individually or in sets, must be defined to uniquely identify classes, objects, methods, method arguments, object and class attributes. Namespaces are the range of identifiers for a given set of things where each identifier can have an unambiguous meaning.

The packet structure can then be defined wherein fields of the packet can contain elements of the various namespaces allowing operable communications between objects. An exemplary packet structure might contain object ids, method ids, class ids, and argument values wherein the ordinal position of the argument value would designate the argument. An alternative to argument values by position would be pairs of argument ids and argument values wherein the ordinal position of the argument value within the packet would not have meaning and the meaning would be derived from the argument id.

Figure 65:
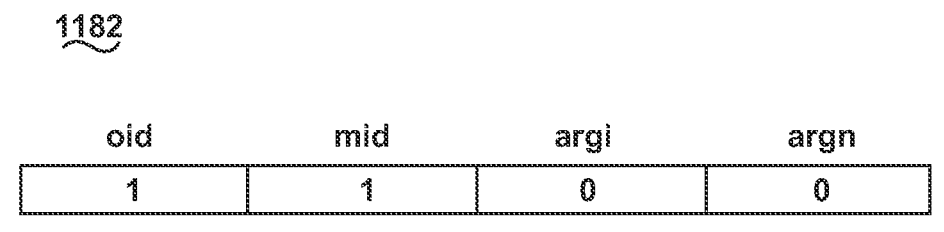

See, for example, FIG. 65 that shows an exemplary packet structure 1182 for an object-oriented message in an appliance 1102 (FIG. 63) according to the invention. In this case, FIG. 65 illustrates the packet structure 1182 for message 3 sent from the configuration mechanism 1152 to the SA 10 or to the embedded virtual router 70 in FIG. 64. The packet 1182 will include at least 4 bytes, one to set the oid (1), one to set the MID (1) and one each for the arguments $arg_1$ through $arg_n$. It will be understood that the packet 1102 can be included in a larger message including values for MMP or Frag, as well as network identifiers as shown, for example, for the packet 24 in FIG. 4.

This invention thus comprises at least one object-oriented control system configurable by a configuration mechanism in selective operable communication with a plurality of object oriented control systems using a packet protocol for constructing messages comprising identifiers from a plurality of namespaces associated with the building blocks of object-oriented systems wherein the meaning of each unique identifier within class library namespace is uniquely meaningful throughout the universe of appliances. The operable communications between objects can be selectively encapsulated through the use of an embedded virtual router and the context of more data about an object can be ascertained by traversing the composite structure from the object or knowing the class from which the object is instantiated. The invention further comprises a comprehensive approach to create a control system which can be configured to deliver the desired benefits of the user.

While the invention has been specifically described in connection with certain specific embodiments thereof, it is to be understood that this is by way of illustration and not of limitation, and the scope of the appended claims should be construed as broadly as the prior art will permit.

What is claimed is:

1. A client for use with at least one appliance having an appliance control system enabling the appliance to perform a useful cycle of operation on a physical article in an appliance network, wherein the appliance control system has at least one functionality associated with the cycle of operation from a universe of functionalities, the client comprising:
   at least one control board having a software architecture configured for communication over the appliance network including with the appliance control system of the at least one appliance,
   wherein the software architecture associates the at least one functionality with a first identifier being an Operational Code (Op Code), and associates the first identifier with at least one second identifier that represents a logical group of functionalities, the second identifier being an Application Programming Interface identifier (API ID), wherein each API ID comprises one or more instances, and wherein the first identifier need only be unique within the context of the second identifier so that the software architecture and the plurality of functionalities is modular and reusable without modification because the at least one functionality within the logical group of functionalities has a unique API ID and the one or more instances comprise a unique instance identifier, and the software architecture enables multiple functionalities simultaneously without changing the values of any of the second identifiers.

2. The client of claim 1 wherein the software architecture associates a third identifier with each second identifier wherein the third identifier represents a class identifier defining message contracts, rules for interaction, and compatibility concerns of the second identifier.

3. The client of claim 2 wherein the third identifier comprises a Type and Version identifier.

4. The client of claim 1 wherein a message comprising communication of the second identifier further comprises one of the first identifier, a request for information relating to the first identifier, a response to a request message having the first identifier, and an acknowledgement of receipt of a command having the first identifier.

5. The client of claim 1 further comprising a display for communication with a user.

6. The client of claim 1 wherein the appliance control system has two identical functionalities and the software architecture assigns a unique instance ID to each of the identical functionalities by associating the second identifier of the functionalities to each of the unique instance IDs.

7. The client of claim 6 wherein the functionality applicable to the second identifier is assignable by way of a message.

8. The client of claim 1 wherein the client is configured to query the appliance network for information such as the identity of another node on the network, another appliance, another client, another arbitrary software component, a device comprising a node, a coupler, one or more of a plurality of identifiable software elements on any node, or functional identifiers thereof.

9. The client of claim 8 wherein the query is a propagated message.

10. The client of claim 8 wherein the first and second identifiers are received in response to a query.

11. The client according to claim 1 wherein the client is one of a clock and time synchronization accessory, a stirring and ingredient addition accessory, a cooking sensor accessory, an operation cycles accessory, a consumable messaging and reader accessory, a recipe book, a recipe wand, a laundry credit accessory, a smart dimmer and adapter, a network binder accessory, a remote user interface, a smart coupler, a resource communication accessory, a cellular telephone accessory, a configuration mechanism, an audio communication accessory, and a remote audio communication accessory.

12. The client according to claim 1 wherein the software architecture is further configured to communicate a password.

13. The client according to claim 1 further comprising identification information wherein the client can establish useful communications with other communicating nodes without having knowledge of routing information otherwise required to enable the useful communication.

14. The client according to claim 1 wherein the software architecture is configured to collect data associated with a node synchronously for a complete snapshot of updates to the state of the node for one scan of a processor, whereby meaningful dynamic and virtual data aggregation can occur regardless of changing states of the node.

15. The client according to claim 1 wherein the software architecture is further configured to send a plurality of commands wherein multiple messages are used to convey elements of a command, bounded together synchronously whereby the receiving node will know when to begin executing the command.

16. The client according to claim 1 further configured to send configuration messages over the appliance network to create an event structure in a memory heap.

17. The client according to claim 16 further configured to classify the event structure as acknowledged or unacknowledged.

18. The client according to claim 1 further configured to invoke a function of a component in the at least one appliance utilizing encapsulated routing information wherein the invocation does not contain routing information.

19. The client according to claim 1 further configured to listen to a heartbeat of a networked appliance.

20. The client according to claim 1 further comprising a source of information about a resource used by the at least one appliance wherein the at least one appliance consumes at least some of a resource in performing the uesful cycle of operation, the source comprising at least one of a request to change the operation of the at least one appliance in response to a resource parameter and a request for the status of a resource used by the at least one appliance.

21. The client of claim 1 networked to the at least one appliance in the appliance network.

22. The network of claim 21 further comprising a second networked client in communication with at least one of the appliance and the client, whereby the client can communicate time with the second networked client.

23. The network of claim 21 wherein the client is one of internal and external to the at least one appliance.

24. The network of claim 23 wherein the client is internal and further comprising a second appliance on a different network than the client wherein the client is in communication with the second appliance.

25. The network of claim 24 wherein the client is a user interface.

26. The network according to claim 21 wherein the client is on a different network than the at least one appliance and has a communication protocol for the different network.

27. The network according to claim 21 wherein at least one of the nodes propagates discovery messages issued by one of the software architecture and software architecture drivers.

28. The client of claim 1 comprising an embedded virtual router, the arbitrary software component being configured to collaborate with another software component by a method of access or exposure to each other, wherein the embedded virtual router encapsulates the method, whereby the collaboration can be uniform and identical whether the collaboration is over a network or sharing a runtime environment.

* * * * *